(12) United States Patent
Konno et al.

(10) Patent No.: US 6,266,189 B1
(45) Date of Patent: *Jul. 24, 2001

(54) ZOOM LENS SYSTEM HAVING AN IMAGE BLUR COMPENSATING FUNCTION

(75) Inventors: Kenji Konno, Daito; Kohtaro Hayashi, Toyonaka, both of (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/802,756

(22) Filed: Feb. 20, 1997

(30) Foreign Application Priority Data

| Feb. 23, 1996 | (JP) | 8-036814 |
| Feb. 27, 1996 | (JP) | 8/040025 |
| Feb. 27, 1996 | (JP) | 8-040045 |
| Feb. 27, 1996 | (JP) | 8-040050 |
| Feb. 27, 1996 | (JP) | 8-040061 |

(51) Int. Cl.$^7$ .................................................. G02B 27/64
(52) U.S. Cl. ............................ 359/557; 359/686; 396/55
(58) Field of Search .................................. 359/554, 557, 359/676, 686, 687; 396/52, 53, 54, 55

(56) References Cited

U.S. PATENT DOCUMENTS

| 5,182,671 | 1/1993 | Kitagishi et al. ................... 359/557 |
| 5,331,467 | * 7/1994 | Sato ...................................... 359/731 |
| 5,477,297 | * 12/1995 | Suzuki ............................... 354/195.1 |
| 5,502,594 | 3/1996 | Suzuki et al. ........................ 359/557 |
| 5,521,758 | 5/1996 | Hamano ............................... 359/557 |
| 5,579,171 | 11/1996 | Suzuki et al. ........................ 359/687 |
| 5,585,966 | * 12/1996 | Suzuki ................................. 359/557 |

FOREIGN PATENT DOCUMENTS

| 0587167 | 3/1994 | (EP) . |
| 0592916 | 4/1994 | (EP) . |
| 5232410 | 9/1993 | (JP) . |
| 6337375 | 12/1994 | (JP) . |
| 792431 | 4/1995 | (JP) . |
| 7128619 | 5/1995 | (JP) . |
| 7199124 | 8/1995 | (JP) . |
| 8136863 | 5/1996 | (JP) . |

* cited by examiner

Primary Examiner—Cassandra Spyrou
Assistant Examiner—Mark A. Robinson
(74) Attorney, Agent, or Firm—Price and Gess

(57) ABSTRACT

A zoom lens system has the first to fifth lens units from the object side. Refractive powers of the first to fifth lens units are positive, negative, negative, positive, negative, respectively. During zooming, the distances between the lens units are varied. Image blur compensation is made by parallel decentering the second lens unit. The second lens unit includes a first lens unit and a rear lens unit, either of which can be moved vertically to the optical axis to compensate for image blur. The distance between the front and rear lens units is fixed during a zooming mode.

23 Claims, 93 Drawing Sheets

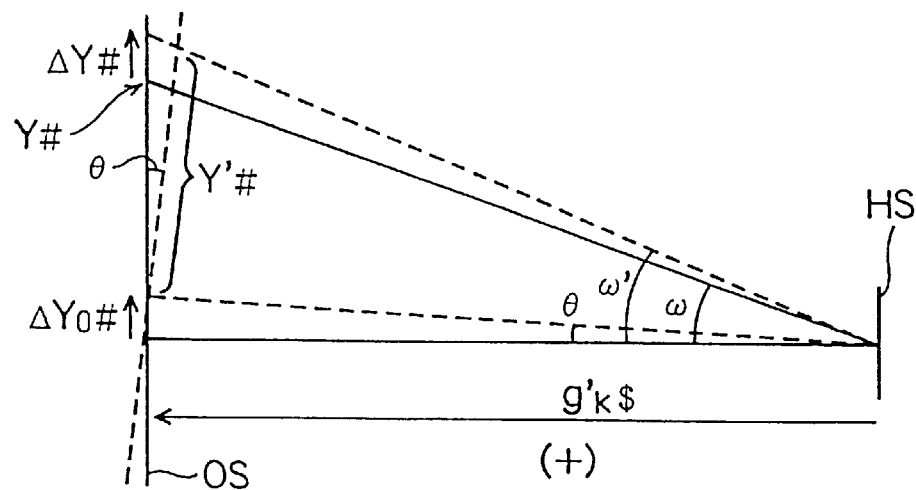
FIG.6A
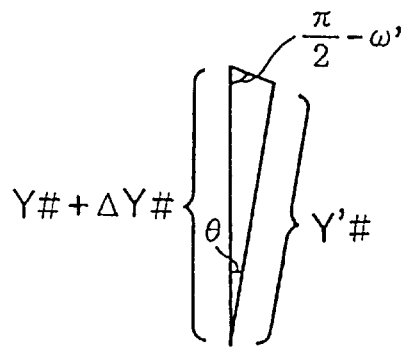
FIG.6B
FIG.7
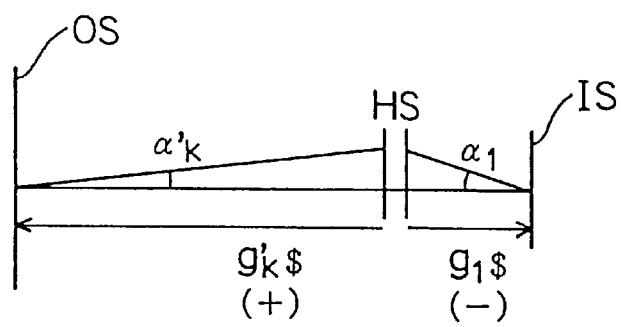

FNO=4.60

Y'=17.3

Y'=17.3

FNO=5.81

Y'=17.3

Y'=17.3

FNO=5.78

Y'=17.3

Y'=17.3

FNO=4.60

SPHERICAL ABERRATION
SINE CONDITION

Y'=17.3

ASTIGMATISM

Y'=17.3

DISTORTION %

FNO=5.81

SPHERICAL ABERRATION
SINE CONDITION

Y'=17.3

ASTIGMATISM

Y'=17.3

DISTORTION %

FNO=6.83

SPHERICAL ABERRATION
SINE CONDITION

Y'=17.3

ASTIGMATISM

Y'=17.3

DISTORTION %

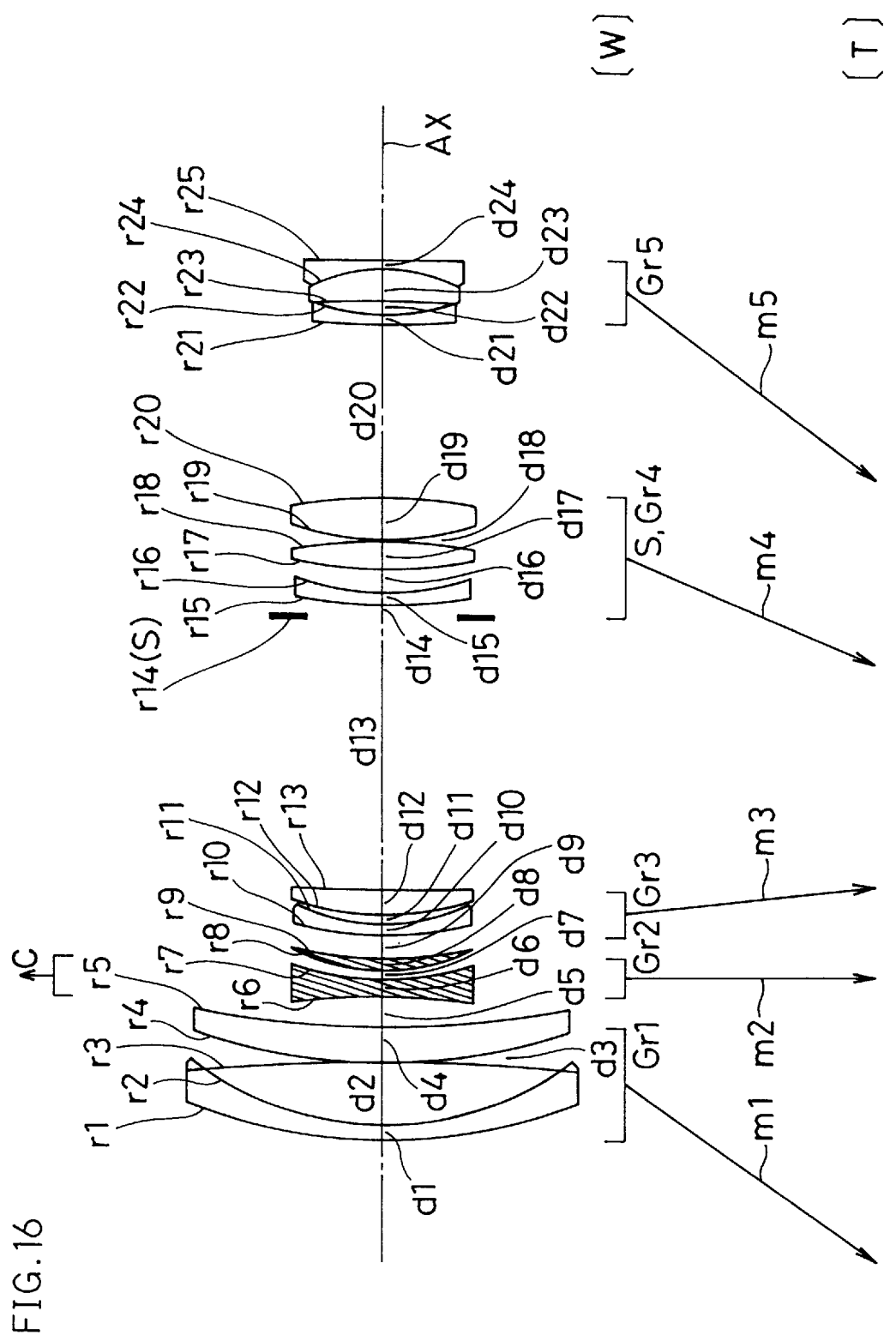

FNO=4.60

— d
----- SC

-0.5  0.5
SPHERICAL SINE
ABERRATION CONDITION

Y'=17.3

----- DM
— DS

-0.5  0.5
ASTIGMATISM

Y'=17.3

-5.0  5.0
DISTORTION %

FNO=5.81

— d
----- SC

-0.5  0.5
SPHERICAL SINE
ABERRATION CONDITION

Y'=17.3

----- DM
— DS

-0.5  0.5
ASTIGMATISM

Y'=17.3

-5.0  5.0
DISTORTION %

FNO=5.95

— d
----- SC

-0.5  0.5
SPHERICAL SINE
ABERRATION CONDITION

Y'=17.3

----- DM
— DS

-0.5  0.5
ASTIGMATISM

Y'=17.3

-5.0  5.0
DISTORTION %

FNO=4.60
SPHERICAL ABERRATION / SINE CONDITION

Y'=17.3
ASTIGMATISM

Y'=17.3
DISTORTION %

FNO=5.90
SPHERICAL ABERRATION / SINE CONDITION

Y'=17.3
ASTIGMATISM

Y'=17.3
DISTORTION %

FNO=6.00
SPHERICAL ABERRATION / SINE CONDITION

Y'=17.3
ASTIGMATISM

Y'=17.3
DISTORTION %

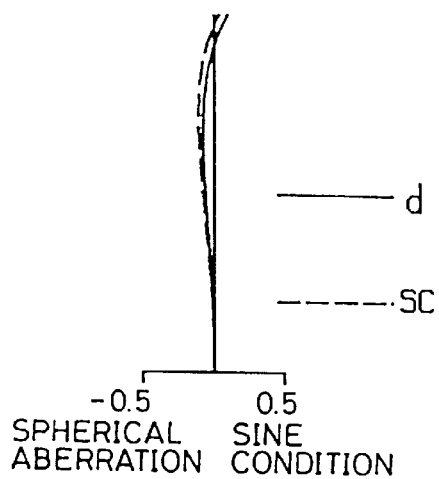
FIG.25A FNO=4.10
FIG.25B Y'=17.25
FIG.25C Y'=17.25
— d
----- SC
----- DM
—— DS
-0.5  0.5
SPHERICAL ABERRATION
SINE CONDITION
-0.5  0.5
ASTIGMATISM
-5.0  5.0
DISTORTION %
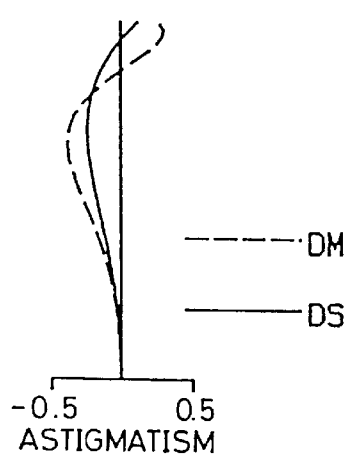
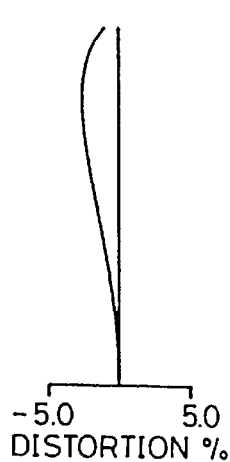
FIG.25D FNO=5.31
FIG.25E Y'=17.25
FIG.25F Y'=17.25
— d
----- SC
----- DM
—— DS
-0.5  0.5
SPHERICAL ABERRATION
SINE CONDITION
-0.5  0.5
ASTIGMATISM
-5.0  5.0
DISTORTION %
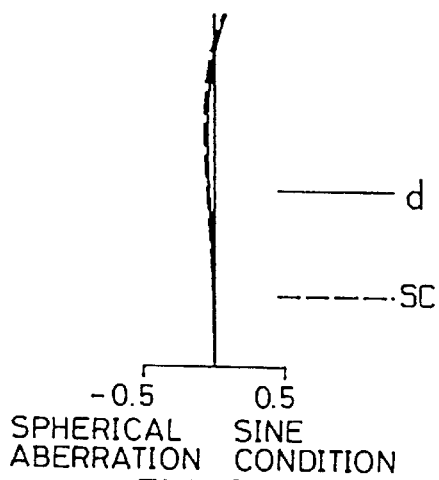
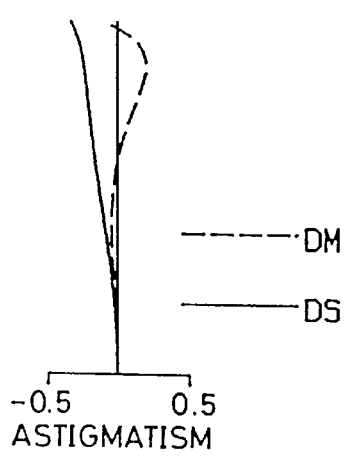
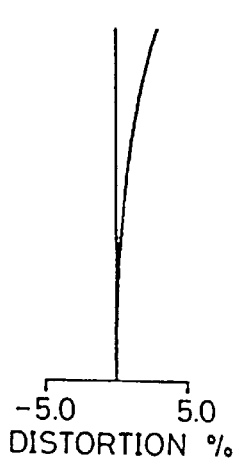
FIG.25G FNO=5.73
FIG.25H Y'=17.25
FIG.25I Y'=17.25
— d
----- SC
----- DM
—— DS
-0.5  0.5
SPHERICAL ABERRATION
SINE CONDITION
-0.5  0.5
ASTIGMATISM
-5.0  5.0
DISTORTION %
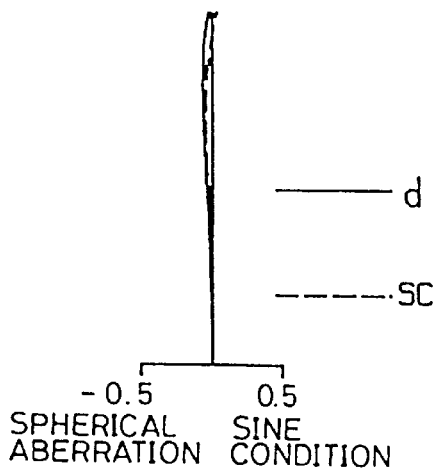
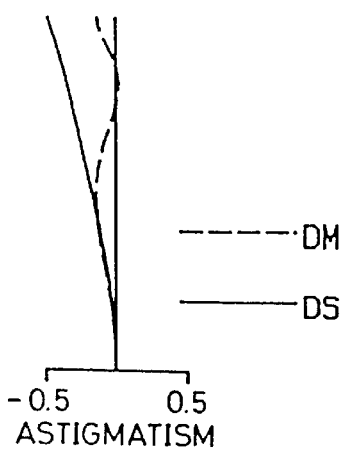
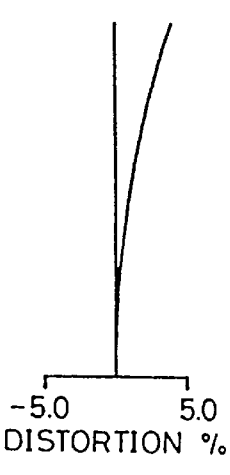

FNO=4.60

SPHERICAL ABERRATION
SINE CONDITION

Y'=17.25

ASTIGMATISM

Y'=17.25

DISTORTION %

FNO=5.23

SPHERICAL ABERRATION
SINE CONDITION

Y'=17.25

ASTIGMATISM

Y'=17.25

DISTORTION %

FNO=5.81

SPHERICAL ABERRATION
SINE CONDITION

Y'=17.25

ASTIGMATISM

Y'=17.25

DISTORTION %

FNO=4.10
— d
----- SC
-0.5    0.5
SPHERICAL  SINE
ABERRATION CONDITION

Y'=17.25
-----DM
——DS
-0.5    0.5
ASTIGMATISM

Y'=17.25
-5.0    5.0
DISTORTION %

FNO=5.31
— d
-----SC
-0.5    0.5
SPHERICAL  SINE
ABERRATION CONDITION

Y'=17.25
-----DM
——DS
-0.5    0.5
ASTIGMATISM

Y'=17.25
-5.0    5.0
DISTORTION %

FNO=5.73
— d
-----SC
-0.5    0.5
SPHERICAL  SINE
ABERRATION CONDITION

Y'=17.25
-----DM
——DS
-0.5    0.5
ASTIGMATISM

Y'=17.25
-5.0    5.0
DISTORTION %

FNO=3.57

SPHERICAL SINE
ABERRATION CONDITION

Y'=17.25

ASTIGMATISM

Y'=17.25

DISTORTION %

FNO=4.38

SPHERICAL SINE
ABERRATION CONDITION

Y'=17.25

ASTIGMATISM

Y'=17.25

DISTORTION %

FNO=4.63

SPHERICAL SINE
ABERRATION CONDITION

Y'=17.25

ASTIGMATISM

Y'=17.25

DISTORTION %

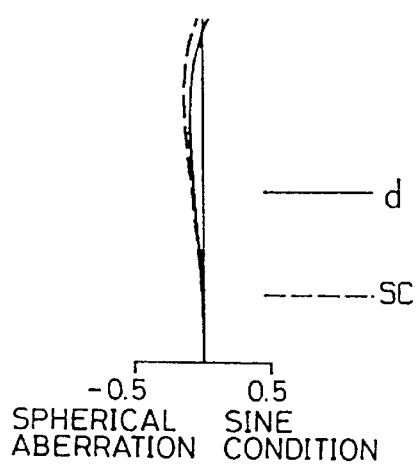
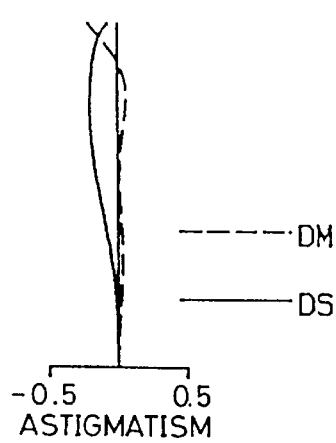
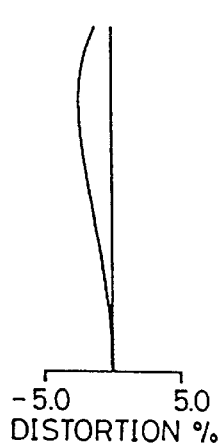
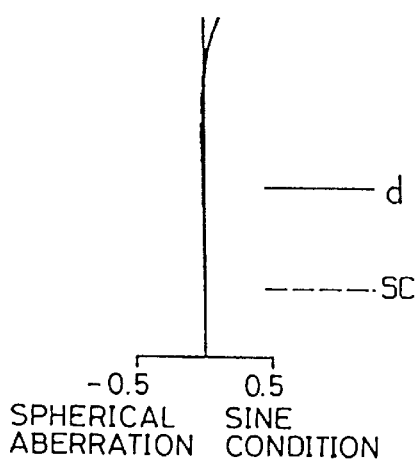
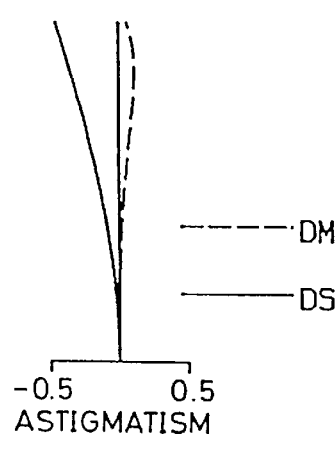
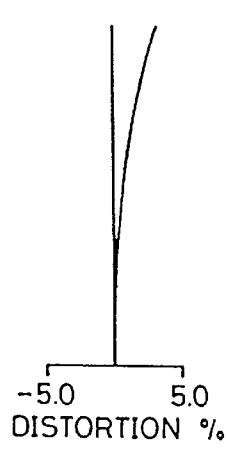
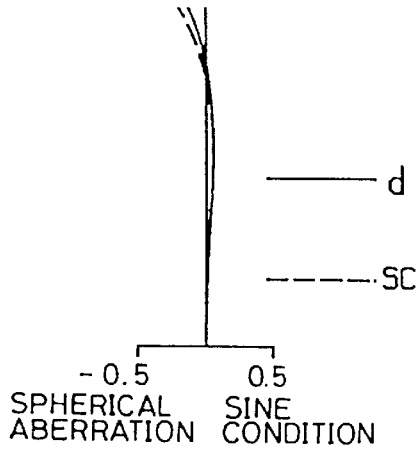
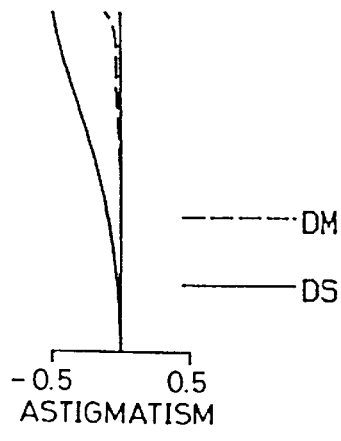
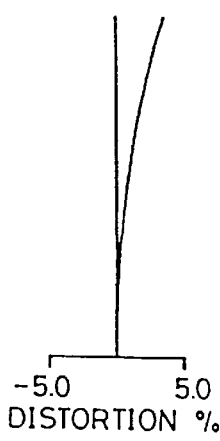

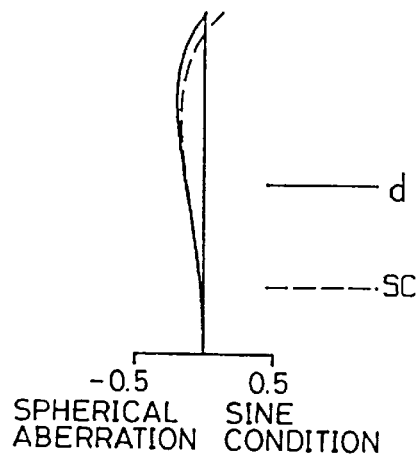
FIG.45A
FNO-4.60
FIG.45B
Y'=17.25
FIG.45C
Y'=17.25
— d
----- SC
----- DM
— DS
-0.5  0.5
SPHERICAL SINE
ABERRATION CONDITION
-0.5  0.5
ASTIGMATISM
-5.0  5.0
DISTORTION %
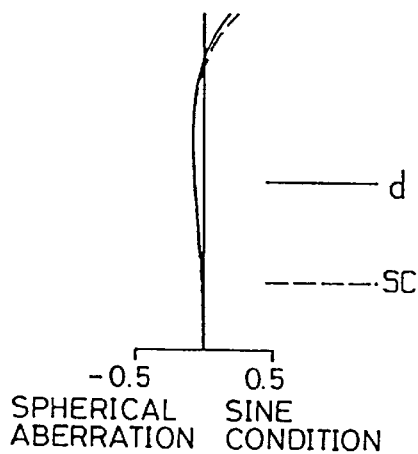
FIG.45D
FNO-5.81
FIG.45E
Y'=17.25
FIG.45F
Y'=17.25
— d
----- SC
----- DM
— DS
-0.5  0.5
SPHERICAL SINE
ABERRATION CONDITION
-0.5  0.5
ASTIGMATISM
-5.0  5.0
DISTORTION %
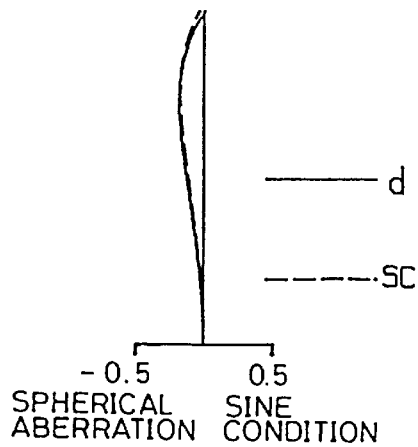
FIG.45G
FNO-6.19
FIG.45H
Y'=17.25
FIG.45I
Y'=17.25
— d
----- SC
----- DM
— DS
-0.5  0.5
SPHERICAL SINE
ABERRATION CONDITION
-0.5  0.5
ASTIGMATISM
-5.0  5.0
DISTORTION %

FIG.49A
FNO=4.60
FIG.49B
Y'=17.25
FIG.49C
Y'=17.25
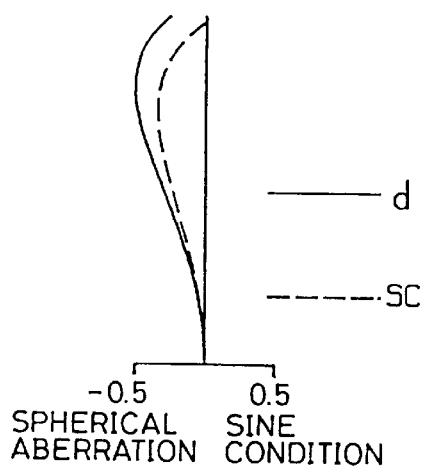
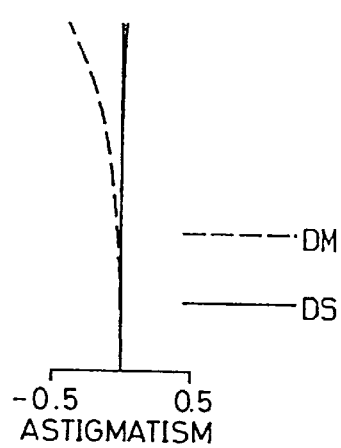
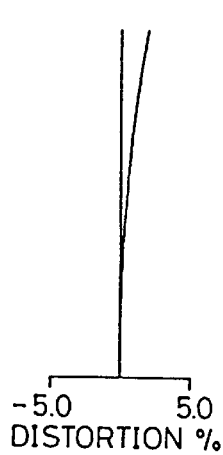
—— d
----- SC
----- DM
—— DS
-0.5  0.5
SPHERICAL SINE
ABERRATION CONDITION
-0.5  0.5
ASTIGMATISM
-5.0  5.0
DISTORTION %
FIG.49D
FNO=5.81
FIG.49E
Y'=17.25
FIG.49F
Y'=17.25
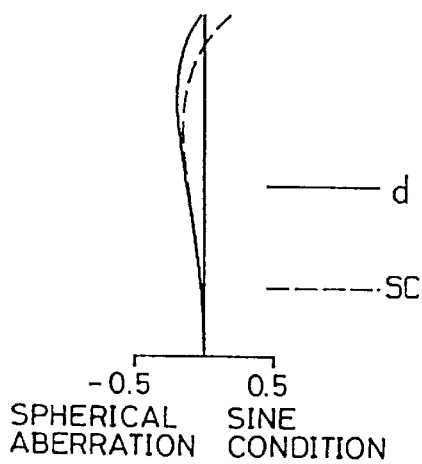
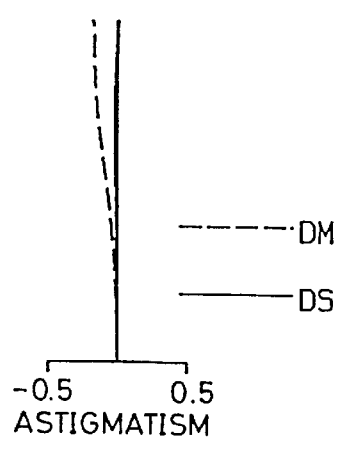
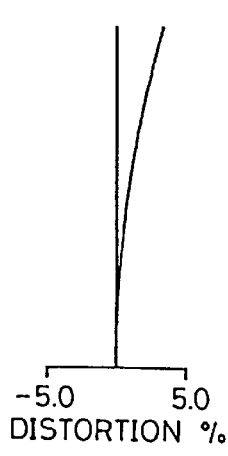
—— d
----- SC
----- DM
—— DS
-0.5  0.5
SPHERICAL SINE
ABERRATION CONDITION
-0.5  0.5
ASTIGMATISM
-5.0  5.0
DISTORTION %
FIG.49G
FNO=6.60
FIG.49H
Y'=17.25
FIG.49I
Y'=17.25
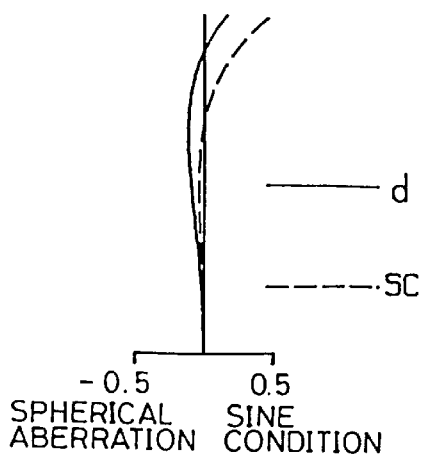
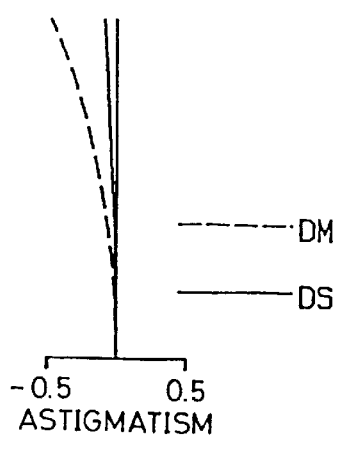
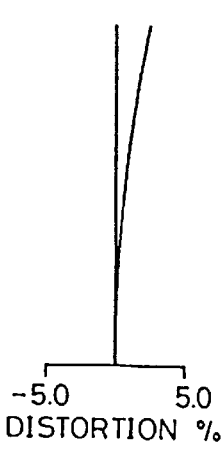
—— d
----- SC
----- DM
—— DS
-0.5  0.5
SPHERICAL SINE
ABERRATION CONDITION
-0.5  0.5
ASTIGMATISM
-5.0  5.0
DISTORTION %

FNO=4.60

—— d
----- SC

-0.5   0.5
SPHERICAL  SINE
ABERRATION CONDITION

Y'=17.25

-----DM
——DS

-0.5   0.5
ASTIGMATISM

Y'=17.25

-5.0   5.0
DISTORTION %

FNO=5.81

—— d
----- SC

-0.5   0.5
SPHERICAL  SINE
ABERRATION CONDITION

Y'=17.25

-----DM
——DS

-0.5   0.5
ASTIGMATISM

Y'=17.25

-5.0   5.0
DISTORTION %

FNO=6.12

—— d
----- SC

-0.5   0.5
SPHERICAL  SINE
ABERRATION CONDITION

Y'=17.25

-----DM
——DS

-0.5   0.5
ASTIGMATISM

Y'=17.25

-5.0   5.0
DISTORTION %

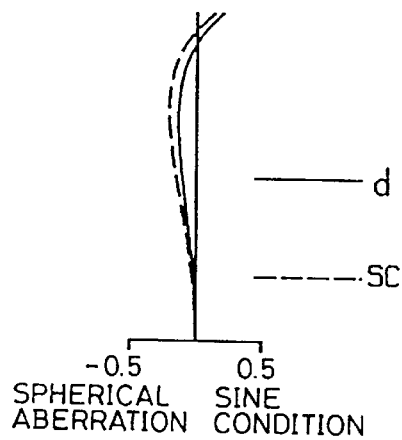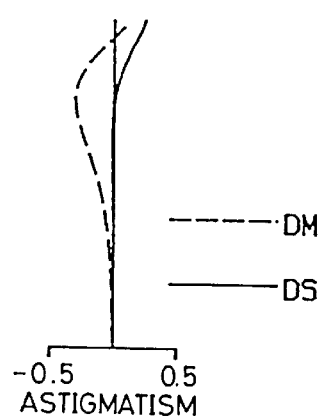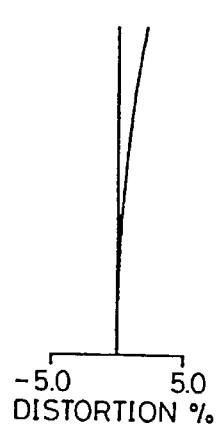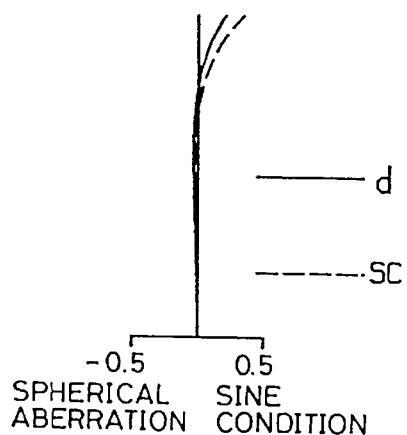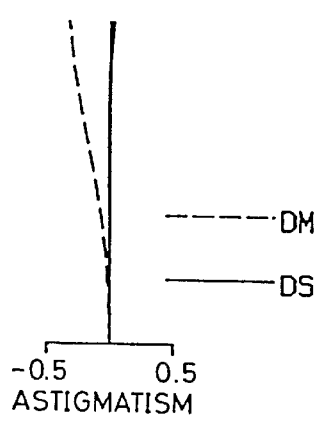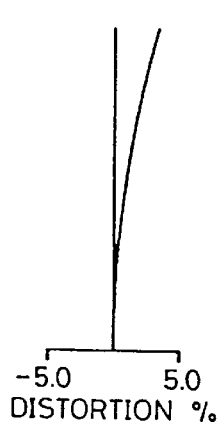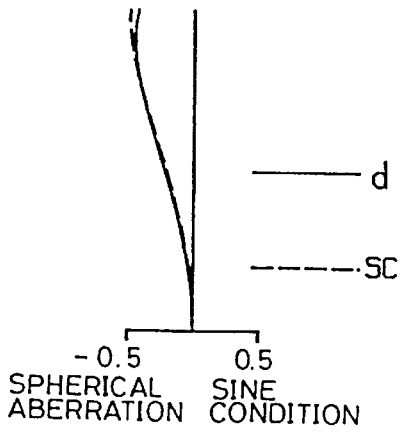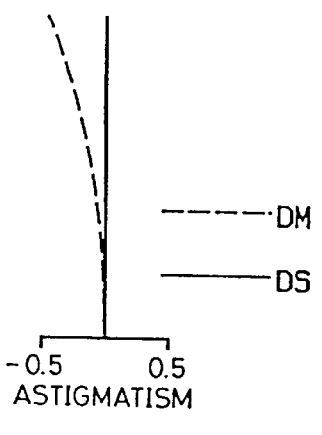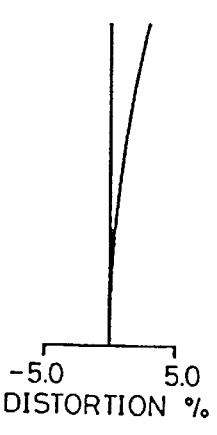

FNO=4.60

SPHERICAL ABERRATION
SINE CONDITION

Y'=17.25

ASTIGMATISM

Y'=17.25

DISTORTION %

FNO=6.50

SPHERICAL ABERRATION
SINE CONDITION

Y'=17.25

ASTIGMATISM

Y'=17.25

DISTORTION %

FNO=6.90

SPHERICAL ABERRATION
SINE CONDITION

Y'=17.25

ASTIGMATISM

Y'=17.25

DISTORTION %

FNO=4.60

SPHERICAL ABERRATION
SINE CONDITION
— d
----- SC

Y'=17.25

ASTIGMATISM
----- DM
— DS

Y'=17.25

DISTORTION %

FNO=5.23

SPHERICAL ABERRATION
SINE CONDITION
— d
----- SC

Y'=17.25

ASTIGMATISM
----- DM
— DS

Y'=17.25

DISTORTION %

FNO=5.81

SPHERICAL ABERRATION
SINE CONDITION
— d
----- SC

Y'=17.25

ASTIGMATISM
----- DM
— DS

Y'=17.25

DISTORTION %

FNO=4.60
-0.5   0.5
SPHERICAL  SINE
ABERRATION CONDITION
— d
----- SC

Y'=17.25
-0.5   0.5
ASTIGMATISM
----- DM
— DS

Y'=17.25
-5.0   5.0
DISTORTION %

FNO=5.23
-0.5   0.5
SPHERICAL  SINE
ABERRATION CONDITION
— d
----- SC

Y'=17.25
-0.5   0.5
ASTIGMATISM
----- DM
— DS

Y'=17.25
-5.0   5.0
DISTORTION %

FNO=5.81
-0.5   0.5
SPHERICAL  SINE
ABERRATION CONDITION
— d
----- SC

Y'=17.25
-0.5   0.5
ASTIGMATISM
----- DM
— DS

Y'=17.25
-5.0   5.0
DISTORTION %

FNO=4.10

— d
----- SC

-0.5  0.5
SPHERICAL  SINE
ABERRATION  CONDITION

Y'=17.25

----- DM
—— DS

-0.5  0.5
ASTIGMATISM

Y'=17.25

-5.0  5.0
DISTORTION %

FNO=5.31

— d
----- SC

-0.5  0.5
SPHERICAL  SINE
ABERRATION  CONDITION

Y'=17.25

----- DM
—— DS

-0.5  0.5
ASTIGMATISM

Y'=17.25

-5.0  5.0
DISTORTION %

FNO=5.73

— d
----- SC

-0.5  0.5
SPHERICAL  SINE
ABERRATION  CONDITION

Y'=17.25

----- DM
—— DS

-0.5  0.5
ASTIGMATISM

Y'=17.25

-5.0  5.0
DISTORTION %

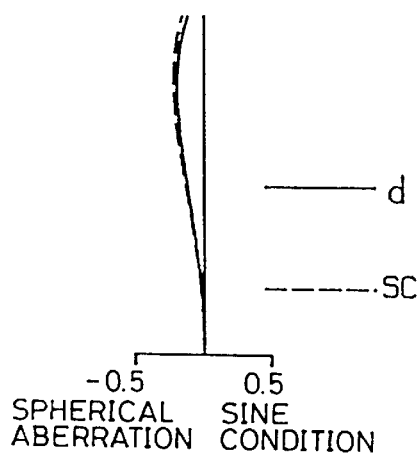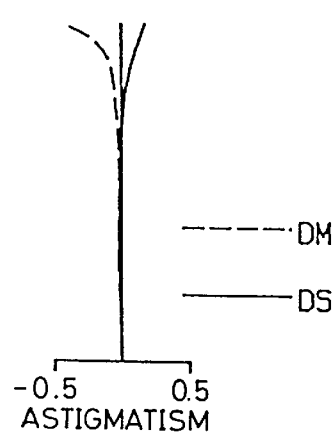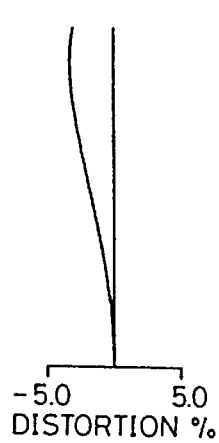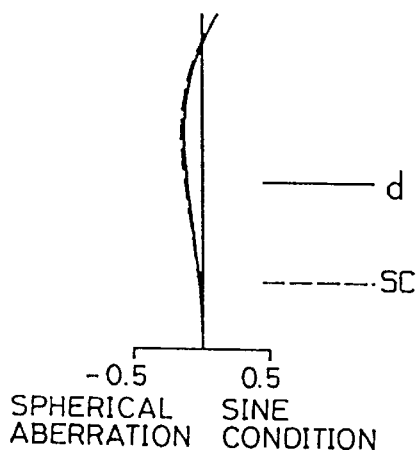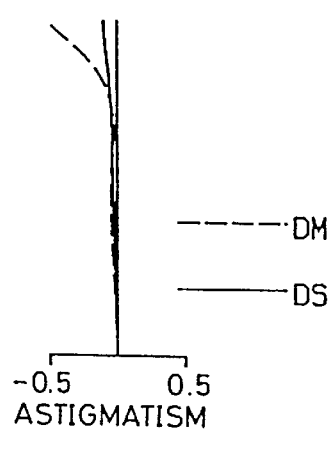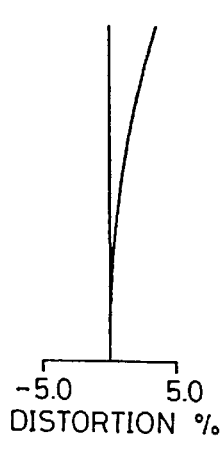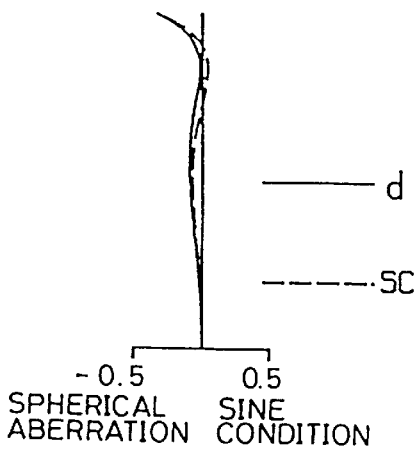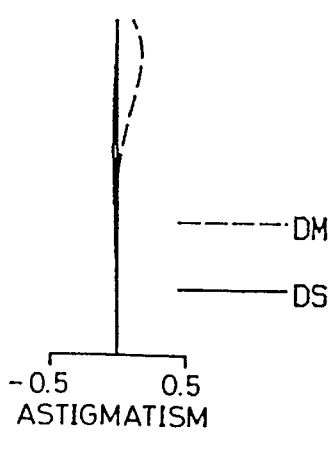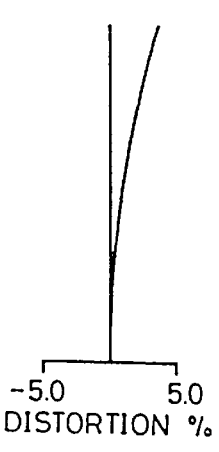

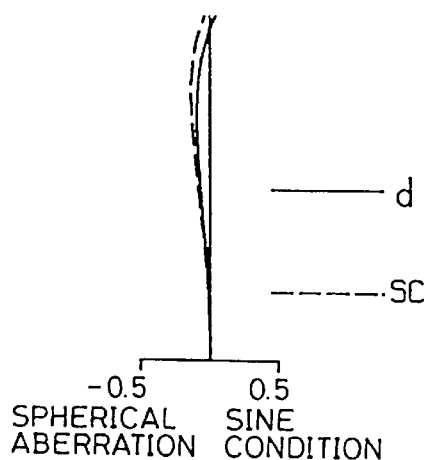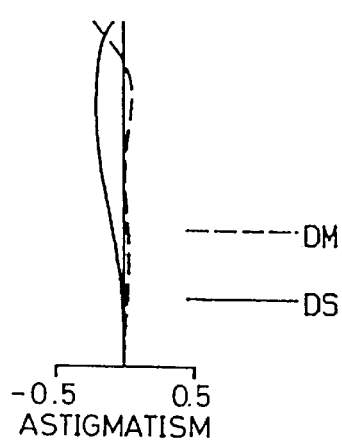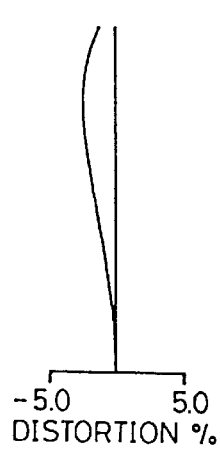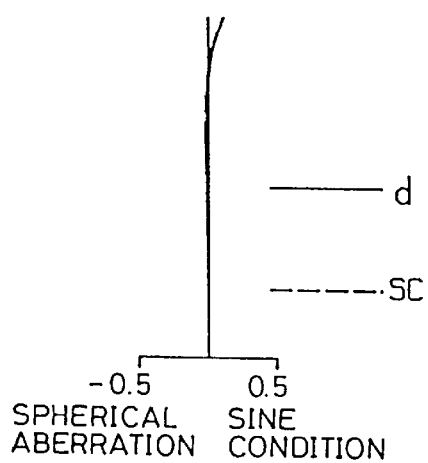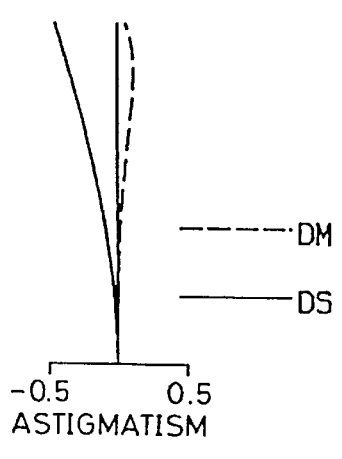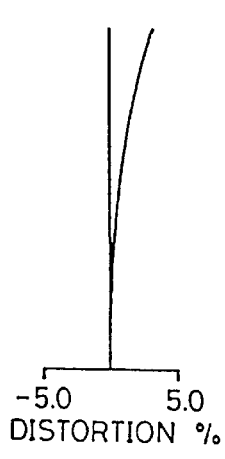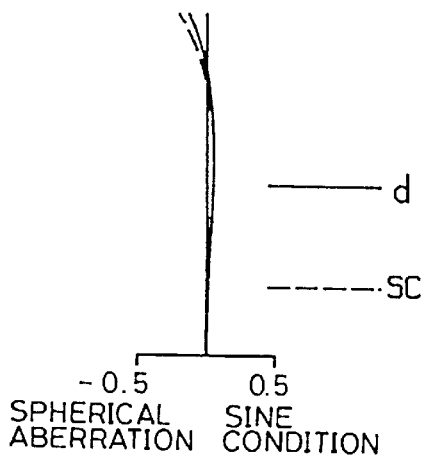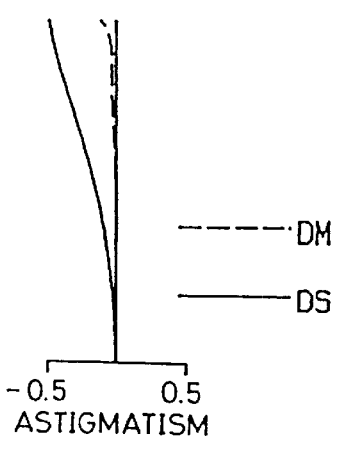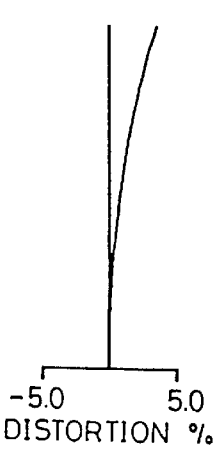

FNO=4.10

— d
--- SC

-0.5   0.5
SPHERICAL  SINE
ABERRATION CONDITION

Y'=17.25

--- DM
— DS

-0.5   0.5
ASTIGMATISM

Y'=17.25

-5.0   5.0
DISTORTION %

FNO=5.31

— d
--- SC

-0.5   0.5
SPHERICAL  SINE
ABERRATION CONDITION

Y'=17.25

--- DM
— DS

-0.5   0.5
ASTIGMATISM

Y'=17.25

-5.0   5.0
DISTORTION %

FNO=5.73

— d
--- SC

-0.5   0.5
SPHERICAL  SINE
ABERRATION CONDITION

Y'=17.25

--- DM
— DS

-0.5   0.5
ASTIGMATISM

Y'=17.25

-5.0   5.0
DISTORTION %

FNO=3.57

SPHERICAL ABERRATION
SINE CONDITION

Y'=17.25

ASTIGMATISM

Y'=17.25

DISTORTION %

FNO=4.38

SPHERICAL ABERRATION
SINE CONDITION

Y'=17.25

ASTIGMATISM

Y'=17.25

DISTORTION %

FNO=4.63

SPHERICAL ABERRATION
SINE CONDITION

Y'=17.25

ASTIGMATISM

Y'=17.25

DISTORTION %

FNO=4.10

−0.5   0.5
SPHERICAL   SINE
ABERRATION   CONDITION

— d
----- SC

Y'=17.25

−0.5   0.5
ASTIGMATISM

----- DM
— DS

Y'=17.25

−5.0   5.0
DISTORTION %

FNO=6.45

−0.5   0.5
SPHERICAL   SINE
ABERRATION   CONDITION

— d
----- SC

Y'=17.25

−0.5   0.5
ASTIGMATISM

----- DM
— DS

Y'=17.25

−5.0   5.0
DISTORTION %

FNO=6.20

−0.5   0.5
SPHERICAL   SINE
ABERRATION   CONDITION

— d
----- SC

Y'=17.25

−0.5   0.5
ASTIGMATISM

----- DM
— DS

Y'=17.25

−5.0   5.0
DISTORTION %

ZOOM LENS SYSTEM HAVING AN IMAGE BLUR COMPENSATING FUNCTION

BACKGROUND OF THE INVENTION

1. Field of the Invention

The present invention relates to a zoom lens system having an image blur compensating function, and more specifically, to a zoom lens system suitable for use as a telephoto zoom lens and a standard/standard high-magnification zoom lens system for single-lens reflex cameras and digital cameras capable of preventing image blurring caused by vibration of an image plane (e.g. vibration of an image plane caused by camera shake when photographing is performed with the camera held in hands).

2. Description of the Prior Art

Conventionally, unsuccessful photography resulted mostly from camera shake and failure in focusing. In recent years, however, most cameras have adopted the autofocus mechanism and the focusing accuracy of the autofocus mechanism has improved, so that the failure in focusing is hardly a cause of unsuccessful photography. On the other hand, the standard lens system mounted in cameras has been shifted from the fixed focal length lens system to the zoom lens system and the focal length at the telephoto limit and the magnification have been increased accordingly, so that image blur resulting from camera shake is very likely caused. Consequently, it is no exaggeration to say that unsuccessful photography results from camera shake. For this reason, an image blur compensating function is indispensable to taking optical systems.

As the zoom lens system having an image blur compensating function, various types have been known. For example, Japanese Laid-open Patent Application No. H6-337375 discloses a telephoto zoom lens system comprising five lens units of positive, negative, negative, positive, negative configuration or positive, negative, positive, positive, negative configuration wherein image blur compensation is made by moving the entire second lens unit vertically (i.e. in a direction perpendicular) to the optical axis. Japanese Laid-open Patent Application No. H5-232410 discloses a telephoto zoom lens system comprising four lens units of positive, negative, positive, positive configuration wherein image blur compensation is made by moving the entire second lens unit vertically to the optical axis. As a commercially available zoom lens system having an image blur compensating function, a zoom lens system is known comprising six lens units of positive, negative, positive, negative, positive, negative configuration wherein image blur compensation is made by moving the entire second lens unit vertically to the optical axis.

However, the above-described conventional zoom lens systems having an image blur compensating function are defective since the total length is too long at the wide angle limit and at the telephoto limit. Even though a zoom lens system has an image blur compensating function, it is undesirable if the lens system is large in size compared with a zoom lens system having no image blur compensating function because the use of such a large-size lens system is disadvantageous in improving portability and handiness. In the zoom lens system having an image blur compensating function, not only the optical quality is necessarily excellent in a normal condition (hereinafter, referred to as "pre-decentering condition") but also the optical quality is necessarily maintained excellent in a compensated condition (hereinafter, referred to as "post-decentering condition") by preventing aberrations from being caused by the decentering of the lens (hereinafter, aberrations caused by decentering will be referred to as "decentering aberrations").

As the taking optical system having an image blur compensating function, various other types have also been proposed. For example, Japanese Laid-open Patent Application No. H5-224160 discloses a zoom lens system comprising five lens units of positive, negative, positive, positive, negative configuration wherein the fifth lens unit is divided into a front lens unit having a negative refractive power and a rear lens unit having a positive refractive power and image blur compensation is made by moving the front lens unit having a negative refractive power vertically to the optical axis. Japanese Laid-open Patent Application No. H7-199124 and U.S. Pat. No. 5,585,966 disclose a zoom lens system comprising four lens units of positive, negative, positive, positive configuration wherein image blur compensation is made by moving the entire third lens unit vertically to the optical axis. Japanese Laid-open Patent Application No. H2-135408 discloses a telephoto lens system comprising four lens units of positive, negative, positive, negative configuration wherein image blur compensation is made by moving the entire second lens unit or the entire third lens unit vertically to the optical axis. Japanese Laid-open Patent Application No. H6-289298 discloses a zoom lens system comprising four lens units of positive, negative, positive, positive configuration wherein image blur compensation is made by moving the entire second lens unit vertically to the optical axis.

In the zoom lens systems disclosed in Japanese Laid-open Patent Applications No. H5-232410, No. H5-224160 and No. H6-289298 wherein image blur compensation is made by moving a plurality of lenses vertically to the optical axis, the weight of the moved lenses is heavy and the lens frames for holding them are large, so that the driving system for driving image blur compensation is greatly burdened. This results in an increase in size of the image blur compensation driving system and a delay in response to decentering. Additionally, in the zoom lens system disclosed in Japanese Laid-open Patent Application No. H5-224160, since the fifth lens unit is largely moved during zooming, it is necessary to largely move the heavy image blur compensation driving system during zooming, so that the moving means for zooming is largely burdened. Since the difference in image blur compensation movement amount between at the wide-angle limit and at the telephoto limit is great, the accuracy of calculating the image blur compensation movement amount degrades.

In the zoom lens system disclosed in Japanese Laid-open Patent Application No. H7-199124 wherein image blur compensation is made by moving the entire third lens unit, since the third lens unit is formed of one doublet lens, the lens moved for image blur compensation is light in weight. However, since the degree of freedom of aberration correction of one doublet lens is too low, it is impossible for the third lens unit to largely contribute to zooming, so that the optical system excessively increases in size. Since the overall size is great, the optical system is, although suitable for use as the taking optical system for video cameras, too large in size for use as the standard zoom taking optical system for single lens reflex cameras and compactness is lost.

In the zoom lens system disclosed in Japanese Laid-open Patent Application No. H6-337375, since image blur compensation is made by moving one doublet lens, the lens moved for image blur compensation is light in weight. However, since the angles of view used are biased toward the telephoto side, the optical system is too large in size for use as the standard zoom lens system.

In the zoom lens systems disclosed in Japanese Laid-open Patent Applications No. H5-232410 and No. H7-199124, since the angles of view used are biased toward the telephoto side, the optical system is too large in size for use as the standard zoom lens system. In Japanese Laid-open Patent Application No. H2-135408, since the disclosed optical system is a fixed focal length lens system, its arrangement for image blur compensation does not fulfill the recent requirements for the zoom lens system having an image blur compensating function.

SUMMARY OF THE INVENTION

An object of the present invention is to provide a zoom lens system having an image blur compensating function being short in total length and compact, wherein aberrations are excellently corrected in both the normal and compensated conditions.

Another object of the present invention is to provide a zoom lens system having an image blur compensating function where the lens unit moved for image blur compensation is light in weight.

To achieve the above-mentioned objects, a zoom lens system having an image blur compensating function according to the present invention is provided with, from the object side, a first lens unit having a positive refractive power and a second lens unit having a negative refractive power, wherein zooming is performed by varying the distances between the lens units. The first lens unit is moved toward the object side during zooming from the wide-angle limit to the telephoto limit. Image blur compensation is made by moving a part of any of the second lens unit and succeeding lens units vertically to the optical axis.

BRIEF DESCRIPTION OF THE DRAWINGS

This and other objects and features of this invention will become clear from the following description, taken in conjunction with the preferred embodiments with reference to the accompanied drawings in which:

FIGS. 6A and 6B are views of assistance in explaining the rotational conversion;

FIG. 7 is a view of assistance in explaining the conversion to the image plane;

FIG. 16 shows the lens arrangement of a third embodiment;

FIGS. 25A to 25I show longitudinal aberration curves of the fifth embodiment before decentering;

FIGS. 41A to 41I show longitudinal aberration curves of the ninth embodiment before decentering;

FIGS. 45A to 45I show longitudinal aberration curves of the tenth embodiment before decentering;

FIGS. 49A to 49I show longitudinal aberration curves of the eleventh embodiment before decentering;

FIGS. 57A to 57I show longitudinal aberration curves of the thirteenth embodiment before decentering;

FIGS. 77A to 77I show longitudinal aberration curves of the eighteenth embodiment before decentering;

FIGS. 81A to 81I show longitudinal aberration curves of the nineteenth embodiment before decentering;

DESCRIPTION OF THE PREFERRED EMBODIMENTS

Hereinafter, zoom lens systems having an image blur compensating function embodying the present invention will be described with reference to the drawings.

<Decentering Aberration and Decentering Aberration Coefficient>

First, the definition of aberration degradation of the optical system having an image blur compensating function (hereinafter, referred to as "image blur compensating optical system") like the zoom lens systems according to the present invention will be described with reference to FIGS. 1A to 1D. The decentering aberrations (off-axial image point shift error, one-side blur, axial coma, and axial lateral chromatic aberration) shown in the figures cause the image degradation of the image blur compensating optical system.

Figure 1A:
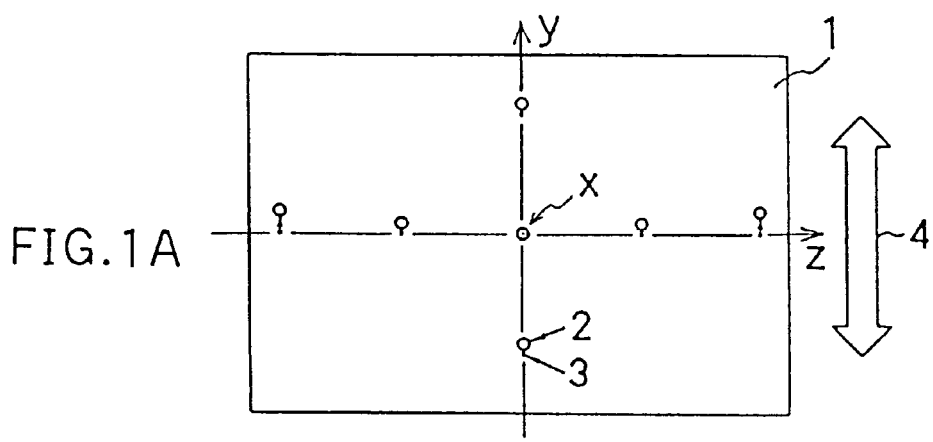
FIGS. 1A to 1D are views of assistance in explaining a cause of image degradation of an image blur compensating optical system.

[Off-axial Image Point Shift Error] (FIG. 1A)

In decentered optical systems, distortion error is caused in addition to the normal distortion. For this reason, in the image blur compensating optical system, when compensation is made so that the axial image point (i.e. image point in the center of the image plane) is completely maintained stationary, the off-axial image point is not completely stationary, so that image blurring is caused. In FIG. 1A, 1 is a film image plane, 2 is the image point in the compensated condition (post-decentering condition), 3 is the image point in the normal condition (pre-decentering condition), and 4 represents the direction of image blur compensation.

The following expression (a) holds when the optical axis is in the direction of the X-axis, the direction of image blur is the direction of the Y-axis (i.e. the image blur compensation direction 4 is also the direction of the Y-axis), and $Y(y', z', \theta)$ is the y coordinates $\{Y(0, 0, \theta)=0$ always holds because compensation is made so that the axial image point is completely maintained stationary$\}$ of the actual image point of a light ray with a paraxial image point of $(y', z')$ at a correction angle $\theta$:

$$\Delta Y(y', z', \theta)=Y(y', z', \theta)-Y(y', z', 0) \quad (a)$$

Unless otherwise specified, an off-axial image point shift error $\Delta Y_{y'}$ with respect to the image point on the Y-axis and an off-axial image point shift error $\Delta Y_{z'}$ with respect to the image point on the Z-axis are represented by the following expressions (b) and (c):

$$\Delta Y_{y'}=\{\Delta Y(0.7\text{field}, 0, 0.7°)+\Delta Y(-0.7\text{field}, 0, 0.7°)\}/2 \quad (b)$$

$$\Delta Y_{z'}=\Delta Y(0, 0.7\text{field}, 0.7°) \quad (c)$$

Here, 0.7field is approximately 12 mm for the 24 mm film according to the new photographic standards.

Figure 1B:
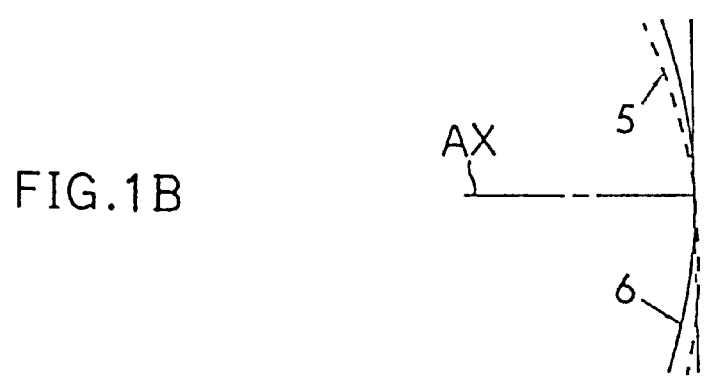

[One-side Blur] (FIG. 1B)

Figure 5:
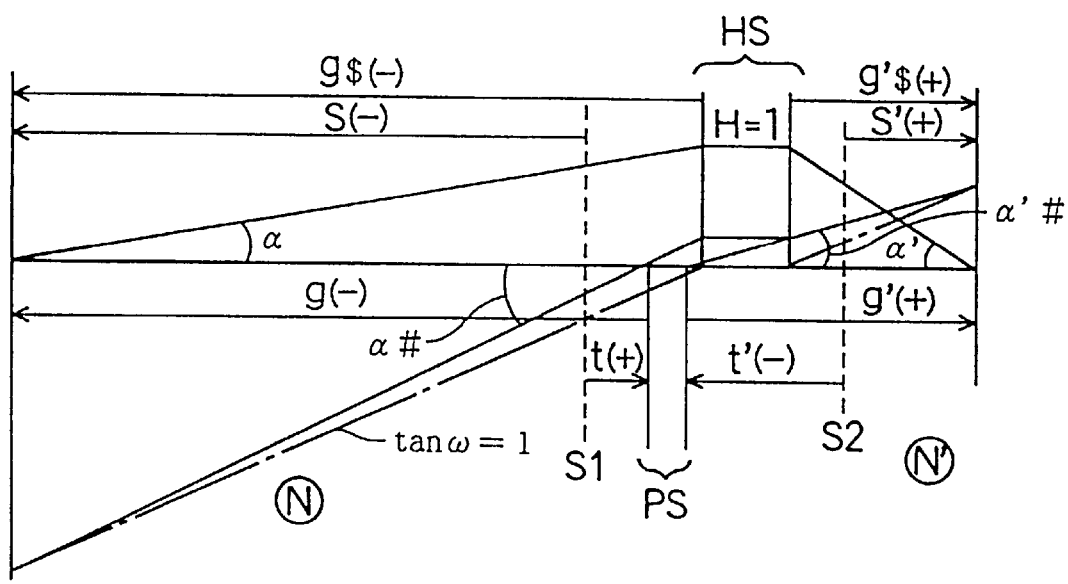
FIG. 5 is a view of assistance in explaining the aberration coefficients of reversed and non-reversed optical systems.

In FIG. 1B, 5 is an image plane asymmetrical with respect to the optical axis AX and 6 is an image plane symmetrical with respect to the optical axis AX. Because of the asymmetry of the optical system, the image plane 5 is asymmetrical with respect to the optical axis AX. A meridional one-side blur $\Delta M'$ and a sagittal one side blur $\Delta S'$ caused by the asymmetry of the image plane are represented by the following expressions (d) and (e):

$$\Delta M'=\{\text{meridional value }(y'=0.7\text{field}, z=0, \theta=0.7°)-\text{meridional value }(y'=-0.7\text{field}, z=0, \theta=0.7°)\}/2 \quad (d)$$

$$\Delta S'=\{\text{sagittal value}(y'=0.7\text{field}, z=0, \theta=0.7°)-\text{sagittal value}(y'=-0.7\text{field}, z=0, \theta=0.7°)\}/2 \quad (e)$$

Figure 1C:
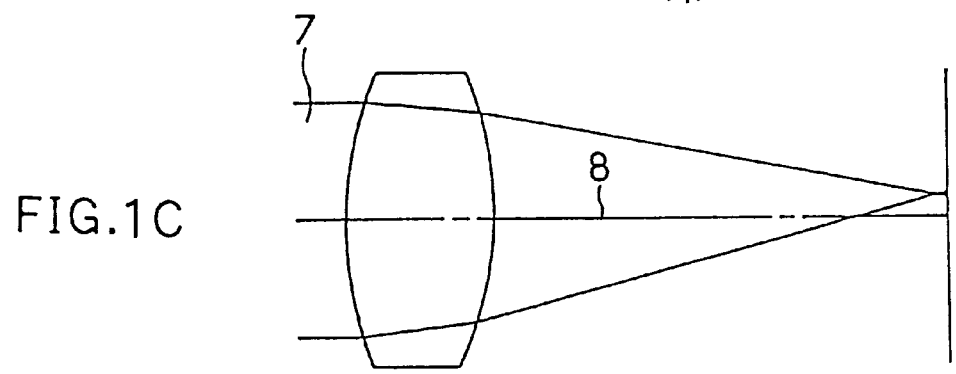

[Axial Coma] (FIG. 1C)

In FIG. 1C, 7 is an axial luminous flux and 8 is an axial principal ray. Since the axial luminous flux 7 is not symmetrical with respect to the axial principal ray 8 as shown in the figure, coma is caused. Axial coma AXCM caused in the axial luminous flux 7 is represented by the following expression (f):

$$\text{AXCM}=\{Y(\text{Upper Zonal}, \theta=0.7°)+Y(\text{Lower Zonal}, \theta=0.7°)\}/2 \quad (f)$$

Figure 1D:
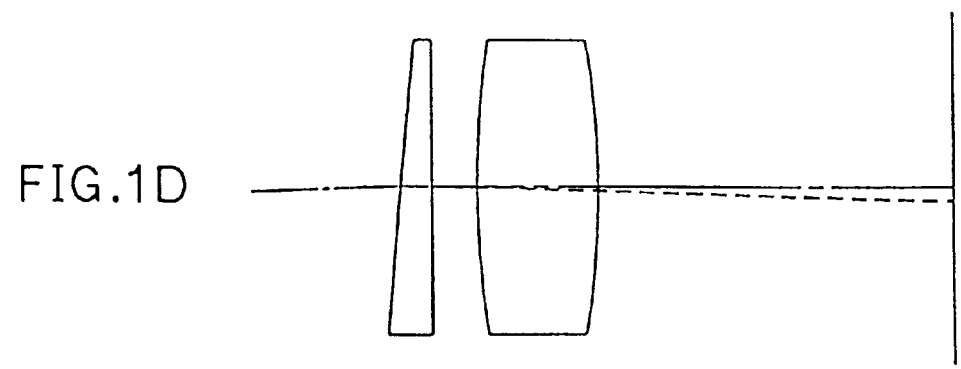

[Axial Lateral Chromatic Aberration] (FIG. 1D)

The image point shifts due to the difference in wavelength. Therefore, when the optical system is asymmetrical, the image point shifts also in the axial light. Axial lateral chromatic aberration caused in the axial principal ray is represented by the following expression (g):

$$(\text{Axial lateral chromatic aberration})=\{Y(\text{g-line}, \theta=0.7°)-Y(\text{d-line}, \theta=0.7°)\} \quad (g)$$

With respect to the above-described decentering aberrations, Yoshiya Matsui's paper "Third-order Aberration Theory of Optical System Where Decentering Exits" (JOEM, June 1990) shows an application method. Although the method is suitable for a case where the normal taking lens system is decentered due to an attachment error, it cannot be directly applied to the image blur compensating optical system where the coaxial relationship among the object plane, the taking lens system and the image plane breaks. In order that the method of the paper may be directly applied to the image blur compensating optical system, the aberrations of the actual image blur compensating optical system are expressed by normal third-order aberration coefficients by performing the following conversions of expressions:

[Application of Decentering Aberration Coefficients to Image blur compensating Optical System]

Figure 2A:
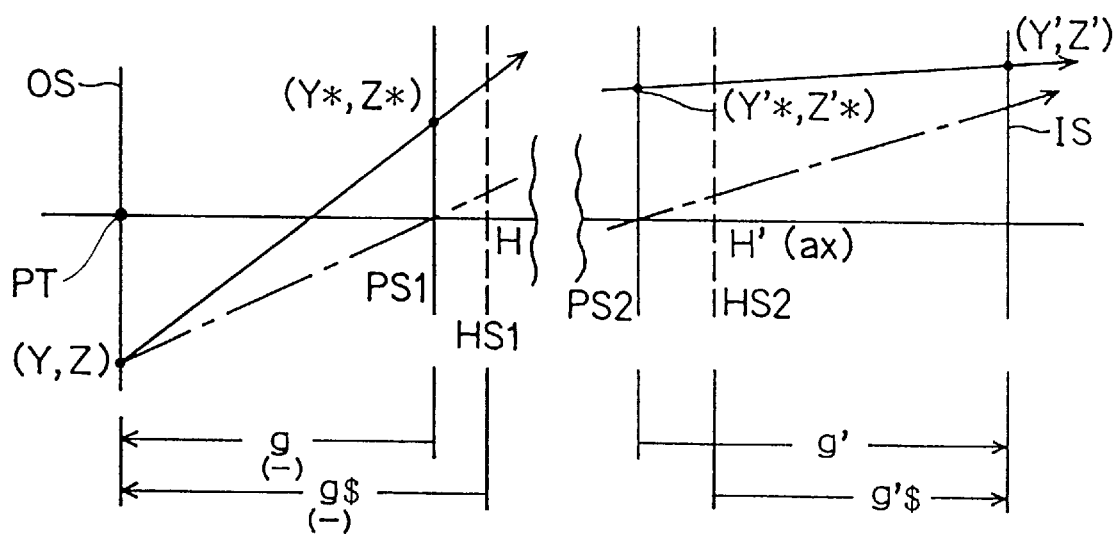
FIGS. 2A and 2B are views of assistance in explaining the relationship between the optical system and the coordinates.
Figure 2B:
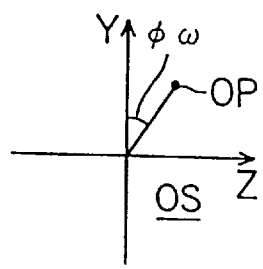

Referring to FIGS. 2A and 2B showing the relationship between the optical system and the coordinates, how to obtain decentering aberration coefficients will be described. In FIG. 2A, ax is a reference axis of the optical system, PS1 is an entrance pupil surface, PS2 is an exit pupil surface, and HS1 and HS2 are principal planes. FIGS. 2B shows the portion of PT in FIG. 2A. First, the expressions are defined as follows:

$$\tan\omega\cdot\cos\phi\omega=y/g\$$$

$$\tan\omega\cdot\sin\phi\omega=Z/g\$$$

$$R\cdot\cos\phi R=(g\$/g)\cdot Y^*$$

$$R\cdot\sin\phi R=(g\$/g)\cdot Z^*$$

where g is the distance from the entrance pupil surface to the object plane (object surface) OS, g$ is the distance from the object side principal plane to the object plane OS, ω is an angle which the straight line between the object point and the object side principal point H forms to the reference axis, φω is its azimuth, R is the entrance pupil radius converted onto the object side principal plane, and φR is its azimuth.

The image point shift amounts ΔY and ΔZ on the image plane (image surface) IS when a νth surface counted from the object side is parallel decentered in the direction of the Y-axis by a small amount Eν are represented by the following expressions (1A) and (1B):

$$\Delta Y = -(E\nu/2\alpha_k')\cdot[(\Delta E)\nu + (N\cdot\tan\omega)^2\cdot\{(2+\cos 2\phi\omega)\cdot(VE1)\nu - (VE2)\nu\}$$
$$+ 2R\cdot(N\cdot\tan\omega)\cdot\{(2\cos(\phi R - \phi\omega) + \cos(\phi R + \phi\omega))\cdot(IIIE)\nu + \cos\phi R\cdot\cos\phi\omega\cdot(PE)\nu\} + R^2\cdot(2+\cos 2\phi R)\cdot(IIE)\nu] \quad (1A)$$

$$\Delta Z = -(E\nu/2\alpha_k')\cdot[(N\cdot\tan\omega)^2\cdot\sin 2\phi\omega\cdot(VE1)\nu + 2R\cdot(N\cdot\tan\omega)$$
$$\cdot\{\sin(\phi R + \phi\omega)\cdot(IIIE)\nu + \sin\phi R\cdot\sin\phi\omega\cdot(PE)\nu\} + R^2\cdot\sin 2\phi R\cdot(IIE)\nu] \quad (1B)$$

Here, when (ΔE)ν is a prismatic effect (lateral shift of the image), (VE1)ν and (VE2)ν are rotationally asymmetric distortions, (IIIE)ν and (PE)ν are a rotationally asymmetric astigmatism and an inclination of the image surface, respectively, and (IIE)ν is a rotationally asymmetric coma which is present also on the axis, the decentering aberration coefficients representing the effects of the decentering are represented by the following expressions (1C) to (1H) based on the aberration coefficients of from the νth surface to the image surface (# is a suffix representative of "on the object surface"). In the case of rotational decentering, the decentering aberration coefficients are represented by expressions similar to the expressions (1A) to (1H):

$$(\Delta E)\nu = -2(\alpha\nu' - \alpha\nu) \quad (1C)$$

$$(VE1)\nu = [\{\alpha\nu'\cdot(\mu=\nu+1\to k)\Sigma V\mu\} - \{\alpha\nu\cdot(\mu=\nu\to k)\Sigma V\mu\}] - [\{\alpha\nu\#\cdot(\mu=\nu+1\to k)\Sigma III\mu\} - \{\alpha\nu\#\cdot(\mu=\nu\to k)\Sigma III\mu\}] \quad (1D)$$

$$(VE2)\nu = \{\alpha\nu\#\cdot(\mu=\nu+1\to k)\Sigma P\mu\} - \{\alpha\nu\#\cdot(\mu=\nu\to k)\Sigma P\mu\} \quad (1E)$$

$$(IIIE)\nu = [\{\alpha\nu'\cdot(\mu=\nu+1\to k)\Sigma III\mu\} - \{\alpha\nu\cdot(\mu=\nu\to k)\Sigma III\mu\}] - [\{\alpha\nu\#\cdot(\mu=\nu+1\to k)\Sigma II\mu\} - \{\alpha\nu\#\cdot(\mu=\nu\to k)\Sigma II\mu\}] \quad (1F)$$

$$(PE)\nu = \{\alpha\nu'\cdot(\mu=\nu+1\to k)\Sigma P\mu\} - \{\alpha\nu\cdot(\mu=\nu\to k)\Sigma P\mu\} \quad (1G)$$

$$(IIE)\nu = [\{\alpha\nu'\cdot(\mu=\nu+1\to k)\Sigma II\mu\} - \{\alpha\nu\cdot(\mu=\nu\to k)\Sigma II\mu\}] - [\{\alpha\nu\#\cdot(\mu=\nu+1\to k)\Sigma I\mu\} - \{\alpha\nu\#\cdot(\mu=\nu\to k)\Sigma I\mu\}] \quad (1H)$$

However, in order to apply the decentering aberration coefficients to the image blur compensating optical system, it is necessary to use the aberration coefficients from the image surface IS by reversing the optical system to replace the image surface IS with the object surface OS. That is, the image point shift amount must be converted to that on the object surface OS. The reasons therefor will be described below.

Figure 3A:
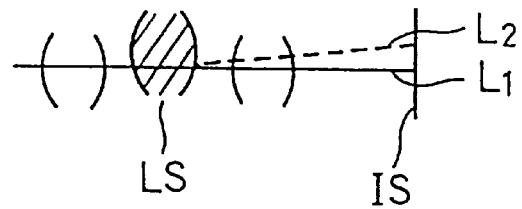
FIGS. 3A and 3B are views of assistance in explaining the difference in light passage position caused by decentering.
Figure 3B:
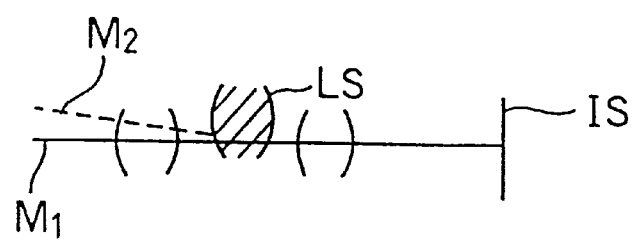

The first reason is that the light passage position varies due to decentering. As shown in FIG. 3A ($L_1$ is a light ray before decentering and $L_2$ is a light ray after decentering), according to the method shown in the above-mentioned paper of Yoshiya Matsui's, the light passage position on the image surface IS side of a decentered lens LS is changed by the decentered lens LS. Consequently, the aberration coefficients of the decentered lens LS and the lens units disposed between the decentered lens LS and the image surface IS relate to the decentering aberration coefficients. On the contrary, as shown in FIG. 3B ($M_1$ is a light ray before image blur compensation and $M_2$ is a light ray after image blur compensation), in the image blur compensating optical system, (ideally,) the light passage position on the object side of the decentered lens LS before the image blur compensation is different from that after image blur compensation. Consequently, the aberration coefficients of the decentered lens LS and the lens units disposed on the object side thereof relate to the decentering aberration coefficients.

Figure 4:
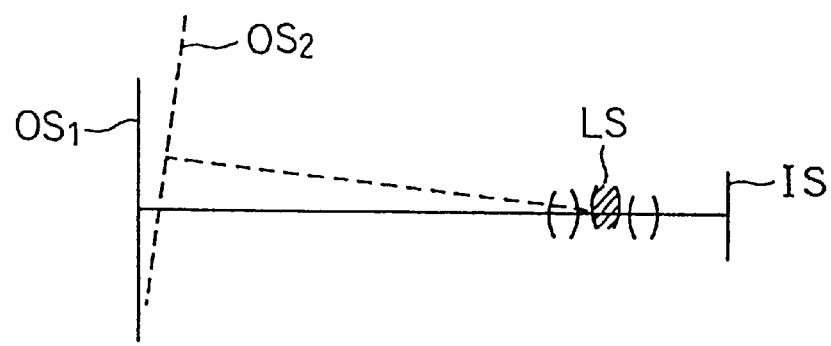
FIG. 4 is a view of assistance in explaining the rotational conversion of the object plane.

The second reason is that aberration degradation is caused due to the rotational conversion of the object surface. According to the method of the above-described paper of Yoshiya Matsui's, an object surface $OS_1$ and the image surface IS are both immovable. In the image blur compensating optical system, however, the object surface $OS_1$ rotates as shown in FIG. 4. For this reason, the off-axial image point shift error and the one-side blur largely differ from those in the case where the object surface $OS_1$ does not rotate. In FIG. 4, $OS_1$ is the object surface before the image blur compensation and $OS_2$ is the object surface after the image blur compensation.

[Aberration Coefficients of Reversed Optical System and Aberration Coefficients of Non-reversed Optical System]

Since the image point shift amount must be converted to that on the object surface for the reasons described above, the coefficients of the expressions (1A) to (1H) are converted according to the expressions (2A) to (2J) shown below represented based on FIG. 5 (non-reversed optical system). In FIG. 5, PS is the pupil surface, HS is the principal plane, S1 is the front surface of the optical system, and S2 is the rear surface of the optical system. $^R(\ )$ is a symbol of the reversed optical system and N is a refractive index.

$$^R\alpha = {^R}N/^Rg\$ = -\alpha' \quad (2A)$$

$$^R\alpha\# = \alpha'\# \quad (2B)$$

$$^R\alpha\mu' = -\alpha\nu \quad (2C)$$

$$^R\alpha\mu\# = \alpha\nu\# \quad (2D)$$

$$^RP\mu = P\nu \quad (2E) \ldots \text{same}$$

$$^R\phi\mu = \phi\nu \quad (2F) \ldots \text{same}$$

$$^RI\mu = I\nu \quad (2G) \ldots \text{same}$$

$$^RII\mu = -II\nu \quad (2H) \ldots \text{reverse}$$

$$^RIII\mu = III\nu \quad (2I) \ldots \text{same}$$

$$^RV\mu = -V\nu \quad (2J) \ldots \text{reverse}$$

[Decentering aberration coefficients and image blur aberration coefficients when compensating lens unit parallely decenters]

Since the previously-mentioned expressions (1A) to (1H) show a case where only one surface V is decentered, they are converted to expressions showing a case where a plurality of surfaces i to j are decentered. When the compensating lens unit is parallely decentered, since the decentering amounts Ei to Ej of the decentered surfaces i to j are the same, the aberration coefficients can be treated as a sum as shown in the following expression:

$$(\Delta E)i \text{ to } j = (\nu = i \to j)\Sigma\{-2\cdot(\alpha\nu' - \alpha\nu)\}$$

From $\alpha\nu' = \alpha\nu + 1$, the following expression is obtained:

$$(\Delta E)i \text{ to } j = -2\cdot(\alpha j' - \alpha i)$$

Likewise, with respect to other aberration coefficients, the terms between Σs are deleted. For example, (PE)i to j=$(\mu=i\rightarrow j)\Sigma\{\alpha v\cdot(\mu=v+1\rightarrow k)\Sigma P\mu-\alpha v\cdot(\mu=v\rightarrow k)\Sigma P\mu\}$=
  $\alpha j'\cdot(\mu=j+1\rightarrow k)\Sigma P\mu-\alpha i\cdot(\mu=i\rightarrow k)\Sigma P\mu$ This is further converted to (PE)i to j=$(\alpha j'-\alpha i)\cdot(\mu=j+1\rightarrow k)\Sigma P\mu-\alpha i\cdot(\mu=i\rightarrow j)\Sigma P\mu$                5 where $(\mu=j+1\rightarrow k)\Sigma P\mu$ is the sum of P (Petzval) of the lenses arranged behind the compensating lens unit, and $(\mu=i\rightarrow j)\Sigma P\mu$ is the sum of P of the compensating lens unit.

(PE)i to j=$(\alpha j'-\alpha i)P_R-\alpha i\cdot P_D$ where $(\ )_R$ is the sum of the aberration coefficients of the lenses arranged behind the compensating lens and $(\ )_D$ is the sum of the aberration coefficients of the compensating lens unit.

As described above, by the conversion of the image point movement amounts to those of the object surface and the conversion of the expressions to the expressions showing the case where a plurality of surfaces i to j are decentered, the decentering aberration coefficients represented by the following expressions (3A) to (3F) are obtained. By re-defining the decentering aberration coefficients according to the expressions (3A) to (3F), the expressions (1A) to (1H) can be used as they are as expressions representing the image point movement amounts on the object surface.

$(\Delta E)$i to j=$-2\cdot(\alpha j'-\alpha i)$           (3A)

$(VE1)$i to j=$(\alpha j'-\alpha i)\cdot V_R-(\alpha j'\#-\alpha i\#)\cdot III_R-(\alpha i\cdot V_D-\alpha i\#\cdot III_D)$     (3B)

$(VE2)$i to j=$(\alpha j\#-\alpha i\#)\cdot P_R-\alpha i\#\cdot P_D$     (3C)

$(IIIE)$i to j=$(\alpha j'-\alpha i)\cdot III_R-(\alpha j'\#-\alpha i\#)\cdot II_R-(\alpha i\cdot III_D-\alpha i\#\cdot II_D)$   (3D)

$(PE)$i to j=$(\alpha j'-\alpha i)\cdot P_R-\alpha i\cdot P_D$     (3E)

$(IIE)$i to j=$(\alpha j'-\alpha i)\cdot II_R-(\alpha j'\#-\alpha i\#)\cdot I_R-(\alpha i\cdot II_D-\alpha i\#\cdot I_D)$   (3F)

[Off-axial image point movement error]

Subsequently, the off-axial image point movement error will be described. The decentering aberration coefficients (of the reversal optical systems) are represented by $\Delta E$, VE1, VE2, IIIE, PE and IIE. The movements of the image point (before rotational conversion on the object surface) due to decentering on the object surface are represented by the following expressions (4A) and (4B) (in the principal light beam (R=0)). The expressions (4A) and (4B) are the expressions (1A) and (1B) where R=0.

$\Delta Y\#=-(E/2\alpha'_k)\cdot[\Delta E+(N\cdot\tan\omega)^2\cdot\{(2+\cos^2\phi\omega)VE1-VE2\}]$   (4A)

$\Delta Z\#=-(E/2\alpha')\cdot\{(N\cdot\tan\omega)^2\cdot\sin 2\phi\omega)\cdot VE1\}$   (4B)

Based on the expressions (4A) and (4B), the following expressions (4C) and (4D) are obtained (axial light beam, tan $\omega$=0):

$\Delta Y_0\#=-(E/2\alpha'_k)\cdot\Delta E$   (4C)

$\Delta Z_0\#=0$   (4D)

Subsequently, the rotational conversion will be described with reference to FIGS. 6A and 6B. From FIG. 6A, the following expression holds:

$Y\#=g\$_k\cdot\tan\omega$

From the sine theorem, $Y'\#/\{\sin(\pi/2-\omega')\}=(Y\#+\Delta Y\#-\Delta Y_0\#)/\{\sin(\pi/2+\omega'-\theta)\}$ $\Delta Y'\#$ after the rotational conversion is represented by the following expression:

$\Delta Y'\#=(Y'\#)-(Y\#)$ $=[Y\#\cdot\cos\omega'+\{(\Delta Y\#)-(\Delta Y_0\#)\}\cdot\cos\omega'-Y\#\cdot\cos(\omega'-\theta)]/\cos(\omega'-\theta)$ Only the numerators of this expression are converted.

$[Y\#\cdot\cos\omega'+\{(\Delta Y\#)-(\Delta Y_0\#)\}\cdot\cos\omega'-Y\#\cdot\cos(\omega'\theta)]=Y\#\cdot\cos\omega'+\{(\Delta Y\#)-(\Delta Y_0\#)\}\cdot\cos\omega'-Y\#\cdot\cos\theta\cdot\cos\omega'-Y\#\cdot\sin\theta\cdot\sin\omega'$ $=(1-\cos\theta)\cdot Y\#\cdot\cos\omega'+\{(\Delta Y\#)-(\Delta Y_0\#)\}\cos\omega'-Y\#\cdot\sin\theta\cdot\sin\omega'$ Here, since $\theta$ is small and ignorable compared to the other values, $(1-\cos\theta)\approx\theta^2/2$, $\sin\theta\approx\theta$, and $\cos\omega'/\{\cos(\omega'-\theta))\approx 1$, $\sin\omega'/\{\cos(\omega'-\theta)\}\approx\tan\omega$.

Therefore, the following expression is obtained:

$\Delta Y'\#\approx(\Delta Y\#-\Delta Y_0\#)-Y\#\cdot\theta\cdot\tan\omega$ $(\Delta Y\#-\Delta Y_0\#)$ represents the off-axial image point movement error of parallel decentering and $Y\#\cdot\theta\cdot\tan\omega$ is an additional term (irrelevant to the aberration coefficients) due to rotation. Since $\omega$ at this time is on an X-Y cross section, $\Delta Y'\#\approx(\Delta Y\#-\Delta Y_0\#)-Y\#\cdot\theta\cdot\tan\omega\cdot\cos\phi\omega$   (5A)

Subsequently, the conversion to the image surface IS will be described with reference to FIG. 7. A magnification $\beta$ is represented by the following expression:

$\beta=g\$_1/g\$_k=\alpha_k'/\alpha_1$ where $\alpha_1=1/g\$_1$. The relationship between the image surface IS and the object surface OS is represented by the following expression:

$Y=\beta\cdot Y\#$ $Y\#$ and $\Delta Y\#$ which take the form of $1/a_k\times(\ )$ are converted as follows:

$Y=\beta\cdot Y\#$ $=(\alpha_k'/\alpha_1)\cdot(1/\alpha_k')\times(\ )$ $=g\$_1\times(\ )$ Here, if $g\$_k\rightarrow\infty$, $g\$_1=-F1$. Therefore, the following expression holds:

$Y=-Fl\times(\ )$ $=-Fl\times\alpha_k'\times Y_\#$

Subsequently, the off-axial image point movement error on the image surface will be described. From the expression (4C) and $\alpha_k'=1/g_k'\$$, a decentering amount E is represented by the following expressions:

$\theta=\Delta Y_0\#/g\$_k'=E\cdot\Delta E/2$ $E=2\cdot\theta/\Delta E$

Normalization is performed so that the image blur compensation angle $\theta$ is constant (0.7 deg=0.0122173 rad).

By performing parallel decentering (rotational decentering is not performed) to image-surface-convert $\Delta Y=(\Delta Y\#-\Delta Y_0\#)$ (here, N·tan $\omega=\Phi/Fl$, $\Phi^2=Y^2+Z^2$), the following expressions (6A) to (6D) are obtained:

$\Delta Y=(\theta\cdot\Phi^2/Fl)\cdot[\{(2+\cos 2\cdot\phi\omega)\cdot VE1-VE2\}/\Delta E]$   (6A)

$$\Delta Z = (\theta \cdot \Phi^2 / Fl) \cdot [\{(\sin 2 \cdot \phi \omega) \cdot VE1 - VE2\} / \Delta E] \quad (6B)$$

$Y_+$ Image Point, $Y_-$ Image Point $\{\phi\omega=0, \pi$ of expressions (6A) and (6B)$\}$:

$$\Delta Y_Y = (\theta \cdot Y^2 / Fl) \cdot \{(3 \cdot VE1 - VE2) / \Delta E\} \quad (6C)$$

Z Image Point $\{\phi\omega=\pi/2$ of expressions (6A) and (6B)$\}$:

$$\Delta Y_Z = (\theta \cdot Z / Fl) \cdot \{(VE1 - VE2) / \Delta E\} \quad (6D)$$

Then, rotational conversion is performed. Since $Y\#=-Y/(Fl \times a_k')$, with respect to $-Y\# \cdot \theta \cdot \tan \omega \cdot \cos \phi\omega$ of the expression (5A), the following expression holds:

$$-Y\# \cdot \theta \cdot \tan \omega \cdot \cos \phi\omega = Y/(Fl \times \alpha_k') \cdot \theta \cdot \tan \omega \cdot \cos \phi\omega$$

At the $Y_+$ image point and the $Y_-$ image Point, since $\phi\omega=0$, $\pi$ and $\tan \omega/a_k'=Y$, $-Y\# \cdot \theta \cdot \tan \omega \cdot \cos \phi\omega$ on the image surface is $-Y\# \cdot \theta \cdot \tan \omega \cdot \cos \phi\omega = Y^2 \cdot \theta / Fl$. By adding this to the expression (6C), the following expression (6E) is obtained. At the Z image point, since $\phi\omega = \pi 2$, $-Y\# \cdot \theta \cdot \tan \omega \cdot \cos \phi\omega$ on the image surface is $-Y\# \cdot \theta \cdot \tan \omega \cdot \cos \phi\omega = 0$. By adding this to the expression (6D), the following expression (6F) is obtained:

$$\Delta Y_Y' = (\theta \cdot Y^2 / Fl) \cdot \{(3 \cdot VE1 - VE2 - \Delta E) / \Delta E\} \quad (6E)$$

$$\Delta Y_Z' = \Delta Y_Z \quad (6F)$$

[One-side blur]

Subsequently, the one-side blur will be described. From the expressions (1A) and (1B), $\Delta M$ is $\{$(primary term of R) of $\Delta Y \phi R=0\} \times g\$_k'$ and $\Delta S$ is $\{$(primary term of R) of $\Delta Z \phi R=\pi/2\} \times g\$_k'$. Before rotation, the following expression holds on the object surface OS (here, $a_k'=N_k'/g\$_k'$ and $E/2=\theta/\Delta E$ are used):

$$\Delta M\# = (-g\$_k'^2 \cdot \theta / N_k') \times 2 \cdot R \cdot (N \cdot \tan \omega) \cdot \cos \phi\omega \cdot \{(3 \cdot IIIE + PE) / \Delta E\}$$

After the rotation, the following expression holds:

$$\Delta M'\# \approx \Delta M\# + \theta Y\#$$

By converting the aberration coefficients to those on the image surface and substituting $N_k'=1$ and $N=1$, the following expression is obtained:

$$\Delta M' = \beta^2 \cdot \Delta M'\#$$
$$= -g\$^2 \cdot \theta \times 2 \cdot R \cdot \tan \omega \cdot \cos \phi\omega \cdot \{(3 \cdot IIIE + PE) / \Delta E\} + \beta \cdot Y \cdot \theta$$

If the object surface OS is $\infty$ (here, $g\$_1=-F1$, $\beta \to 0$, $\tan \omega = Y/F1$ and $\phi\omega = 0$), the following expression (7A) representative of a meridional one-side blur $\Delta M'$ is obtained. Likewise, an expression (7B) representative of a sagittal one-side blur is obtained.

$$\Delta M' = -2 \cdot Fl \cdot Y \cdot \theta \cdot R \cdot \{(3 \cdot IIIE + PE) / \Delta E\} \quad (7A)$$

$$\Delta S' = -2 \cdot Fl \cdot Y \cdot \theta \cdot R \cdot \{(IIIE + PE) / \Delta E\} \quad (7B)$$

[Axial coma]

Subsequently, axial coma will be described. Based on the expression (1A), coma by $\omega=0$ and upper decentering is represented by the following expression:

$$\Delta Y_{Upper}\# = \Delta Y\#(\omega=0, \phi_R=0) \Delta Y\#(\omega=0, R=0) = -E/(2 \cdot \alpha') \times R^2 \times 3 \cdot IIE$$

Coma by $\omega=0$ and lower decentering (the same as $\Delta Y_{upper}\#$ including the sign) is represented by the following expression:

$$\Delta Y_{Lower}\# = \Delta Y\#(\omega=0, \phi_R=\pi) \Delta Y\#(\omega=0, R=0) = -E/(2 \cdot \alpha') \times R^2 \times 3 \cdot IIE$$

Since $\omega=0$, axial coma is hardly varied by the rotational conversion. By the conversion from the object surface OS to the image surface IS ($\Delta Y = \beta \cdot \Delta Y\#$, $E/2 = \theta/\Delta E$), the following expression is obtained $$\Delta Y_{Upper} = Fl \times \theta \times R^2 \times (3 \cdot IIE / \Delta E) = \Delta Y_{Lower}$$

The axial coma AXCM is represented by the following expression (8A):

$$AXCM = (\Delta Y_{Upper} + \Delta Y_{Lower})/2$$
$$= \Delta Y_{Upper} \quad (8A)$$

A part of each of the expressions (6E), (6F), (7A), (7B) and (8A) is newly defined as an aberration coefficient represented by the following expressions (9A) to (9E):

Off-axial image-point movement error of an image point on the Y axis:

$$VE_Y = \{(3 \cdot VE1 - VE2 - \Delta E) / \Delta E\} \quad (9A)$$

Off-axial image-point movement error of an image point on the Z axis:

$$VE_Z = \{(VE1 - VE2) / \Delta E\} \quad (9B)$$

Meridional single-sided blur:

$$IIIE_M = \{(3 \cdot IIIE + PE) / \Delta E\} \quad (9C)$$

Sagittal single-sided blur:

$$IIIE_S = \{(IIIE + PE) / \Delta E\} \quad (9D)$$

Off-axial coma:

$$IIE_A = \{(3 \cdot IIE) / \Delta E\} \quad (9E)$$

By substituting the expressions (3A) to (3F) in the expressions (9A) to (9B) representative of the image blur aberration coefficients, the following expressions (10A) to (10E) representative of image blur aberration coefficients are obtained:

$$VE_Y = -\tfrac{1}{2} \cdot \{3V_R - 3V_D \cdot A + 2 - (3 \cdot III_R + P_R) \cdot H\# + (3 \cdot III_D + P_D) \cdot A\#\} \quad (10A)$$

$$VE_Z = -\tfrac{1}{2} \cdot \{V_R - V_D \cdot A - (III_R + P_R) \cdot H\# + (III_D + P_D) \cdot A\#\} \quad (10B)$$

$$IIIE_M = -\tfrac{1}{2} \cdot \{(3 \cdot III_R + P_R) - (3 \cdot III_D + P_D) \cdot A - 3 \cdot II_R \cdot H\# + 3 \cdot II_D \cdot A\#\} \quad (10C)$$

$$IIIE_S = -\tfrac{1}{2} \cdot \{(III_R + P_R) - (III_D + P_D) \cdot A - II_R \cdot H\# + II_D \cdot A\#\} \quad (10D)$$

$$IIE_A = -\tfrac{3}{2} \cdot (II_R + II_D \cdot A - I_R \cdot H\# + I_D \cdot A\#) \quad (10E)$$

where $(\ )_D$ is the sum of the aberration coefficients of the compensating lens unit;

$(\ )_R$ is the sum of the aberration coefficients of the lens units arranged behind (on the object side of) the compensating lens unit;

$A = \alpha i / (\alpha j' - \alpha i)$ (here, the compensating lens units are i to j);

$A\# = \alpha i\# / (\alpha j' - \alpha i)$; and $H\# = (\alpha i'\# - \alpha i\#)/(\alpha j' - \alpha i)$.

$\Delta E = -2 \cdot (\alpha j' - \alpha i)$ (here, $(\alpha j' - \alpha i)$ is $\pm 0.0122173$ when $0.7°/mm$) which is the coefficient of (image blur compensation angle)/(decentering amount) aims substantially at a predetermined value (however, the sign differs according to whether the compensating lens units are positive or negative). Therefore, A is an incident angle of a marginal light beam to the compensating lens units (viewed from the image side) and A# is proportional to the incident angle of the principal light beam. When h# and h do not vary so much in the compensating lens units, H# represents a ratio between h# of the principal light beam and h of the marginal light beam.

Since the decentering aberration coefficients in the expressions (10A) to (10E) are defined as those of the reversal optical system, it is necessary to return them to the coefficients of the non-reversal optical system. Returning the coefficients in the expressions (10A) to (10E) by using the expressions (2A) to (2J), the following expressions (11A) to (11E) are obtained:

$$VE_Y = +\tfrac{1}{2} \cdot \{3V_F - 3V_D \cdot A - 2 + (3 \cdot III_F + P_F) H\# - (3 \cdot III_D + P_D) \cdot A\#\} \quad (11A)$$

$$VE_Z = +\tfrac{1}{2} \cdot \{V_F - V_D \cdot A + (III_F + P_F) H\# - (III_D + P_D) \cdot A\#\} \quad (11B)$$

$$IIIE_M = -\tfrac{1}{2} \cdot \{(3 \cdot III_F + P_F) - (3 \cdot III_D + P_D) \cdot A + 3 \cdot II_F \cdot H\# - 3 \cdot II_D \cdot A\#\} \quad (11C)$$

$$IIIE_S = -\tfrac{1}{2} \cdot \{(III_F + P_F) - (III_D + P_D) \cdot A + II_F \cdot H\# - II_D \cdot A\#\} \quad (11D)$$

$$IIE_A = +\tfrac{3}{2} \cdot (II_F - II_D \cdot A + I_F \cdot H\# - I_D \cdot A_\#) \quad (11E)$$

where $(\ )_D$ is the sum of the aberration coefficients of the compensating lens units and the reversal optical system;

$(\ )_F$ is the sum of the aberration coefficients of the lens units arranged in front of the compensating lens units;

$A = -\alpha n'/(\alpha n' - \alpha m)$;

$A\# = \alpha n'\#/(\alpha n' - \alpha m)$;

$H = -(\alpha n'\# - \alpha m\#)/(\alpha n' - \alpha m) = -(\Sigma h \mu \# \cdot \phi \mu)/(\Sigma h \mu \cdot \phi \mu)$; and $\Delta E = -2(\alpha n' - \alpha m)$ (compensating lens units: $m \rightarrow n$, non-reversal lens system: $j \leftarrow i$).

The following are understood from the expressions (11A) to (11E): First, while according to the method of the above-mentioned paper of Yoshiya Matsui's, the image blur compensating lens unit (i.e. the decentered lens LS) and succeeding lens units relate to the optical quality as described previously, according to the expressions (11A) to (11E), the image blur compensating lens unit and the preceding lens units are related to the optical performance. Second, the off-axial image point shift error tends to increase in wide-angle lens systems (the focal length Fl of the image blur compensating lens unit is the denominator) and the one-side blur and the axial coma tend to increase in telephoto lens systems.

Third, while the aberration degradation at the time of decentering is reduced by decreasing the aberration coefficients of the image blur compensating lens unit and the preceding lens units, a constant (−2 in { } of the expression (11A)) is left in the coefficient $VE_Y$ of the off-axial image point shift error $\Delta Y_Y'$. This is a term which occurs because of an inclined relationship between the object surface OS and the image surface IS due to deflection in the rotation. The off-axial image point shift error due to the constant term (−2) is great in wide-angle lens systems. For example, when the focal length Fl is 38 mm, the off-axial image point shift error $\Delta Y_Y'$ is −72 $\mu$m, which cannot be ignored. Moreover, the off-axial image point shift error due to the constant term (−2) is left even if the aberration coefficients are "0". Therefore, it is desirable to set the aberration coefficients so that the constant term (−2) is canceled.

Fourth, in order to reduce the aberration degradation at the time of decentering, it is necessary to reduce the aberration coefficients and the coefficients such as A, A# and H# multiplied by the aberration coefficients. In order to reduce A and A#, the denominator $\alpha_n' - \alpha_m$ is increased. Since this is directly related to $\Delta E = -2(\alpha_n' - \alpha_m')$, if the denominator is increased too much, the blur compensation sensitivity (how many degrees the luminous flux is bent at when the lens is decentered by certain millimeters) becomes too high, so that mechanical driving accuracy is necessary. With respect to H#, the closer the image blur compensating lens unit is to the aperture diaphragm, the smaller h# of each surface is and the smaller H# is.

<First to Fourth Embodiments>

Zoom lens systems having an image blur compensating function according to the first to fourth embodiments will be described with reference to the drawings. FIGS. 8, 12, 16 and 20 show the lens arrangements of the first to fourth embodiments in the normal condition (pre-decentering condition) at the wide-angle limit [W]. In the figures, the surface marked with ri (i=1, 2, 3, . . . ) is an ith surface counted from the object side, and the axial distance marked with di (i=1, 2, 3, . . . ) is an ith axial distance counted from the object side. Arrows m1, m2, m3, m4 and m5 of FIGS. 8, 12, 16 and 20 schematically show zoom movements of a first lens unit Gr1, a second lens unit Gr2, a third lens unit Gr3, an aperture diaphragm S and a fourth lens unit Gr4, and a fifth lens unit Gr5 from the wide-angle limit [W] to the telephoto limit [T].

Figure 8:
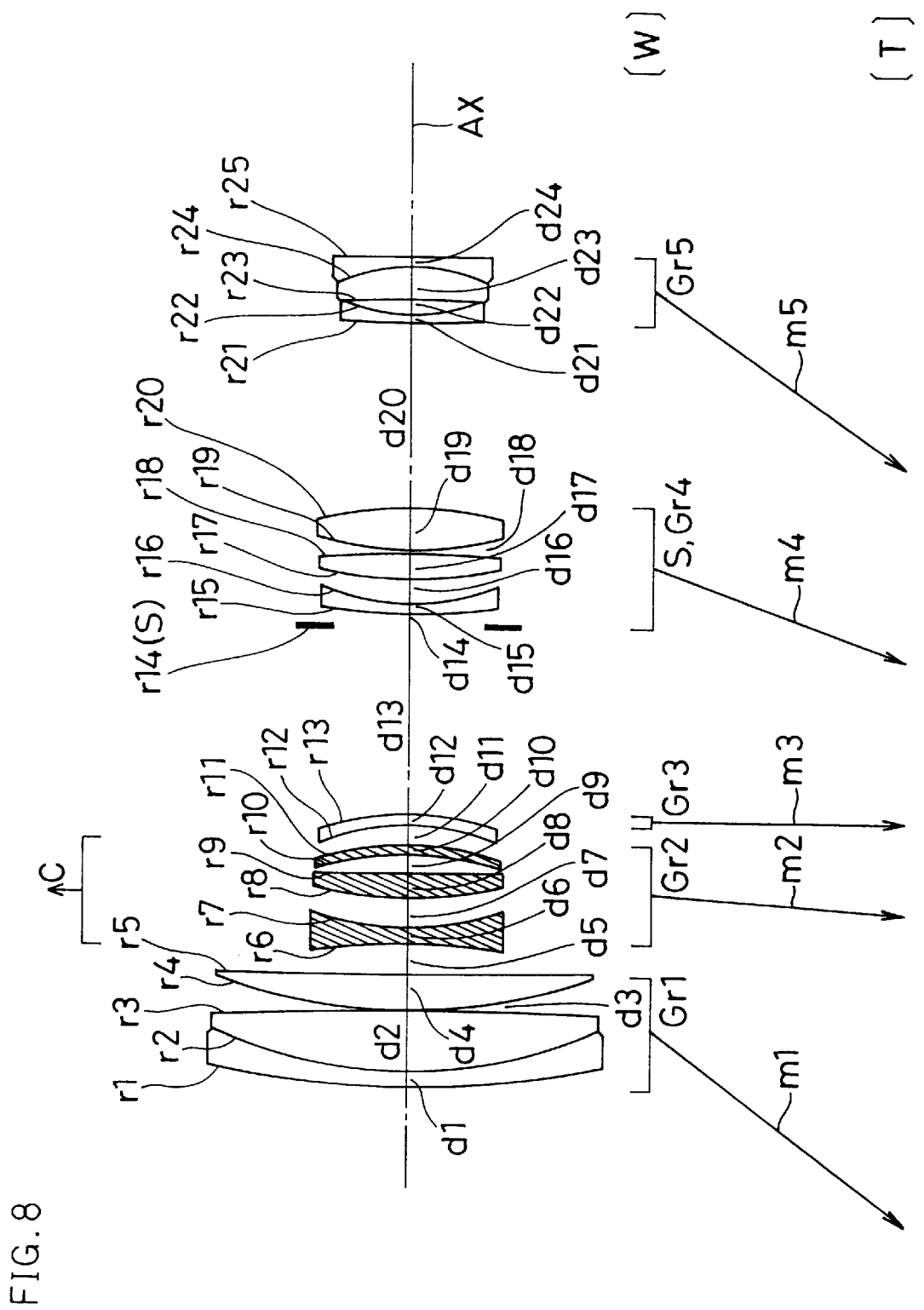
FIG. 8 shows the lens arrangement of a first embodiment.
Figure 9A:
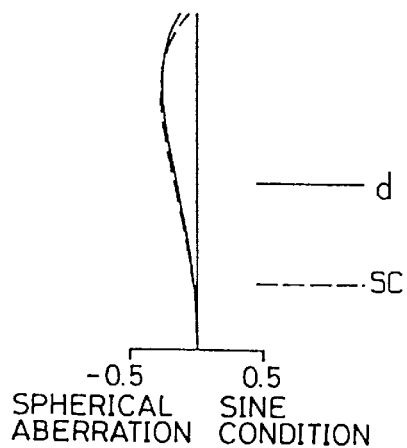
FIGS. 9A to 9I show longitudinal aberration curves of the first embodiment before decentering.
Figure 9B:
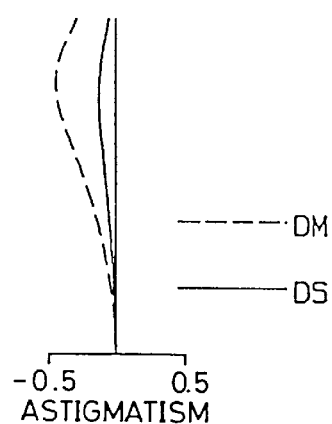
Figure 9C:
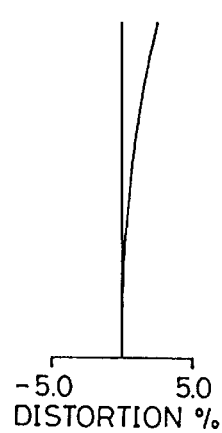
Figure 9D:
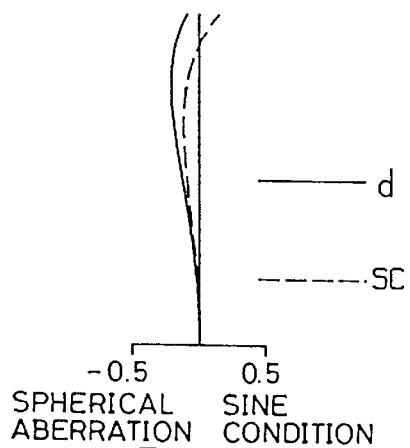
Figure 9E:
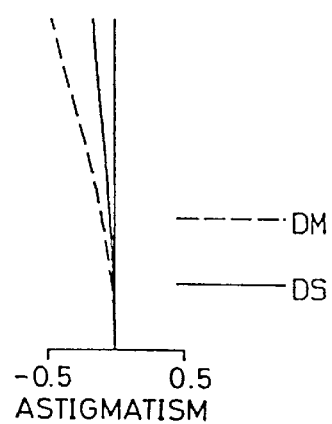
Figure 9F:
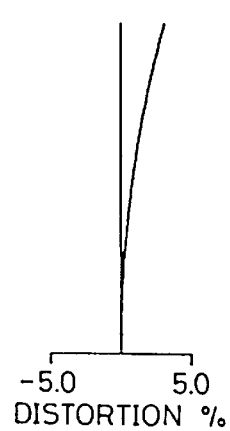
Figure 9G:
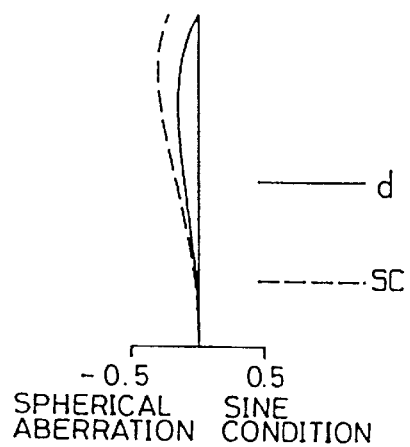
Figure 9H:
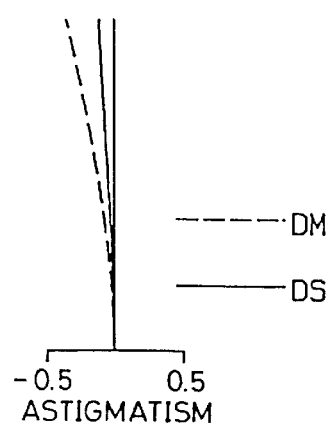
Figure 9I:
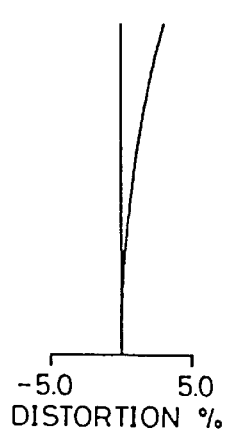
Figure 10A:
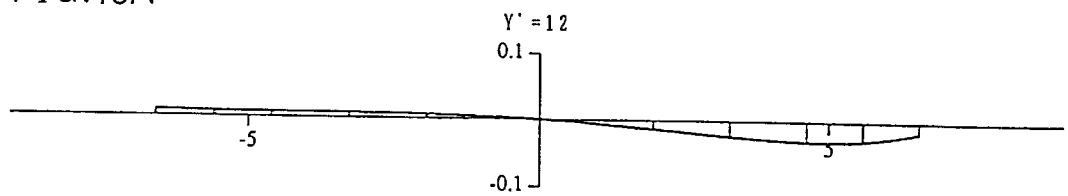
FIGS. 10A to 10E show meridional lateral aberration curves of the first embodiment at the wide angle limit before and after decentering.
Figure 10B:
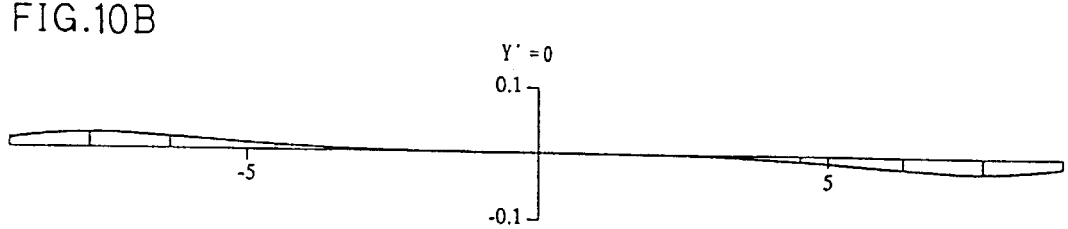
Figure 10C:
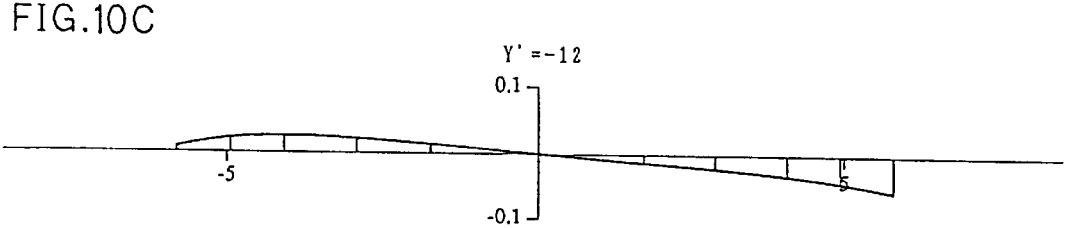
Figure 10D:
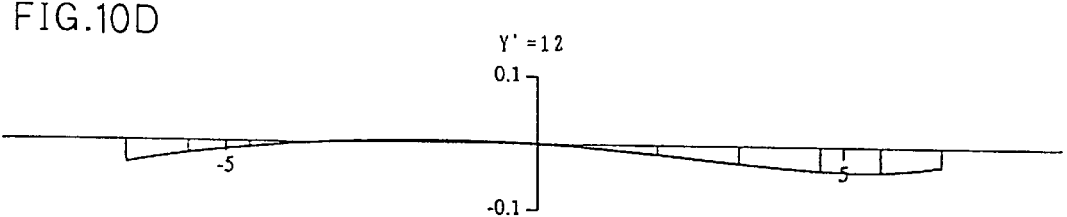
Figure 10E:
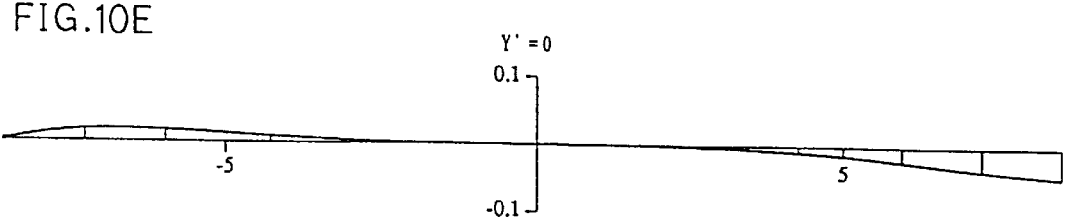
Figure 11A:
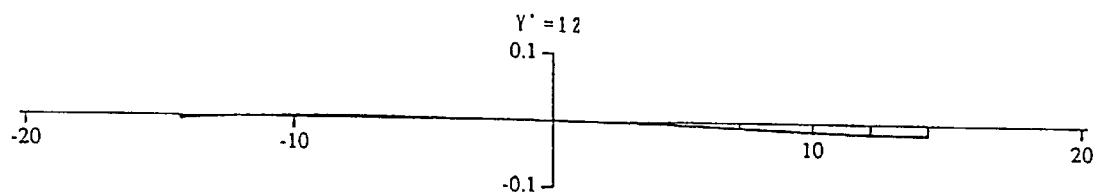
FIGS. 11A to 11E show meridional lateral aberration curves of the first embodiment at the telephoto limit before and after decentering.
Figure 11B:
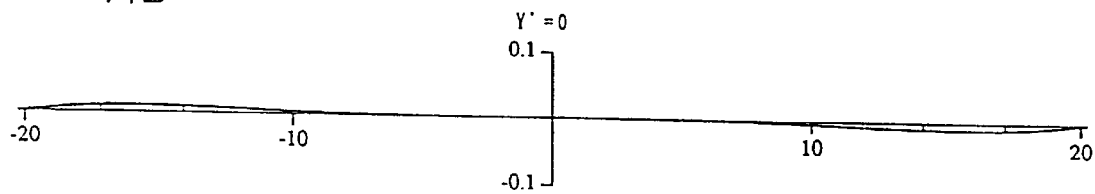
Figure 11C:
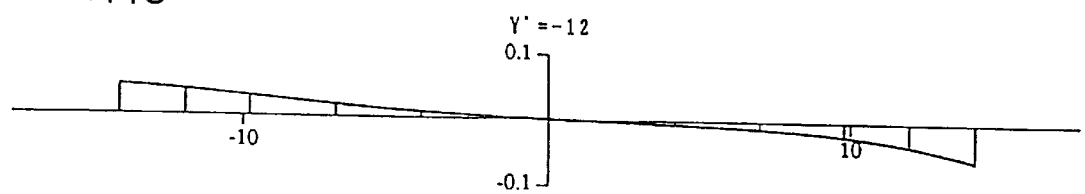
Figure 11D:
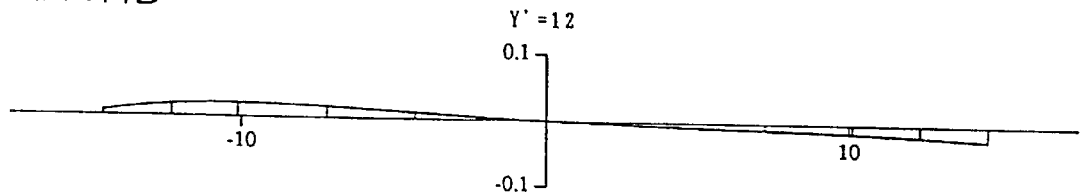
Figure 11E:
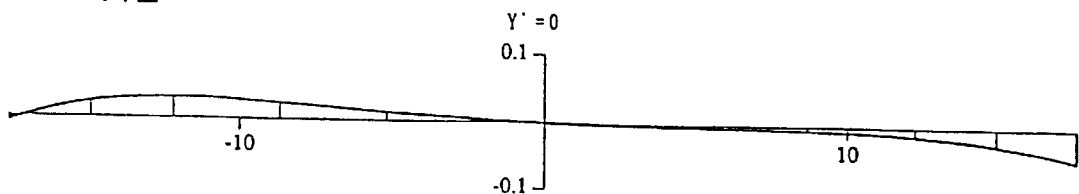

A zoom lens system of the first embodiment consists of, from the object side, a first lens unit Gr1 having a positive refractive power, a second lens unit Gr2 having a negative refractive power, a third lens unit Gr3 having a negative refractive power, a fourth lens unit Gr4 having a positive refractive power, and a fifth lens unit Gr5 having a negative refractive power, wherein zooming is performed by varying the distances between the lens units. Image blur compensation is made by parallel decentering the second lens unit Gr2, that is, by moving it vertically (i.e. in a direction perpendicular) to the optical axis AX. In FIG. 8, arrow C represents the movement of the second lens unit Gr2 during image blur correction.

Figure 12:
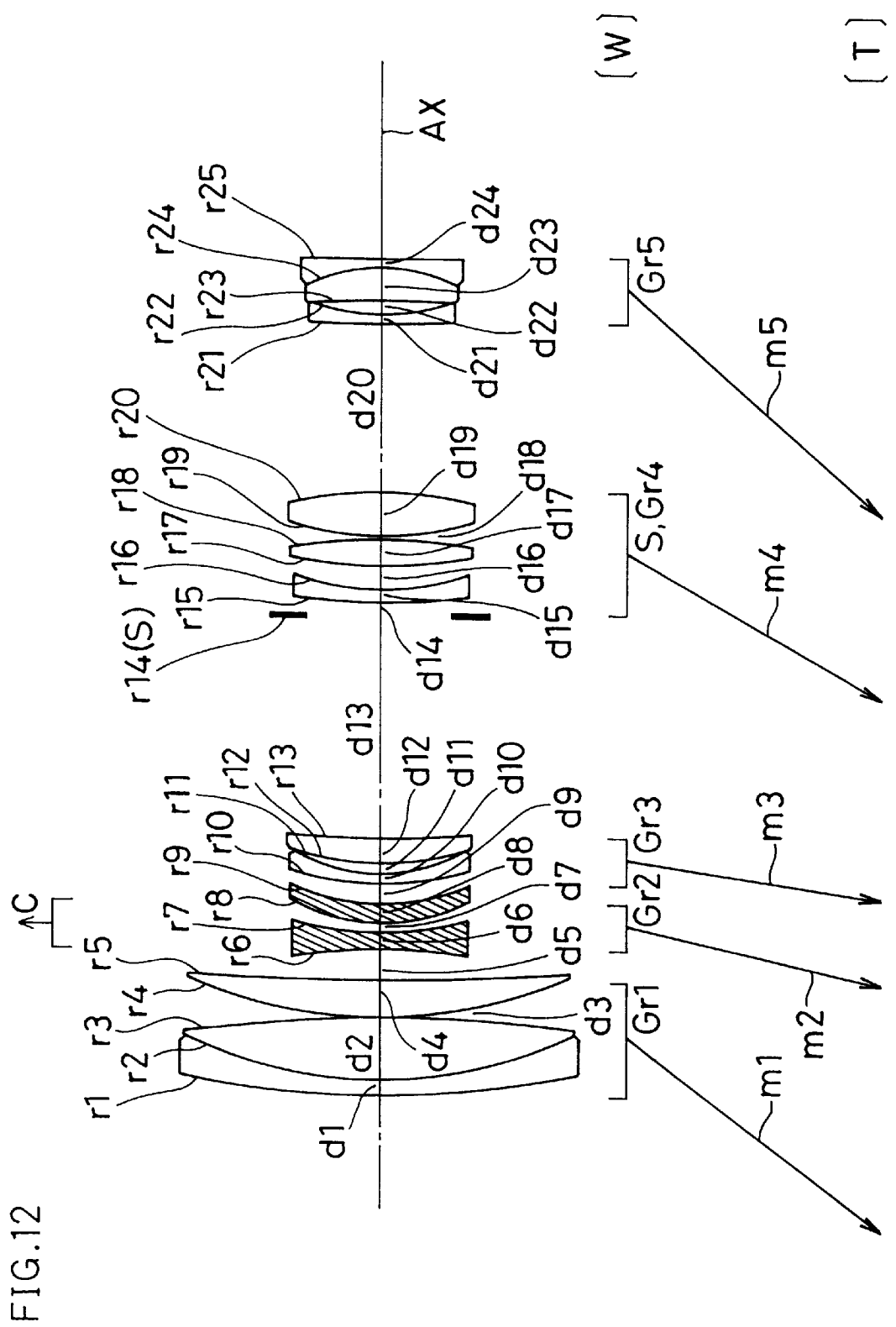
FIG. 12 shows the lens arrangement of a second embodiment.
Figure 13A:
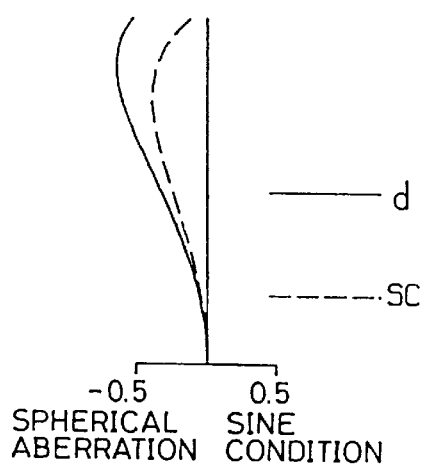
FIGS. 13A to 13I show longitudinal aberration curves of the second embodiment before decentering.
Figure 13B:
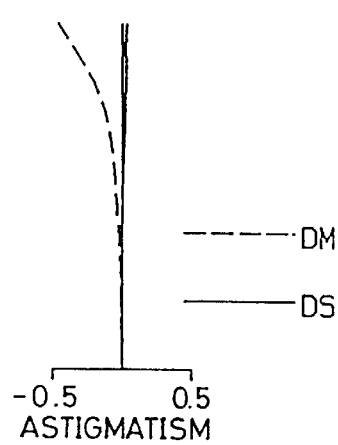
Figure 13C:
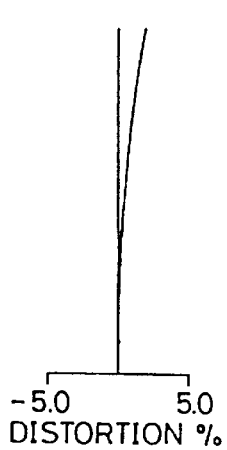
Figure 13D:
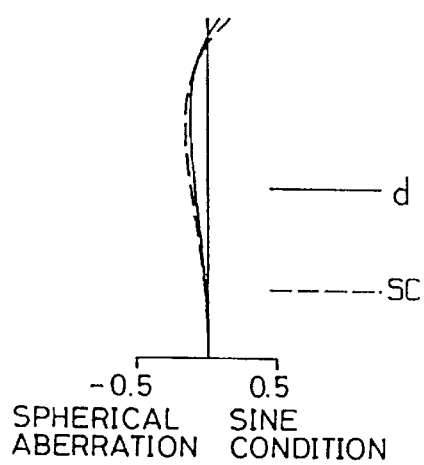
Figure 13E:
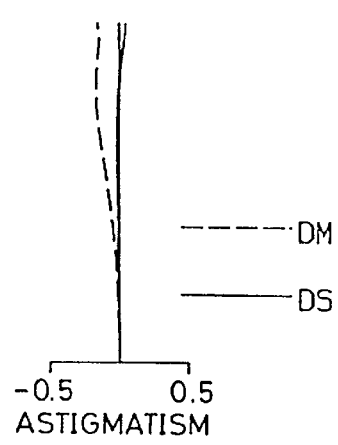
Figure 13F:
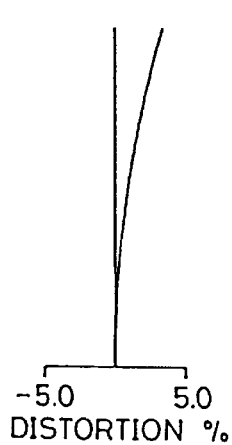
Figure 13G:
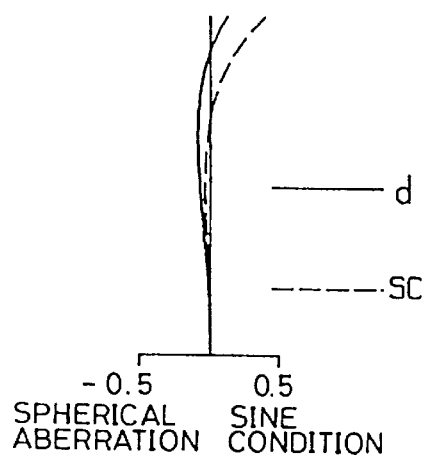
Figure 13H:
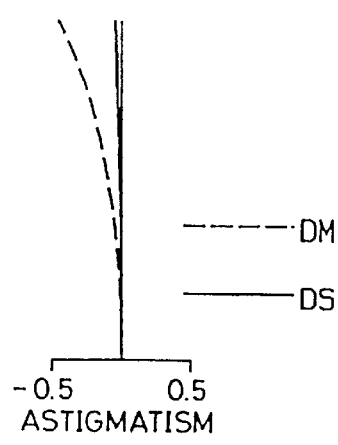
Figure 13I:
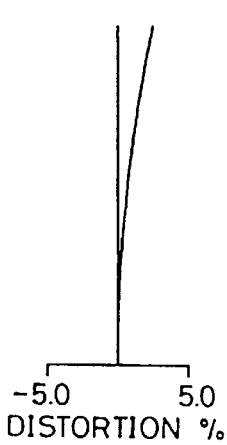
Figure 14A:
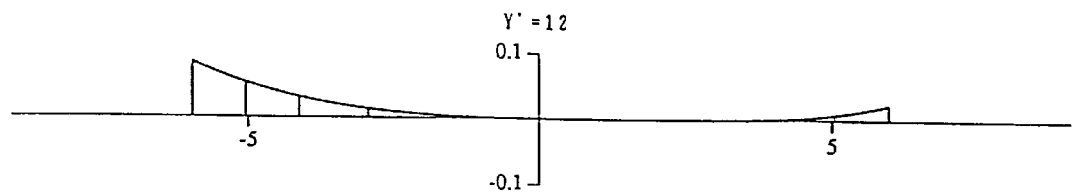
FIGS. 14A to 14E show meridional lateral aberration curves of the second embodiment at the wide angle limit before and after decentering.
Figure 14B:
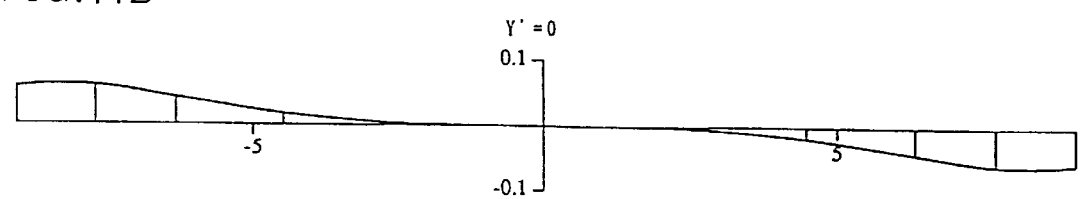
Figure 14C:
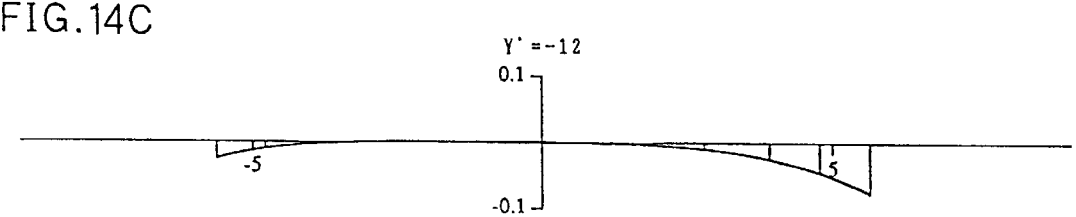
Figure 14D:
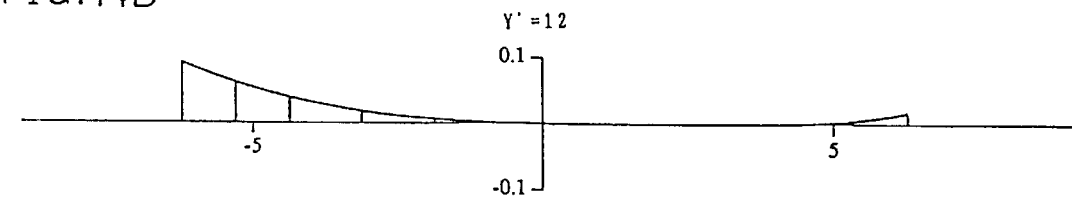
Figure 14E:
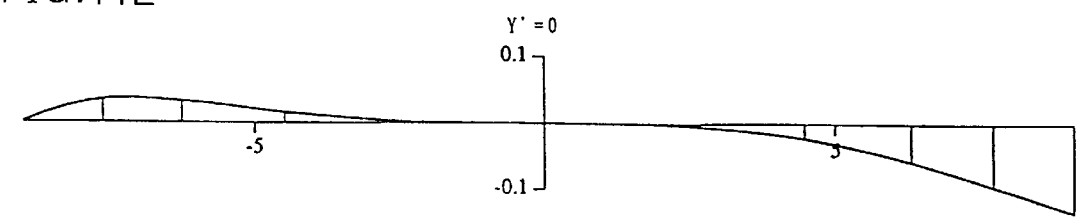
Figure 15A:
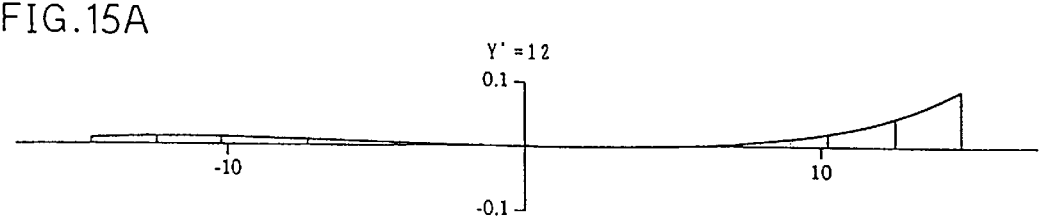
FIGS. 15A to 15E show meridional lateral aberration curves of the second embodiment at the telephoto limit before and after decentering.
Figure 15B:
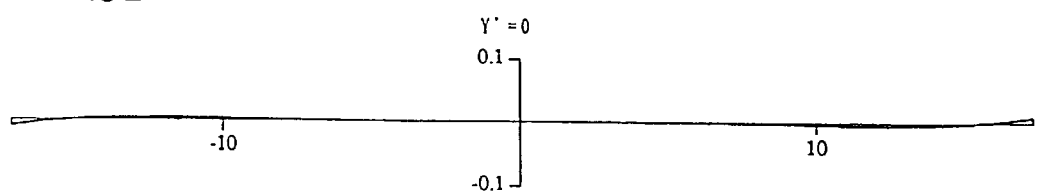
Figure 15C:
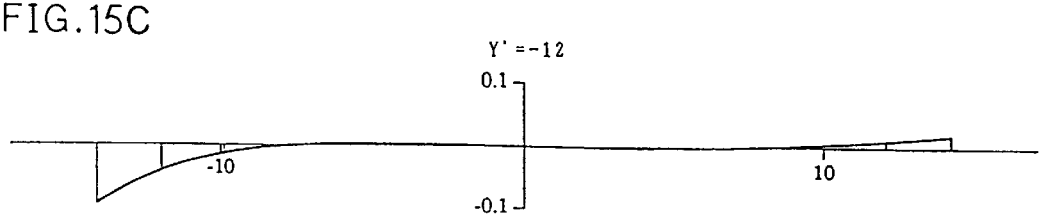
Figure 15D:
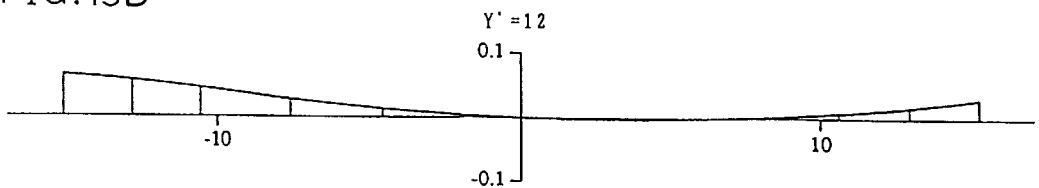
Figure 15E:
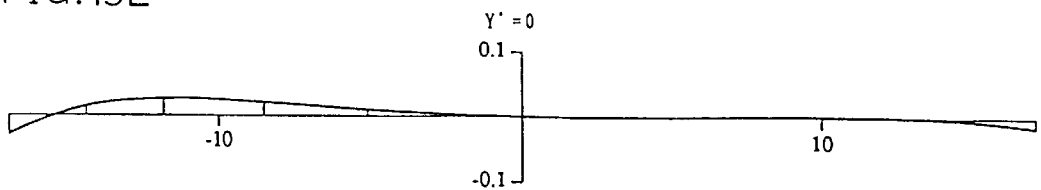
Figure 17A:
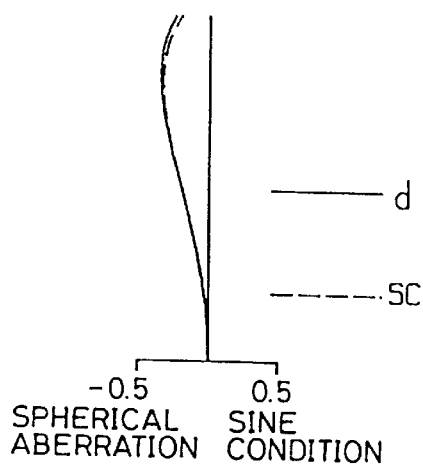
FIGS. 17A to 17I show longitudinal aberration curves of the third embodiment before decentering.
Figure 17B:
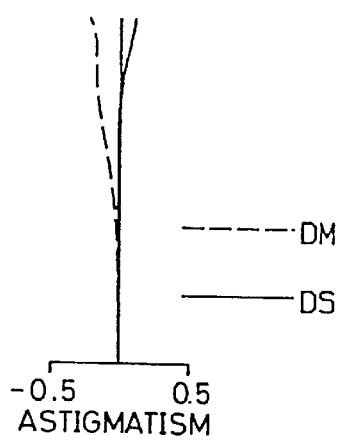
Figure 17C:
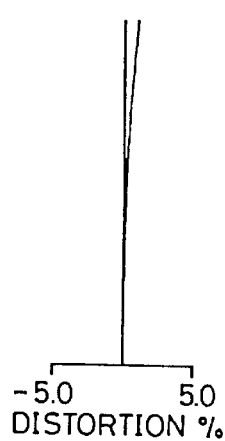
Figure 17D:
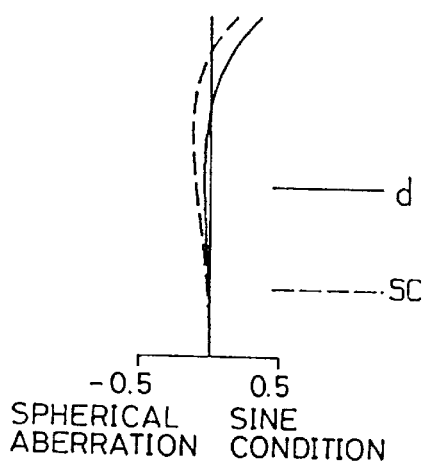
Figure 17E:
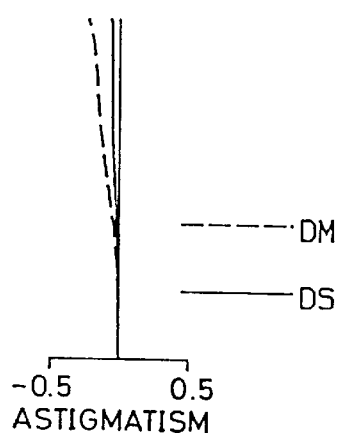
Figure 17F:
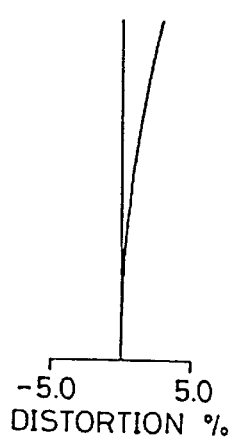
Figure 17G:
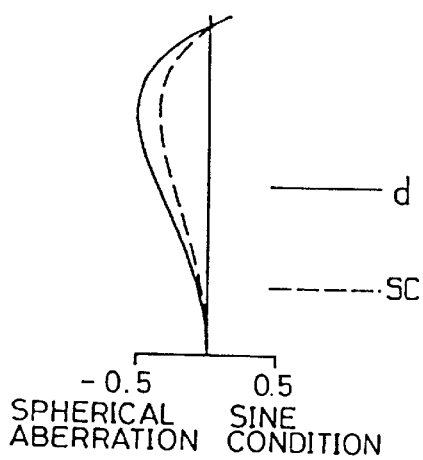
Figure 17H:
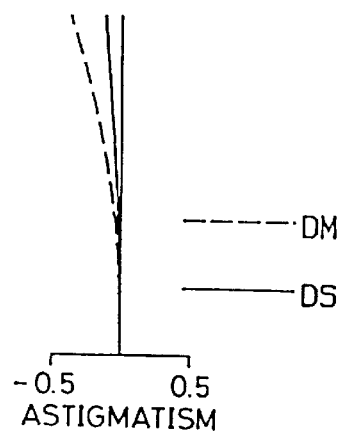
Figure 17I:
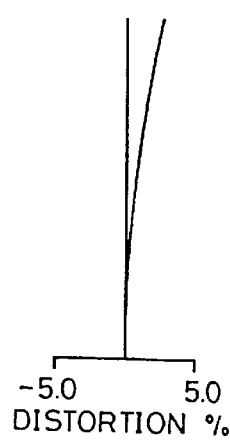
Figure 18A:
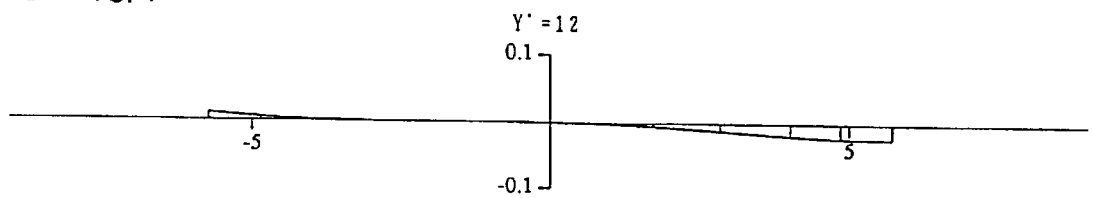
FIGS. 18A to 18E show meridional lateral aberration curves of the third embodiment at the wide angle limit before and after decentering.
Figure 18B:
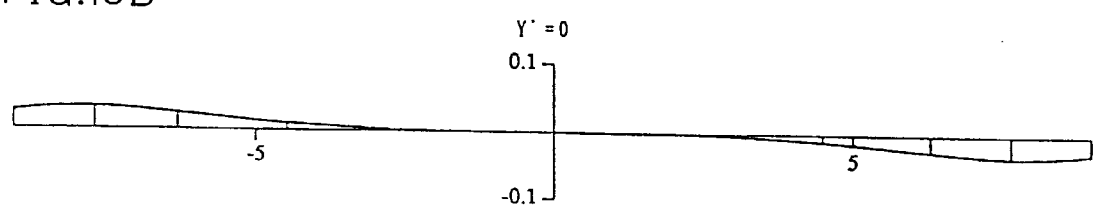
Figure 18C:
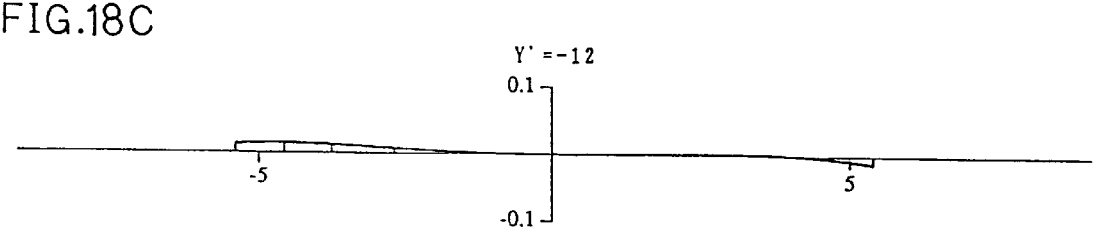
Figure 18D:
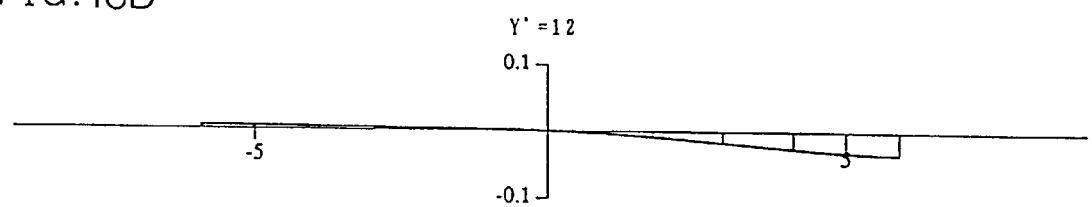
Figure 18E:
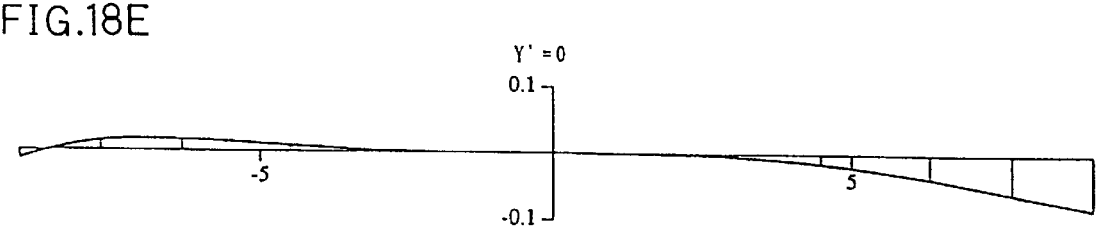
Figure 19A:
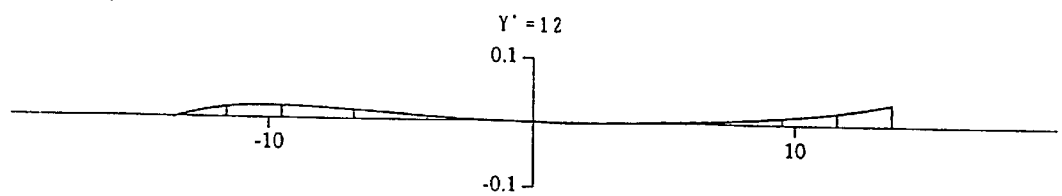
FIGS. 19A to 19E show meridional lateral aberration curves of the third embodiment at the telephoto limit before and after decentering.
Figure 19B:
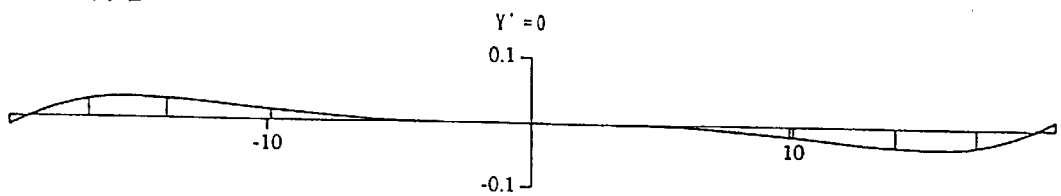
Figure 19C:
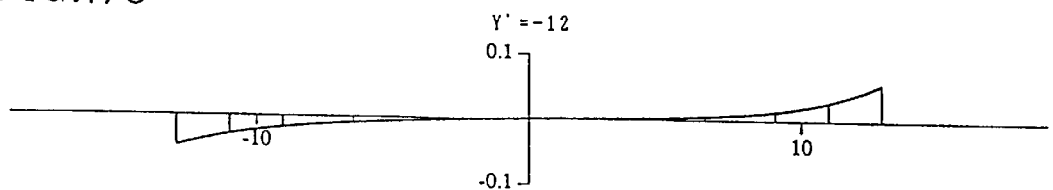
Figure 19D:
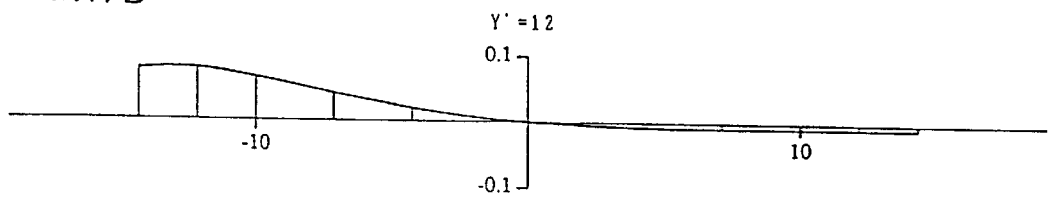
Figure 19E:
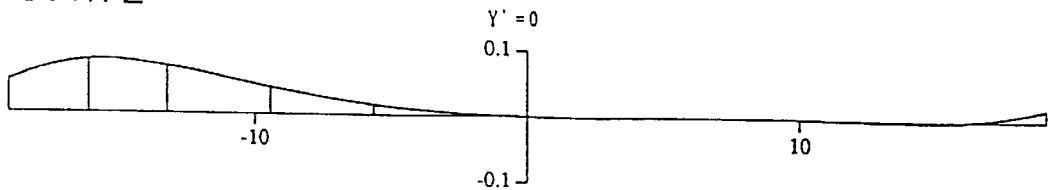
Figure 20:
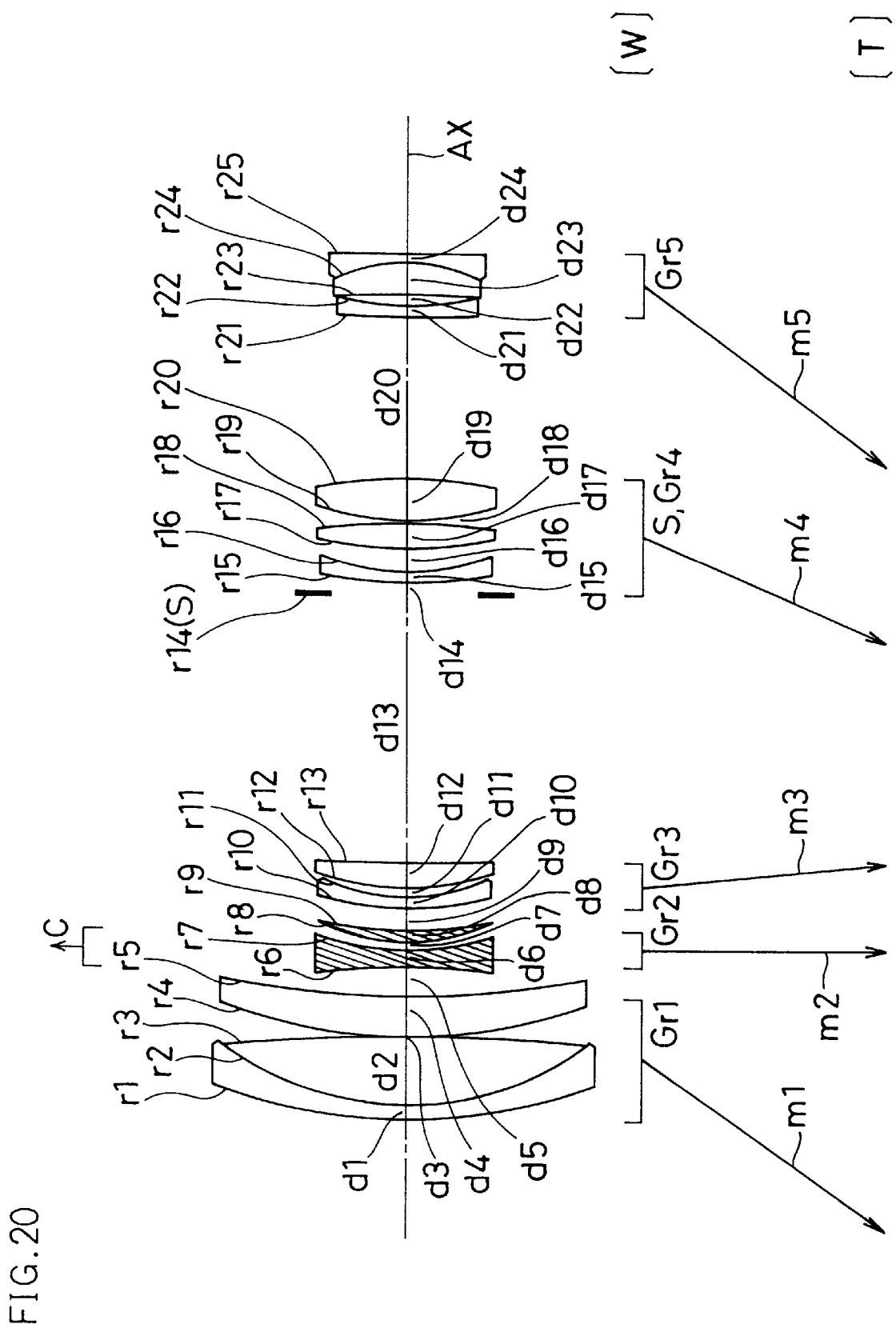
FIG. 20 shows the lens arrangement of a fourth embodiment.
Figure 21A:
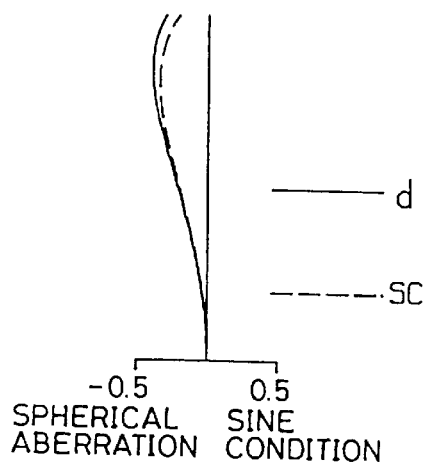
FIGS. 21A to 21I show longitudinal aberration curves of the fourth embodiment before decentering.
Figure 21B:
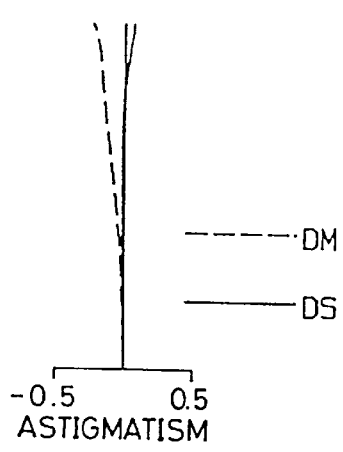
Figure 21C:
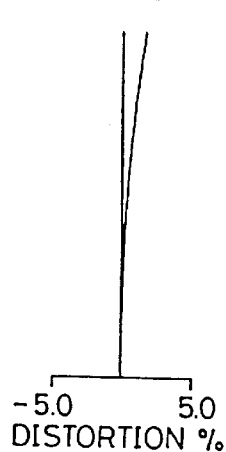
Figure 21D:
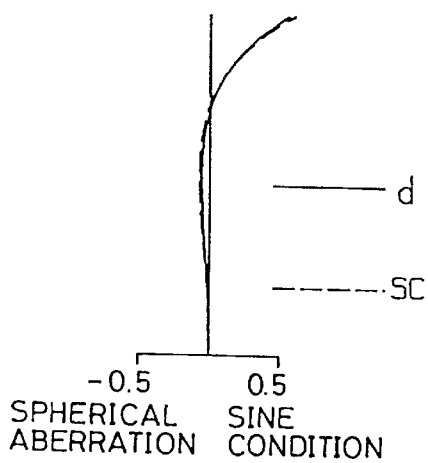
Figure 21E:
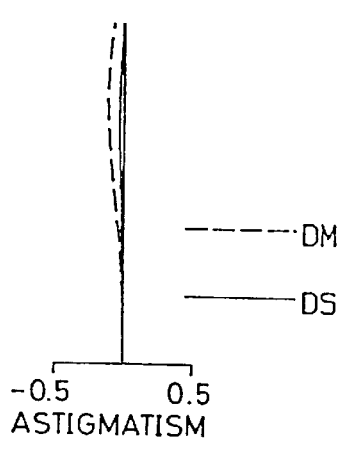
Figure 21F:
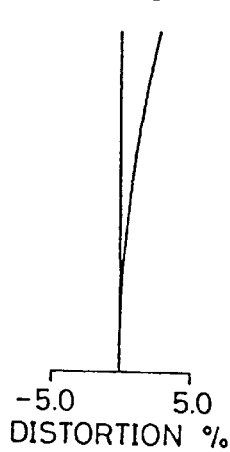
Figure 21G:
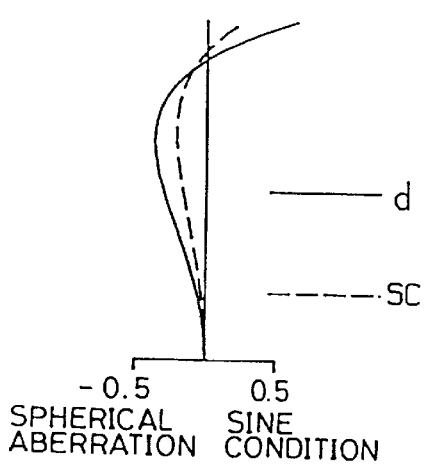
Figure 21H:
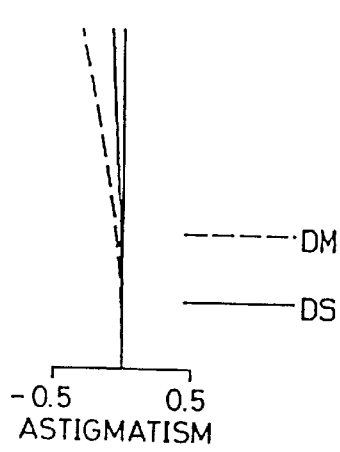
Figure 21I:
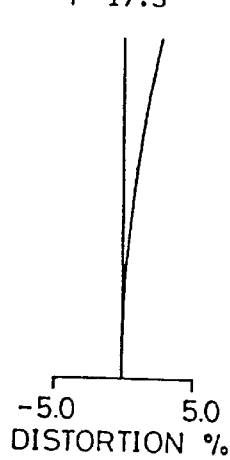
Figure 22A:
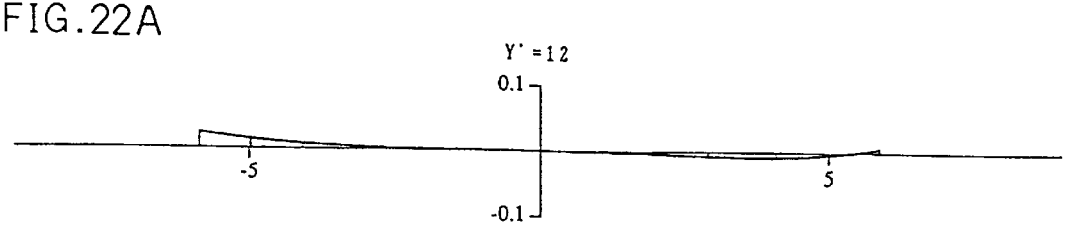
FIGS. 22A to 22E show meridional lateral aberration curves of the fourth embodiment at the wide angle limit before and after decentering.
Figure 22B:
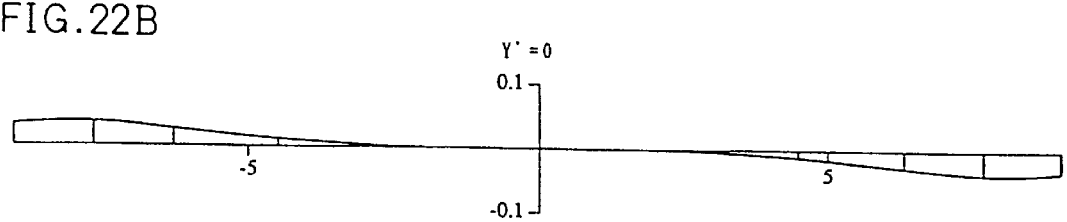
Figure 22C:
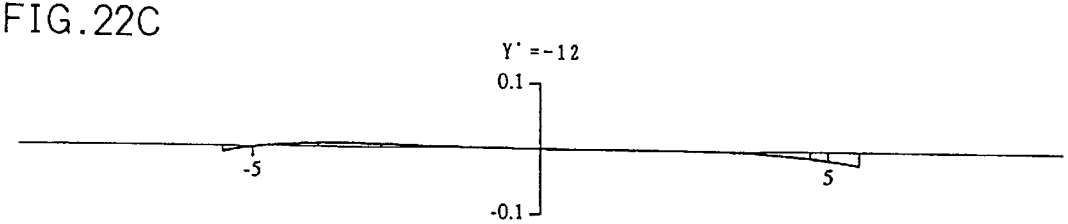
Figure 22D:
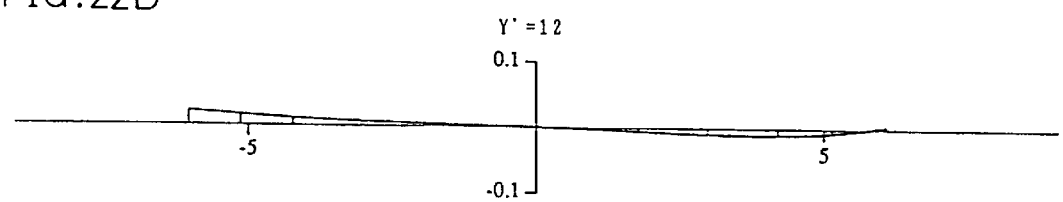
Figure 22E:
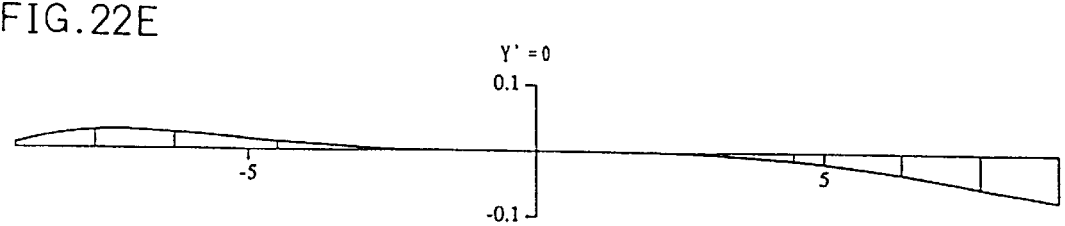
Figure 23A:
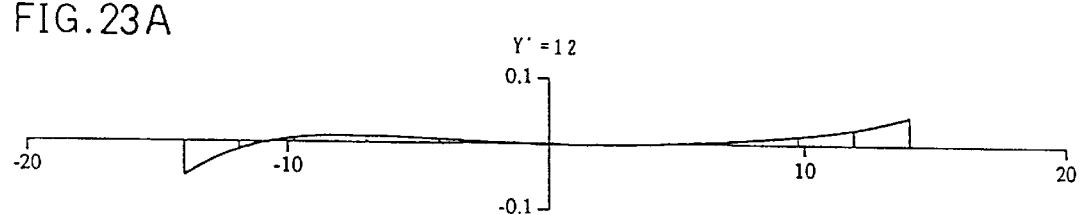
FIGS. 23A to 23E show meridional lateral aberration curves of the fourth embodiment at the telephoto limit before and after decentering.
Figure 23B:
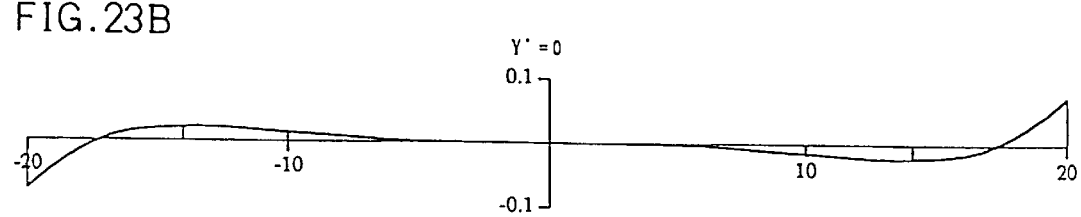
Figure 23C:
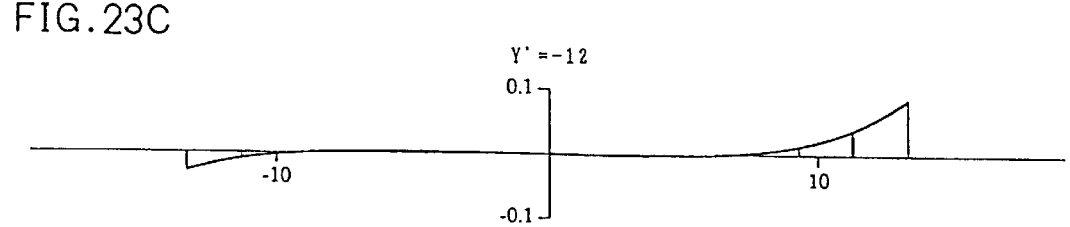
Figure 23D:
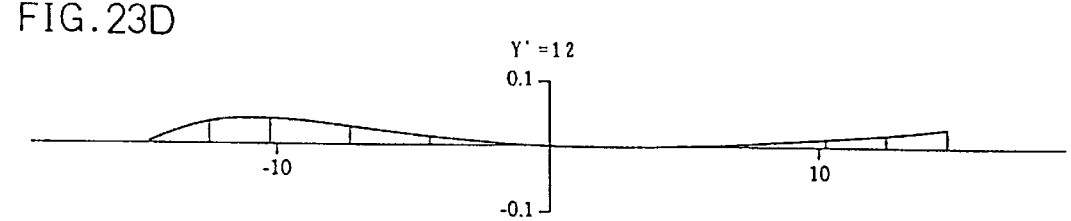
Figure 23E:
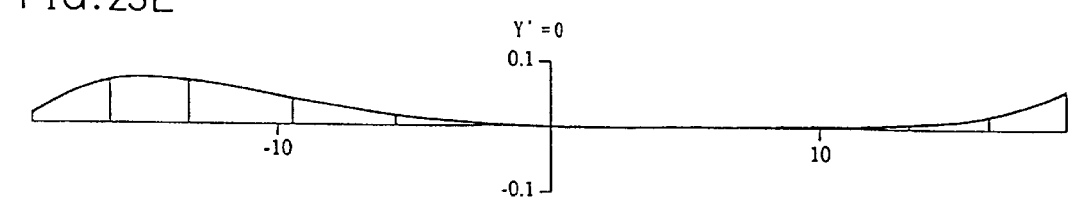

Zoom lens systems of the second to fourth embodiments consist of, from the object side, a first lens unit Gr1 having a positive refractive power, a second lens unit Gr2 having a negative refractive power, a third lens unit Gr3 having a positive refractive power, a fourth lens unit Gr4 having a positive refractive power, and a fifth lens unit Gr5 having a negative refractive power, wherein zooming is performed by varying the distances between the lens units. Image blur compensation is made by parallel decentering the second lens unit Gr2. In FIGS. 12, 16, and 20, arrow C represents the movement of the second lens unit Gr2 during image blur correction.

The first to fourth embodiments include from the object side the first lens unit Gr1 having a positive refractive power and the second lens unit Gr2 having a negative refractive power, and include on the most image side the last lens unit (i.e. the most image side lens unit) having a negative refractive power. In this type of zoom lens systems, since the degree of freedom of the movements of the zoom lens units are effectively used for aberration correction, excellent image quality is obtained in the entire zoom range.

Since the first lens unit Gr1 and the fifth lens unit Gr5 which is the last lens unit are moved toward the object side during zooming from the wide-angle limit [W] to the telephoto limit [T], a telephoto zoom lens system is achieved which is compact but has a sufficient back focal length. Since the last lens unit has a negative refractive power, a sufficient back focal length and compactness are simultaneously achieved. Further, by arranging so that the second lens unit Gr2 and the third lens unit Gr3 are moved during zooming from the wide-angle limit [W] to the telephoto limit [T], the degree of freedom of the movements of the zoom lens units increases, so that an optical system is obtained which is advantageous in correcting aberration and has a further reduced total length.

The first to fourth embodiments fulfill the conditions (1) and (2) shown below. Since the first to fourth embodiments are five-unit zoom lens systems, the following conditions (1a) and (2) are fulfilled:

$$0.2<|fL/fW|<0.4 \quad (1)$$

$$0.2<|f5/fW|<0.4 \quad (1a)$$

$$0.2<|f2/fW|<4.0 \quad (2)$$

where fL is the focal length of the last lens unit, fW is the focal length of the entire lens system at the wide-angle limit [W], f2 is the focal length of the second lens unit Gr2, and f5 is the focal length of the fifth lens unit Gr5.

The conditions (1) and (1a) define the length of the focal length of the last lens unit. When the upper limit of the conditions (1) and (1a) is exceeded, the refractive power of the last lens unit is weakened and the proportion of its contribution to zooming decreases, so that the zoom movement amount increases. If the zoom movement amount increases, the total length increases, so that compactness is lost. When the conditions (1) and (1a) are fulfilled with an upper limit of 0.38, a more compact zoom optical system is obtained. When the lower limit of the conditions (1) and (1a) is exceeded, the refractive power of the last lens unit is too strong, so that an enormous amount of aberration is caused and it is difficult to restrain the aberration by use of another lens unit. When the conditions (1) and (1a) are fulfilled with a lower limit of 0.27, a zoom optical system which is more excellent in image quality is obtained.

In zoom taking optical systems for single lens reflex cameras, it is typical that the first lens unit Gr1 is the largest lens unit and is considerably heavy in weight. Therefore, in zoom lens systems like the first to fourth embodiments including from the object side the first lens unit Gr1 having a positive refractive power and the second lens unit Gr2 having a negative refractive power and including on the most image side the last lens unit having a negative refractive power wherein zooming is performed by varying the distances between the lens units and the first lens unit Gr1 and the last lens unit are moved toward the object side during zooming from the wide-angle limit [W] to the telephoto limit [T], the first lens unit Gr1 is heavy in weight compared with the second lens unit Gr2 and succeeding lens units. For this reason, it is undesirable to make image blur compensation by moving the first lens unit Gr1 vertically to the optical axis AX (i.e. by parallel decentering it) because this requires for the image blur compensation driving system to increase in size.

For this reason, in the first to fourth embodiments, image blur compensation is made by moving the second lens unit Gr2 vertically to the optical axis AX. Since the second lens unit Gr2 is small in diameter and light in weight compared with the first lens unit Gr1, by using the second lens unit Gr2 for image blur compensation, image blur is compensated without any increase in burden on the image blur compensation driving system. Moreover, the second lens unit Gr2 has a characteristic that its movement amount during zooming from the wide-angle limit [W] to the telephoto limit [T] is small compared with the other lens units. This characteristic is advantageous in making image blur compensation, and also in that regard, the second lens unit Gr2 is superior as the image blur compensating lens unit. In the fourth embodiment, the second lens unit Gr2 is stationary during zooming. The arrangement where the second lens unit Gr2 serving as the image blur compensating lens unit is stationary during zooming is desirable because it is advantageous in disposing the image blur compensation driving system in the lens barrel.

The condition (2) defines the length of the focal length of the second lens unit Gr2. When the upper limit of the condition (2) is exceeded, the refractive power of the second lens unit Gr2 is too weak, so that the sensitivity for the movement of the second lens unit Gr2 vertical to the optical axis AX to move the image point is too weak. For this reason, the movement amount of the second lens unit Gr2 at the time of image blur compensation increases. When the condition (2) is fulfilled with an upper limit of 2.0, the movement amount of the second lens unit Gr2 at the time of image blur compensation is further reduced. When the lower limit of the condition (2) is exceeded, the refractive power of the second lens unit Gr2 is too strong, so that the amount of aberration caused in the normal condition and the amount of aberration caused in the compensated condition at the time of image blur both increase and it is difficult to restrain the aberration by use of another lens unit. When the condition (2) is fulfilled with a lower limit of 0.3, more excellent image quality is obtained.

The first to fourth embodiments further fulfill the following condition (3):

$$f1/fW<1.10 \quad (3)$$

where f1 is the focal length of the first lens unit Gr1.

The condition (3) defines the length of the focal length of the first lens unit Gr1. When the upper limit of the condition (3) is exceeded, the refractive power of the first lens unit Gr1 is weakened, so that the movement amount during zooming increases. Since the total length and the lens diameter increase for this reason, compactness is lost. When the condition (3) is fulfilled with an upper limit of 1.00, a more compact zoom optical system is obtained.

When a lens unit is moved vertically to the optical axis AX for image blur compensation, in the compensated condition (post-decentering condition), the light passes through a place where no light passes in the normal condition (pre-decentering condition). There is a possibility that the light becomes harmful light and degrades the image quality. Therefore, it is desirable to cut off the harmful light during image blur compensation by providing a stationary aperture diaphragm S on the object side of the second lens unit Gr2 serving as the image blur compensating lens unit, in the second lens unit Gr2 or on the image side of the second lens unit Gr2. By doing so, excellent image quality is obtained in the image blur compensated condition.

It is desirable to perform focusing to a near object by use of the second lens unit Gr2 serving as the image blur compensating lens unit. By doing so, the driving system for focusing and the driving system for image blur compensation may be realized by use of a common driving member. This is advantageous in view of the cost.

It is desirable that the movement amount of the image blur compensating lens unit (in this case, the second lens unit Gr2) at the time of image blur (this movement amount will hereinafter be referred to as "image blur compensation movement amount") at the wide-angle limit [W] and that at the telephoto limit [T] do not largely differ from each other. Therefore, the first to fourth embodiments further fulfill the following condition (4):

$$0.4<MT/MW<2.5 \quad (4)$$

where MT is the blur compensation movement amount of the second lens unit Gr2 at the telephoto limit [T] and MW is the blur compensation movement amount of the second lens unit Gr2 at the wide-angle limit [W].

When the upper limit or the lower limit of the condition (4) is exceeded, the image blur compensation movement amount at the wide-angle limit [W] and that at the telephoto limit [T] largely differ from each other, so that error is prone to be caused in calculating the image blur compensation amount at a given focal length.

When the image blur compensating lens unit is parallel decentered at the time of image blur, axial lateral chromatic aberration which is one of the decentering aberrations is caused. To restrain this, it is desirable that the second lens unit Gr2 serving as the image blur compensating lens unit be color-corrected. Therefore, the first to fourth embodiments fulfill the following condition (5):

$$vp > vn \qquad (5)$$

where vp is the Abbe number of a positive lens element included in the second lens unit Gr2 and vn is the Abbe number of a negative lens element included in the second lens unit Gr2.

The arrangements of the first to fourth embodiments (FIGS. 8, 12, 16 and 20) will be specifically described with reference to their construction data and aberration qualities. Tables 1 to 4 show construction data of the first to fourth embodiments. In the tables, ri (i=1, 2, 3, . . . ) is the radius of curvature of an ith surface counted from the object side, di (i=1, 2, 3, . . . ) is an ith axial distance counted from the object side (in these tables, axial distances before decentering are shown), Ni (i=1, 2, 3, . . . ) and vi (i=1, 2, 3, . . . ) are the refractive index (Nd) and the Abbe number (vd) to the d-line of an ith lens counted from the object side. The axial distances varied during zooming are actual axial distances between the lens units at the wide-angle limit [W], at the middle focal length condition [M] and at the telephoto limit [T]. Tables 1 to 4 also show the focal length f and the F-number FNO of the entire lens system corresponding to the conditions [W], [M] and [T]. Note that the definitions and the like given above in connection with Tables 1 to 4 apply also to Tables 7 to 10, 12 to 17, 20 to 23, and 25 to 27, which will be described later. Table 5 shows values of the conditions (1) to (4) in the first to fourth embodiments.

FIGS. 9A to 9I, 13A to 13I, 17A to 17I and 21A to 21I show longitudinal aberration curves of the first to fourth embodiments. FIGS. 9A to 9C, 13A to 13C, 17A to 17C and 21A to 21C show aberration curves at the wide-angle limit [W] in the normal condition (pre-decentering condition). FIGS. 9D to 9F, 13D to 13F, 17D to 17F and 21D to 21F show aberration curves at the middle focal length condition [M] in the normal condition. FIGS. 9G to 9I, 13G to 13I, 17G to 17I and 21G to 21I show aberration curves at the telephoto limit [T] in the normal condition.

FIGS. 9A, 9D, 9G, 13A, 13D, 13G, 17A, 17D, 17G, 21A, 21D and 21G show spherical aberration and sine condition. The solid line d represents aberration to the d-line. The broken line SC represents sine condition. FIGS. 9B, 9E, 9H, 13B, 13E, 13H, 17B, 17E, 17H, 21B, 21E and 21H show astigmatism. The broken line DM and the solid line DS represent astigmatisms on the meridional image plane and on the sagittal image plane, respectively. FIGS. 9C, 9F, 9I, 13C, 13F, 13I, 17C, 17F, 17I, 21C, 21G and 21I show distortion.

FIGS. 10A to 10E, 14A to 14E, 18A to 18E and 22A to 22E show lateral aberration curves of the first to fourth embodiments at the wide-angle limit [W]. FIGS. 11A to 11E, 15A to 15E, 19A to 19E and 23A to 23E show lateral aberration curves of the first to fourth embodiments at the telephoto limit [T].

FIGS. 10A, 10B, 11A, 11B, 14A, 14B, 15A, 15B, 18A, 18B, 19A, 19B, 22A, 22B, 23A and 23B show lateral aberration (image height Y'=12, 0) with respect to the luminous flux on the meridional image plane before the decentering of the second lens unit Gr2 in the first to fourth embodiments. FIGS. 10C to 10E, 11C to 11E, 14C to 14E, 15C to 15E, 18E to 18E, 19C to 19E, 22C to 22E and 23C to 23E show lateral aberration (image height Y'=-12, 12, 0) with respect to the luminous flux on the meridional image plane after the decentering of the second lens unit Gr2 in the first to fourth embodiments. The aberration curves after the decentering show aberrations in the compensated condition when an image blur compensation angle θ of the second lens unit Gr2 is 0.7° (=0.0122173 rad.).

As described above, in the first to fourth embodiments, since the second lens unit Gr2 being small in diameter and light in weight is used for image blur compensation, the burden on the image blur compensating lens unit is lightened. In addition, the zoom movements and power arrangements of the lens units and the fulfillment of the above-described conditions reduce the total length to achieve compactness and are effective in obtaining excellent image quality by excellently correcting aberrations in both the normal and compensated conditions. The fourth embodiment where the second lens unit Gr2 serving as the image blur compensating lens unit is stationary during zooming is advantageous in arranging the image blur compensation driving system in the lens barrel.

<Fifth to Ninth Embodiments>

Figure 28:
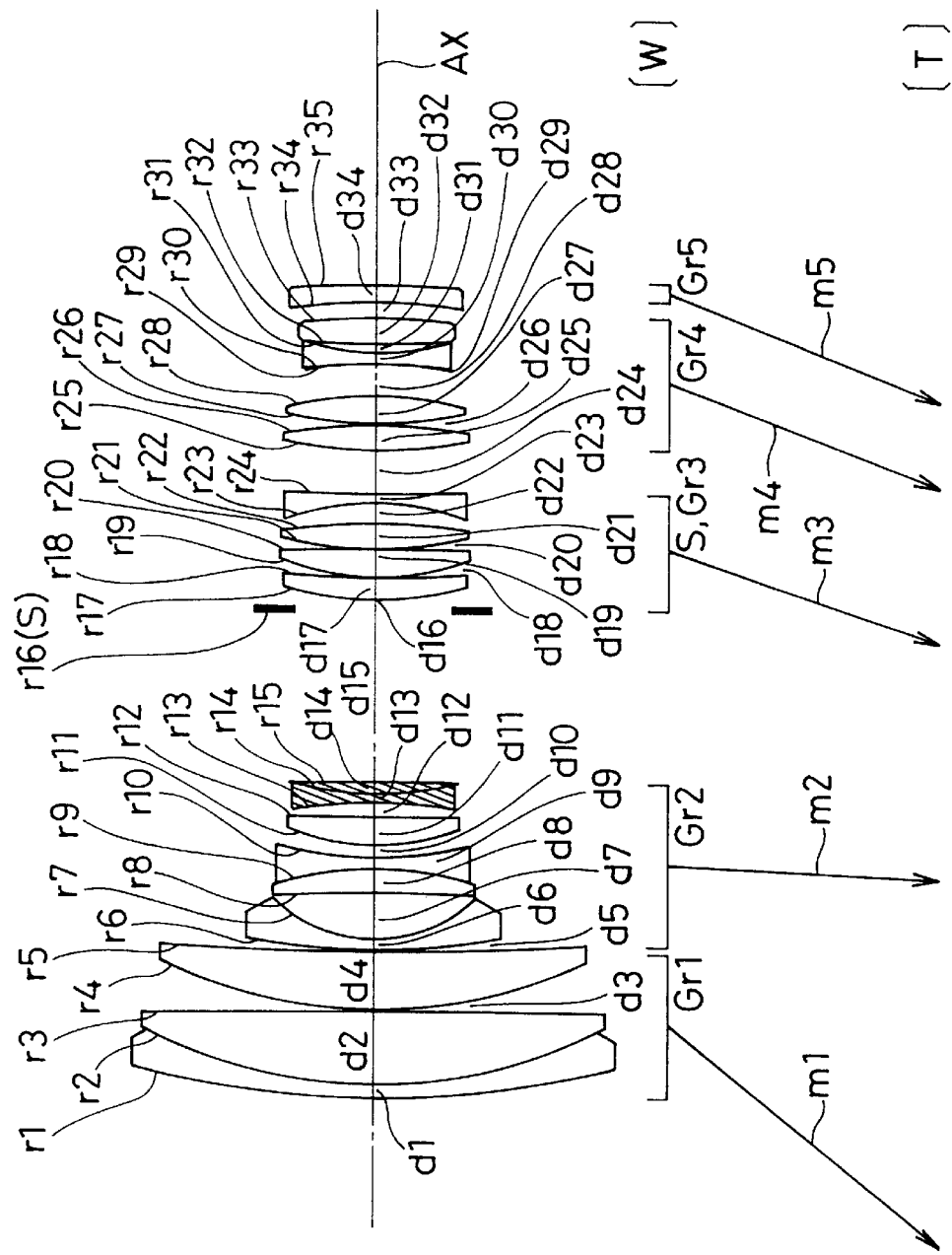
FIG. 28 shows the lens arrangement of a sixth embodiment.
Figure 29A:
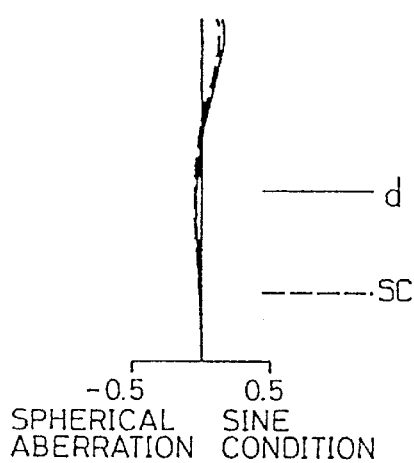
FIGS. 29A to 29I show longitudinal aberration curves of the sixth embodiment before decentering.
Figure 29B:
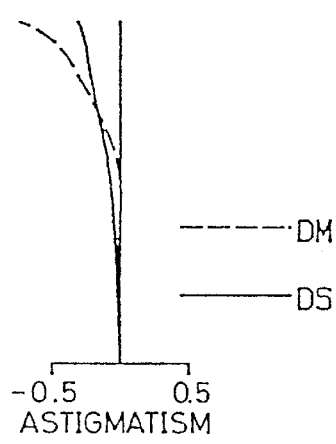
Figure 29C:
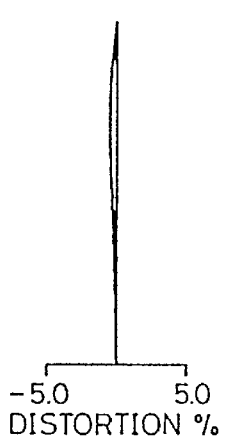
Figure 29D:
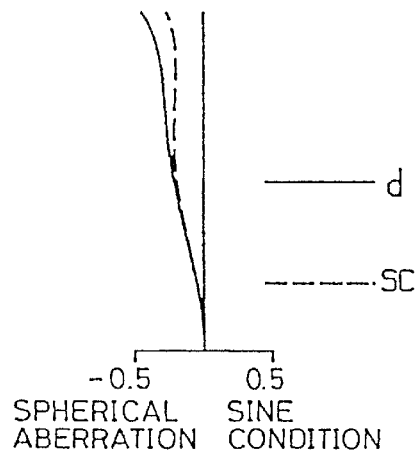
Figure 29E:
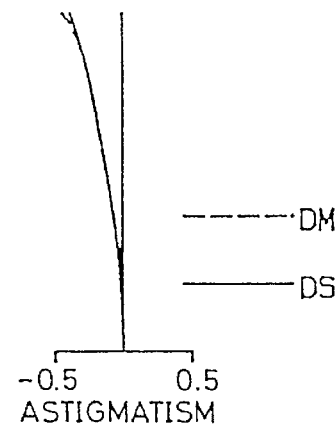
Figure 29F:
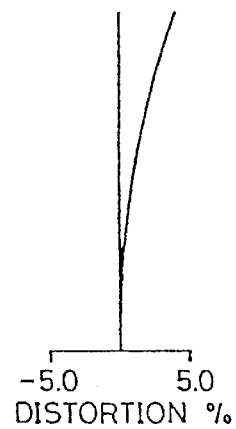
Figure 29G:
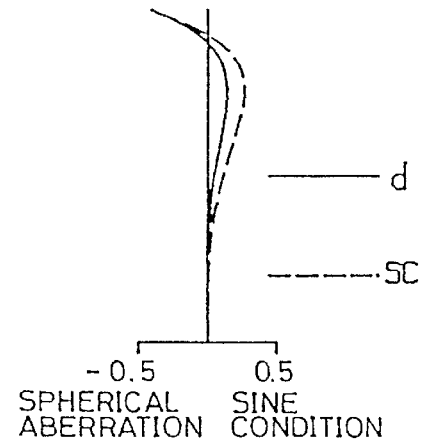
Figure 29H:
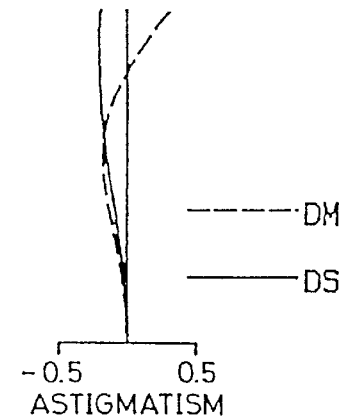
Figure 29I:
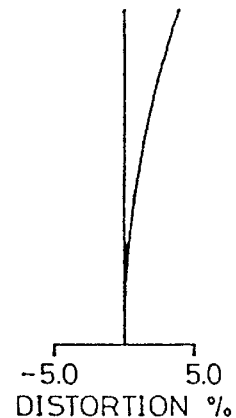
Figure 30A:
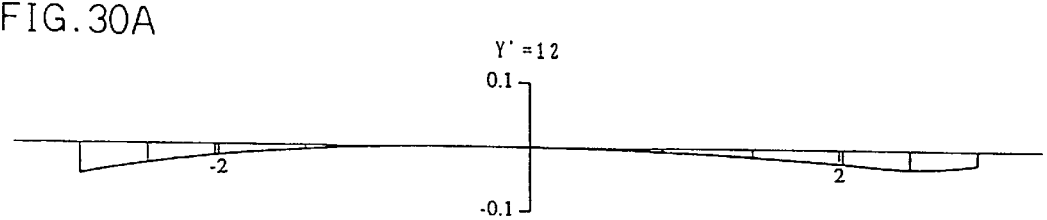
FIGS. 30A to 30E show meridional lateral aberration curves of the sixth embodiment at the wide angle limit before and after decentering.
Figure 30B:
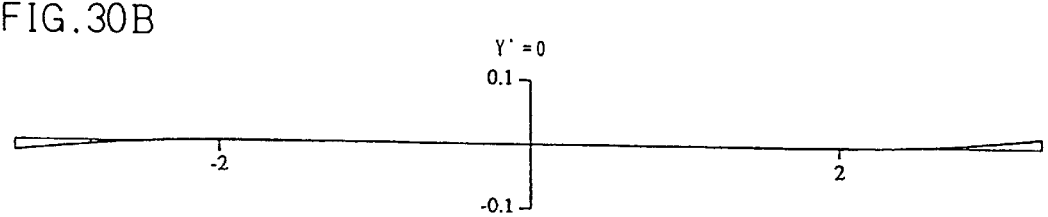
Figure 30C:
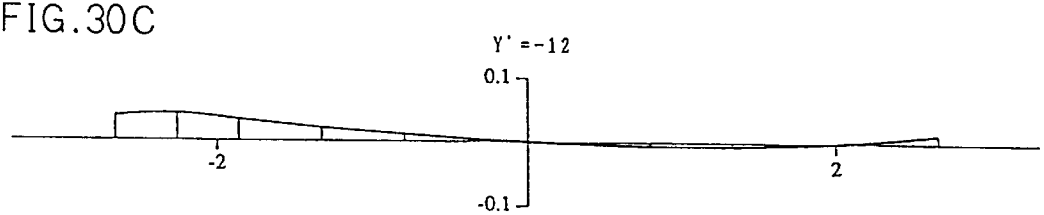
Figure 30D:
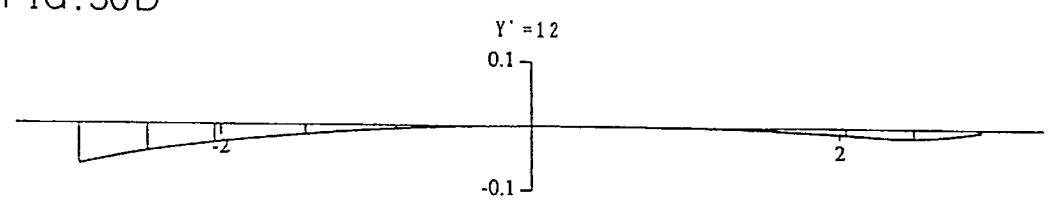
Figure 30E:
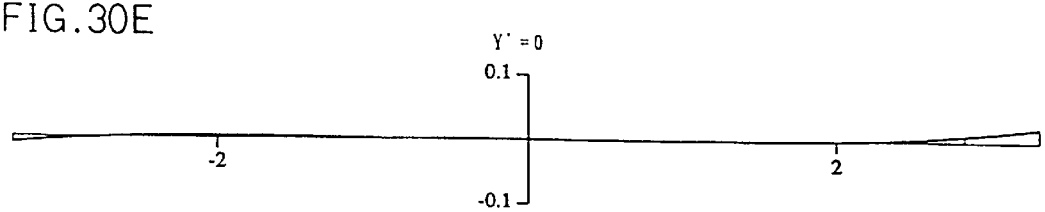
Figure 31A:
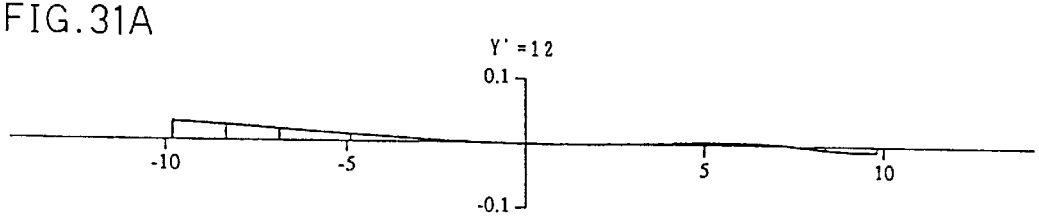
FIGS. 31A to 31E show meridional lateral aberration curves of the sixth embodiment at the telephoto limit before and after decentering.
Figure 31B:
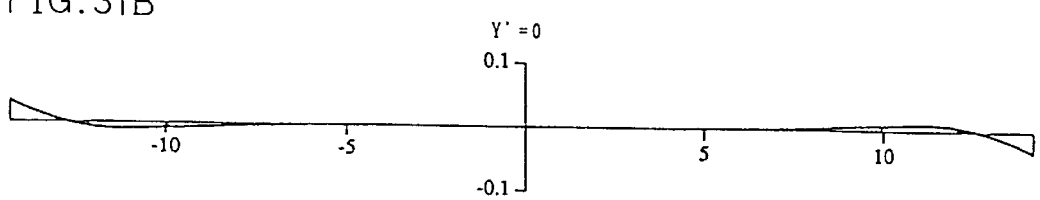
Figure 31C:
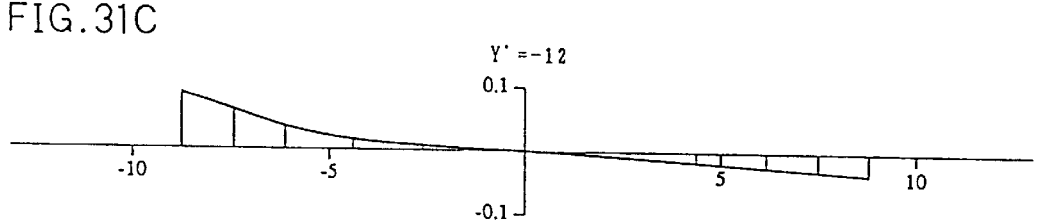
Figure 31D:
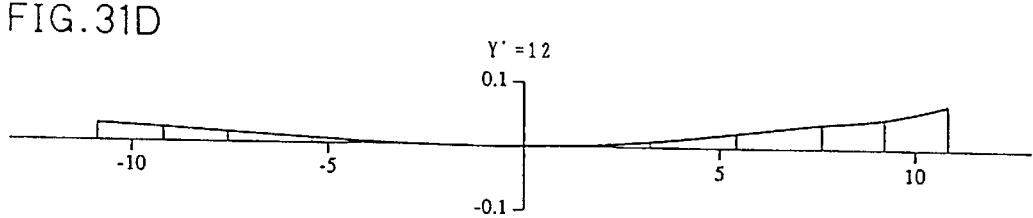
Figure 31E:
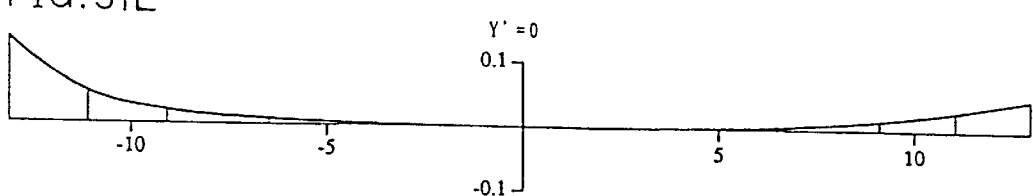

Zoom lens systems having an image blur compensating function according to the fifth to ninth embodiments will be described with reference to the drawings. FIGS. 24, 28, 32, 36 and 40 show the lens arrangements of the fifth to ninth embodiments in the normal condition (pre-decentering condition) at the wide-angle limit [W]. In the figures, the surface marked with ri (i=1, 2, 3, . . . ) is an ith surface counted from the object side, and the axial distance marked with di (i=1, 2, 3, . . . ) is an ith axial distance counted from the object side. Arrows m1, m2, m3 and m4 of FIGS. 24, 28, 32, 36 and 40 schematically show zoom movements of a first lens unit Gr1, a second lens unit Gr2, an aperture diaphragm S and a third lens unit Gr3, and a fourth lens unit Gr4 from the wide-angle limit [W] to the telephoto limit [T]. Arrow m5 of FIG. 28 schematically shows the zoom movement of a fifth lens unit Gr5 from the wide-angle limit [W] to the telephoto limit [T].

Zoom lens systems of the fifth and seventh to ninth embodiments consist of, from the object side, a first lens unit Gr1 having a positive refractive power, a second lens unit Gr2 having a negative refractive power, a third lens unit Gr3 having a positive refractive power and a fourth lens unit Gr4 having a positive refractive power, wherein zooming is performed by varying the distances between the lens units.

Figure 24:
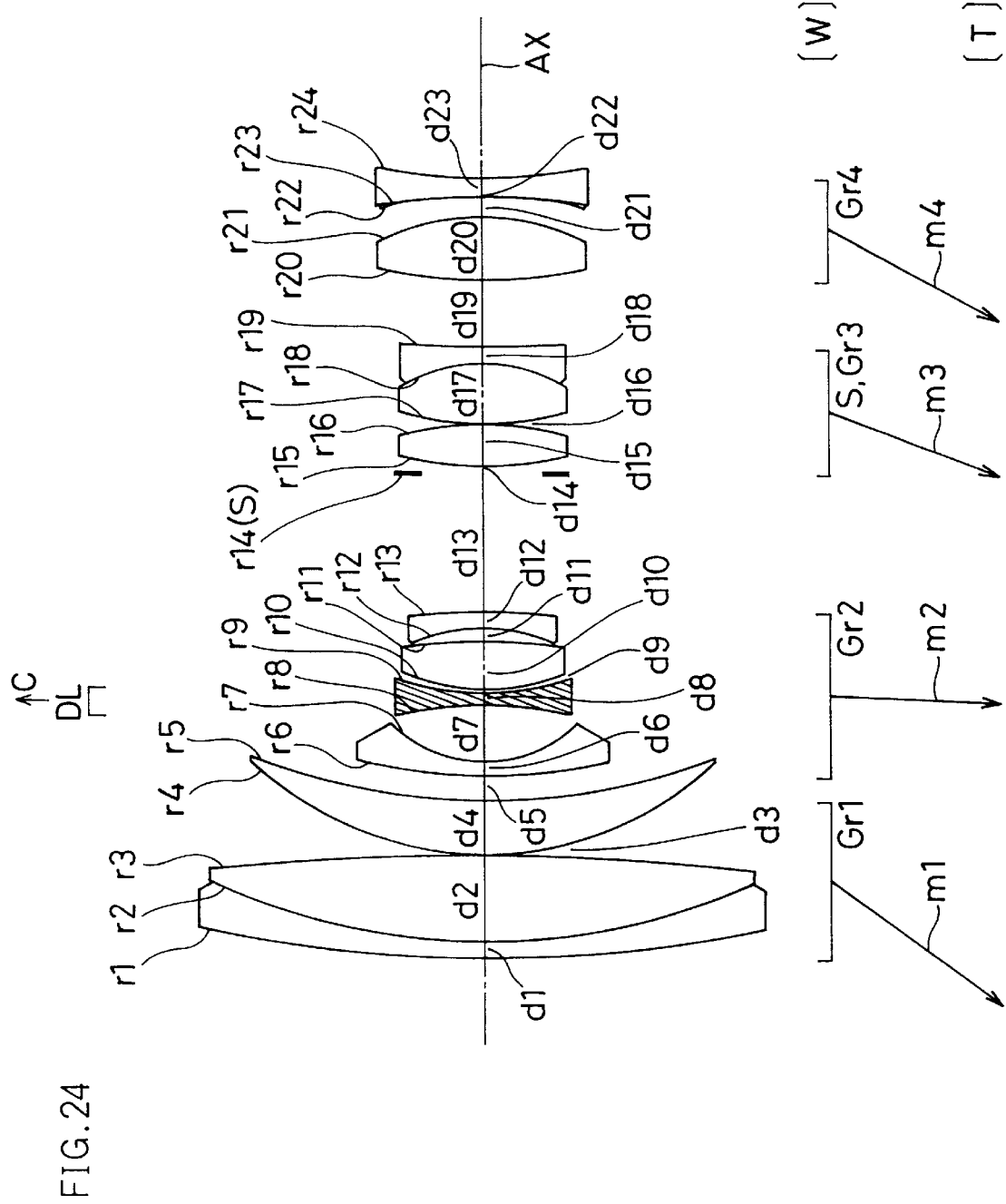
FIG. 24 shows the lens arrangement of a fifth embodiment.
Figure 26A:
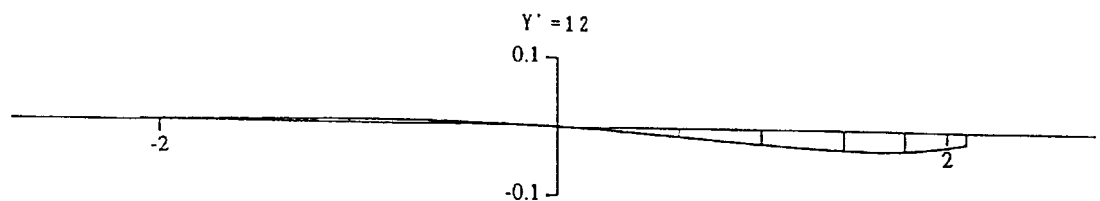
FIGS. 26A to 26E show meridional lateral aberration curves of the fifth embodiment at the wide angle limit before and after decentering.
Figure 26B:
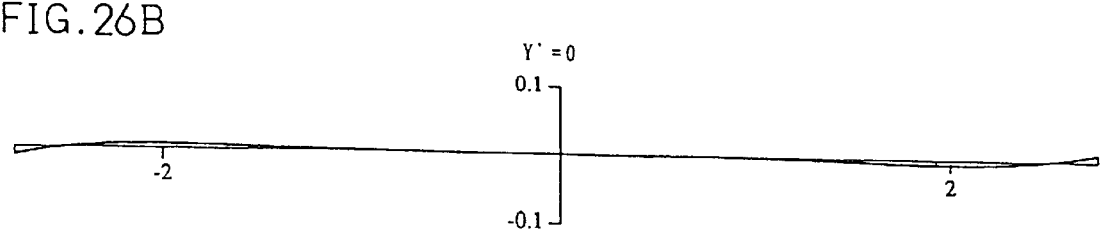
Figure 26C:
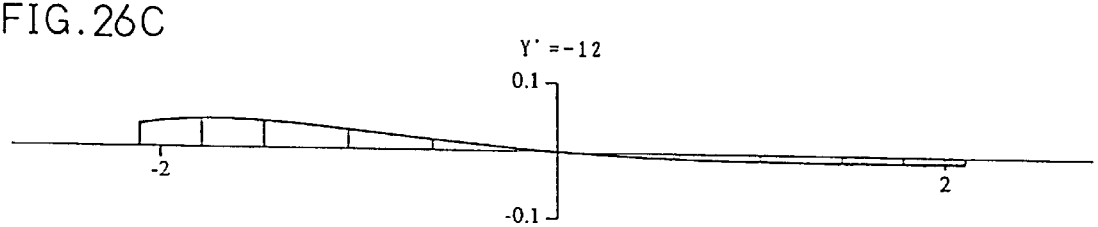
Figure 26D:
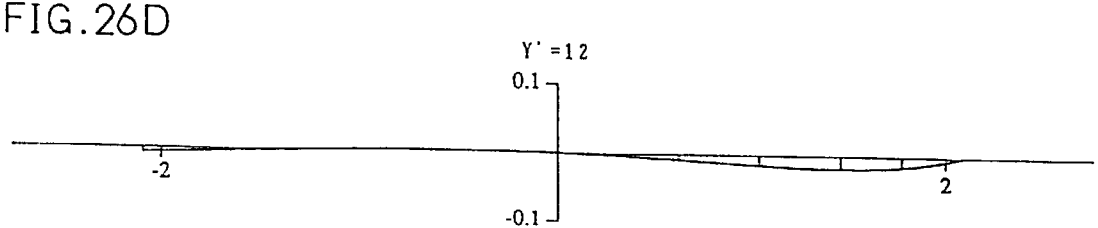
Figure 26E:
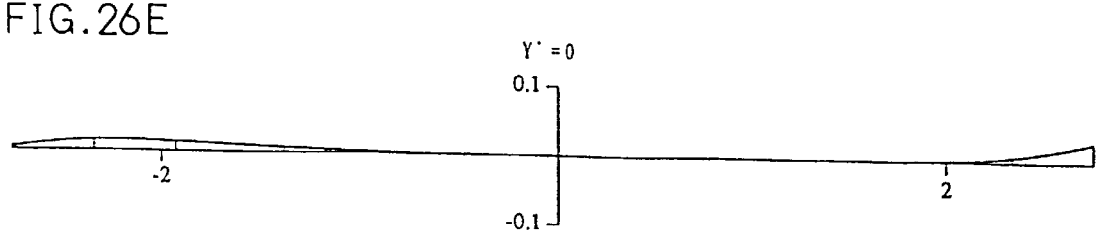
Figure 27A:
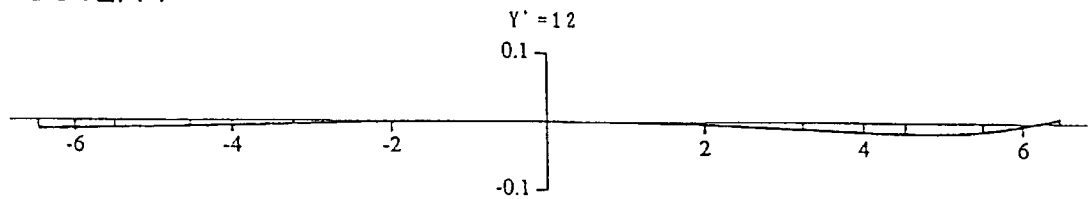
FIGS. 27A to 27E show meridional lateral aberration curves of the fifth embodiment at the telephoto limit before and after decentering.
Figure 27B:
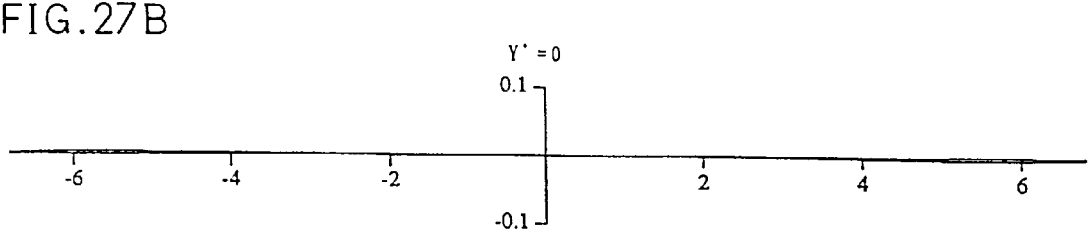
Figure 27C:
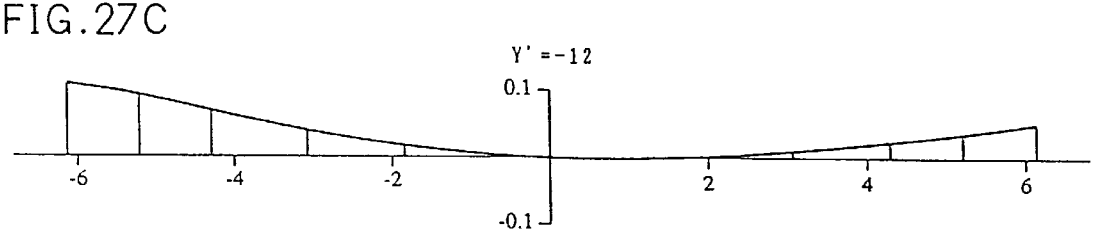
Figure 27D:
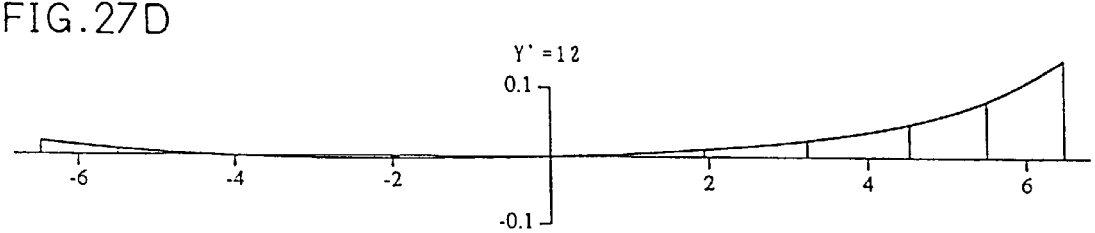
Figure 27E:
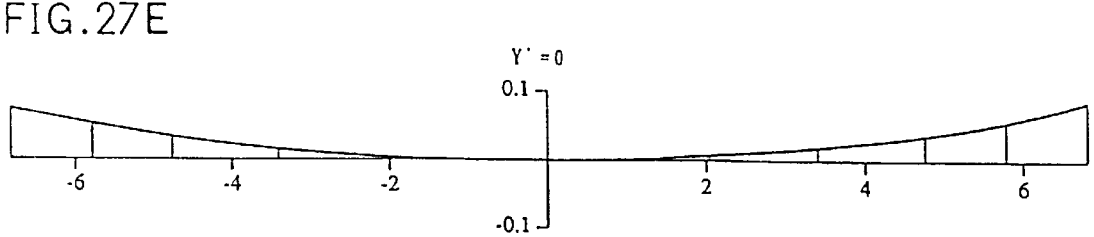
Figure 32:
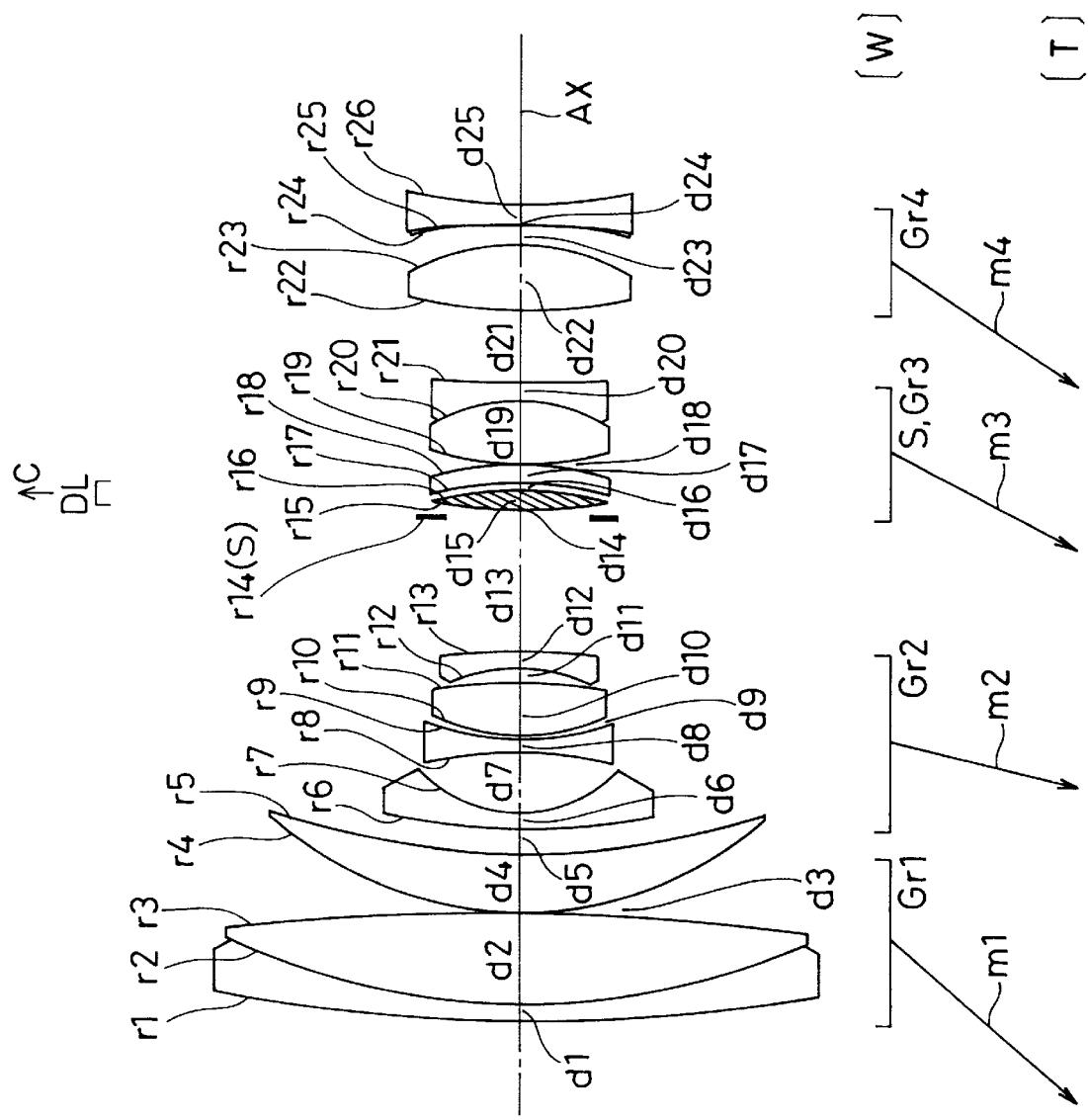
FIG. 32 shows the lens arrangement of a seventh embodiment.
Figure 33A:
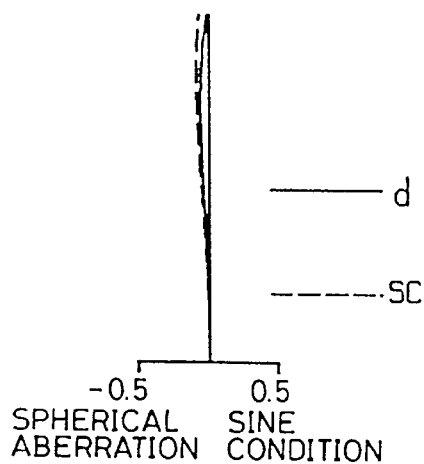
FIGS. 33A to 33I show longitudinal aberration curves of the seventh embodiment before decentering.
Figure 33B:
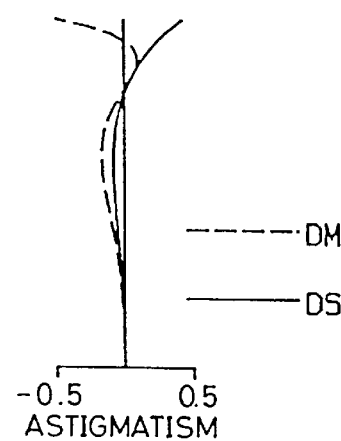
Figure 33C:
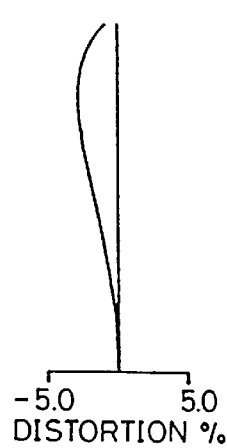
Figure 33D:
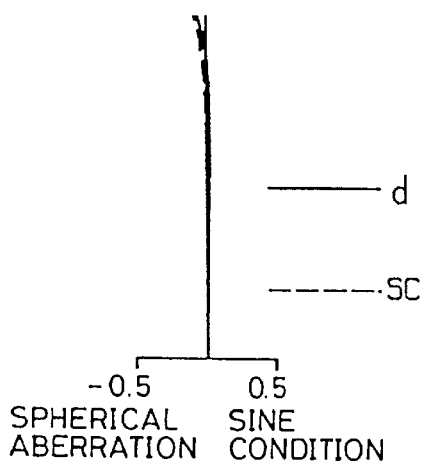
Figure 33E:
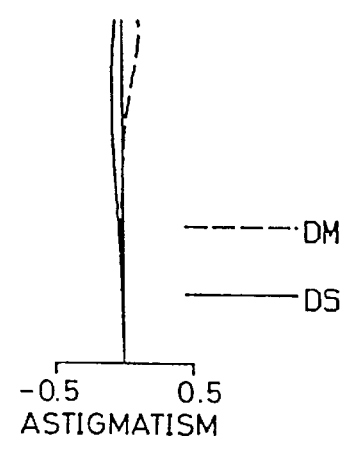
Figure 33F:
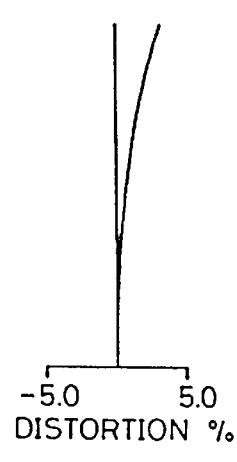
Figure 33G:
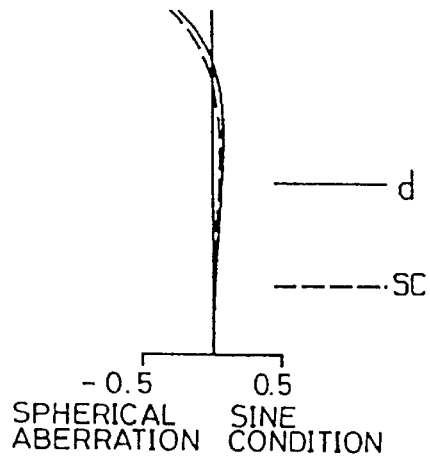
Figure 33H:
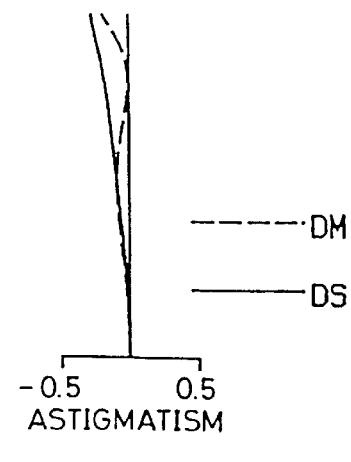
Figure 33I:
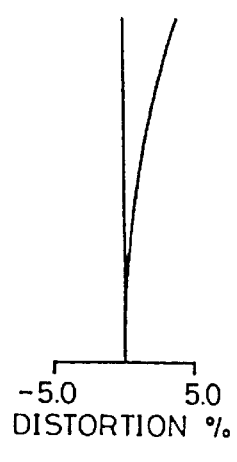
Figure 34A:
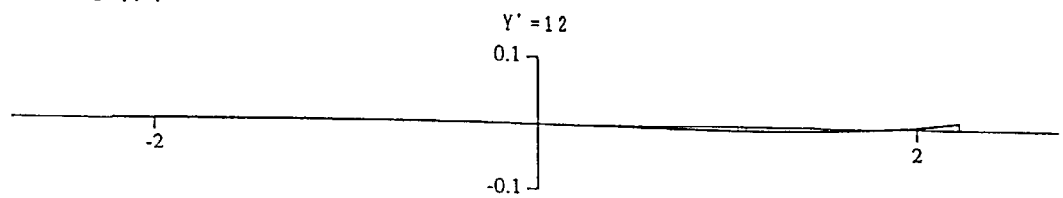
FIGS. 34A to 34E show meridional lateral aberration curves of the seventh embodiment at the wide angle limit before and after decentering.
Figure 34B:
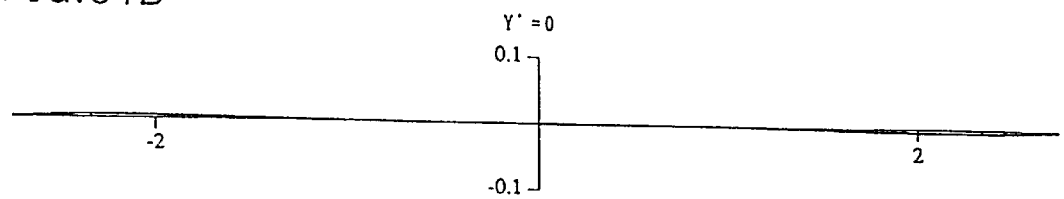
Figure 34C:
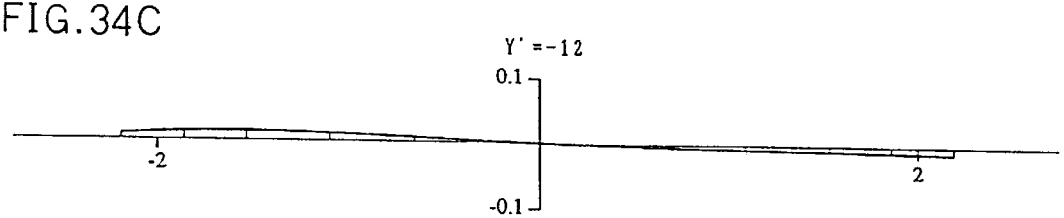
Figure 34D:
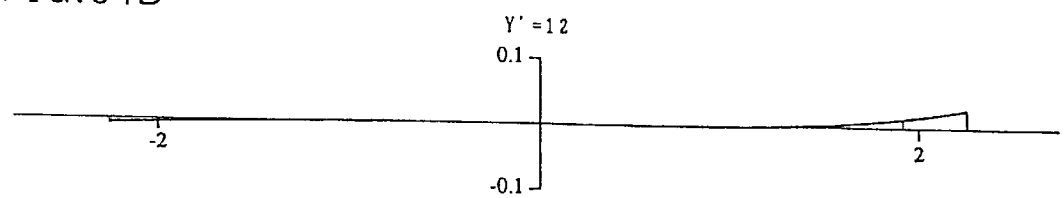
Figure 34E:
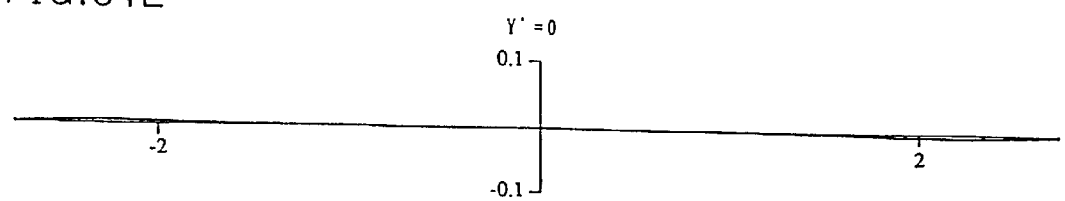
Figure 35A:
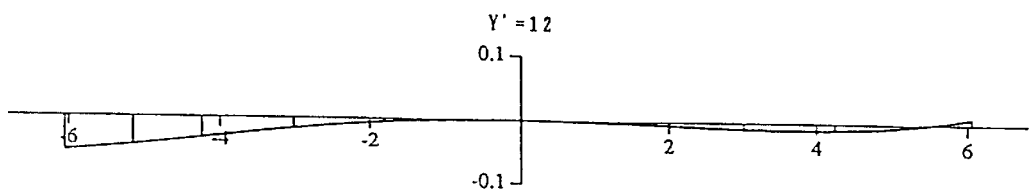
FIGS. 35A to 35E show meridional lateral aberration curves of the seventh embodiment at the telephoto limit before and after decentering.
Figure 35B:
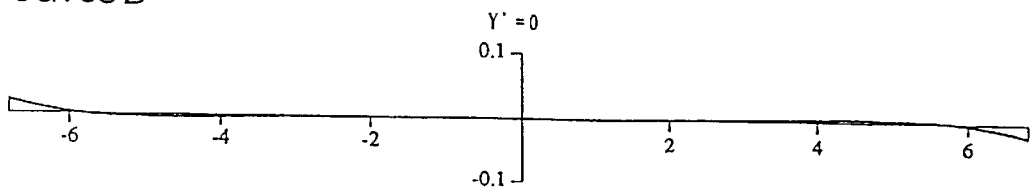
Figure 35C:
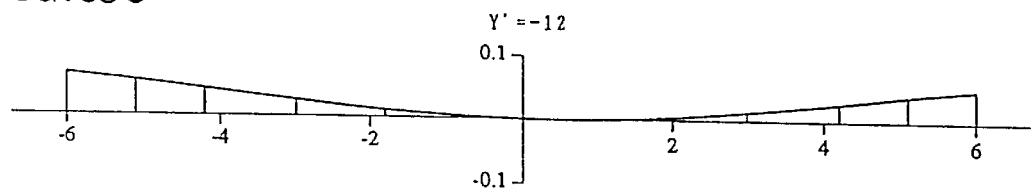
Figure 35D:
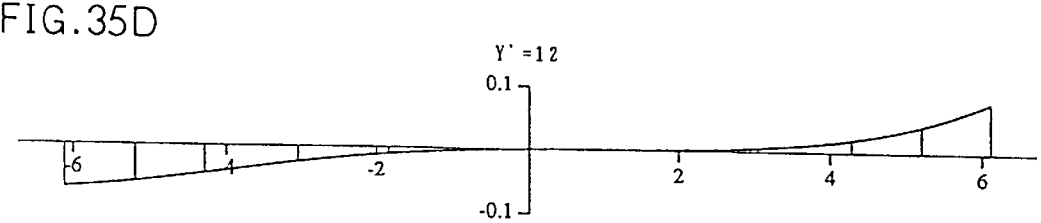
Figure 35E:
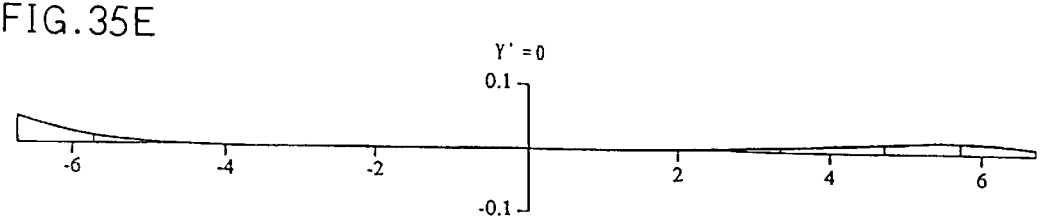
Figure 36:
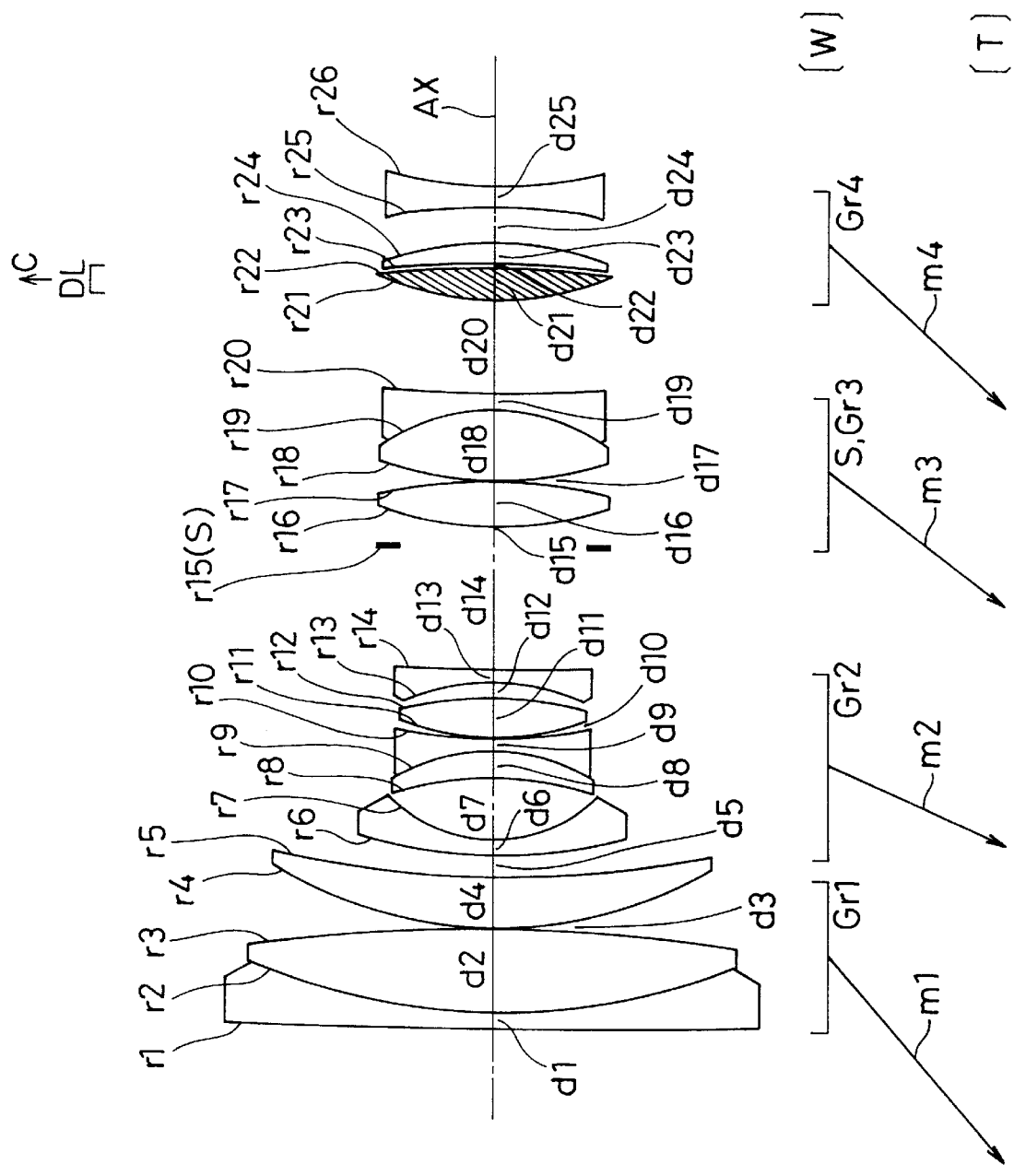
FIG. 36 shows the lens arrangement of an eighth embodiment.
Figure 37A:
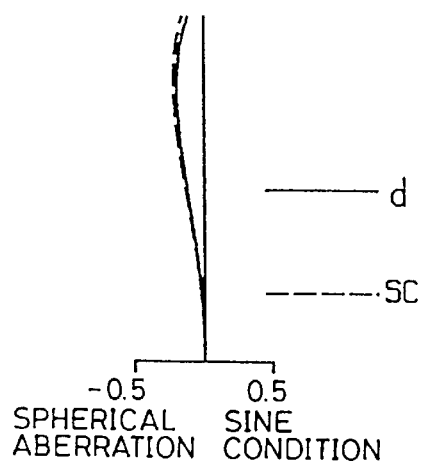
FIGS. 37A to 37I show longitudinal aberration curves of the eighth embodiment before decentering.
Figure 37B:
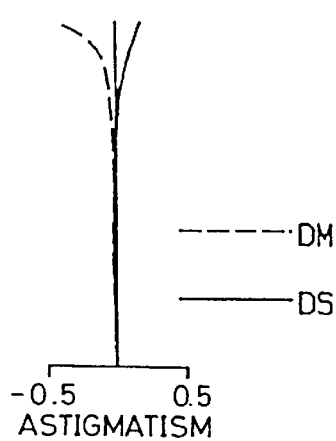
Figure 37C:
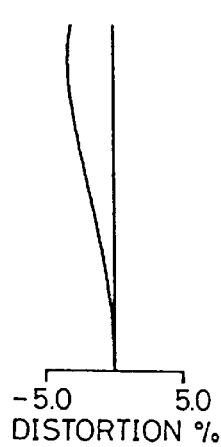
Figure 37D:
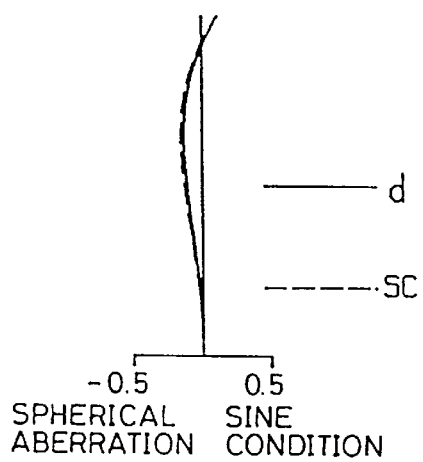
Figure 37E:
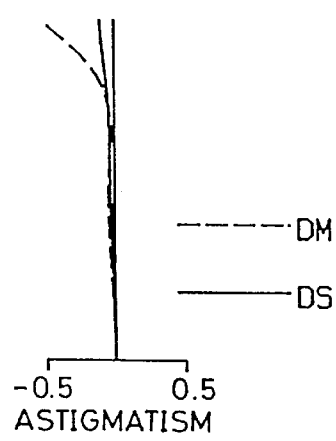
Figure 37F:
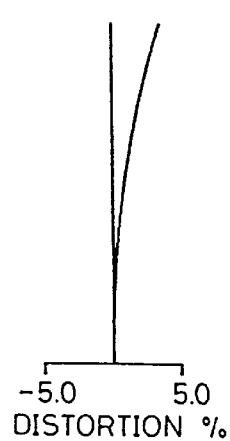
Figure 37G:
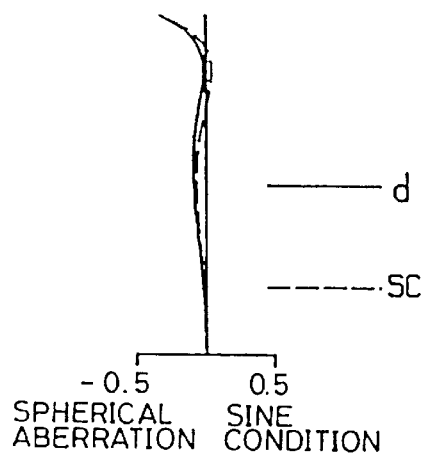
Figure 37H:
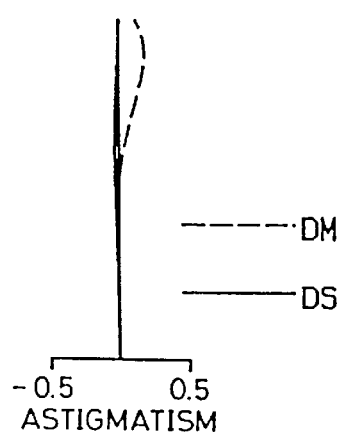
Figure 37I:
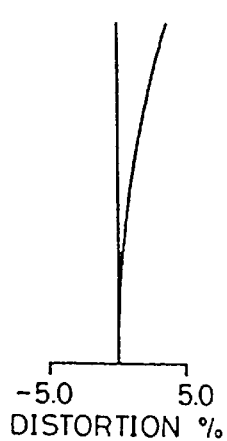
Figure 38A:
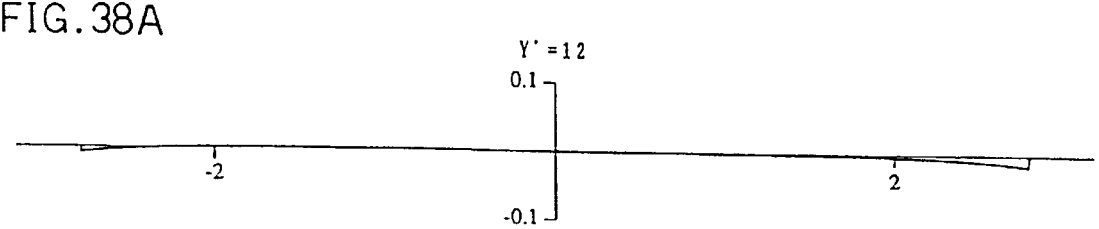
FIGS. 38A to 38E show meridional lateral aberration curves of the eighth embodiment at the wide angle limit before and after decentering.
Figure 38B:
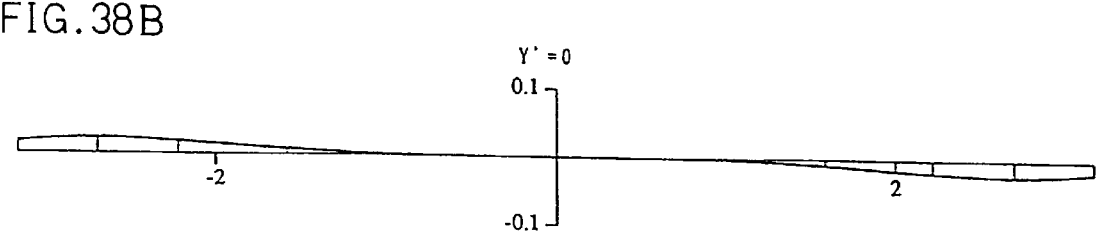
Figure 38C:
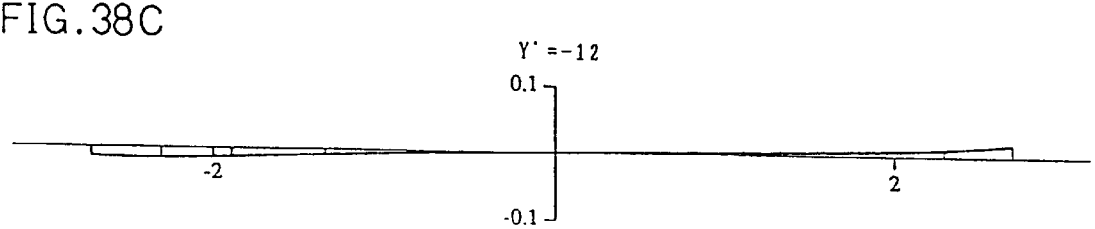
Figure 38D:
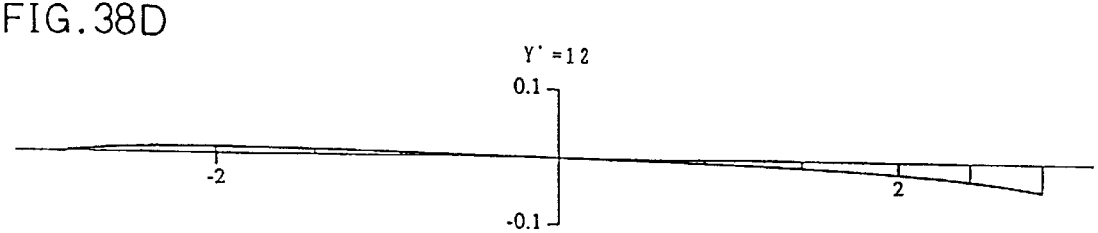
Figure 38E:
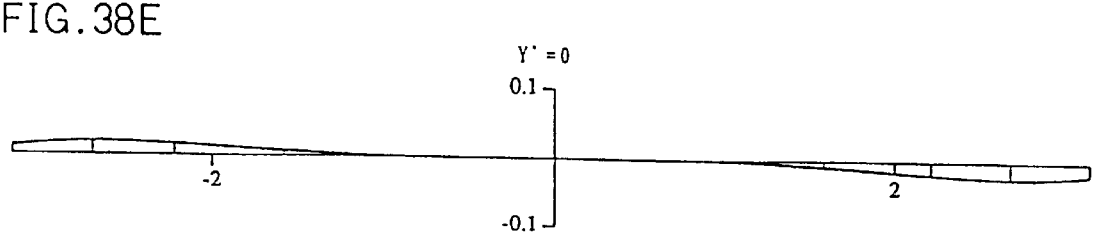
Figure 39A:
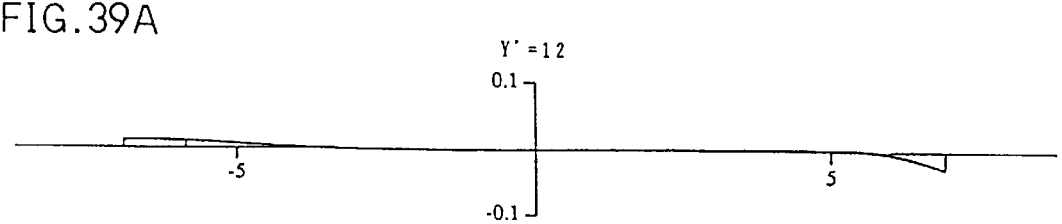
FIGS. 39A to 39E show meridional lateral aberration curves of the eighth embodiment at the telephoto limit before and after decentering.
Figure 39B:
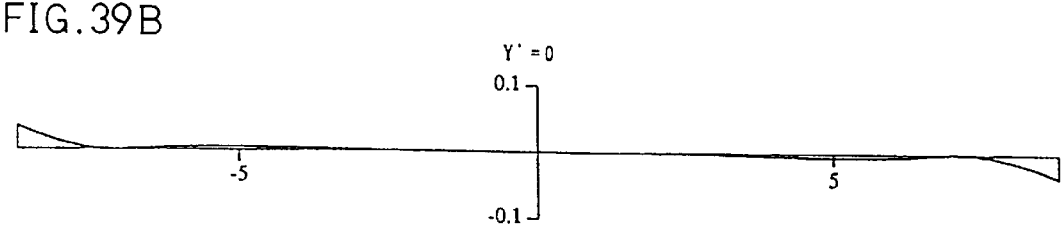
Figure 39C:
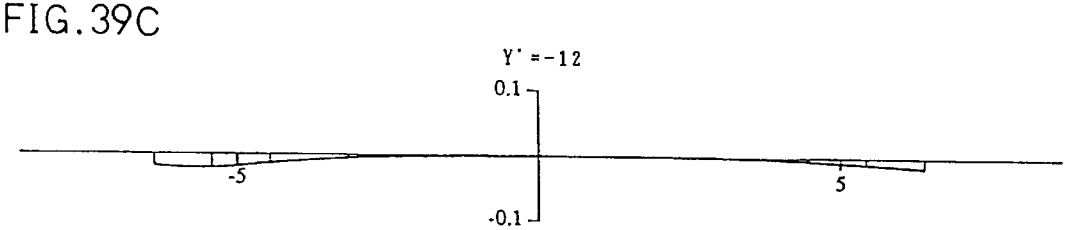
Figure 39D:
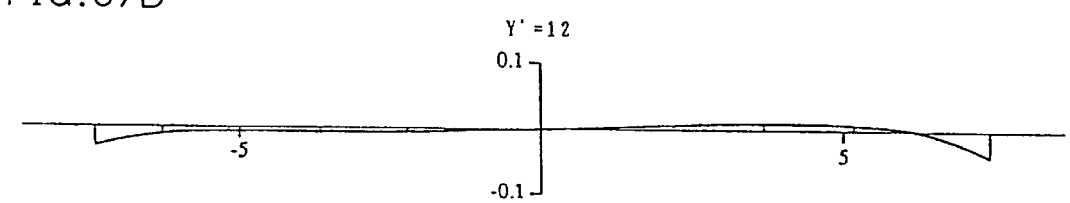
Figure 39E:
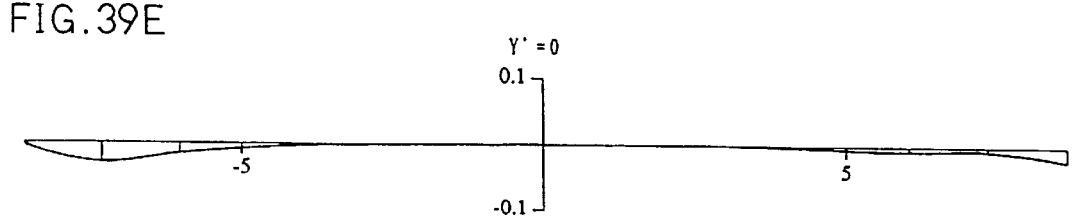
Figure 40:
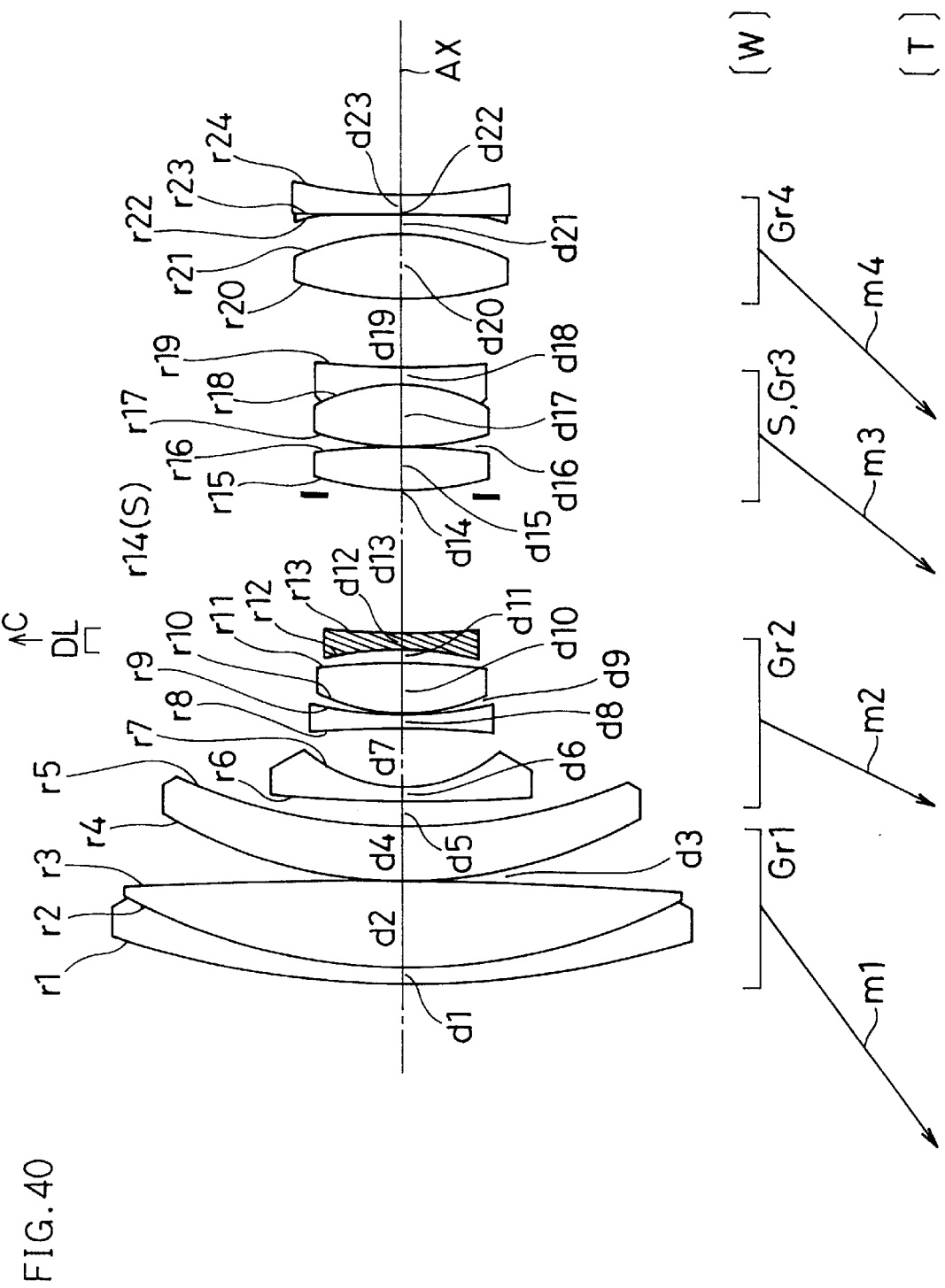
FIG. 40 shows the lens arrangement of a ninth embodiment.
Figure 42A:
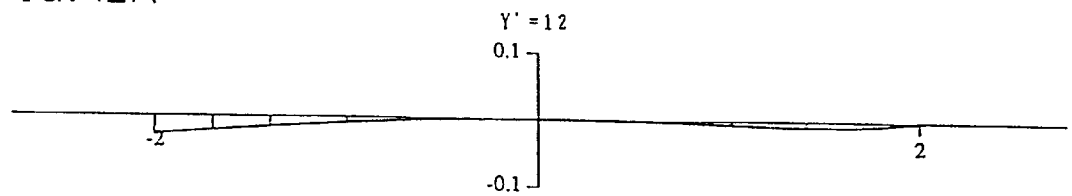
FIGS. 42A to 42E show meridional lateral aberration curves of the ninth embodiment at the wide angle limit before and after decentering.
Figure 42B:
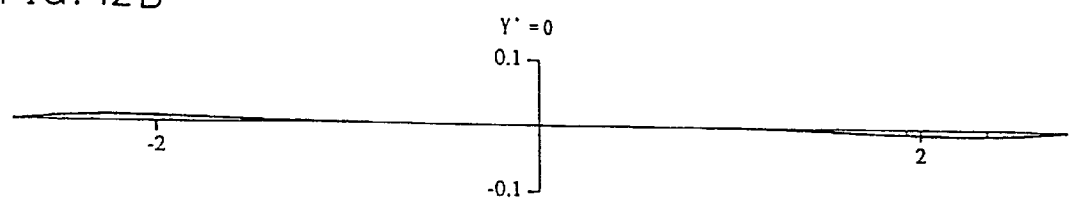
Figure 42C:
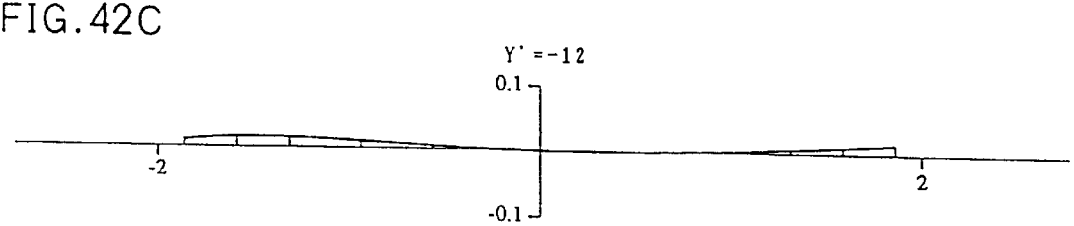
Figure 42D:
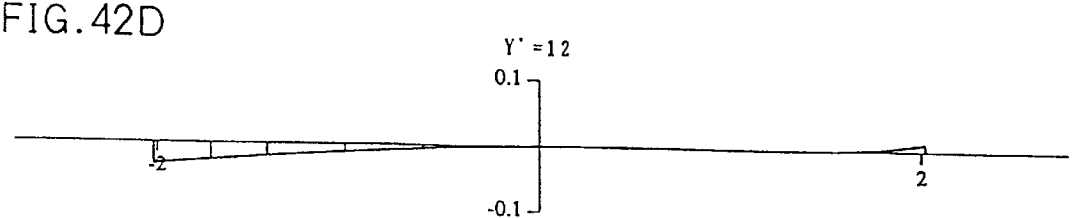
Figure 42E:
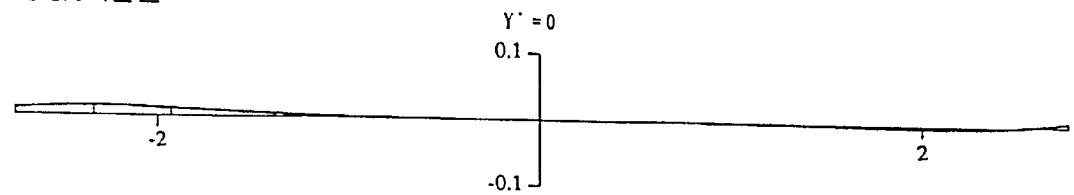
Figure 43A:
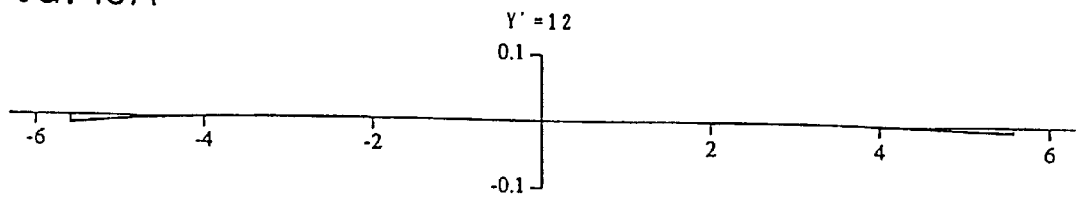
FIGS. 43A to 43E show meridional lateral aberration curves of the ninth embodiment at the telephoto limit before and after decentering.
Figure 43B:
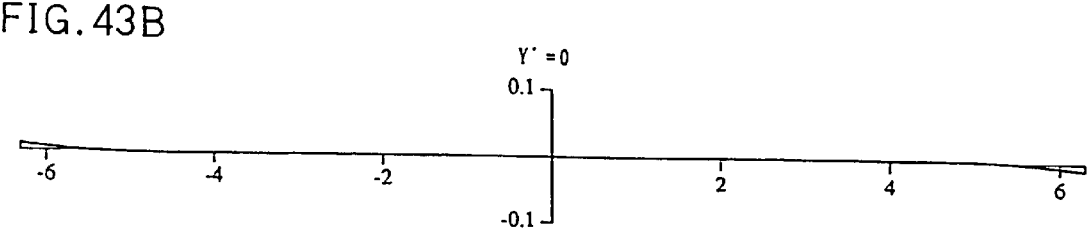
Figure 43C:
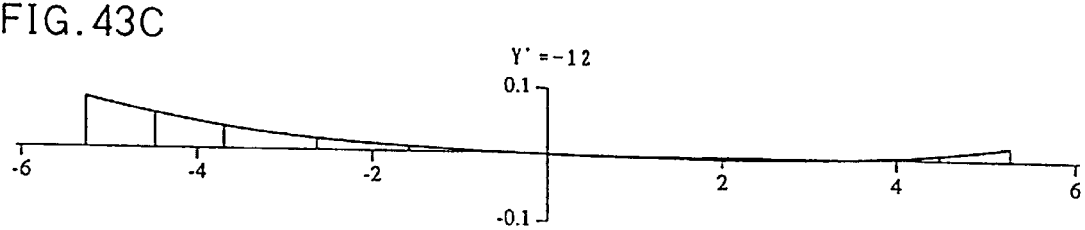
Figure 43D:
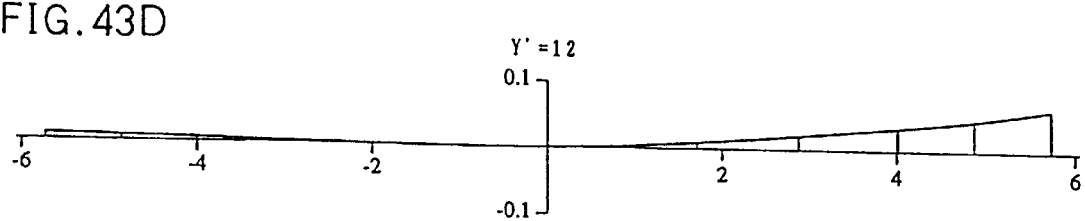
Figure 43E:
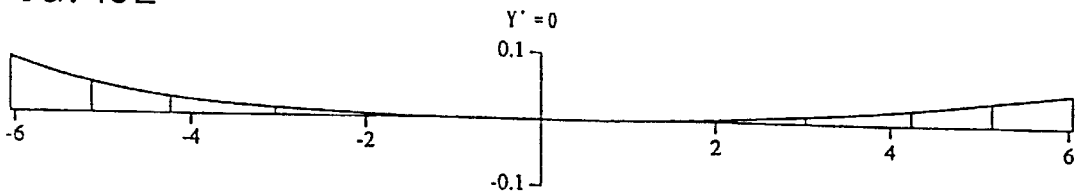

In the fifth embodiment, image blur compensation is made by parallel decentering (i.e. by moving vertically to the optical axis AX) a single lens which is a second lens element of the second lens unit Gr2 as an image blur compensating lens element DL. In FIG. 24, arrow C represents the movement of the second lens element of the second lens unit Gr2 during image blur correction. In the seventh embodiment, image blur compensation is made by parallel decentering a single lens which is a first lens element of the third lens unit Gr3 as the image blur compensating lens element DL. In FIG. 32, arrow C represents the movement of the first lens element of the third lens unit Gr3 during image blur correction. In the eighth embodiment, image blur compensation is made by parallel decentering a single lens which is a first lens element of the fourth lens unit Gr4 as the image blur compensating lens element DL. In FIG. 36, arrow C represents the movement of the first lens element of the fourth lens unit Gr4 during image blur correction. In the ninth embodiment, image blur compensation is made by parallel decentering a single lens which is a fourth lens element of the second lens unit Gr2 as the image blur compensating lens element DL. In FIG. 40, arrow C represents the movement of the fourth lens element of the second lens unit Gr2 during image blur correction.

In the seventh and eighth embodiments, the image side surface of the image blur compensating lens element DL is an aspherical surface (i.e. r16 in the seventh embodiment, and r22 in the eighth embodiment), and the lens disposed directly on the image side of the image blur compensating lens element DL has an aspherical surface (i.e. r17 in the seventh embodiment, and r23 in the eighth embodiment) which cancels the aspherical surface of the image blur compensating lens element DL. That is, the facing surfaces are aspherical surfaces which cancel each other. By this arrangement, aberrations caused at the time of image blur are excellently corrected without any change in the image quality to be obtained in normal photographing.

A zoom lens system of the sixth embodiment consists of, from the object side, a first lens unit Gr1 having a positive refractive power, a second lens unit Gr2 having a negative refractive power, a third lens unit Gr3 having a positive refractive power, a fourth lens unit Gr4 having a positive refractive power and a fifth lens unit Gr5 having a negative refractive power, wherein zooming is performed by varying the distances between the lens units. Image blur compensation is made by parallel decentering a doublet lens which is a fourth lens element of the second lens unit Gr2 as the image blur compensating lens element DL. In FIG. 28, arrow C represents the movement of the fourth lens element of the second lens unit Gr2 during image blur correction.

The fifth to ninth embodiments include from the object side the first lens unit Gr1 having a positive refractive power, the second lens unit Gr2 having a negative refractive power, the third lens unit Gr3 having a positive refractive power and the fourth lens unit Gr4 having a positive refractive power so that they are suitable for use as the standard zoom lens systems and the standard high-magnification zoom lens systems for single lens reflex cameras. In this type of zoom lens systems including positive, negative, positive, positive lens units, the degree of freedom of the movements of the zoom lens units is effectively used for aberration correction. As a result, excellent image quality is obtained in the entire zoom range even though the zoom lens systems are high-magnification zoom lens systems including the wide-angle range.

Since the first lens unit Gr1 and the fourth lens unit Gr4 are moved toward the object side during zooming from the wide-angle limit [W] to the telephoto limit [T], the zoom lens systems is in a retro-type arrangement at the wide-angle limit [W] and in a telephoto-type arrangement at the telephoto limit [T]. For this reason, a sufficient back focal length is secured and an optical system being short in total length is achieved. Further, by arranging so that the second lens unit Gr2 and the third lens unit Gr3 are moved toward the object side during zooming from the wide-angle limit [W] to the telephoto limit [T], the degree of freedom of the movements of the zoom lens units increases, so that an optical system is obtained which is advantageous in correcting aberration and has a further reduced total length.

The fifth to ninth embodiments fulfill the following condition (6):

$$0.65 < fR/fW < 1.8 \tag{6}$$

where fR is the composite focal length of the third lens unit Gr3 and the entire lens units provided at an image side of the third lens unit Gr3 at the wide-angle limit [W], and fW is the focal length of the entire lens system at the wide-angle limit [W].

The condition (6) relates to the composite focal length of the third lens unit Gr3 and succeeding lens units at the wide-angle limit [W]. By fulfilling the condition (6), a high-magnification zoom lens system including the wide-angle range is reduced in size and its image quality is improved. When the upper limit of the condition (6) is exceeded, although this is advantageous in correcting aberrations, the structural length of the third lens unit Gr3 and succeeding lens units increases, so that compactness is lost. When the condition (6) is fulfilled with an upper limit of 1.3, a more compact optical system is obtained. When the lower limit of the condition (6) is exceeded, the composite focal length of the third lens unit Gr3 and succeeding lens units at the wide-angle limit [W] is too short, so that an excessive amount of aberration is caused and it is difficult to correct the aberration by use of other zoom lens units. When the condition (6) is fulfilled with a lower limit of 0.8, more excellent image quality is obtained.

The fifth to ninth embodiment further fulfill the following condition (7):

$$2.1 < f1/fW < 4.3 \tag{7}$$

where f1 is the focal length of the first lens unit Gr1, and fW is the focal length of the entire lens system at the wide-angle limit [W].

The condition (7) relates to the focal length of the first lens unit Gr1. By fulfilling the condition (7), excellent image quality is obtained without any degradation in compactness. When the upper limit of the condition (7) is exceeded, the focal length of the first lens unit Gr1 increases. Although this is advantageous in correcting aberrations, the diameter and the zoom movement amount of the first lens unit Gr1 increases, so that it is difficult to obtain a compact optical system. When the condition (7) is fulfilled with an upper limit of 3.8, a more compact optical system is obtained. When the lower limit of the condition (7) is exceeded, the amount of aberration caused in the first lens unit Gr1 is great and it is difficult to correct the aberration by use of another lens unit. When the condition (7) is fulfilled with a lower limit of 2.5, more excellent image quality is obtained.

As mentioned above, in zoom taking optical systems for single lens reflex cameras, it is typical that the first lens unit Gr1 is the largest lens unit and is considerably heavy in weight. Therefore, in zoom lens systems like the fifth to ninth embodiments including from the object side the first lens unit Gr1 having a positive refractive power, the second lens unit Gr2 having a negative refractive power, the third lens unit Gr3 having a positive refractive power and the fourth lens unit Gr4 having a positive refractive power, the first lens unit Gr1 is heavy in weight compared with the second lens unit Gr2 and succeeding lens units. For this reason, it is undesirable to make image blur compensation by moving the first lens unit Gr1 vertically to the optical axis AX (i.e. by parallel decentering it) because this requires for the image blur compensation driving system to increase in size.

In zoom lens systems like the fifth to ninth embodiments including from the object side the first lens unit Gr1 having a positive refractive power, the second lens unit Gr2 having a negative refractive power, the third lens unit Gr3 having a positive refractive power and the fourth lens unit Gr4 having a positive refractive power, it is typical that an aperture diaphragm S is disposed in the second lens unit Gr2 or in the third lens unit Gr3. Since the axial luminous flux and the off-axial luminous flux are close to each other in the vicinity of the aperture diaphragm S, the lens diameter is small in the vicinity of the aperture diaphragm S. Since the second lens unit Gr2 and succeeding zoom lens units are situated in the vicinity of the aperture diaphragm S during zooming from the wide-angle limit [W] to the telephoto limit [T], their lens diameters can be comparatively small. Therefore, using for image blur compensation a small and lightweight lens element included in any of the second lens unit Gr2 and succeeding zoom lens units like in the fifth to ninth embodiments is suitable for making image blur compensation without increasing the burden on the image blur compensation driving system.

However, if image blur compensation is made by parallel decentering a plurality of lens elements, since the weight of the lens elements to be decentered and the lens frame is heavy, the burden on the image blur compensation driving system increases. Therefore, in the fifth to ninth embodiments, image blur compensation is made by moving one lens element vertically to the optical axis AX (i.e. by parallel decentering it). By this arrangement, the weight of the lens element to be decentered and the lens frame is reduced, so that the burden on the image blur compensation driving system is lightened.

With respect to the positional relationship between the aperture diaphragm S and one lens element (i.e. the image blur compensating lens element) DL parallel decentered for image blur compensation, the fifth to ninth embodiments fulfill the following condition (8) in the entire zoom range:

$$D/f<1.2 \tag{8}$$

where D is the distance from the aperture diaphragm S side surface of the image blur compensating lens element DL to the aperture diaphragm S, and f is the focal length of the entire lens system.

When the upper limit of the condition (8) is exceeded, the image blur compensating lens element DL is largely away from the aperture diaphragm S, so that the position of passage of the axial luminous flux and that of the off-axial luminous flux are largely away from each other. Consequently, the lens diameter increases to increase the lens weight. As a result, the burden on the image blur compensation driving system increases.

Generally, the aberration caused at the time of image blur is represented by the composition of the aberration caused in the optical systems preceding the optical system decentered for image blur compensation and the aberration caused in the optical system decentered for image blur compensation. In the case where image blur compensation is made by one lens element DL like in the fifth to ninth embodiments, the optical systems preceding the image blur compensating lens element DL have a higher degree of freedom of aberration correction than the image blur compensating lens element DL because they include more lens elements. Therefore, the aberration caused in the normal condition and the aberration caused at the time of image blur can both be corrected by the optical systems preceding the image blur compensating lens element DL. However, since the image blur compensating lens element DL has a low degree of freedom of aberration correction, if its refractive power is too strong, the amount of aberration caused in the image blur compensating lens element DL is great, so that it is difficult to restrain the aberration caused in the normal condition by use of other lenses.

Therefore, in the fifth to ninth embodiments, the image blur compensating lens element DL fulfill the following condition (9):

$$|Pd|/fW<2.30 \tag{9}$$

where Pd is the refractive power of the image blur compensating lens DL element.

When the upper limit of the condition (9) is exceeded, the refractive power of the image blur compensating lens element DL is too strong, so that an excessive amount of aberration is caused in the image blur compensating lens element DL. As a result, it is difficult to correct the aberration caused in the normal condition (pre-decentered condition). When the condition (9) is fulfilled with an upper limit of 1.6, an optical system having its aberration further corrected is obtained.

In the sixth embodiment, the image blur compensating lens element DL is a doublet lens as mentioned above. This will be described in detail. When the image blur compensating lens element DL is parallel decentered at the time of image blur, axial lateral chromatic aberration which is one of the decentering aberrations is caused. To restrain this, it is desirable that the image blur compensating lens unit be color-corrected. However, when the image blur compensating lens element DL is one single lens, chromatic aberration is inevitably caused in the image blur compensating lens element DL. If the number of lens elements for image blur compensation is increased to restrain this, the optical system decentered for image blur compensation increases in size. Therefore, it is desirable to use as the image blur compensating lens element DL a doublet lens formed of a positive lens and a negative lens. By using one doublet lens, a color-corrected and lightweight image blur compensating lens element DL is realized.

In the case where an image blur compensating lens element DL formed of one doublet lens is used, when the image blur compensating lens element DL has a positive refractive power, it is desirable for the image blur compensating lens element DL to fulfill the following condition (10), and when the image blur compensating lens element DL has a negative refractive power, it is desirable for the image blur compensating lens element DL to fulfill the following condition (11):

$$vp>vn \tag{10}$$

$$vp<vn \tag{11}$$

where vp is the Abbe number of the positive lens element of the image blur compensating lens element (doublet lens) DL, and vn is the Abbe number of the negative lens element of the image blur compensating lens element (doublet lens) DL.

When a lens unit is moved vertically to the optical axis AX for image blur compensation, in the compensated condition (post-decentering condition), the light passes through a place where no light passes in the normal condition (pre-decentering condition). There is a possibility that the light becomes harmful light and degrades the image quality. Therefore, it is desirable to cut off the harmful light during image blur compensation by providing a stationary aperture diaphragm S on the object side of the image blur compensating lens unit, in the image blur compensating lens unit or on the image side of the image blur compensating lens unit. By doing so, excellent image quality is obtained in the image blur compensated condition.

Tables 6 to 10 show construction data of the fifth to ninth embodiments (FIGS. 24, 28, 32, 36 and 40). Table 11 shows values of the conditions (6) to (9) in the fifth to ninth embodiments.

In Tables 6 to 10 (and also in Tables 16 and 17, 20 to 23, 25 to 27, which will be described later), the surfaces whose radii of curvature are marked with asterisks are aspherical surfaces defined by the following expression (AS) representing the surface configuration of the aspherical surface:

$$X = C \cdot Y^2 / \{1 + (1 - \epsilon \cdot C^2 \cdot Y^2)^{1/2}\} + A4 \cdot Y^4 + A6 \cdot Y^6 + A8 \cdot Y^8 + A10 \cdot Y^{10} + A12 \cdot Y^{12} \quad (AS)$$

where X is a displacement amount from the reference surface in the direction of the optical axis AX, Y is a height in the direction vertical to the optical axis AX, C is a paraxial curvature, E is a conic constant, and A4, A6, A8, A10 and A12 are fourth-order, sixth-order, eighth-order, tenth-order and twelfth-order aspherical coefficients, respectively.

FIGS. 25A to 25I, 29A to 29I, 33A to 33I, 37A to 37I and 41A to 41I show longitudinal aberration curves of the fifth to ninth embodiments. FIGS. 25A to 25C, 29A to 29C, 33A to 33C, 37A to 37C and 41A to 41C show aberration curves at the wide-angle limit [W] in the normal condition (pre-decentering condition). FIGS. 25D to 25F, 29D to 29F, 33D to 33F, 37D to 37F and 41D to 41F show aberration curves at the middle focal length condition [M] in the normal condition. FIGS. 25G to 25I, 29G to 29I, 33G to 33I, 37G to 37I and 41G to 41I show aberration curves at the telephoto limit [T] in the normal condition.

FIGS. 25A, 25D, 25G, 29A, 29D, 29G, 33A, 33D, 33G, 37A, 37D, 37G, 41A, 41D and 41G show spherical aberration and sine condition. The solid line d represents aberration to the d-line. The broken line SC represents sine condition. FIGS. 25B, 25E, 25H, 29B, 29E, 29H, 33B, 33E, 33H, 37B, 37E, 37H, 41B, 41E and 41H show astigmatism. The broken line DM and the solid line DS represent astigmatisms on the meridional image plane and on the sagittal image plane, respectively. FIGS. 25C, 25F, 25I, 29C, 29F, 29I, 33C, 33F, 33I, 37C, 37F, 37I, 41C, 41F and 41I show distortion.

FIGS. 26A to 26E, 30A to 30E, 34A to 34E, 38A to 38E and 42A to 42E show lateral aberration curves of the fifth to ninth embodiments at the wide-angle limit [W]. FIGS. 27A to 27E, 31A to 31E, 35A to 35E, 39A to 39E and 43A to 43E show lateral aberration curves of the fifth to ninth embodiments at the telephoto limit [T].

FIGS. 26A, 26B, 27A, 27B, 30A, 30B, 31A, 31B, 34A, 34B, 35A, 35B, 38A, 38B, 39A, 39B, 42A, 42B, 43A and 43B show lateral aberration (image height Y'=12, 0) with respect to the luminous flux on the meridional image plane before the decentering of the image blur compensating lens element DL in the fifth to ninth embodiments. FIGS. 26C to 26E, 27C to 27E, 30C to 30E, 31C to 31E, 34C to 34E, 35C to 35E, 38C to 38E, 39C to 39E, 42C to 42E, 43C to 43E show lateral aberration (image height Y'=−12, 12, 0) with respect to the luminous flux on the meridional image plane after the decentering of the second lens unit Gr2 in the fifth to ninth embodiments. The aberration curves after the decentering show aberrations in the compensated condition when an image blur compensation angle θ of the second lens unit Gr2 is 0.7° (=0.0122173 rad.).

As described above, in the fifth to ninth embodiments, since the image blur compensating lens element DL decentered for image blur compensation is one lightweight single lens or doublet lens included in any of the second to fourth lens units Gr2 to Gr4, the burden on the image blur compensation driving system is light. In addition, since the power arrangement and the zoom movement arrangement are effective in reducing the total length to achieve compactness and the above-described conditions are fulfilled, high description quality is obtained without any degradation of compactness.

<Tenth to Fifteenth Embodiments>

Figure 64:
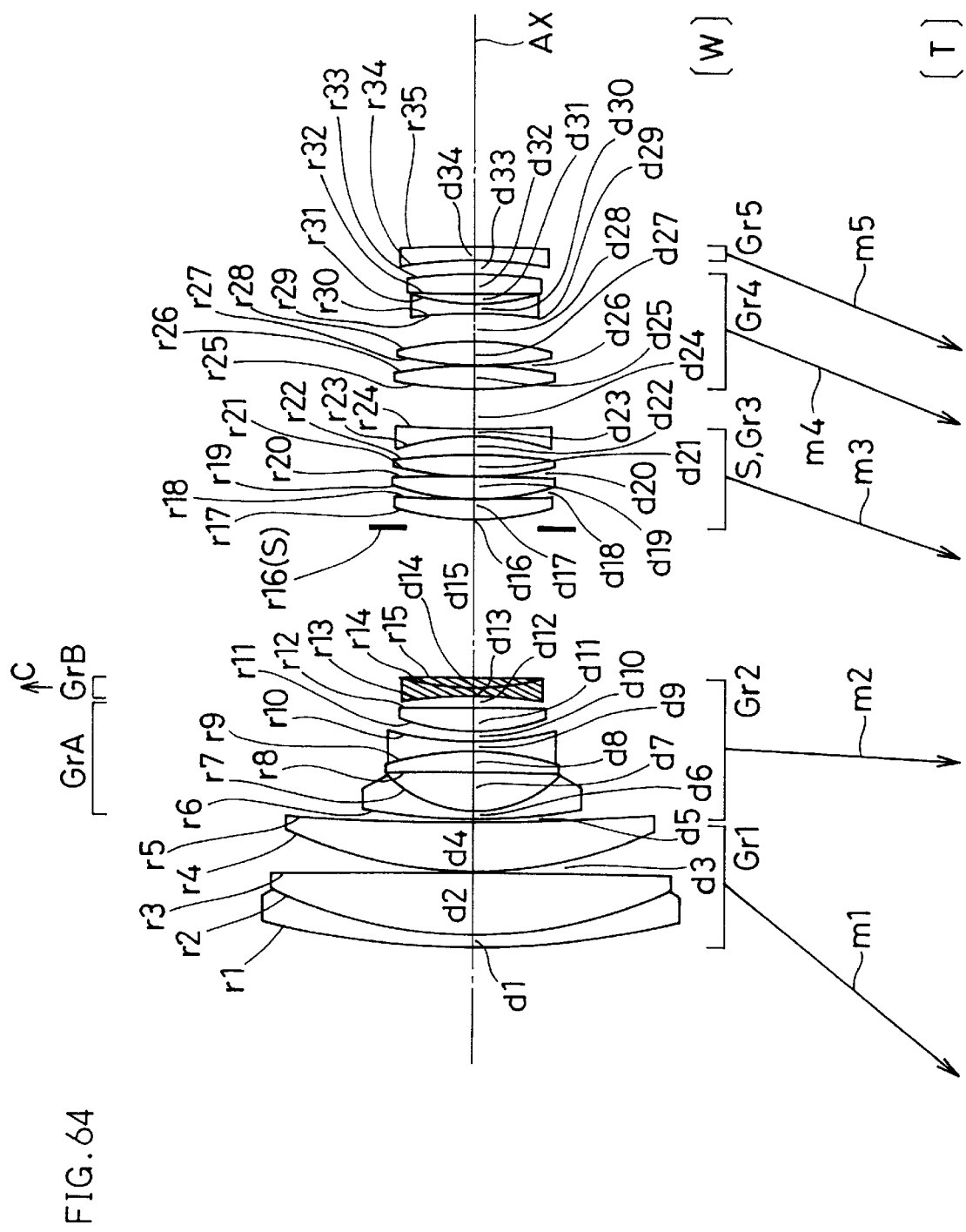
FIG. 64 shows the lens arrangement of a fifteenth embodiment.
Figure 65A:
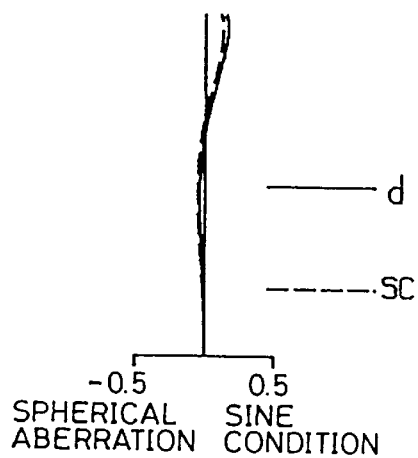
FIGS. 65A to 65I show longitudinal aberration curves of the fifteenth embodiment before decentering.
Figure 65B:
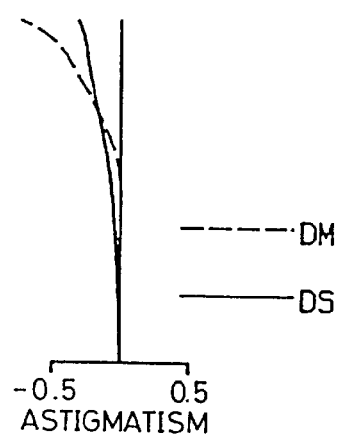
Figure 65C:
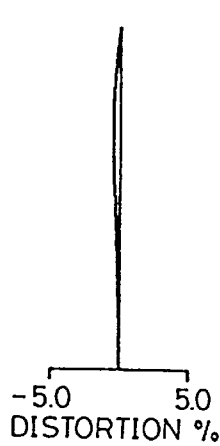
Figure 65D:
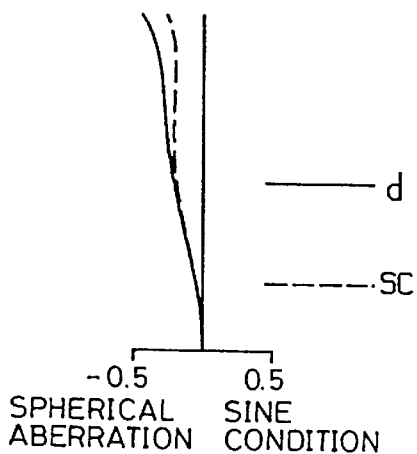
Figure 65E:
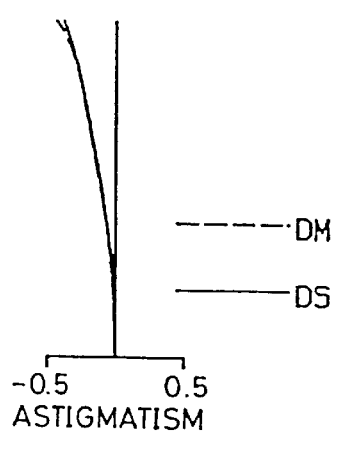
Figure 65F:
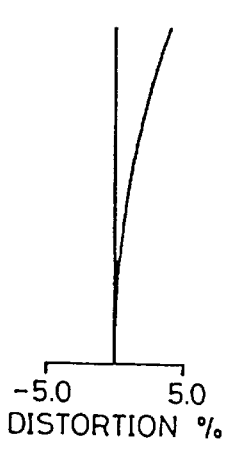
Figure 65G:
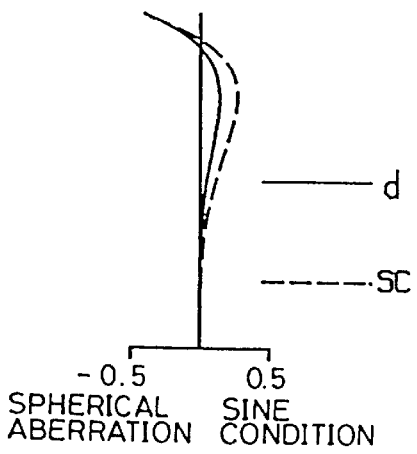
Figure 65H:
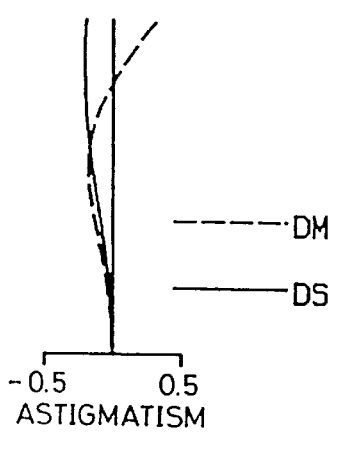
Figure 65I:
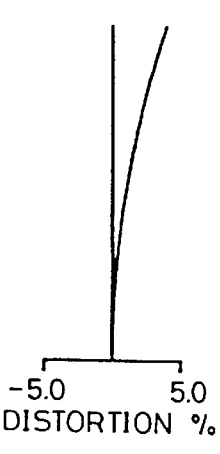
Figure 66A:
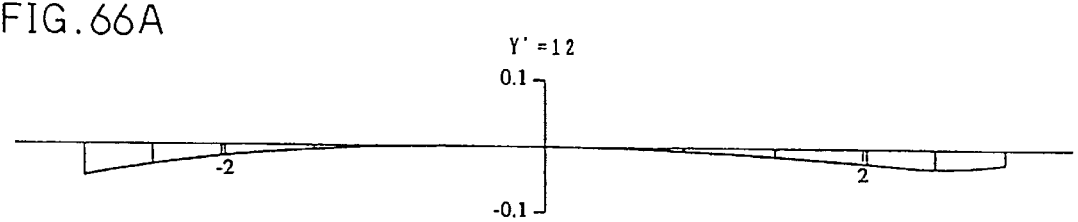
FIGS. 66A to 66E show meridional lateral aberration curves of the fifteenth embodiment at the wide angle limit before and after decentering.
Figure 66B:
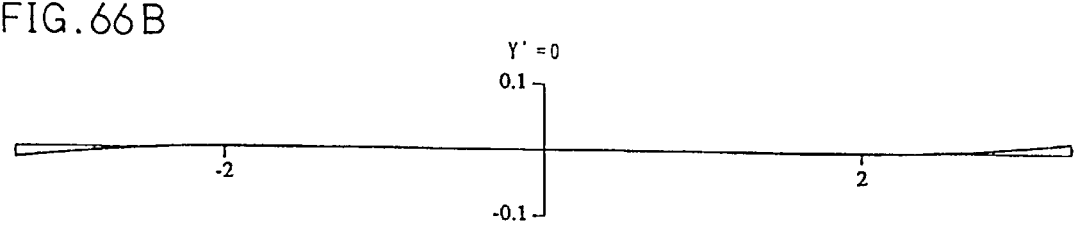
Figure 66C:
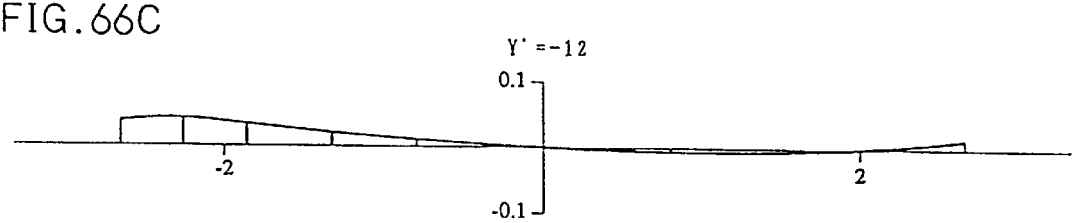
Figure 66D:
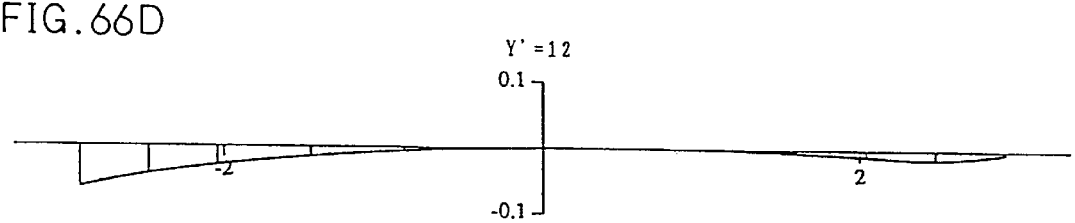
Figure 66E:
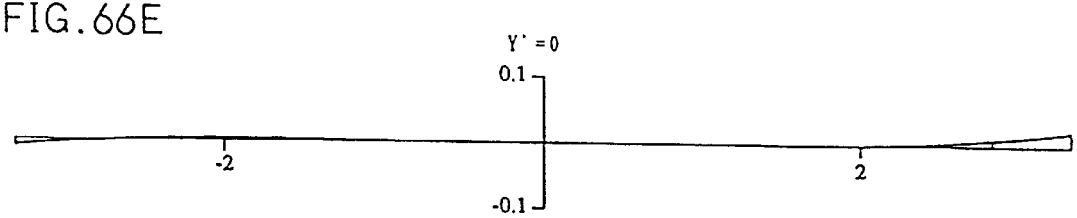
Figure 67A:
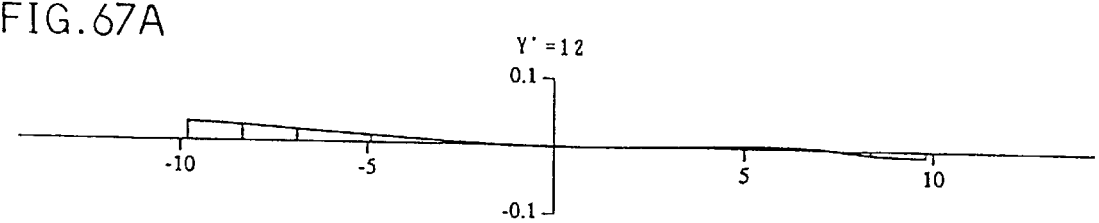
FIGS. 67A to 67E show meridional lateral aberration curves of the fifteenth embodiment at the telephoto limit before and after decentering.
Figure 67B:
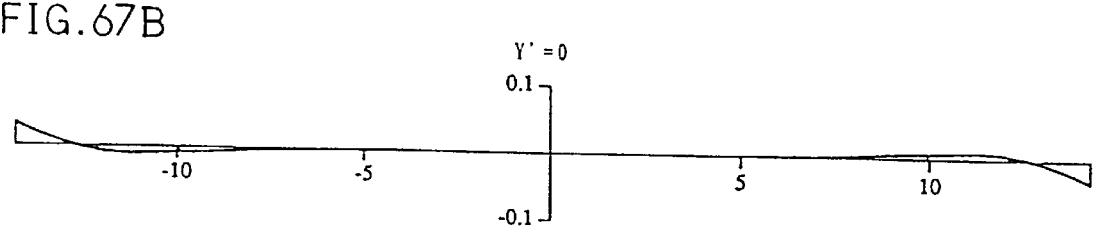
Figure 67C:
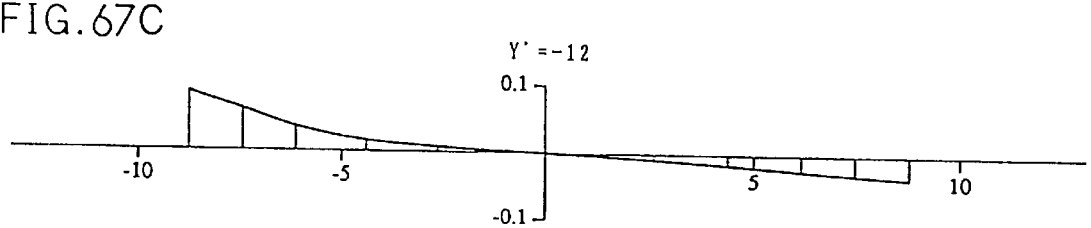
Figure 67D:
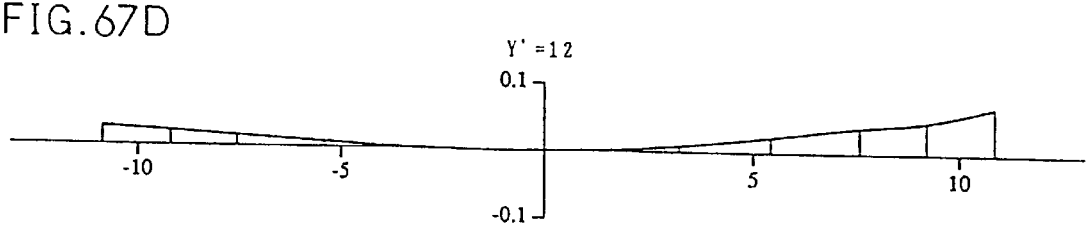
Figure 67E:
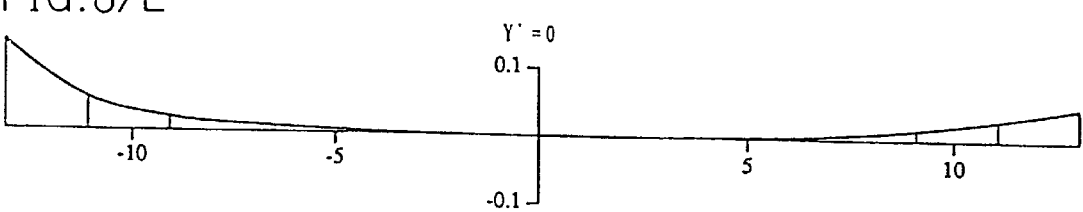

Zoom lens systems having an image blur compensating function according to the tenth to fifteenth embodiments will be described with reference to the drawings. FIGS. 44, 48, 52, 56, 60 and 64 show the lens arrangements of the tenth to fifteenth embodiments in the normal condition (pre-decentering condition) at the wide-angle limit [W]. In the figures, the surface marked with ri (i=1, 2, 3, . . . ) is an ith surface counted from the object side, and the axial distance marked with di (i=1, 2, 3, . . . ) is an ith axial distance counted from the object side. Arrows m1, m2, m3 and m4 of FIGS. 44, 48, 52, 56, 60 and 64 schematically show zoom movements of a first lens unit Gr1, a second lens unit Gr2, an aperture diaphragm S and a third lens unit Gr3, and a fourth lens unit Gr4 from the wide-angle limit [W] to the telephoto limit [T]. Arrow m5 of FIG. 64 schematically shows the zoom movement of a fifth lens unit Gr5 from the wide-angle limit [W] to the telephoto limit [T].

Figure 44:
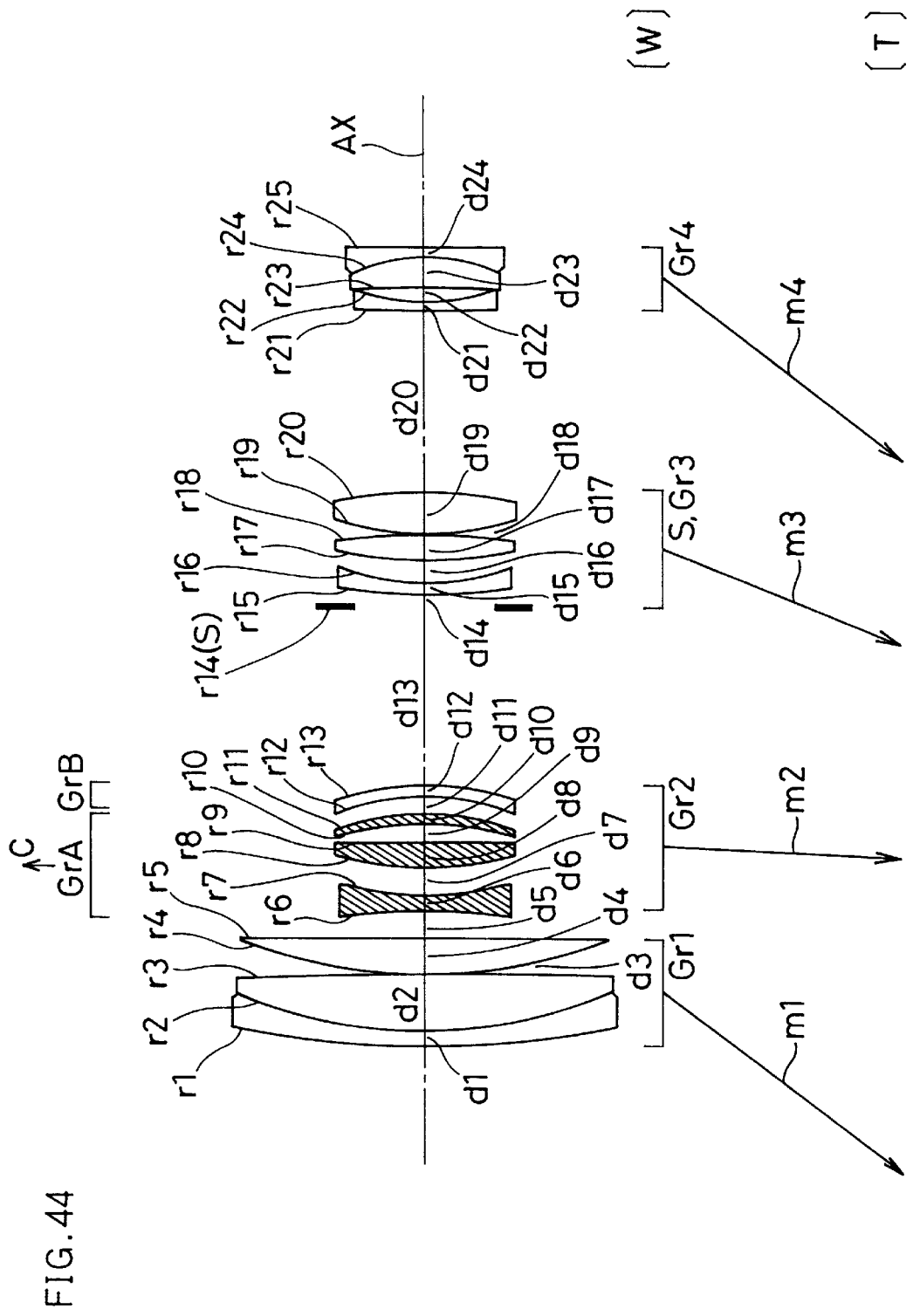
FIG. 44 shows the lens arrangement of a tenth embodiment.
Figure 46A:
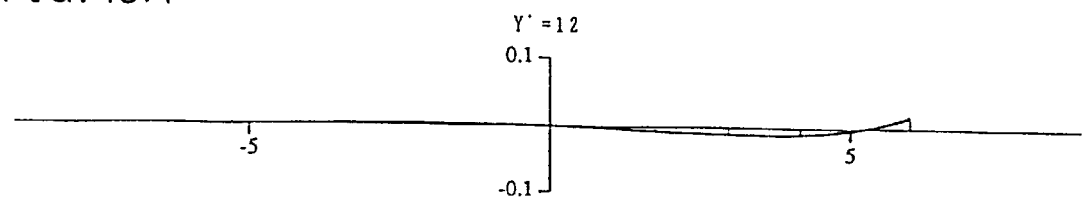
FIGS. 46A to 46E show meridional lateral aberration curves of the tenth embodiment at the wide angle limit before and after decentering.
Figure 46B:
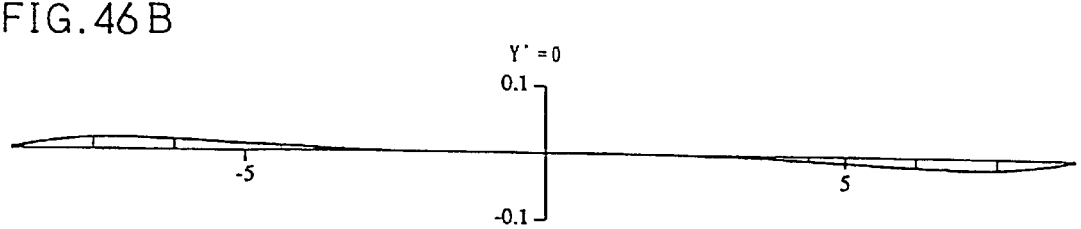
Figure 46C:
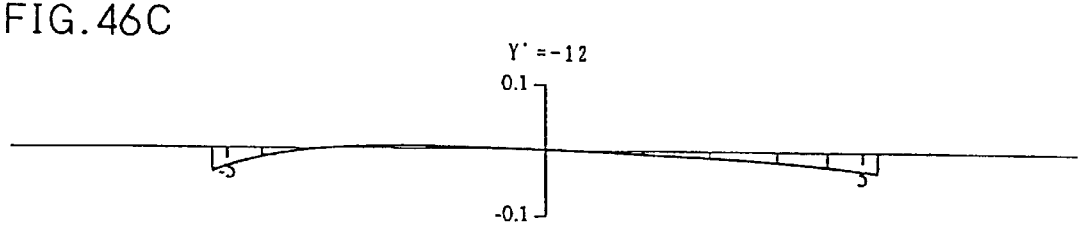
Figure 46D:
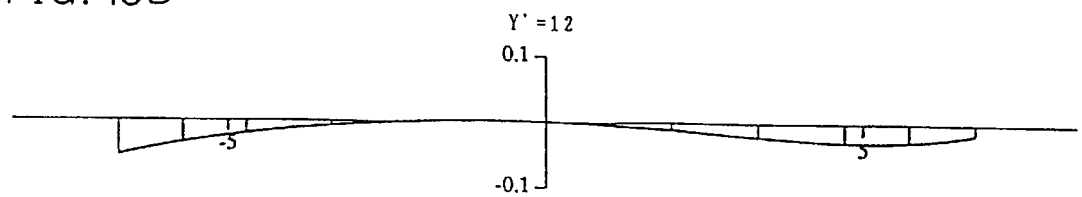
Figure 46E:
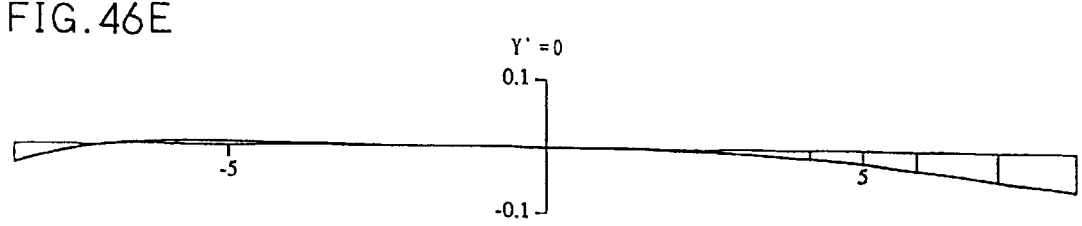
Figure 47A:
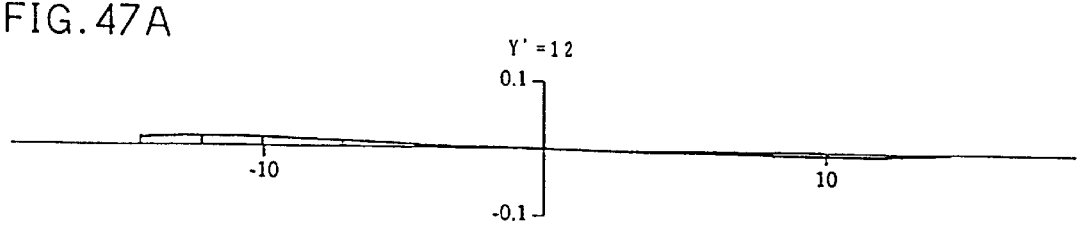
FIGS. 47A to 47E show meridional lateral aberration curves of the tenth embodiment at the telephoto limit before and after decentering.
Figure 47B:
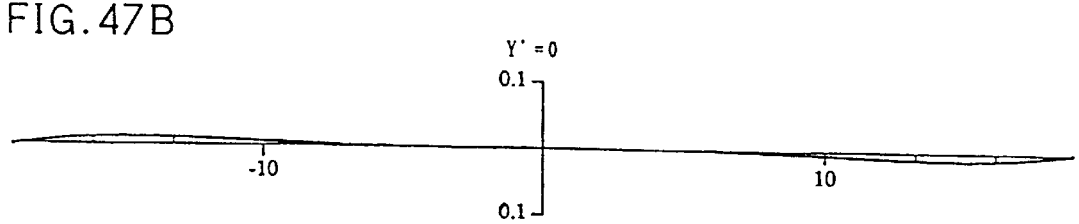
Figure 47C:
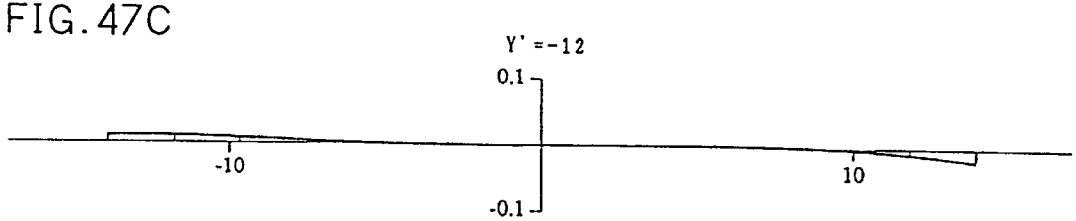
Figure 47D:
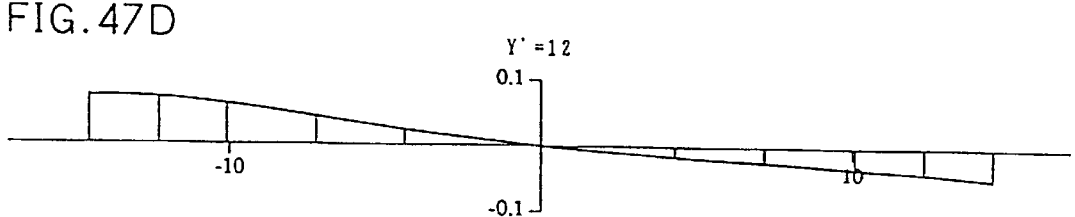
Figure 47E:
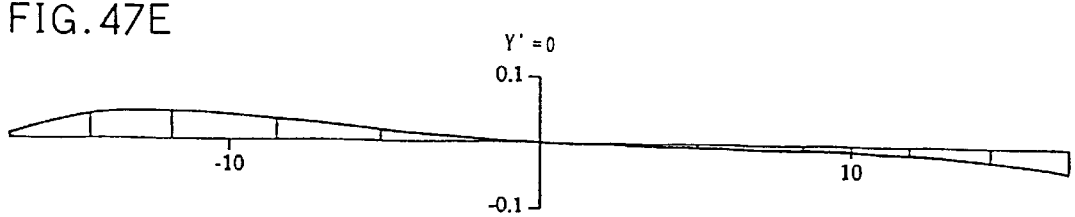
Figure 48:
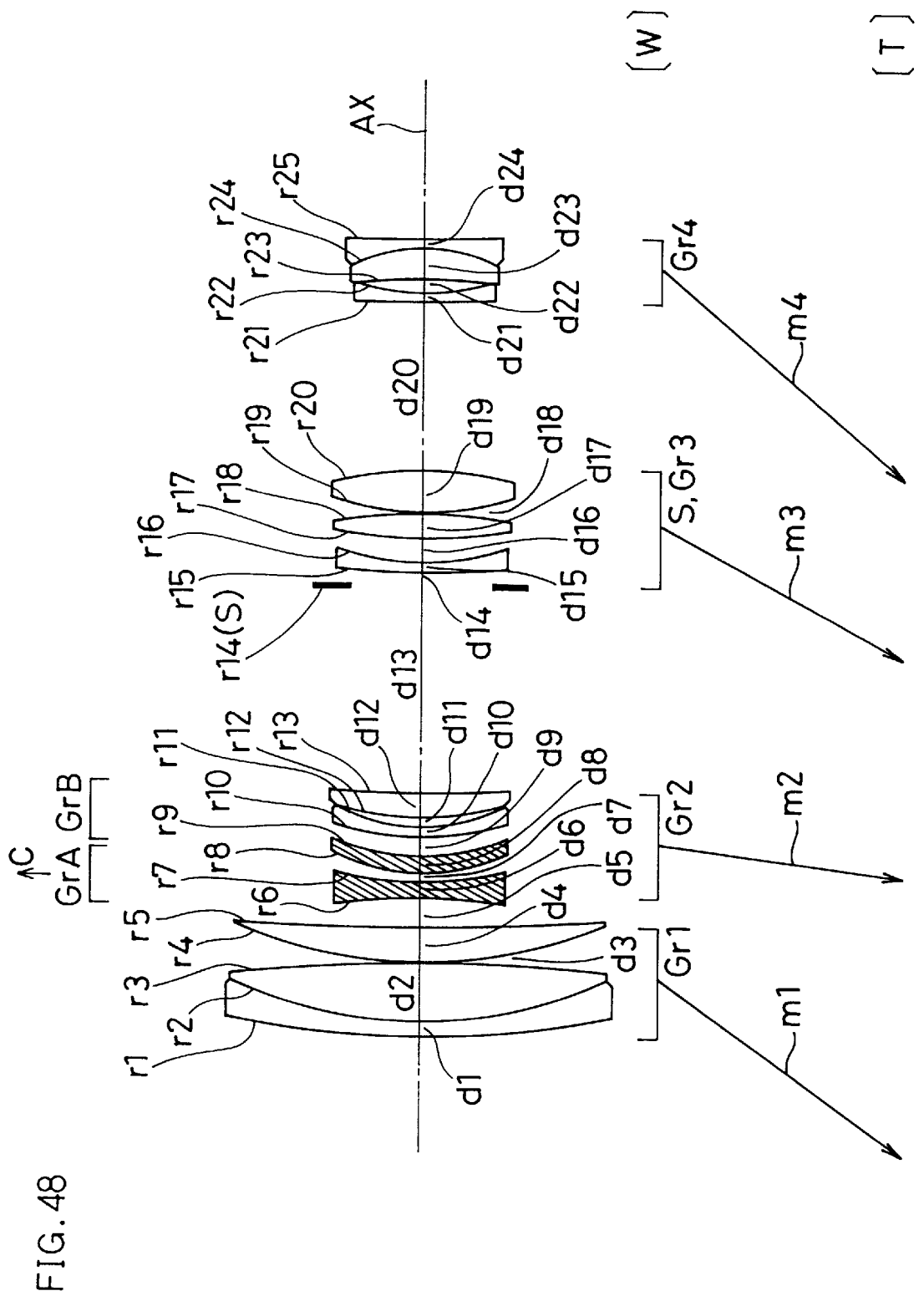
FIG. 48 shows the lens arrangement of an eleventh embodiment.
Figure 50A:
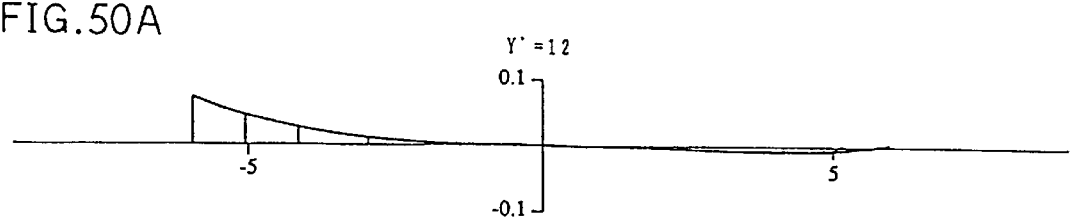
FIGS. 50A to 50E show meridional lateral aberration curves of the eleventh embodiment at the wide angle limit before and after decentering.
Figure 50B:
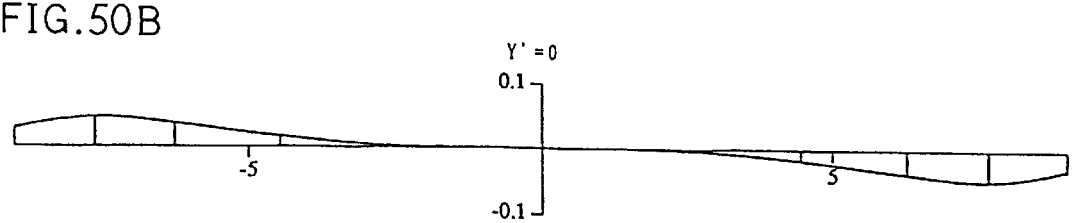
Figure 50C:
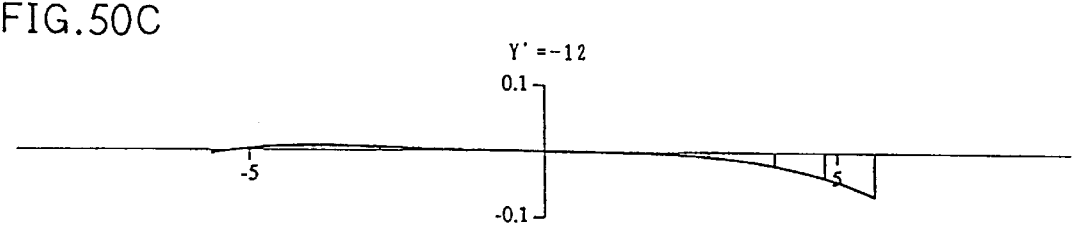
Figure 50D:
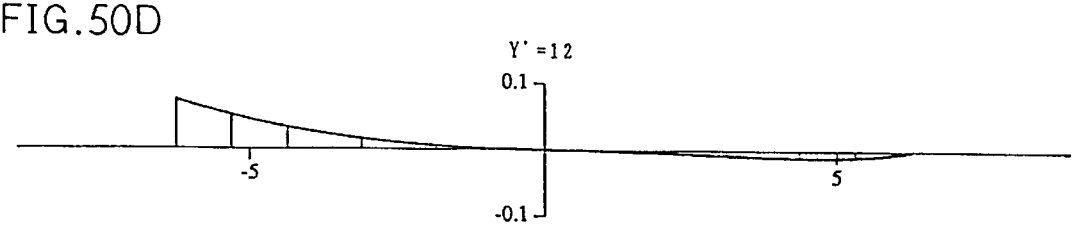
Figure 50E:
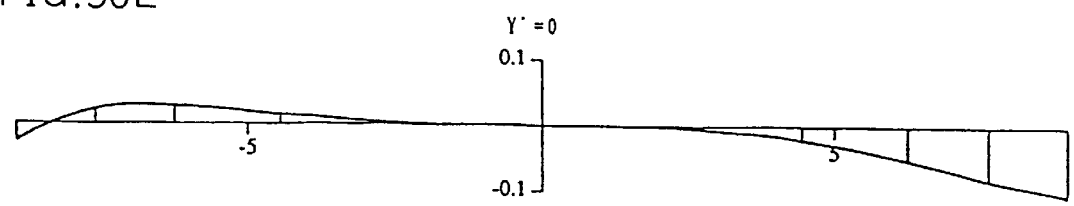
Figure 51A:
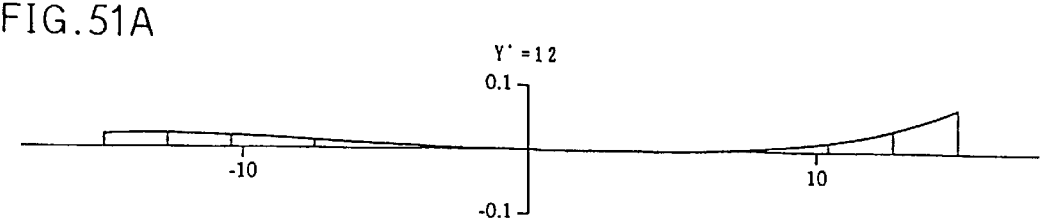
FIGS. 51A to 51E show meridional lateral aberration curves of the eleventh embodiment at the telephoto limit before and after decentering.
Figure 51B:
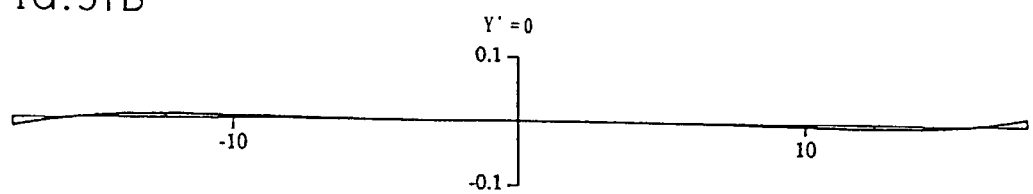
Figure 51C:
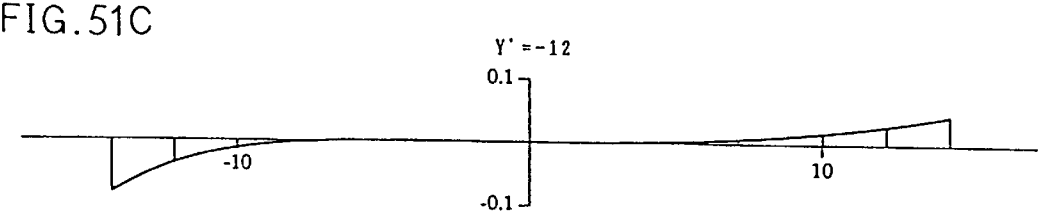
Figure 51D:
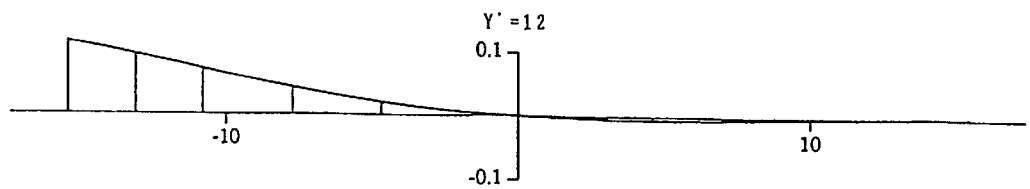
Figure 51E:
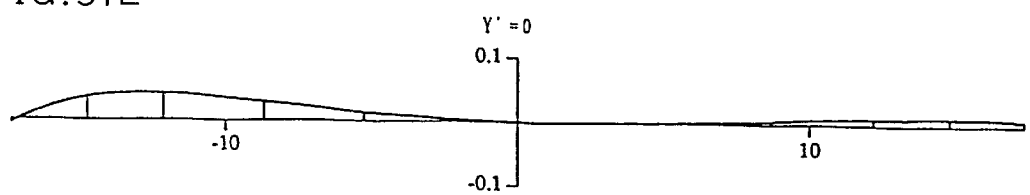
Figure 52:
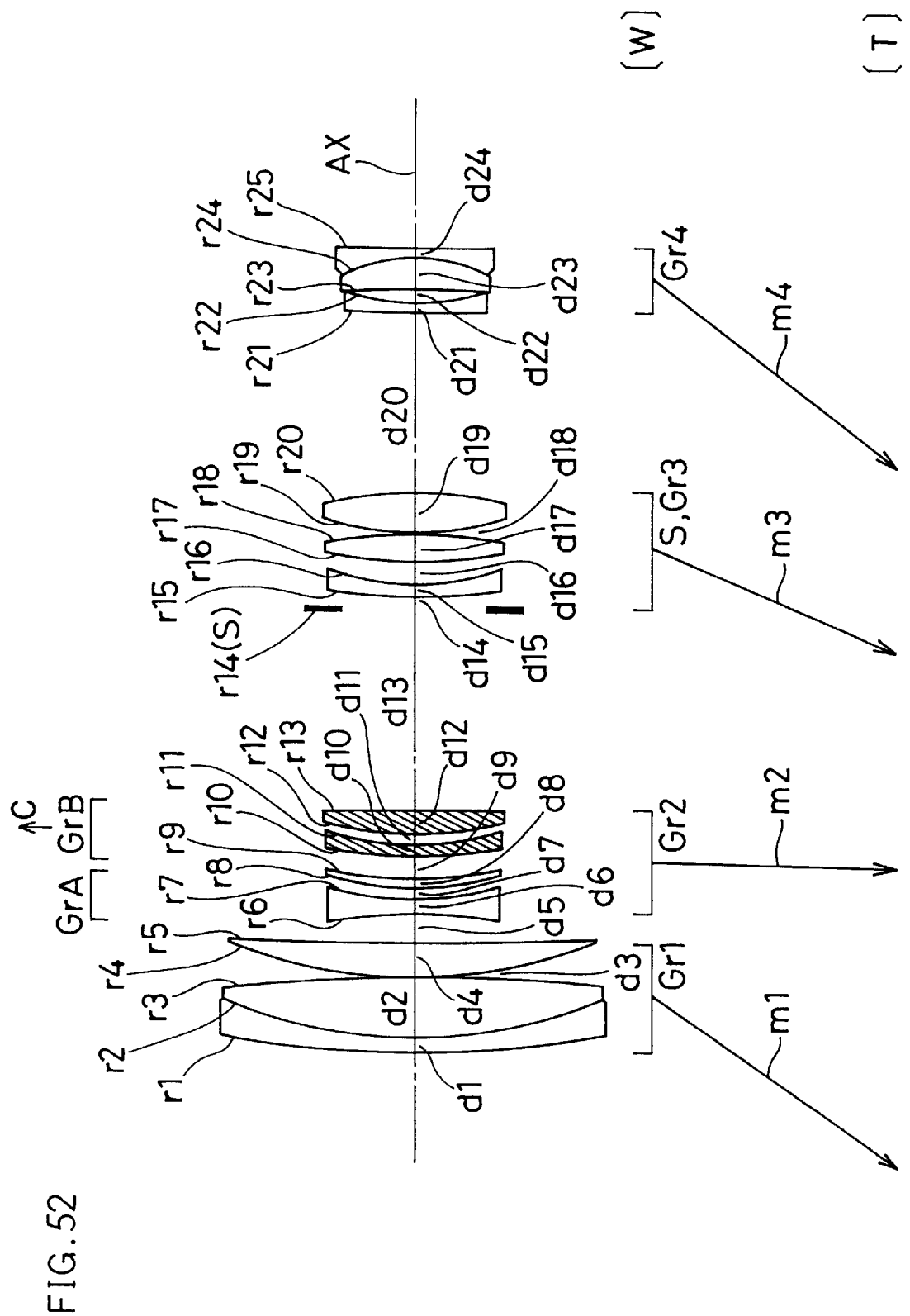
FIG. 52 shows the lens arrangement of a twelfth embodiment.
Figure 53A:
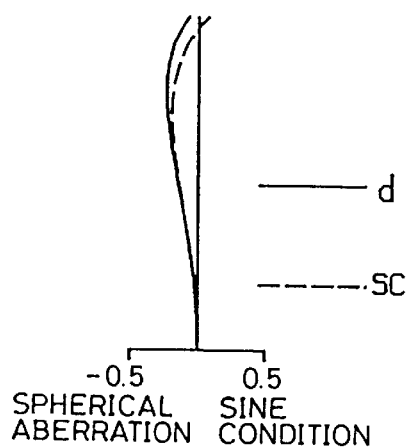
FIGS. 53A to 53I show longitudinal aberration curves of the twelfth embodiment before decentering.
Figure 53B:
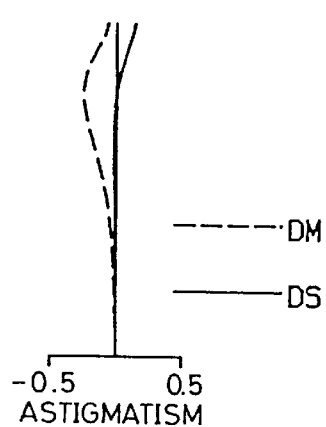
Figure 53C:
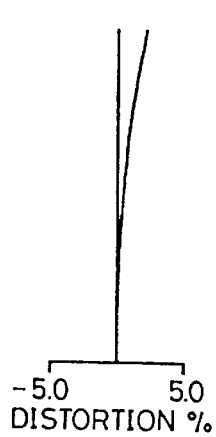
Figure 53D:
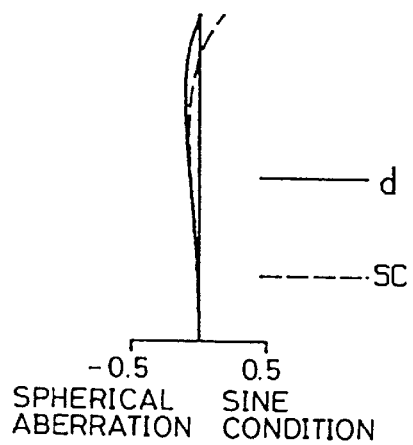
Figure 53E:
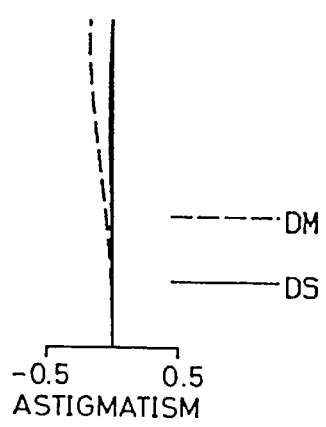
Figure 53F:
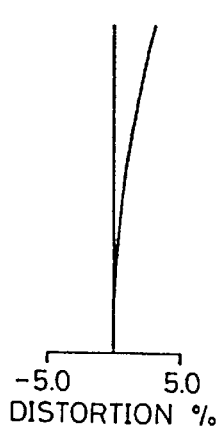
Figure 53G:
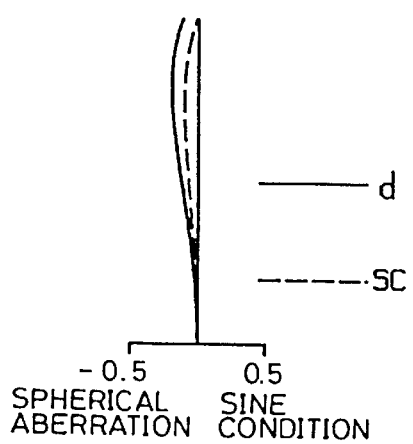
Figure 53H:
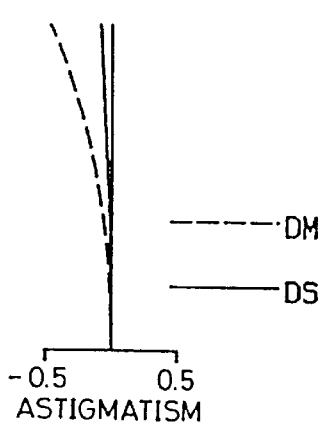
Figure 53I:
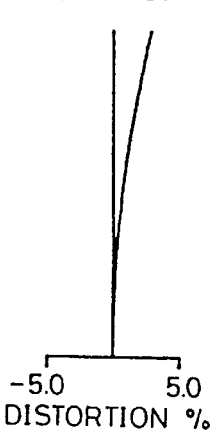
Figure 54A:
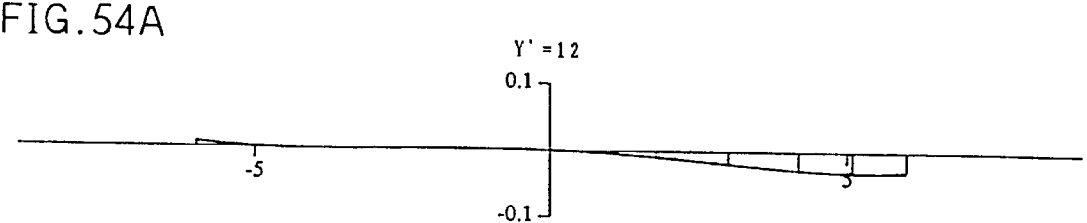
FIGS. 54A to 54E show meridional lateral aberration curves of the twelfth embodiment at the wide angle limit before and after decentering.
Figure 54B:
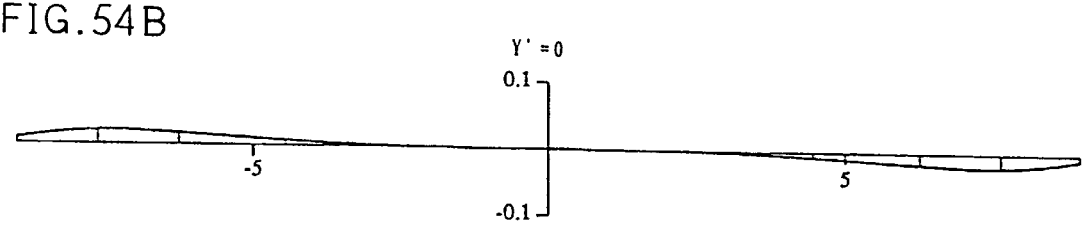
Figure 54C:
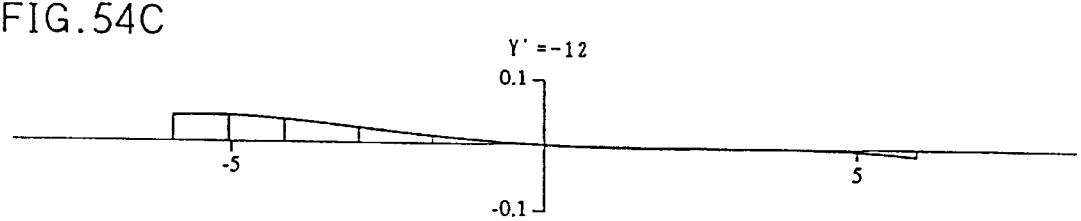
Figure 54D:
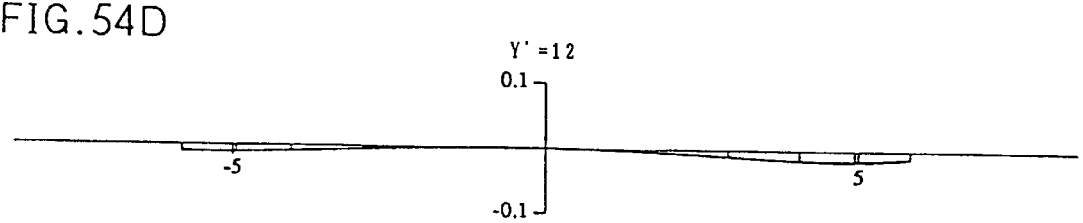
Figure 54E:
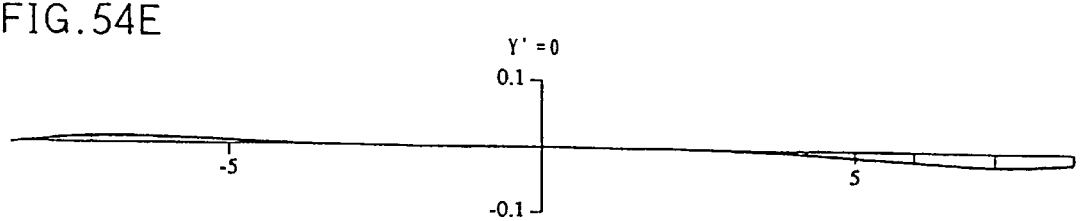
Figure 55A:
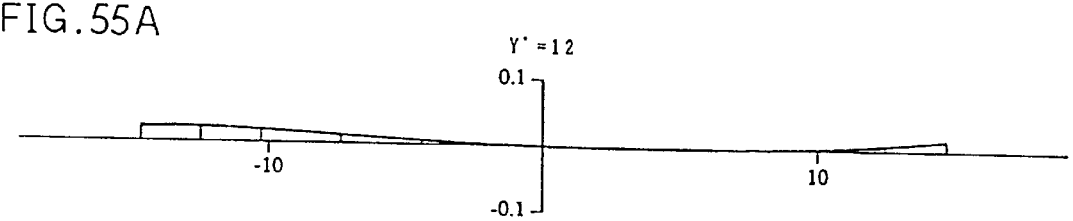
FIGS. 55A to 55E show meridional lateral aberration curves of the twelfth embodiment at the telephoto limit before and after decentering.
Figure 55B:
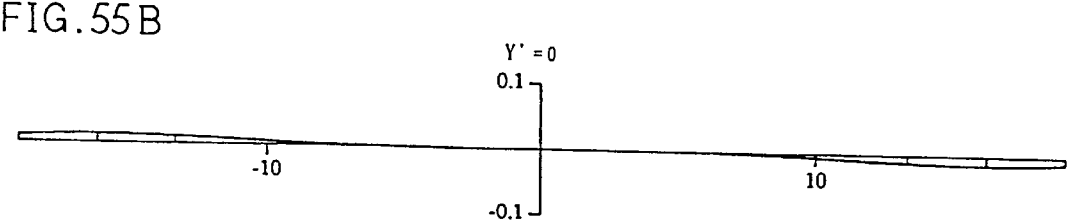
Figure 55C:
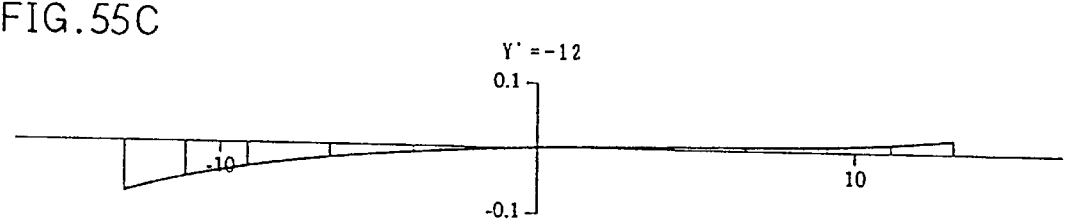
Figure 55D:
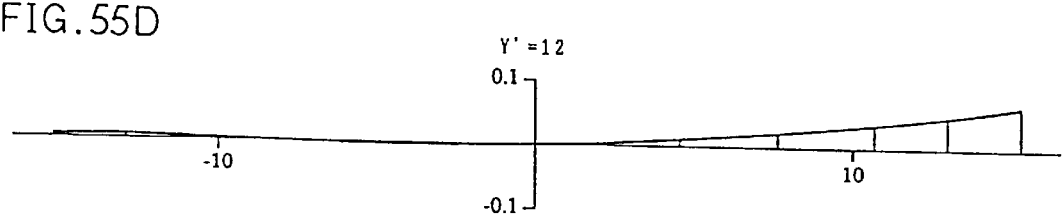
Figure 55E:
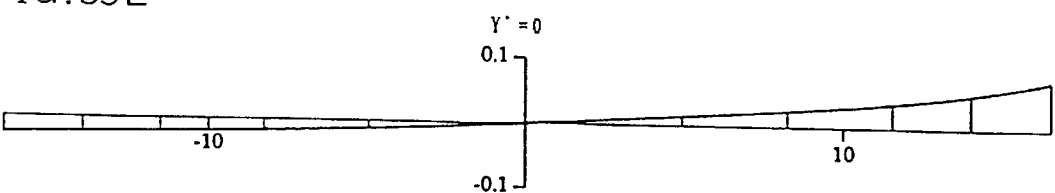
Figure 56:
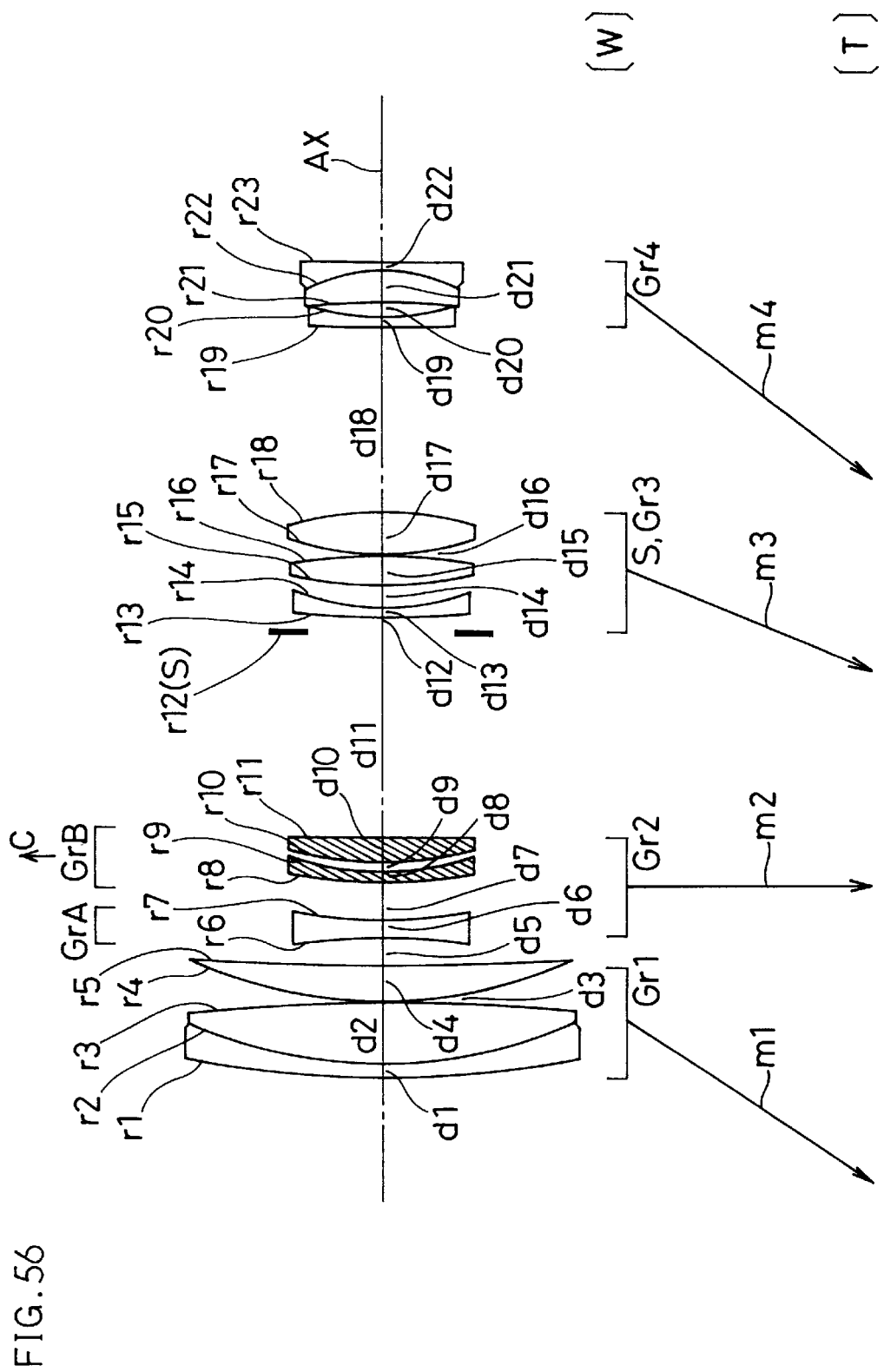
FIG. 56 shows the lens arrangement of a thirteenth embodiment.
Figure 58A:
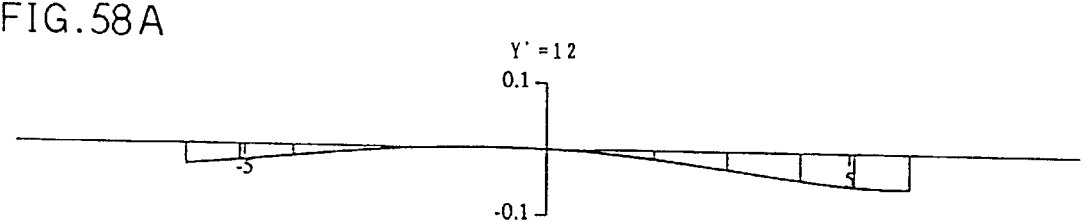
FIGS. 58A to 58E show meridional lateral aberration curves of the thirteenth embodiment at the wide angle limit before and after decentering.
Figure 58B:
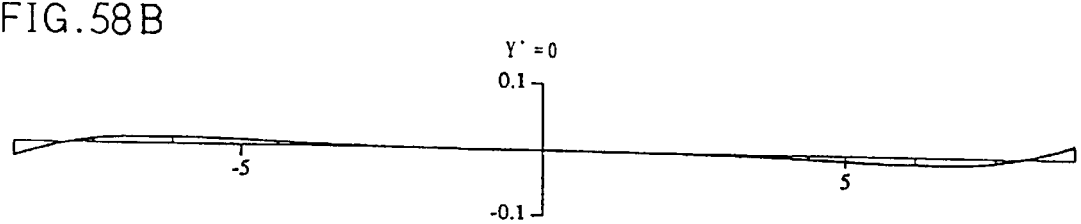
Figure 58C:
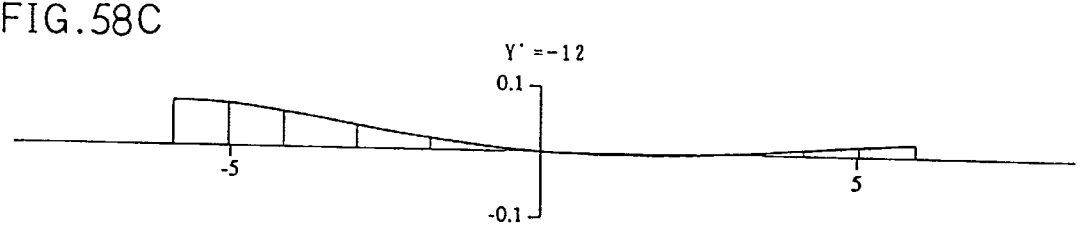
Figure 58D:
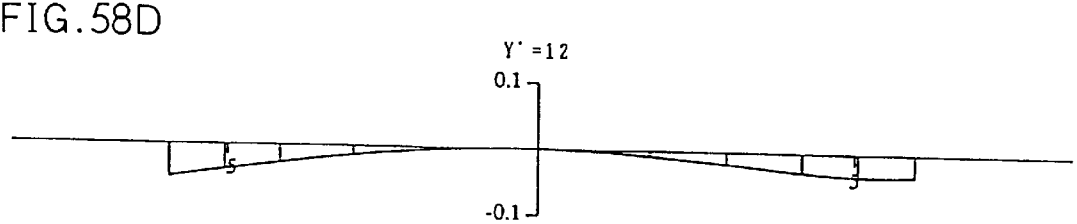
Figure 58E:
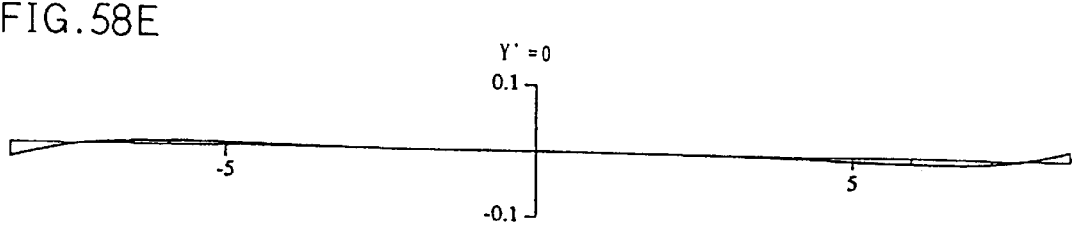
Figure 59A:
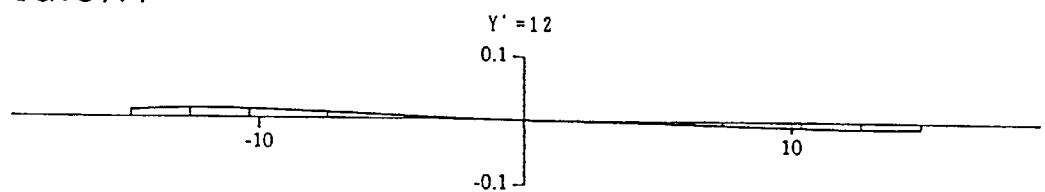
FIGS. 59A to 59E show meridional lateral aberration curves of the thirteenth embodiment at the telephoto limit before and after decentering.
Figure 59B:
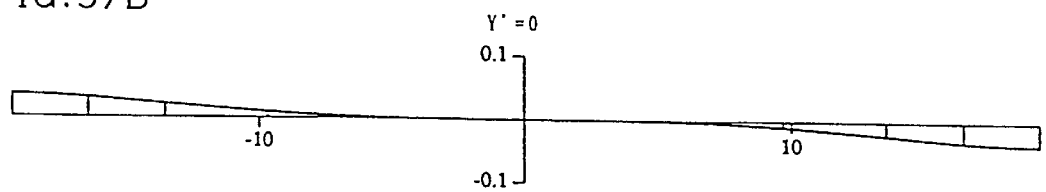
Figure 59C:
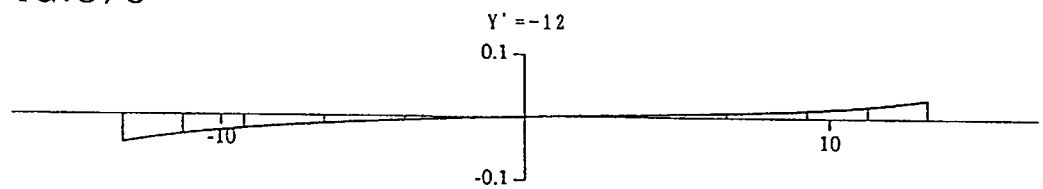
Figure 59D:
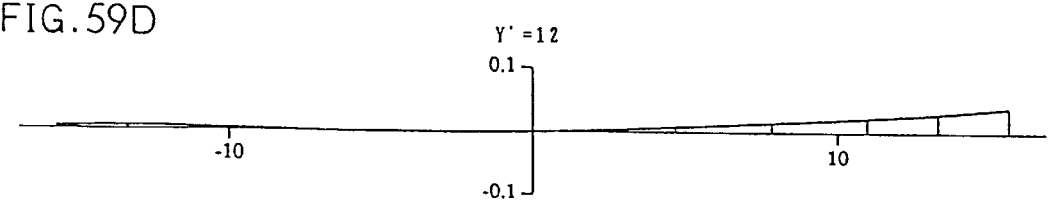
Figure 59E:
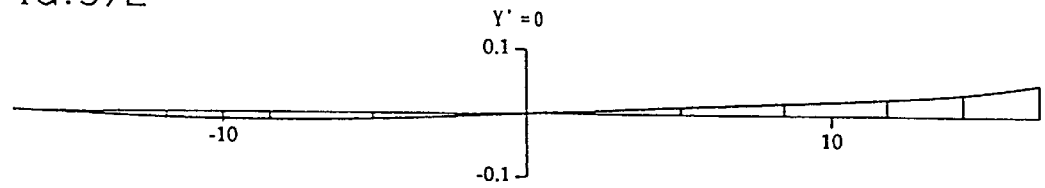
Figure 60:
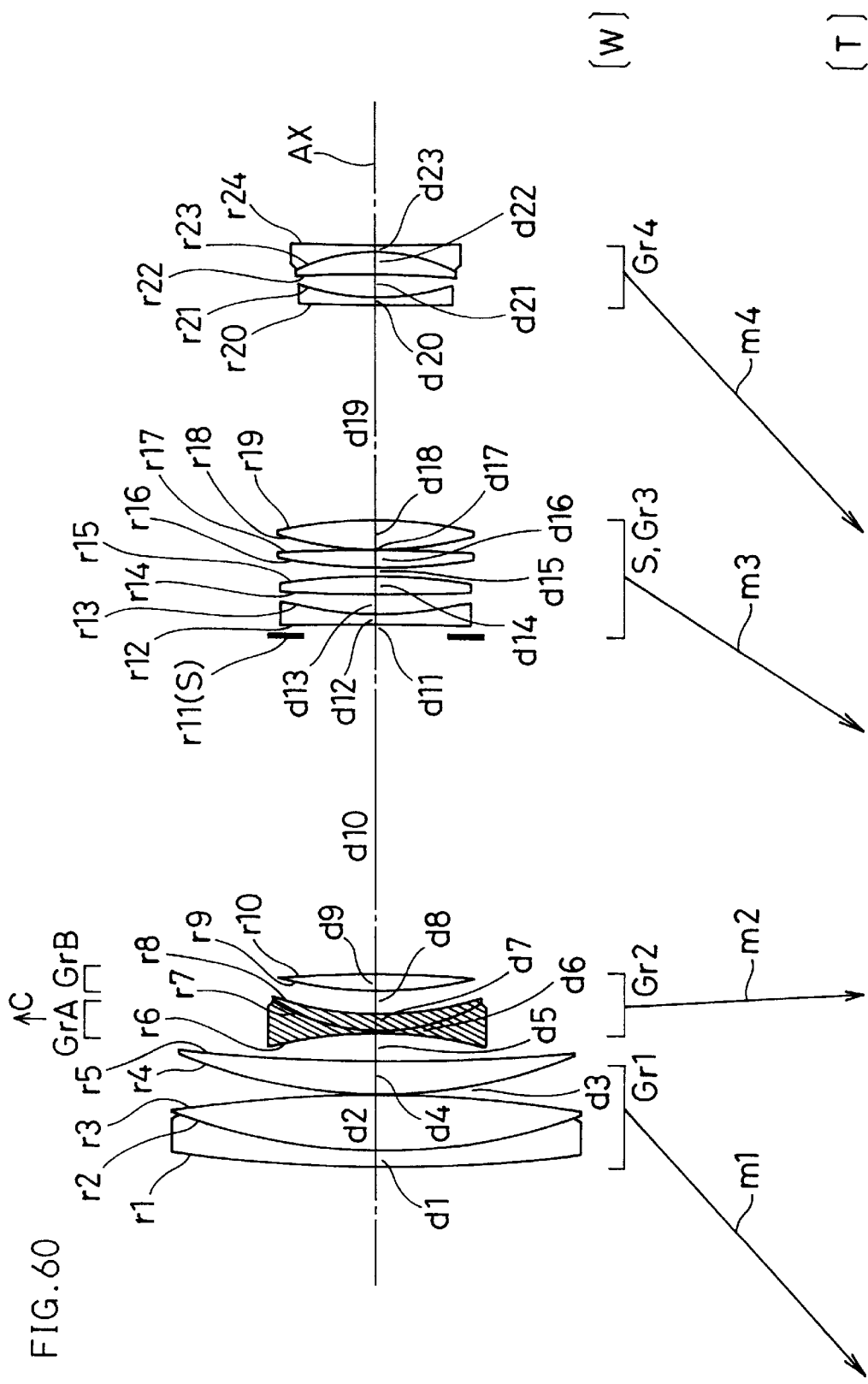
FIG. 60 shows the lens arrangement of a fourteenth embodiment.
Figure 61A:
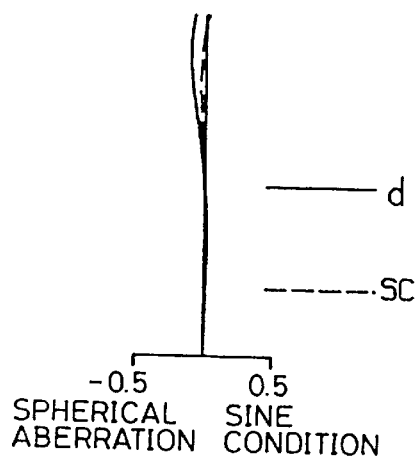
FIGS. 61A to 61I show longitudinal aberration curves of the fourteenth embodiment before decentering.
Figure 61B:
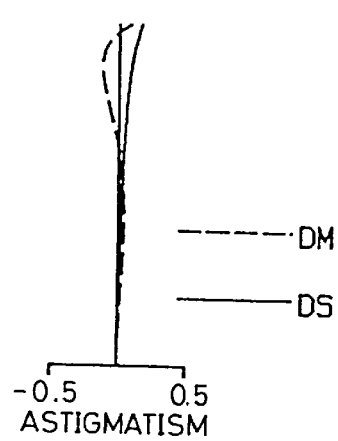
Figure 61C:
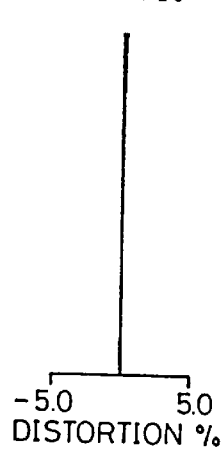
Figure 61D:
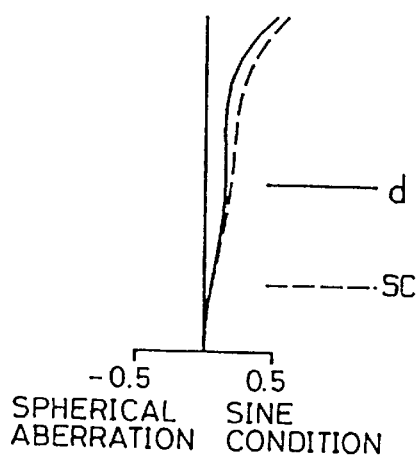
Figure 61E:
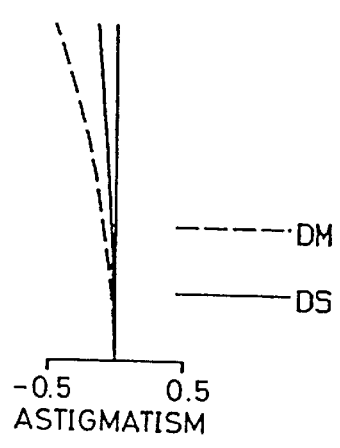
Figure 61F:
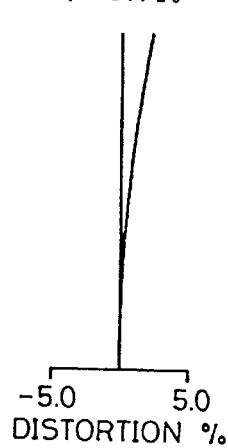
Figure 61G:
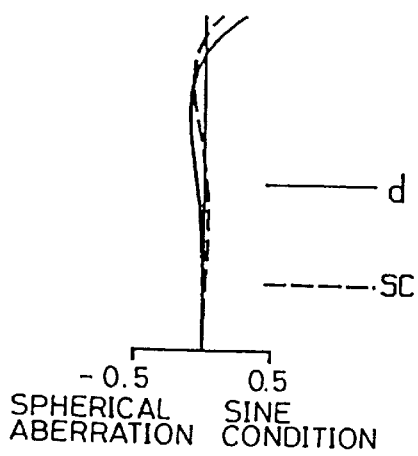
Figure 61H:
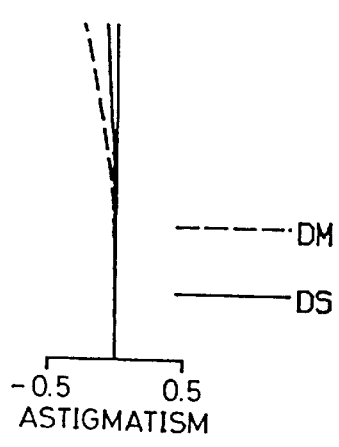
Figure 61I:
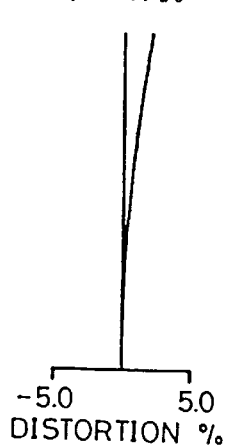
Figure 62A:
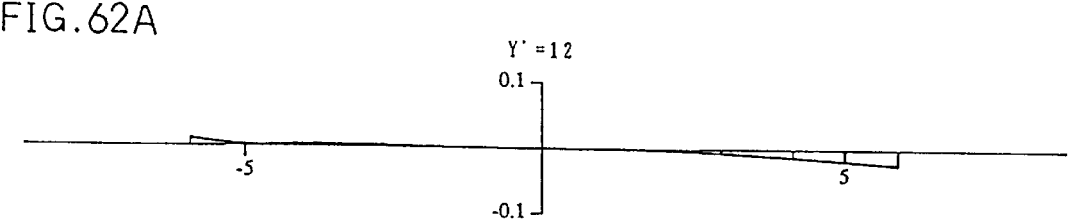
FIGS. 62A to 62E show meridional lateral aberration curves of the fourteenth embodiment at the wide angle limit before and after decentering.
Figure 62B:
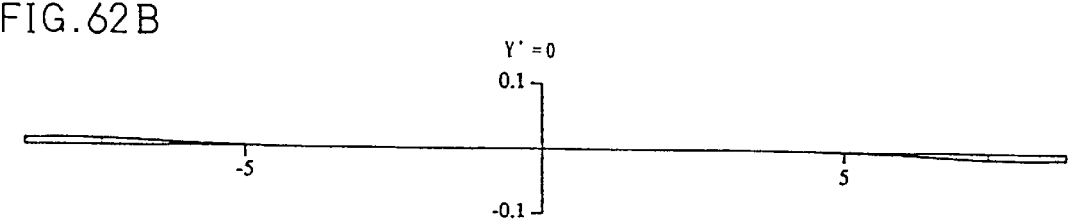
Figure 62C:
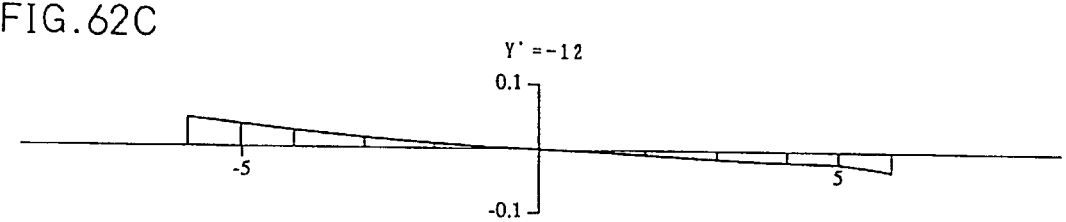
Figure 62D:
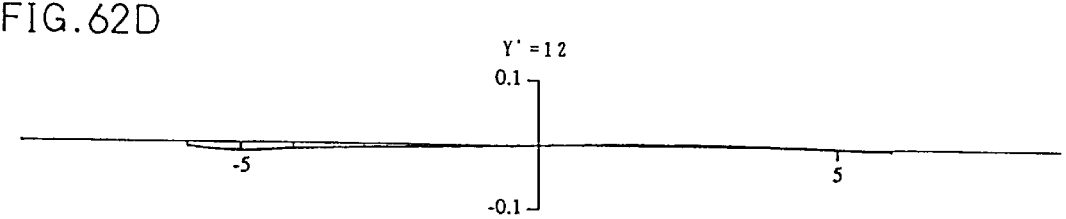
Figure 62E:
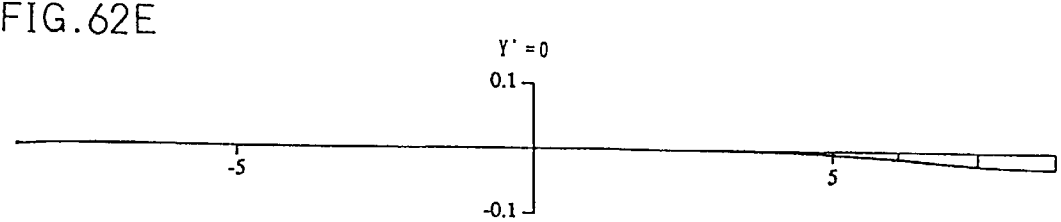
Figure 63A:
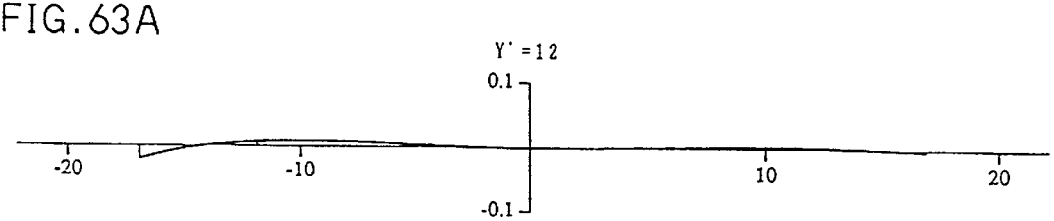
FIGS. 63A to 63E show meridional lateral aberration curves of the fourteenth embodiment at the telephoto limit before and after decentering.
Figure 63B:
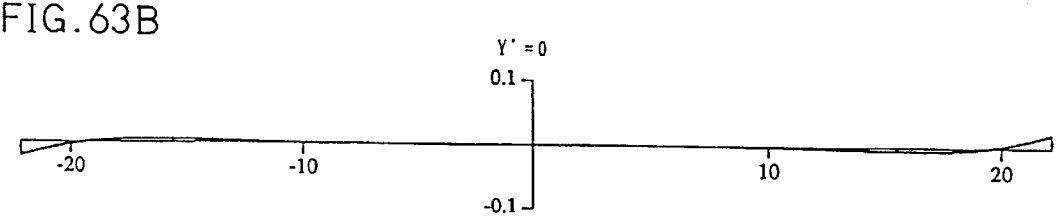
Figure 63C:
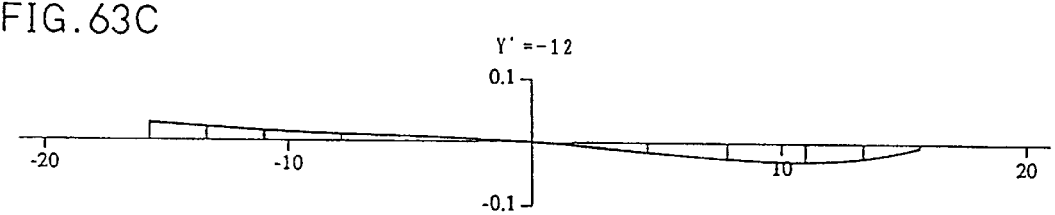
Figure 63D:
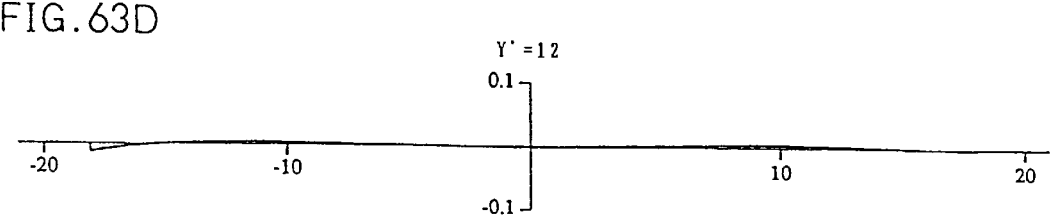
Figure 63E:
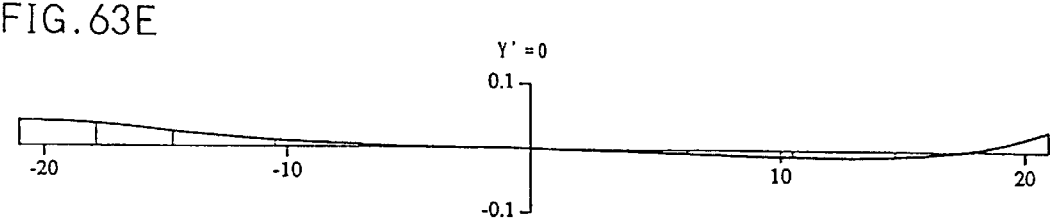

Zoom lens systems of the tenth to fourteenth embodiments consist of, from the object side, a first lens unit Gr1 having a positive refractive power, a second lens unit Gr2 having a negative refractive power, a third lens unit Gr3 having a positive refractive power and a fourth lens unit Gr4 having a negative refractive power, wherein zooming is performed by varying the distances between the lens units. In the tenth, eleventh and fourteenth embodiments, the second lens unit Gr2 is divided into a front lens unit GrA and a rear lens unit GrB from the object side, and image blur compensation is made by parallel decentering the front lens unit GrA (i.e. by moving it vertically to the optical axis AX). In FIGS. 44, 48, and 60, arrow C represents the movement of the front lens unit GrA during image blur correction. In the twelfth and thirteenth embodiments, the second lens unit is divided into a front lens unit GrA and a rear lens unit GrB from the object side, and image blur compensation is made by parallel decentering the rear lens unit GrB. In FIGS. 52, and 56, arrow C represents the movement of the rear lens unit GrB during image blur correction. In the fourteenth embodiment, the facing surfaces (i.e. r8 and r9) of the front and rear lens units GrA and GrB are aspherical surfaces which cancel each other. By this arrangement, aberrations caused at the time of image blur are excellently corrected without any change in the image quality to be obtained in normal photographing.

A zoom lens system of the fifteenth embodiment consists of, from the object side, a first lens unit Gr1 having a positive refractive power, a second lens unit Gr2 having a negative refractive power, a third lens unit Gr3 having a positive refractive power, a fourth lens unit Gr4 having a positive refractive power and a fifth lens unit Gr5 having a negative refractive power, wherein zooming is performed by varying the distances between the lens units. In the fifteenth embodiment, the second lens unit Gr2 is divided into a front lens unit GrA and a rear lens unit GrB from the object side, and image blur compensation is made by parallel decentering the rear lens unit GrB. In FIG. 64, arrow C represents the movement of the rear lens unit GrB during image blur correction.

The tenth to fifteenth lens units include from the object side the first lens unit Gr1 having a positive refractive power and the second lens unit Gr2 having a negative refractive power, and include on the most image side the last lens unit (i.e. the most image side lens unit) having a negative refractive power. In this type of zoom lens systems, since the degree of freedom of the movements of the zoom lens units is effectively used for aberration correction, excellent image quality is obtained in the entire zoom range.

Since the first lens unit Gr1 and the last lens unit are moved toward the object side during zooming from the wide-angle limit [W] to the telephoto limit [T], a zoom optical system is realized which is compact but has a sufficient back focal length. In a four-unit zoom lens system of positive, negative, positive, negative configuration, by arranging so that the first lens unit Gr1 and the fourth lens unit Gr4 are moved toward the object side during zooming from the wide-angle limit [W] to the telephoto limit [T] like in the tenth to fourteenth embodiments, an extremely compact telephoto zoom lens system is obtained. Further, by arranging so that the third lens unit Gr3 is moved toward the object side during zooming from the wide-angle limit [W] to the telephoto limit [T], the degree of freedom of the movements of the zoom lens units increases, so that an optical system is obtained which is advantageous in correcting aberration and has a further reduced total length.

The tenth to fifteenth embodiments fulfill the following condition (12):

$$1.3 < (fT/fW) \cdot (\beta LW/\beta LT) < 7.0 \quad (12)$$

where fT is the focal length of the entire lens system at the telephoto limit [T], fW is the focal length of the entire lens system at the wide-angle limit [W], βLW is the magnification of the last lens unit at the wide-angle limit [W], and βLT is the magnification of the last lens unit at the telephoto limit [T].

The condition (12) shows how much the last lens unit contributes to zooming. When the upper limit of the condition (12) is exceeded, the proportion of the contribution of the last lens unit to zooming decreases, so that the compactness of the entire zoom lens system is lost. When the condition (12) is fulfilled with an upper limit of 3.0, a more compact zoom lens system is obtained. When the lower limit of the condition (12) is exceeded, zooming is performed mostly by the last lens unit, so that the variation in aberration caused by zooming increases and it is difficult to restrain it. When the condition (12) is fulfilled with a lower limit of 1.45, a zoom lens system which is more excellent in image quality is obtained.

In zoom taking optical systems for single lens reflex cameras, it is typical that the first lens unit Gr1 is the largest lens unit and is considerably heavy in weight. Therefore, in zoom lens systems like the tenth to fifteenth embodiments including from the object side the first lens unit Gr1 having a positive refractive power and the second lens unit Gr2 having a negative refractive power, and including on the most image side the last lens unit having a negative refractive power wherein zooming is performed by varying the distances between the lens units and the first lens unit Gr1 and the last lens unit are moved toward the object side during zooming from the wide-angle limit [W] to the telephoto limit [T], the first lens unit Gr1 is heavy in weight compared with the second lens unit Gr2 and succeeding lens units. For this reason, it is undesirable to make image blur compensation by moving the first lens unit Gr1 vertically to the optical axis AX (i.e. by parallel decentering it) because this requires the image blur compensation driving system to increase in size.

In zoom lens systems like the tenth to fifteenth embodiments including from the object side the first lens unit Gr1 having a positive refractive power and the second lens unit Gr2 having a negative refractive power and including on the most image side the last lens unit having a positive refractive power wherein zooming is performed by varying the distances between the lens units and the first lens unit Gr1 and the last lens unit are moved toward the object side during zooming from the wide-angle limit [W] to the telephoto limit [T], it is typical that the aperture diaphragm S is disposed in the second lens unit Gr2 or in the third lens unit Gr3. Since the axial luminous flux and the off-axial luminous flux are close to each other in the vicinity of the aperture diaphragm S, the lens diameter is small in the vicinity of the aperture diaphragm S. Since the second lens unit Gr2 is situated in the vicinity of the aperture diaphragm S during zooming from the wide-angle limit [W] to the telephoto limit [T], its lens diameter can be comparatively small. Therefore, the use of the small and lightweight second lens unit Gr2 for image blur compensation is suitable for making image blur compensation without increasing the burden on the image blur compensation driving system.

However, if image blur compensation is made by parallel decentering the entire second lens unit Gr2, the weight of the lens to be parallel decentered and the lens frame increases, so that the burden on the image blur compensation driving system increases. Therefore, in the tenth to fifteenth embodiments, the second lens unit Gr2 is divided into the front lens unit GrA and the rear lens unit GrB from the object side, and image blur compensation is made by moving the front lens unit GrA or the rear lens unit GrB of the second lens unit Gr2 vertically to the optical axis (i.e. by parallel decentering it) as the image blur compensating lens unit. By this arrangement, the weight of the lens moved for image blur compensation and the lens frame are reduced, so that the burden on the image blur compensation driving system is lightened.

If a lens unit which is largely moved during zooming is used for image blur compensation, it is necessary to largely move the image blur compensating means together with the image blur compensating lens unit, so that the moving means is largely burdened during zooming. The zoom movement amount of the second lens unit is extremely small compared with the other lens units. Therefore, also in this regard, it is advantageous to use the front lens unit GrA or the rear lens unit GrB of the second lens unit Gr2 as the image blur compensating lens unit.

It is desirable that the movement amount of the image blur compensating lens unit at the time of image blur (i.e. image blur compensation movement amount) at the wide-angle limit [W] and that at the telephoto limit [T] do not largely differ from each other. Therefore, the tenth to fifteenth embodiments further fulfill the following condition (13):

$$0.4 < MT/MW < 2.5 \quad (13)$$

where MT is the blur compensation movement amount of either of the front or the rear lens unit moving vertically to an optical axis to compensate for an image blur at the telephoto limit [T], and MW is the blur compensation movement amount of either of the front or the rear lens unit moving vertically to an optical axis to compensate for an image blur at the wide-angle limit [W].

When the upper limit or the lower limit of the condition (13) is exceeded, the image blur compensation movement amount at the wide-angle limit [W] and that at the telephoto limit [T] largely differ from each other, so that error is prone to be caused in calculating the image blur compensation amount at a given focal length.

When the image blur compensating lens unit is parallel decentered at the time of image blur, axial lateral chromatic aberration which is one of the decentering aberrations is caused. To restrain this, it is desirable that the image blur compensating lens unit be color-corrected. Therefore, the tenth to fifteenth embodiments further fulfill the following condition (14):

$$vp > vn \qquad (14)$$

where νp is the Abbe number of the positive lens element included in either of the front or the rear lens unit moving vertically to an optical axis to compensate for an image blur, and νn is the Abbe number of the negative lens element included in either of the front or the rear lens unit moving vertically to an optical axis to compensate for an image blur.

When a lens unit is moved vertically to the optical axis AX for image blur compensation, in the compensated condition (post-decentering condition), the light passes through a place where no light passes in the normal condition (pre-decentering condition). There is a possibility that the light becomes harmful light and degrades the image quality. Therefore, it is desirable to cut off the harmful light during image blur compensation by providing a stationary aperture diaphragm S on the object side of the image blur compensating lens unit, in the image blur compensating lens unit or on the image side of the image blur compensating lens unit. By doing so, excellent image quality is obtained in the image blur compensated condition.

Tables 12 to 17 show construction data of the tenth to fifteenth embodiments (FIGS. 44, 48, 52, 56, 60 and 64). Table 18 shows values of the conditions (12) and (13) in the tenth to fifteenth embodiments. Table 19 shows data on refractive power in the tenth to fifteenth embodiments. In Table 19, φ1 is the refractive power of the first lens unit, φ2 is the refractive power of the second lens unit, and φL is the refractive power of the last lens unit.

FIGS. 45A to 45I, 49A to 49I, 53A to 53I, 57A to 57I, 61A to 61I and 65A to 65I show longitudinal aberration curves of the tenth to fifteenth embodiments. FIGS. 45A to 45C, 49A to 49C, 53A to 53C, 57A to 57C, 61A to 61C and 65A to 65C show aberration curves at the wide-angle limit [W] in the normal condition (pre-decentering condition). FIGS. 45D to 45F, 49D to 49F, 53D to 53F, 57D to 57F, 61D to 61F and 65D to 65F show aberration curves at the middle focal length condition [M] in the normal condition. FIGS. 45G to 45I, 49G to 49I, 53G to 53I, 57G to 57I, 61G to 61I and 65G to 65I show aberration curves at the telephoto limit [T] in the normal condition.

FIGS. 45A, 45D, 45G, 49A, 49D, 49G, 53A, 53D, 53G, 57A, 57D, 57G, 61A, 61D, 61G, 65A, 65D and 65G show spherical aberration and sine condition. The solid line d represents aberration to the d-line. The broken line SC represents sine condition. FIGS. 45B, 45E, 45H, 49B, 49E, 49H, 53B, 53E, 53H, 57B, 57E, 57H, 61B, 61E, 61H, 65B, 65E and 65H show astigmatism. The broken line DM and the solid line DS represent astigmatisms on the meridional image plane and on the sagittal image plane, respectively. FIGS. 45C, 45F, 45I, 49C, 49F, 49I, 53C, 53F, 53I, 57C, 57F, 57I, 61C, 61F, 61I, 65C, 65F and 65I show distortion.

FIGS. 46A to 46E, 50A to 50E, 54A to 54E, 58A to 58E, 62A to 62E and 66A to 66E show lateral aberration curves of the tenth to fifteenth embodiments at the wide-angle limit [W]. FIGS. 47A to 47E, 51A to 51E, 55A to 55E, 59A to 59E, 63A to 63E and 67A to 67E show lateral aberration curves of the tenth to fifteenth embodiments at the telephoto limit [T].

FIGS. 46A, 46B, 47A, 47B, 50A, 50B, 51A, 51B, 54A, 54B, 55A, 55B, 58A, 58B, 59A, 59B, 62A, 62B, 63A, 63B, 66A, 66B, 67A and 67B show lateral aberration (image height Y'=12, 0) with respect to the luminous flux on the meridional image plane before the decentering of the image blur compensating lens unit in the tenth to fifteenth embodiments. FIGS. 26C to 26E, 27C to 27E, 30C to 30E, 31C to 31E, 34C to 34E, 35C to 35E, 38C to 38E, 39C to 39E, 42C to 42E and 43C to 43E show lateral aberration (image height Y'=−12, 12, 0) with respect to the luminous flux on the meridional image plane after the decentering of the image blur compensating lens unit in the tenth to fifteenth embodiments. The aberration curves after the decentering show aberrations in the compensated condition when an image blur compensation angle θ of the image blur compensating lens unit is 0.7° (=0.0122173 rad.).

As described above, in the tenth to fifteenth embodiments, since the image blur compensating lens unit parallel decentered for image blur compensation is the lightweight front or rear lens unit GrA or GrB included in the second lens unit Gr2, the burden on the image blur compensation driving system is lightened. In addition, the zoom movements of the lens units and the power arrangement are effective in reducing the total length to achieve compactness.

<Sixteenth to Nineteenth Embodiments>

Figure 68:
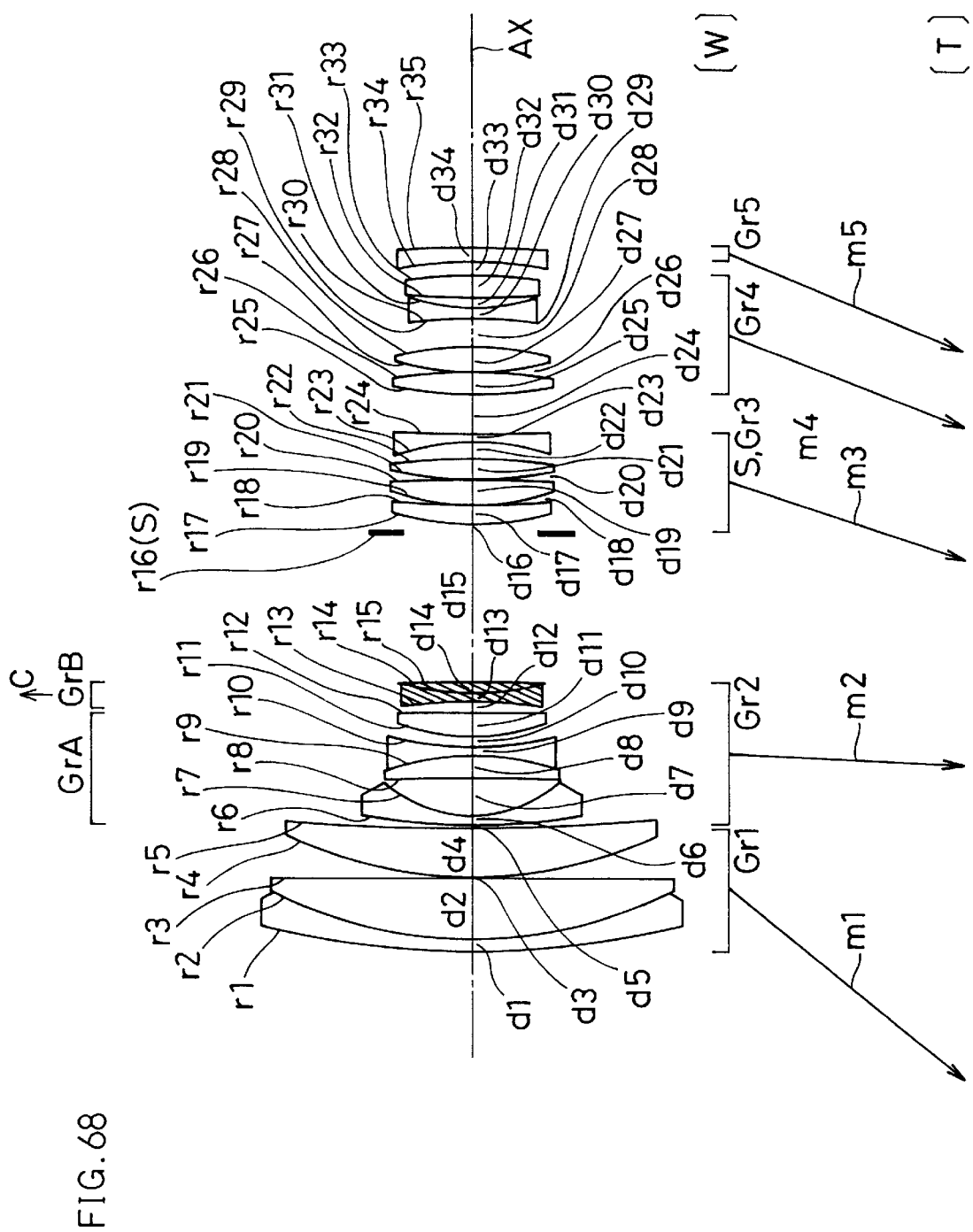
FIG. 68 shows the lens arrangement of a sixteenth embodiment.
Figure 69A:
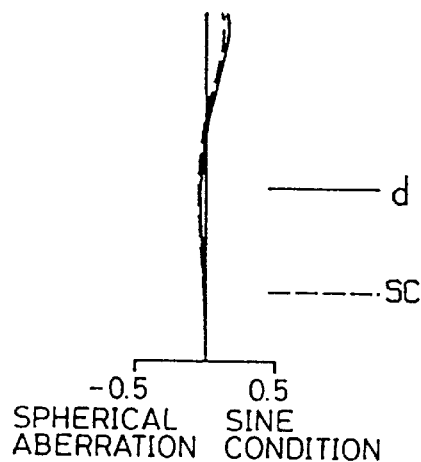
FIGS. 69A to 69I show longitudinal aberration curves of the sixteenth embodiment before decentering.
Figure 69B:
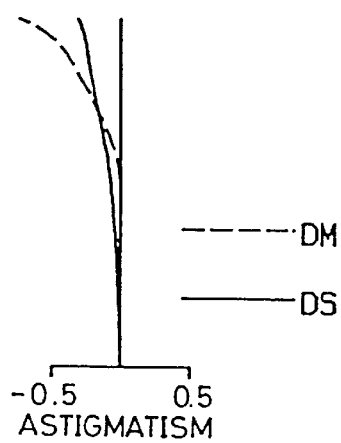
Figure 69C:
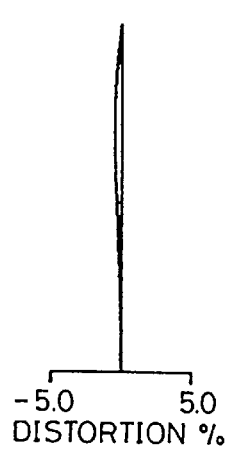
Figure 69D:
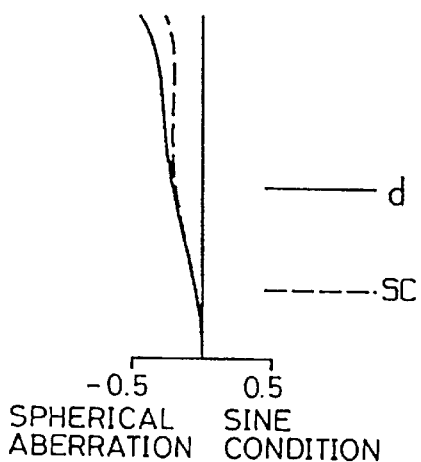
Figure 69E:
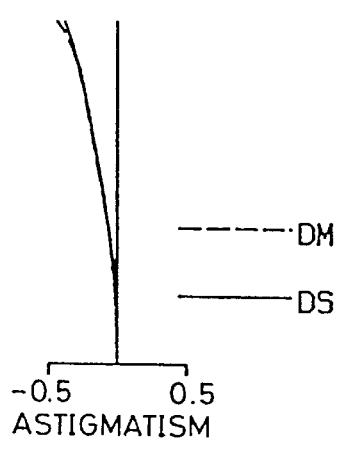
Figure 69F:
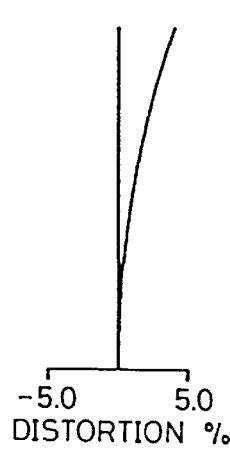
Figure 69G:
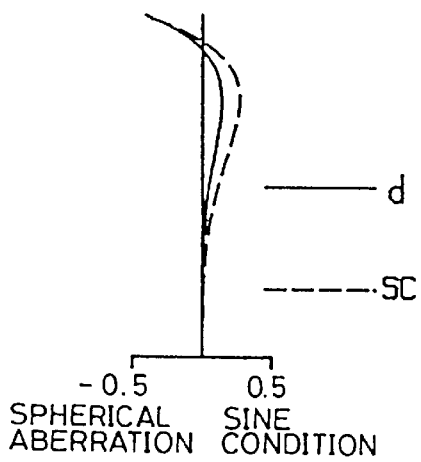
Figure 69H:
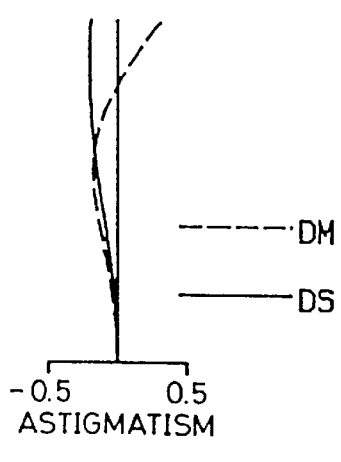
Figure 69I:
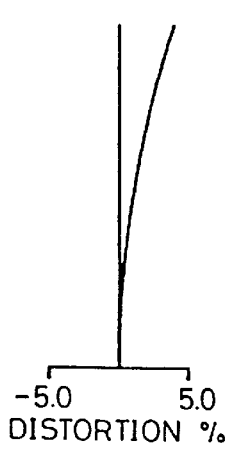
Figure 70A:
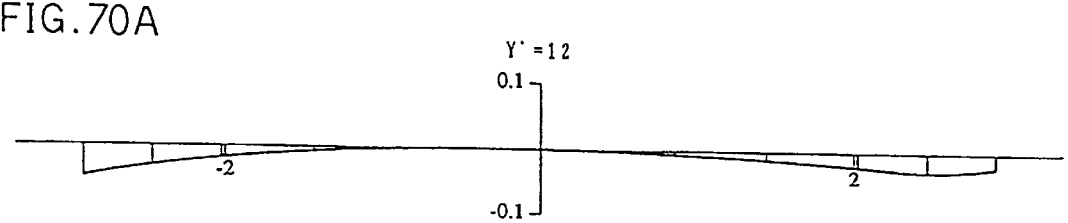
FIGS. 70A to 70E show meridional lateral aberration curves of the sixteenth embodiment at the wide angle limit before and after decentering.
Figure 70B:
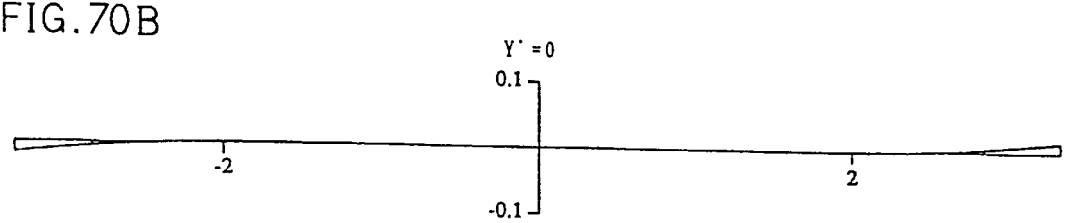
Figure 70C:
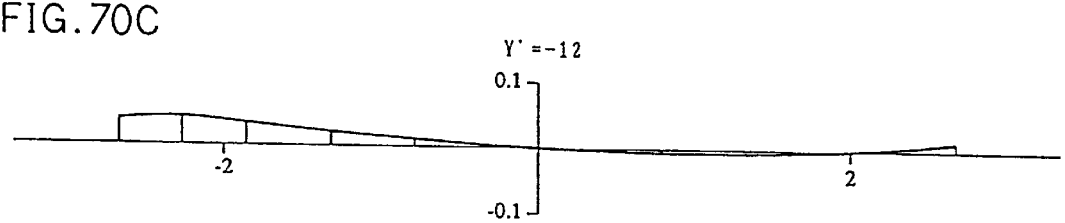
Figure 70D:
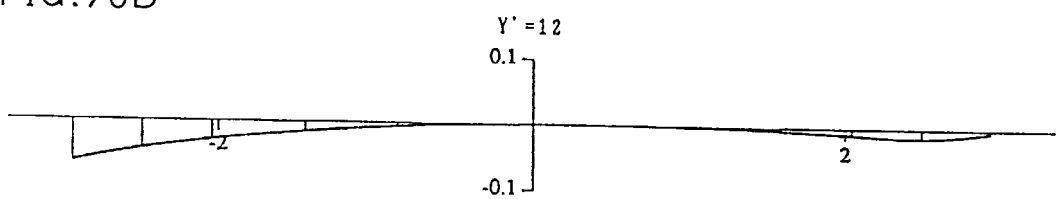
Figure 70E:
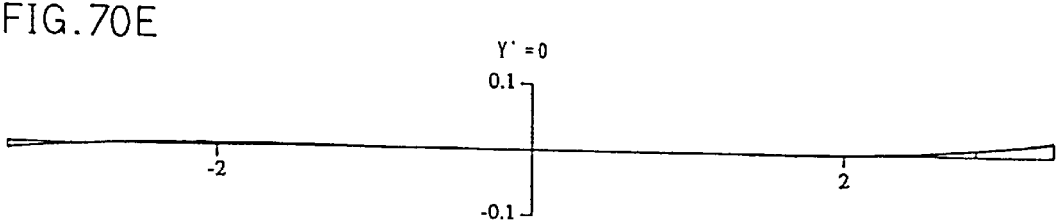
Figure 71A:
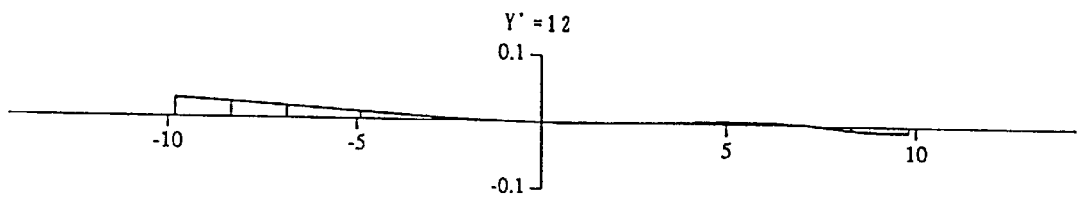
FIGS. 71A to 71E show meridional lateral aberration curves of the sixteenth embodiment at the telephoto limit before and after decentering.
Figure 71B:
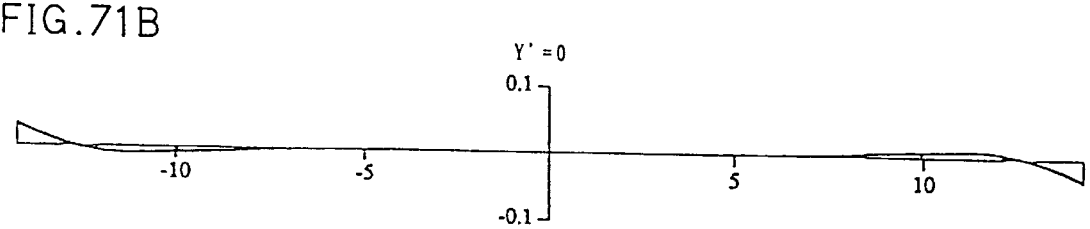
Figure 71C:
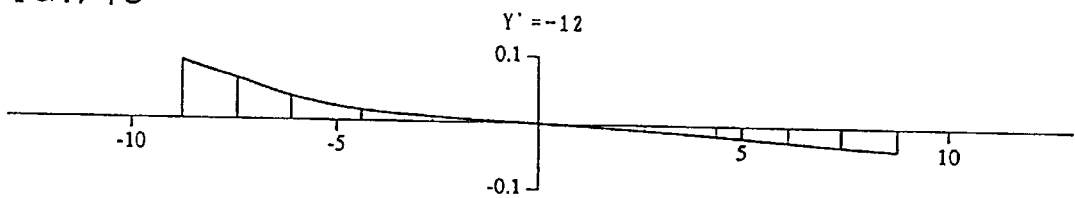
Figure 71D:
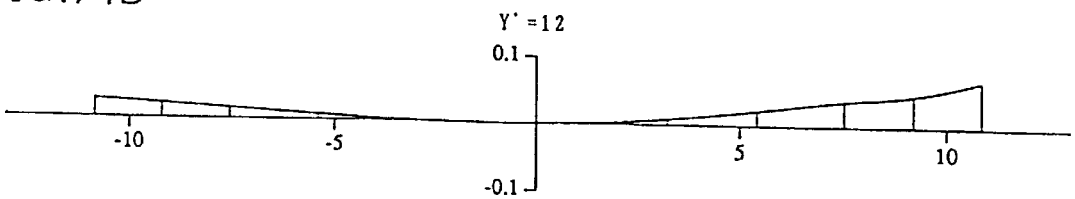
Figure 71E:
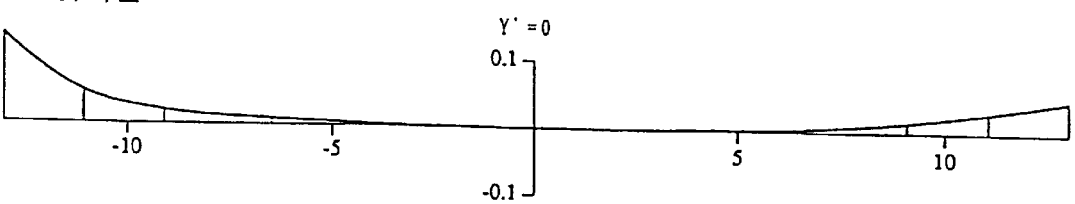

Zoom lens systems having an image blur compensating function according to the sixteenth to nineteenth embodiments will be described with reference to the drawings. FIGS. 68, 72, 76 and 80 show the lens arrangements of the sixteenth to nineteenth embodiments in the normal condition (pre-decentering condition) at the wide-angle limit [W]. In the figures, the surface marked with ri (i=1, 2, 3, . . . ) is an ith surface counted from the object side, and the axial distance marked with di (i=1, 2, 3, . . . ) is an ith axial distance counted from the object side. Arrows m1, m2, m3 and m4 of FIGS. 68, 72, 76 and 80 schematically show zoom movements of a first lens unit Gr1, a second lens unit r2, an aperture diaphragm S and a third lens unit Gr3, and a fourth lens unit Gr4 from the wide-angle limit [W] to the telephoto limit [T]. Arrow m5 of FIG. 68 schematically shows the zoom movement of a fifth lens unit Gr5 from the wide-angle limit [W] to the telephoto limit [T].

A zoom lens system of the sixteenth embodiment consists of, from the object side, a first lens unit Gr1 having a positive refractive power, a second lens unit Gr2 having a negative refractive power, a third lens unit Gr3 having a positive refractive power, a fourth lens unit Gr4 having a positive refractive power and a fifth lens unit Gr5 having a negative refractive power wherein zooming is performed by varying the distances between the lens units. In the sixteenth embodiment, the second lens unit Gr2 is divided into a front lens unit GrA and a rear lens unit GrB from the object side, and image blur compensation is made by parallel decentering the rear lens unit GrB (i.e. moving it vertically to the optical axis AX). In FIG. 68, arrow C represents the movement of the rear lens unit GrB during image blur correction.

Zoom lens systems of the seventeenth to nineteenth embodiments are zoom lens systems consisting of, from the object side, a first lens unit Gr1 having a positive refractive power, a second lens unit Gr2 having a negative refractive power, a third lens unit Gr3 having a positive refractive power and a fourth lens unit Gr4 having a positive refractive power wherein zooming is performed by varying the distances between the lens units.

Figure 72:
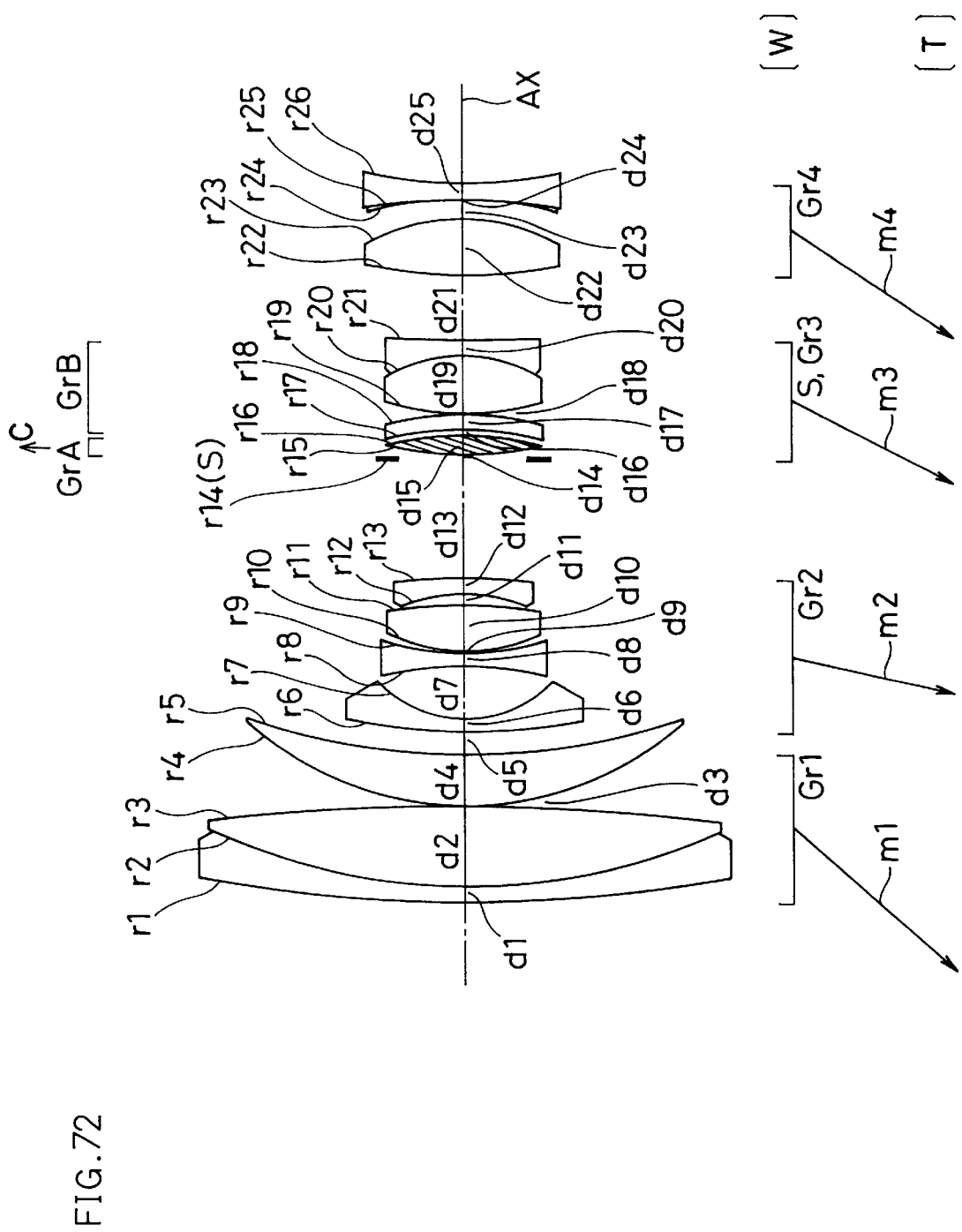
FIG. 72 shows the lens arrangement of a seventeenth embodiment.
Figure 73A:
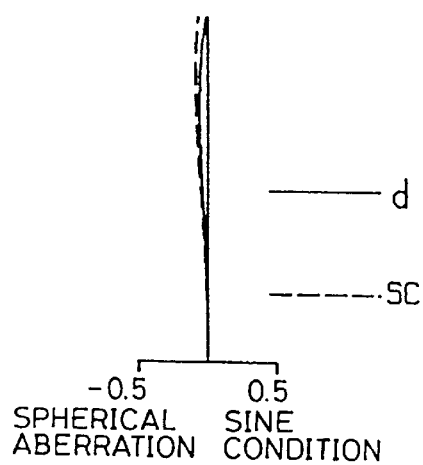
FIGS. 73A to 73I show longitudinal aberration curves of the seventeenth embodiment before decentering.
Figure 73B:
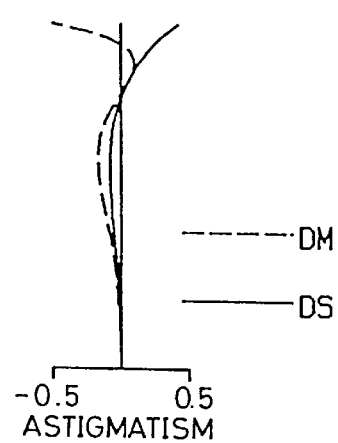
Figure 73C:
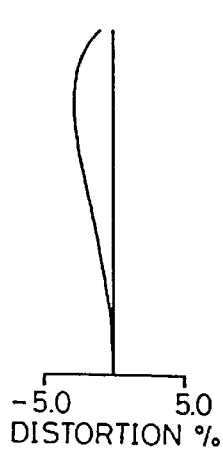
Figure 73D:
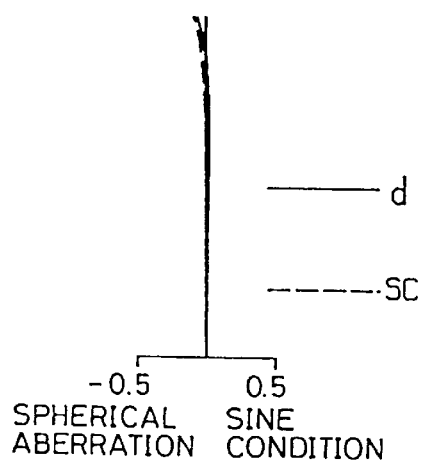
Figure 73E:
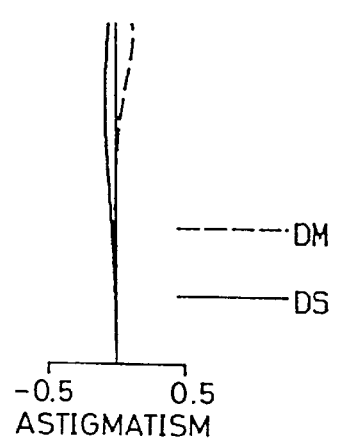
Figure 73F:
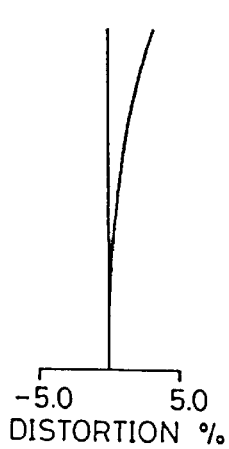
Figure 73G:
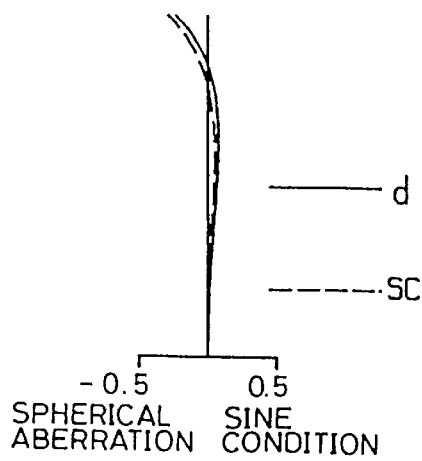
Figure 73H:
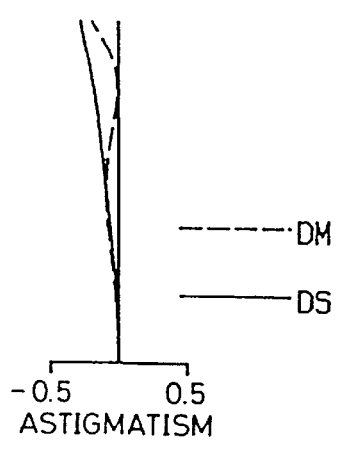
Figure 73I:
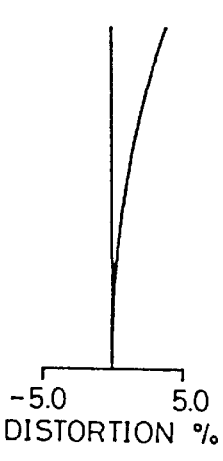
Figure 74A:
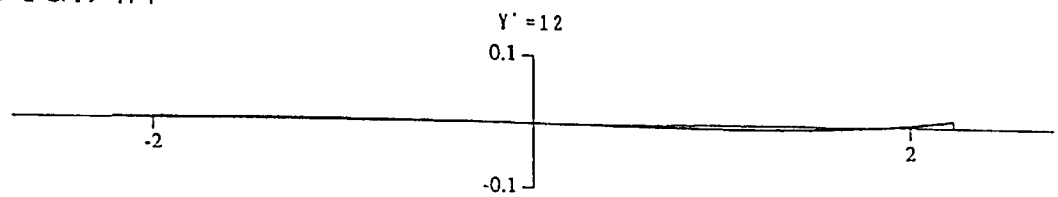
FIGS. 74A to 74E show meridional lateral aberration curves of the seventeenth embodiment at the wide angle limit before and after decentering.
Figure 74B:
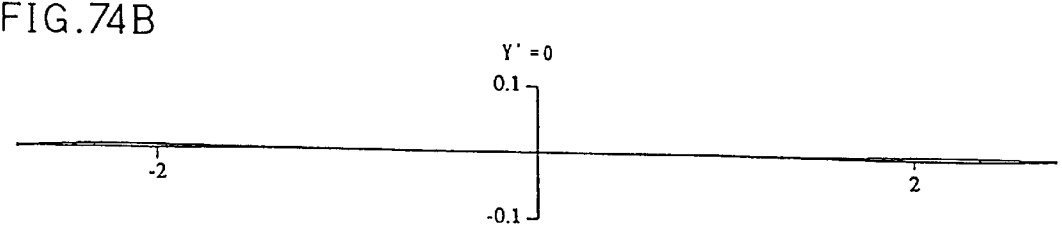
Figure 74C:
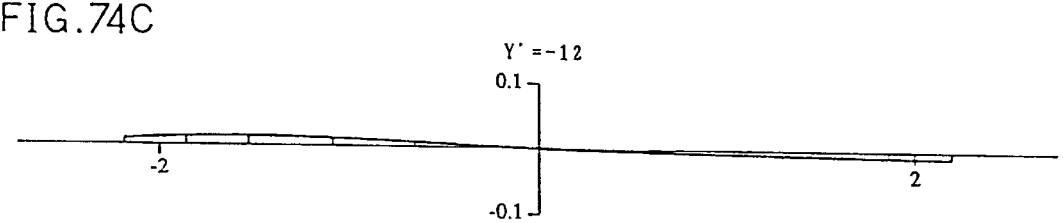
Figure 74D:
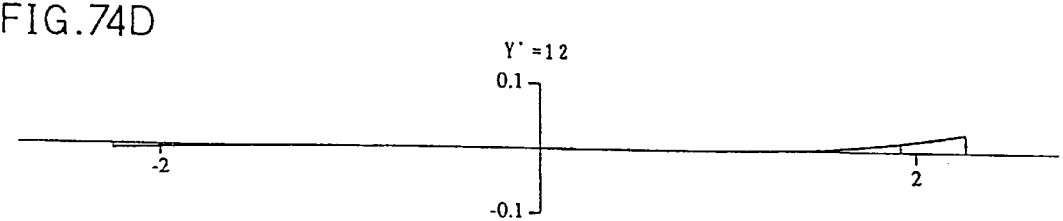
Figure 74E:
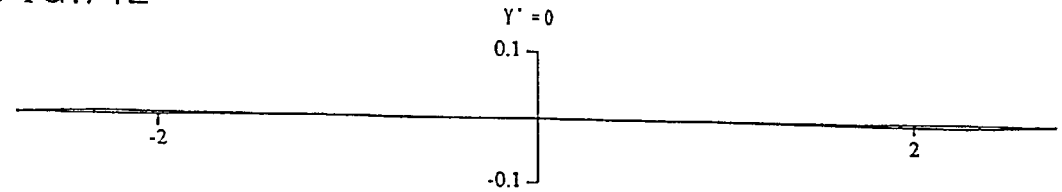
Figure 75A:
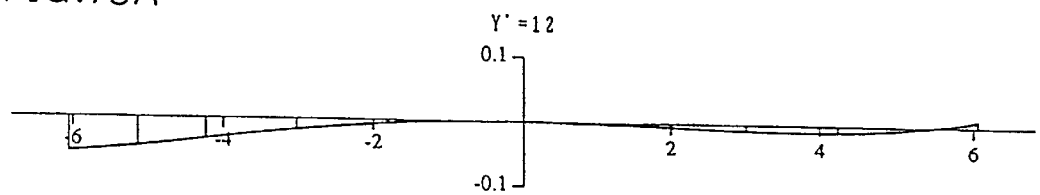
FIGS. 75A to 75E show meridional lateral aberration curves of the seventeenth embodiment at the telephoto limit before and after decentering.
Figure 75B:
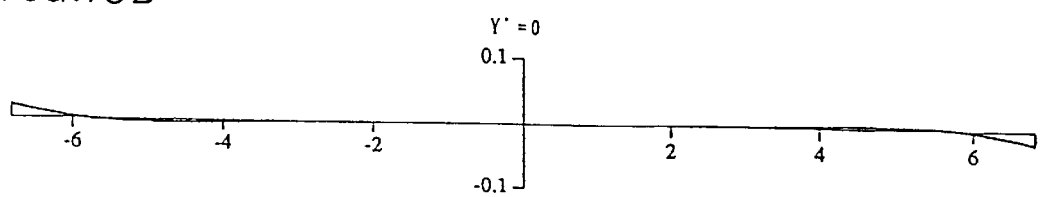
Figure 75C:
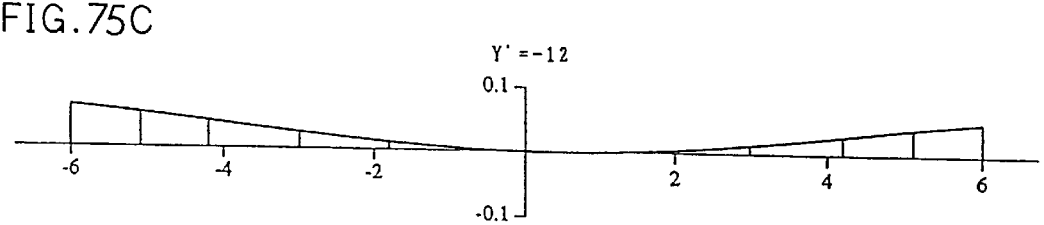
Figure 75D:
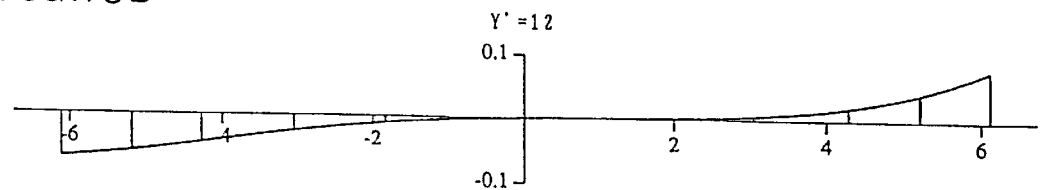
Figure 75E:
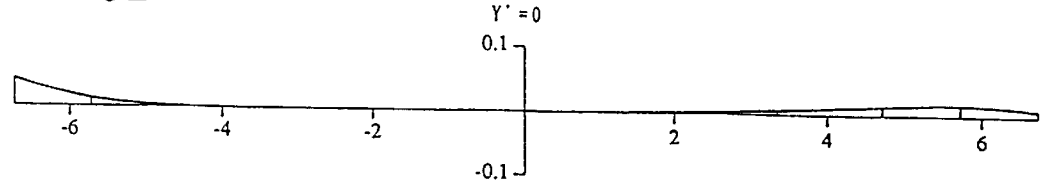
Figure 76:
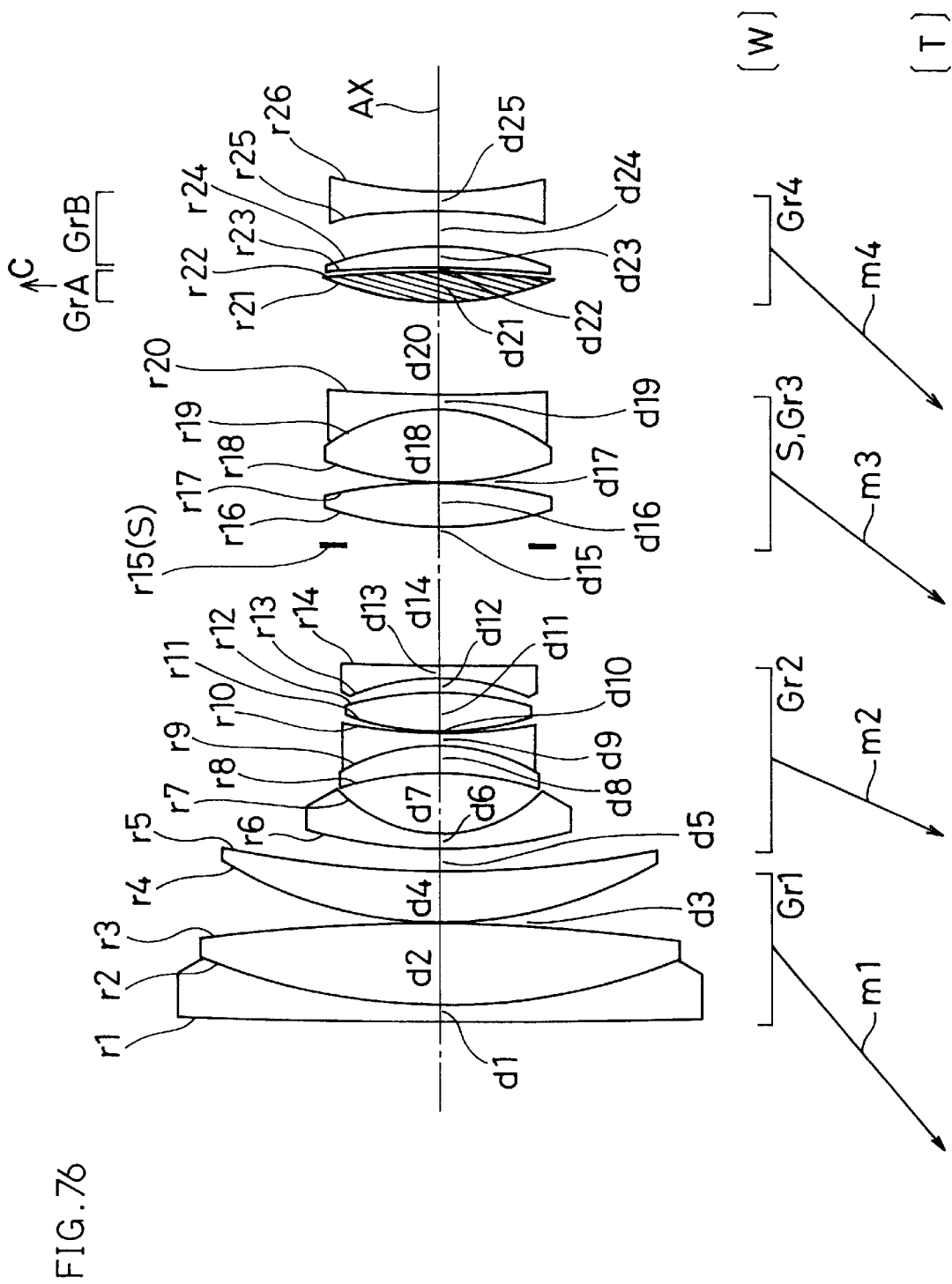
FIG. 76 shows the lens arrangement of an eighteenth embodiment.
Figure 78A:
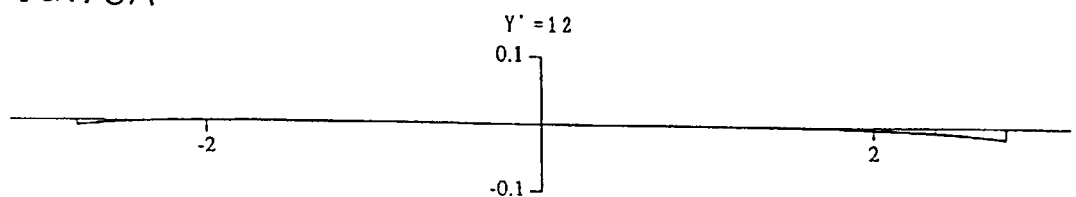
FIGS. 78A to 78E show meridional lateral aberration curves of the eighteenth embodiment at the wide angle limit before and after decentering.
Figure 78B:
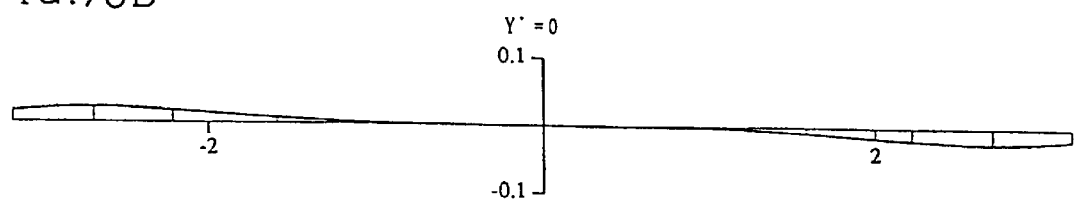
Figure 78C:
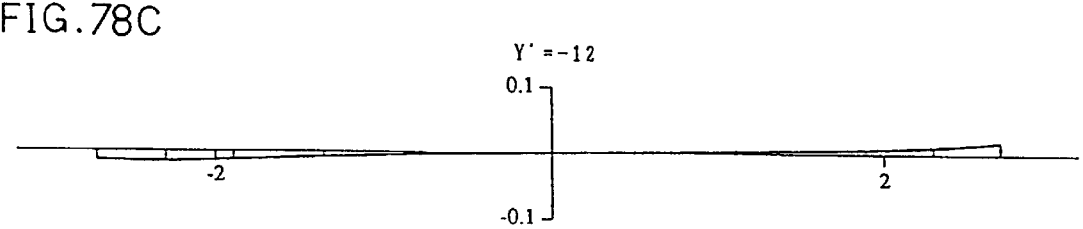
Figure 78D:
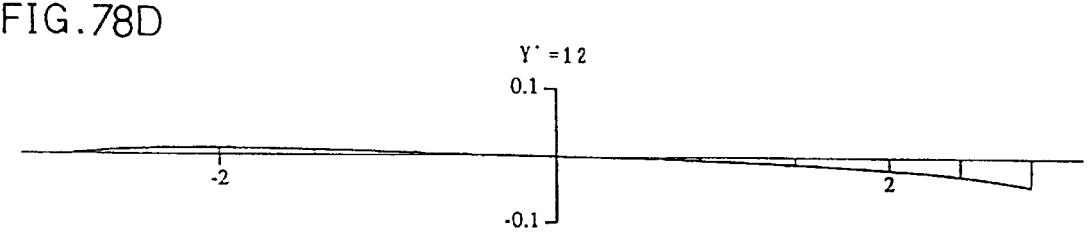
Figure 78E:
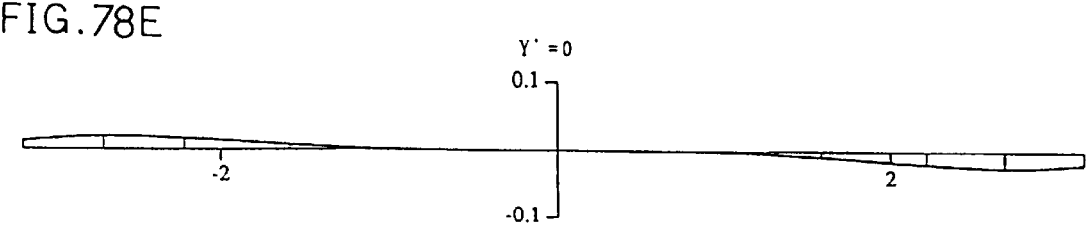
Figure 79A:
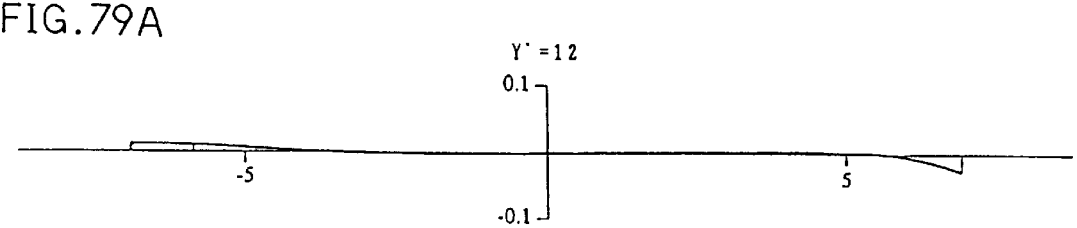
FIGS. 79A to 79E show meridional lateral aberration curves of the eighteenth embodiment at the telephoto limit before and after decentering.
Figure 79B:
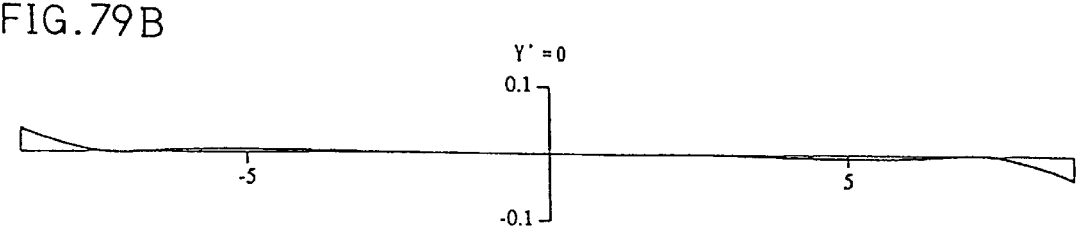
Figure 79C:
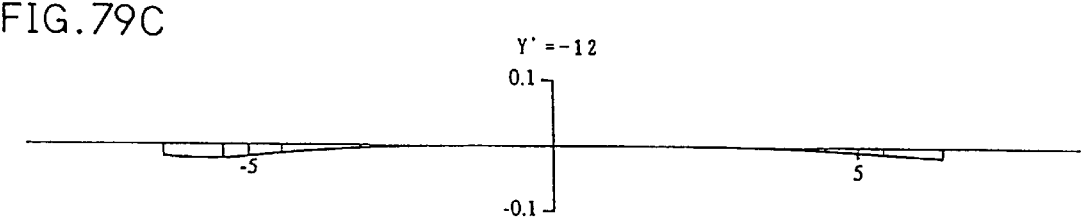
Figure 79D:
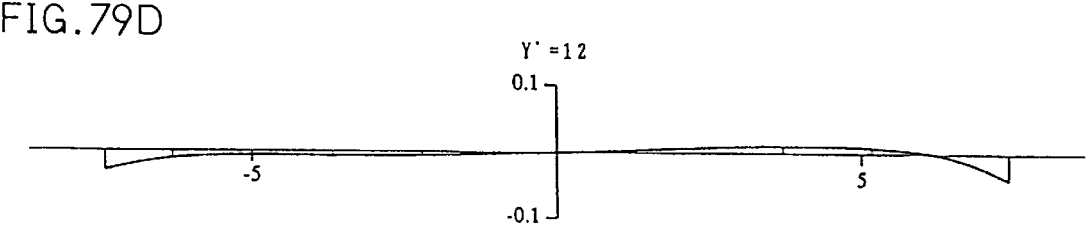
Figure 79E:
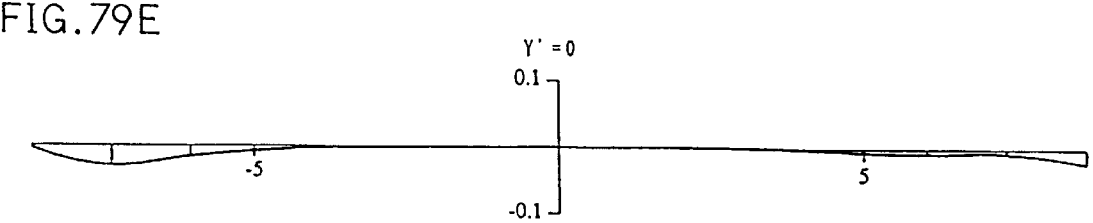
Figure 80:
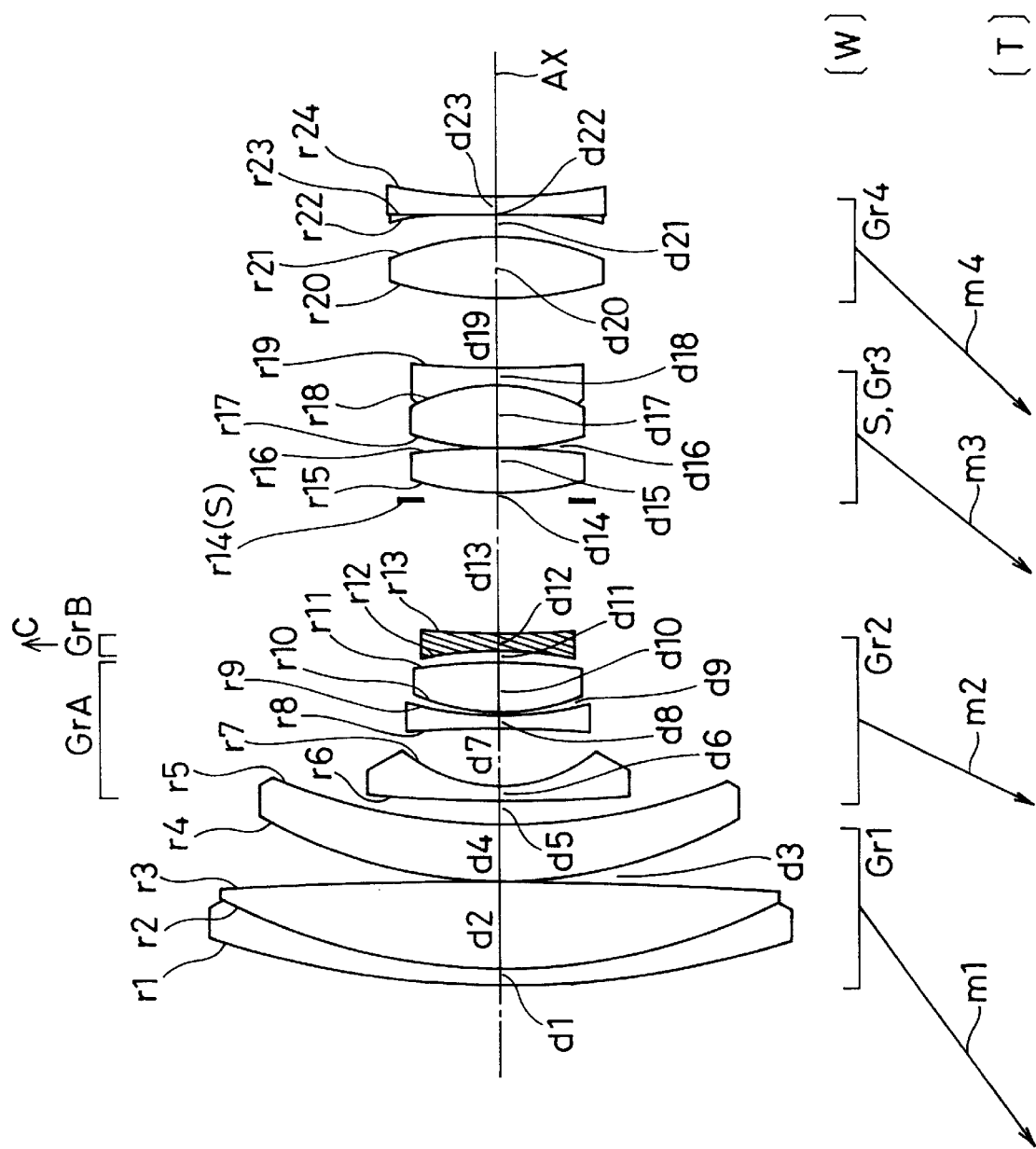
FIG. 80 shows the lens arrangement of a nineteenth embodiment.
Figure 82A:
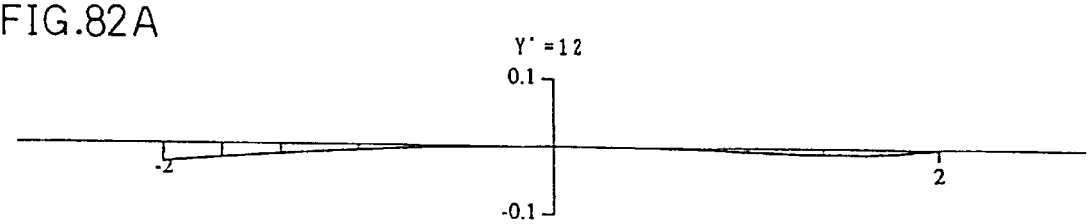
FIGS. 82A to 82E show meridional lateral aberration curves of the nineteenth embodiment at the wide angle limit before and after decentering.
Figure 82B:
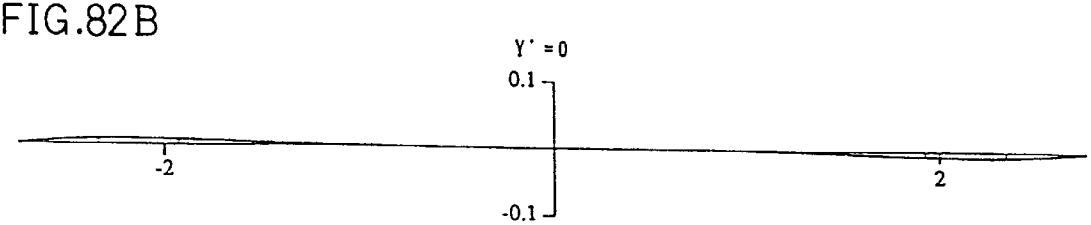
Figure 82C:
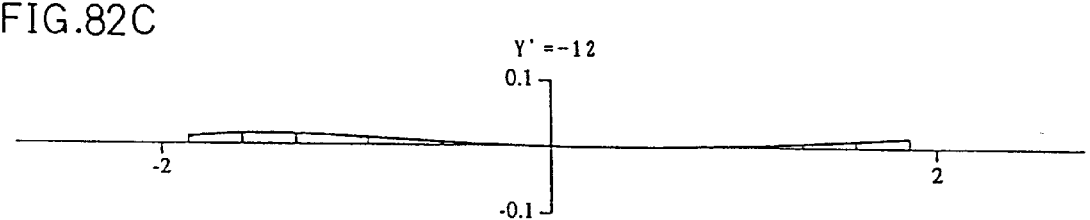
Figure 82D:
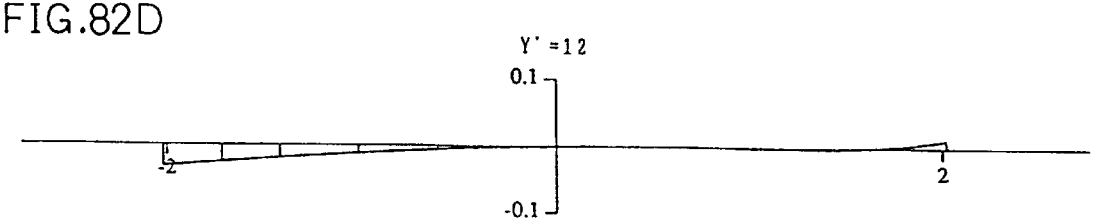
Figure 82E:
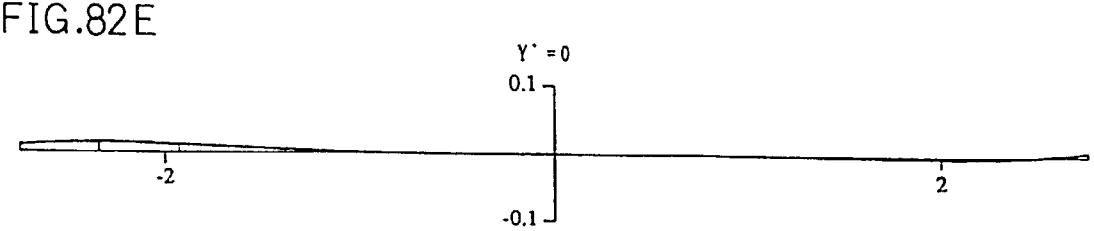
Figure 83A:
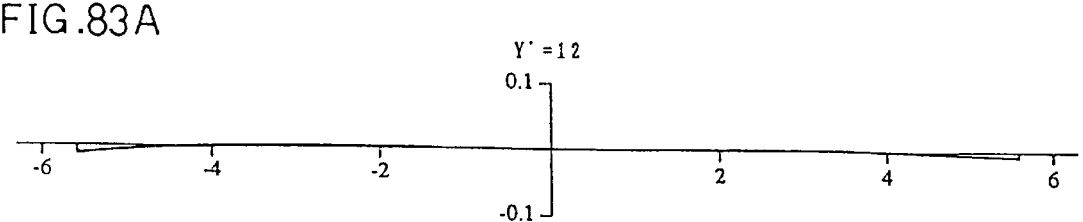
FIGS. 83A to 83E show meridional lateral aberration curves of the nineteenth embodiment at the telephoto limit before and after decentering.
Figure 83B:
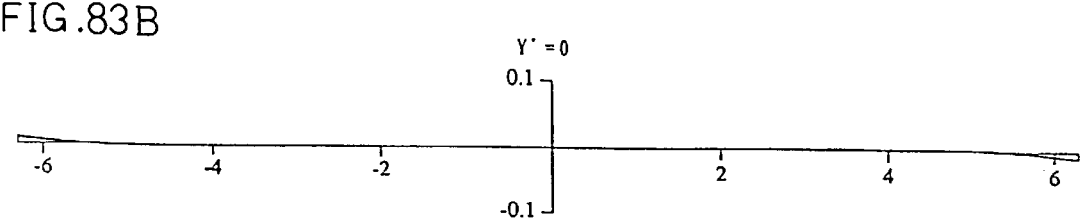
Figure 83C:
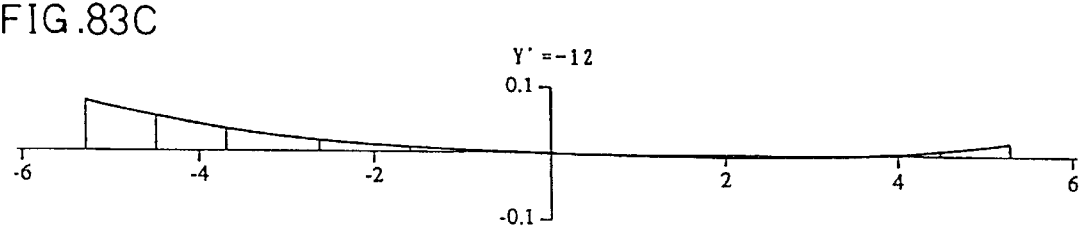
Figure 83D:
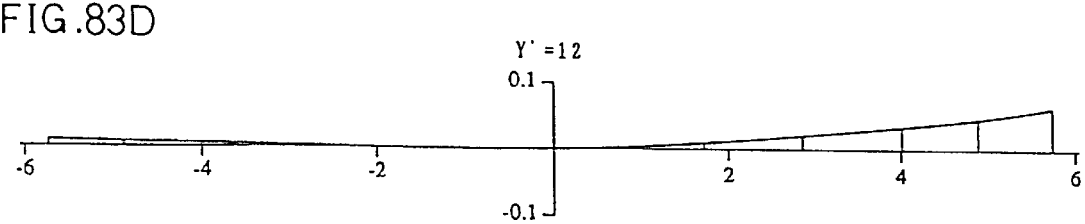
Figure 83E:
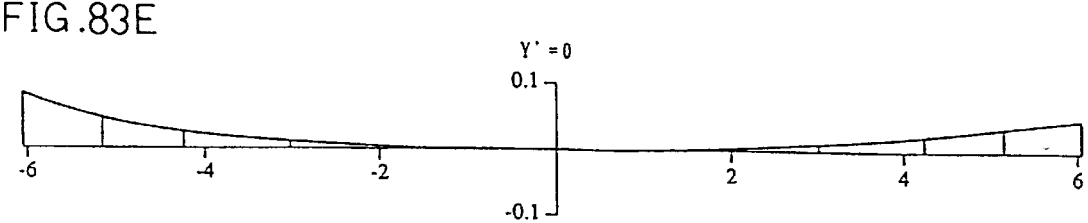

In the seventeenth embodiment, the third lens unit Gr3 is divided into a front lens unit GrA and a rear lens unit GrB from the object side, and image blur compensation is made by parallel decentering the front lens unit GrA. In FIG. 72, arrow C represents the movement of the front lens unit GrA during image blur correction. In the eighteenth embodiment, the fourth lens unit Gr4 is divided into a front lens unit GrA and a rear lens unit GrB from the object side, and image blur compensation is made by parallel decentering the front lens unit GrA. In FIG. 76, arrow C represents the movement of the front lens unit GrA during image blur correction. In the nineteenth embodiment, the second lens unit Gr2 is divided into a front lens unit GrA and a rear lens unit GrB from the object side, and image blur compensation is made by parallel decentering the rear lens unit GrB. In FIG. 80, arrow C represents the movement of the rear lens unit GrB during image blur correction.

In the seventeenth and eighteenth embodiments, the image side surface of the front lens unit GrA serving as the image blur compensating lens unit is an aspherical surface (i.e. r16 in the seventeenth embodiment, and r22 in the eighteenth embodiment), and the lens disposed directly on the image side of the front lens unit GrA has an aspherical surface (i.e. r17 in the seventeenth embodiment, and r23 in the eighteenth embodiment) which cancels the aspherical surface of the front lens unit GrA. That is, the facing surfaces of the front and rear lens units GrA and GrB are aspherical surfaces which cancel each other. By this arrangement, aberrations caused at the time of image blur are excellently corrected without any change in the image quality to be obtained in normal photographing.

The sixteenth to nineteenth embodiments include from the object side the first lens unit Gr1 having a positive refractive power, the second lens unit Gr2 having a negative refractive power and the third lens unit Gr3 having a positive refractive power so that they are suitable for use as the standard zoom lens systems and the standard high-magnification zoom lens systems for single lens reflex cameras. In this type of zoom lens systems including positive, negative, positive lens units, the degree of freedom of the movements of the zoom lens units is effectively used for aberration correction. As a result, excellent image quality is obtained in the entire zoom range even though the zoom lens systems are high-magnification zoom lens systems including the wide-angle range.

Since the first lens unit Gr1 is moved toward the object side during zooming from the wide-angle limit [W] to the telephoto limit [T], the zoom lens systems is in a retro-type arrangement at the wide-angle limit [W] and in a telephoto-type arrangement at the telephoto limit [T]. For this reason, a sufficient back focal length is secured and an optical system being short in total length is achieved. Further, by arranging so that the second lens unit Gr2 and the third lens unit Gr3 are moved toward the object side during zooming from the wide-angle limit [W] to the telephoto limit [T], the degree of freedom of the movements of the zoom lens units increases, so that an optical system is obtained which is advantageous in correcting aberration and has a further reduced total length.

In this type of zoom lens systems, since the zoom lens units positively perform zooming, the aberration burden on the zoom lens units is considerably heavy. For this reason, it is extremely difficult to correct aberrations caused in each of the zoom lens units by use of only one single lens or one doublet lens. Therefore, it is desirable that the zoom lens units include a plurality of lens elements.

The sixteenth to nineteenth embodiments fulfill the conditions (6) to (11) noted above. When the condition (6) is fulfilled with an upper limit of 1.3, a more compact optical system is obtained; when the condition (6) is fulfilled with a lower limit of 0.8, still better image quality is obtained. When the condition (7) is fulfilled with an upper limit of 3.8, a more compact optical system is obtained; when the condition (7) is fulfilled with a lower limit of 2.5, still better image quality is obtained. Moreover, when the condition (9) is fulfilled with an upper limit of 1.6, an optical system having its aberration further corrected is obtained.

Tables 20 to 23 show construction data of the sixteenth to nineteenth embodiments (FIGS. 68, 72, 76 and 80). Table 24 shows values of the conditions (6) to (9) in the sixteenth to nineteenth embodiments.

FIGS. 69A to 69I, 73A to 73I, 77A to 77I and 81A to 81I show longitudinal aberration curves of the sixteenth to nineteenth embodiments. FIGS. 69A to 69C, 73A to 73C, 77A to 77C and 81A to 81C show aberration curves at the wide-angle limit [W] in the normal condition (pre-decentering condition). FIGS. 69D to 69F, 73D to 73F, 77D to 77F and 81D to 81F show aberration curves at the middle focal length condition [M] in the normal condition. FIGS. 69G to 69I, 73G to 73I, 77G to 77I and 81G to 81I show aberration curves at the telephoto limit [T] in the normal condition.

FIGS. 69A, 69D, 69G, 73A, 73D, 73G, 77A, 77D, 77G, 81A, 81D and 81G show spherical aberration and sine condition. The solid line d represents aberration to the d-line. The broken line SC represents sine condition. FIGS. 69B, 69E, 69H, 73B, 73E, 73H, 77B, 77E, 77H, 81B, 81E and 81H show astigmatism. The broken line DM and the solid line DS represent astigmatisms on the meridional image plane and on the sagittal image plane, respectively. FIGS. 69C, 69F, 69I, 73C, 73F, 73I, 77C, 77F, 77I, 81C, 81F and 81I show distortion.

FIGS. 70A to 70E, 74A to 74E, 78A to 78E and 82A to 82E show lateral aberration curves of the sixteenth to nineteenth embodiments at the wide-angle limit [W]. FIGS. 71A to 71E, 75A to 75E, 79A to 79E and 83A to 83E show lateral aberration curves of the sixteenth to nineteenth embodiments at the telephoto limit [T].

FIGS. 70A, 70B, 71A, 71B, 74A, 74B, 75A, 75B, 78A, 78B, 79A, 79B, 82A, 82B, 83A and 83B show lateral aberration (image height Y'=12, 0) with respect to the luminous flux on the meridional image plane before the decentering of the image blur compensating lens unit in the sixteenth to nineteenth embodiments. FIGS. 70C to 70E, 71C to 71E, 74C to 74E, 75C to 75E, 78C to 78E, 79C to 79E, 82C to 82E and 83C to 83E show lateral aberration (image height Y'=−12, 12, 0) with respect to the luminous flux on the meridional image plane after the decentering of the image blur compensating lens unit in the sixteenth to nineteenth embodiments. The aberration curves after the decentering show aberrations in the compensated condition when an image blur compensation angle θ of the image blur compensating lens unit is 0.7° (=0.0122173 rad.).

As described above, in the sixteenth to nineteenth embodiments, since the image blur compensating lens unit parallel decentered for image blur compensation is a light-weight front or rear lens unit GrA or GrB included in the second, third or fourth lens unit Gr2, Gr3 or Gr4, the burden on the image blur compensation driving system is lightened. In addition, since the power arrangement and the zoom movement arrangement are effective in reducing the total length to achieve compactness and the above-described conditions are fulfilled, high description quality is obtained without any degradation of compactness.

<Twentieth to Twenty-second Embodiments>

Figure 84:
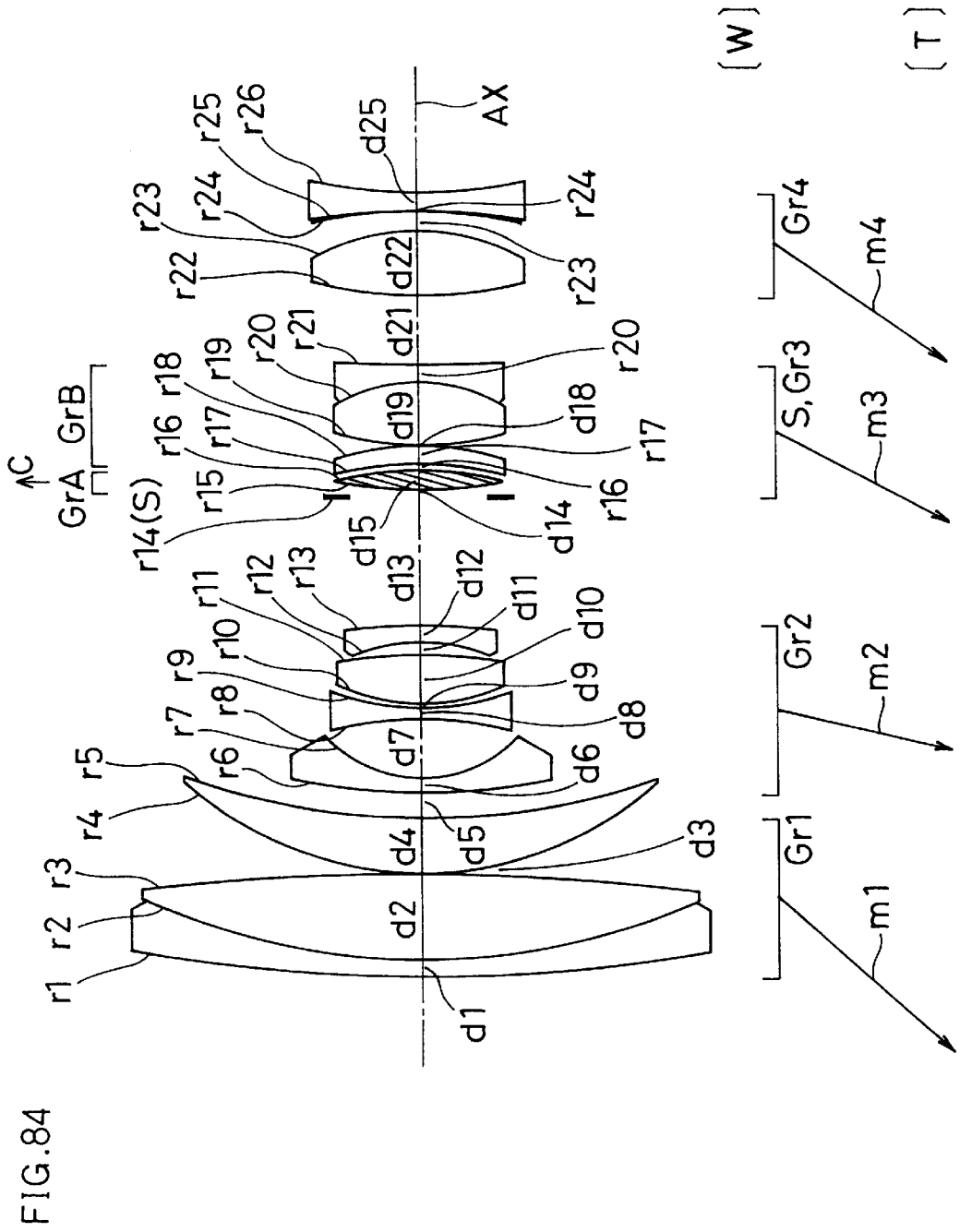
FIG. 84 shows the lens arrangement of a twentieth embodiment.
Figure 85A:
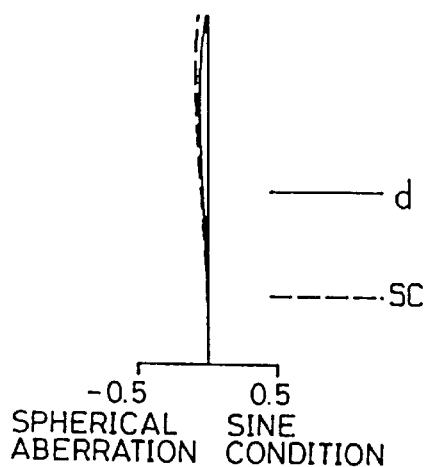
FIGS. 85A to 85I show longitudinal aberration curves of the twentieth embodiment before decentering.
Figure 85B:
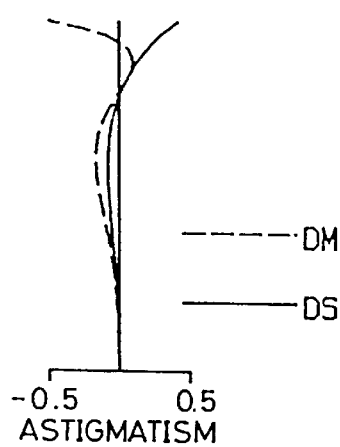
Figure 85C:
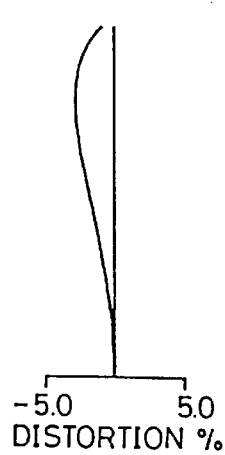
Figure 85D:
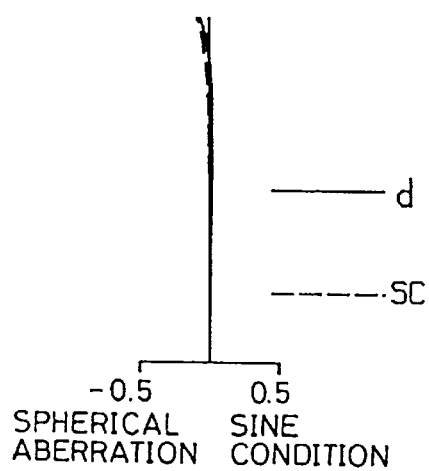
Figure 85E:
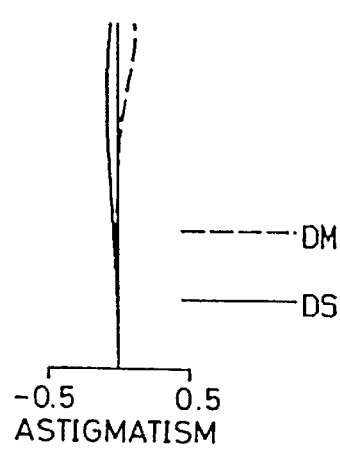
Figure 85F:
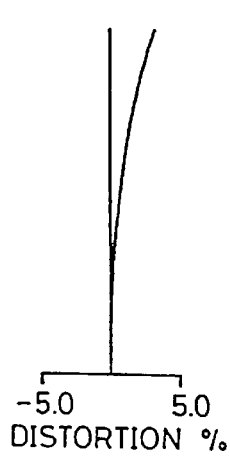
Figure 85G:
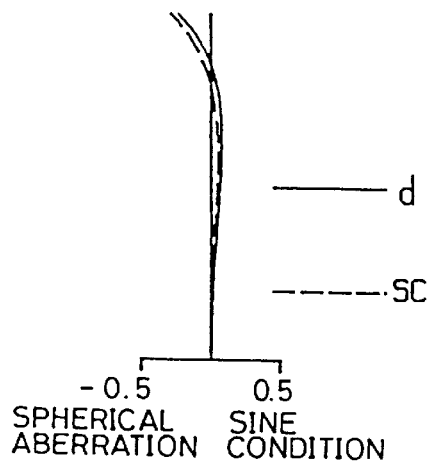
Figure 85H:
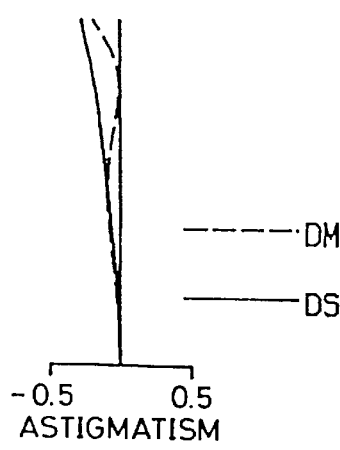
Figure 85I:
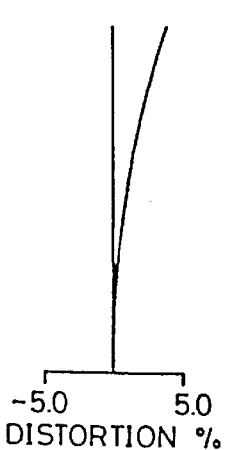
Figure 86A:
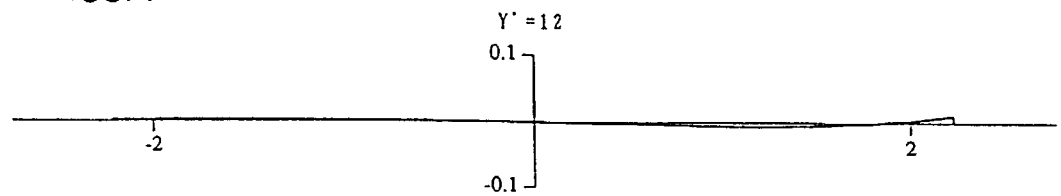
FIGS. 86A to 86E show meridional lateral aberration curves of the twentieth embodiment at the wide angle limit before and after decentering.
Figure 86B:
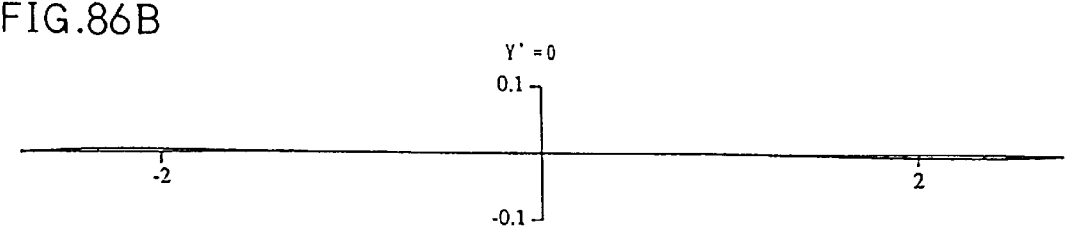
Figure 86C:
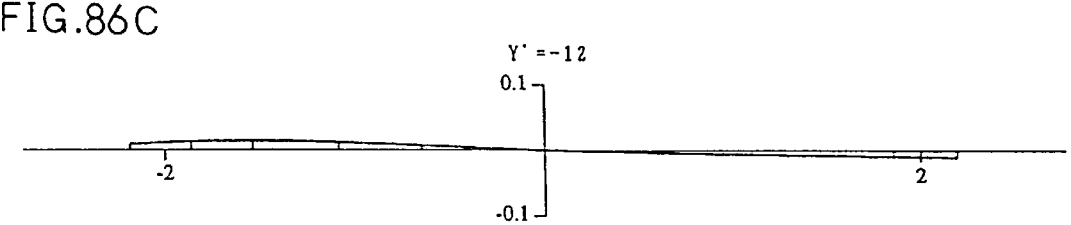
Figure 86D:
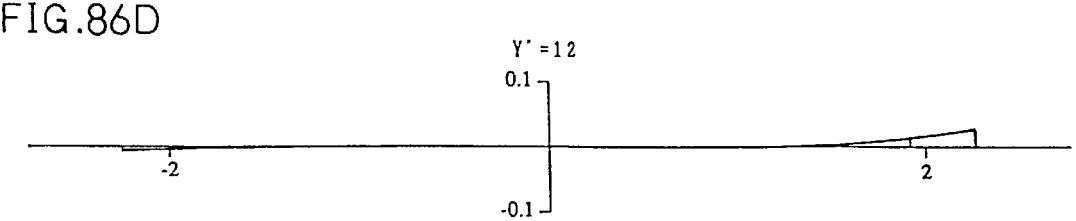
Figure 86E:
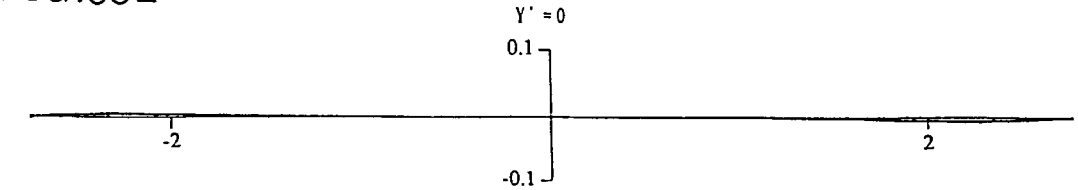
Figure 87A:
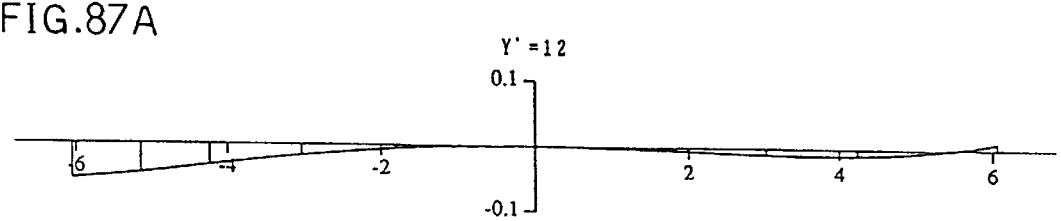
FIGS. 87A to 87E show meridional lateral aberration curves of the twentieth embodiment at the telephoto limit before and after decentering.
Figure 87B:
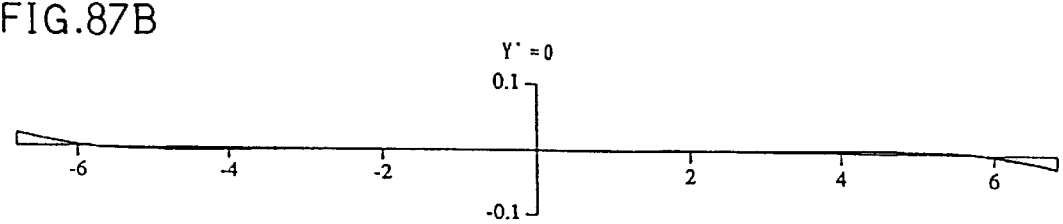
Figure 87C:
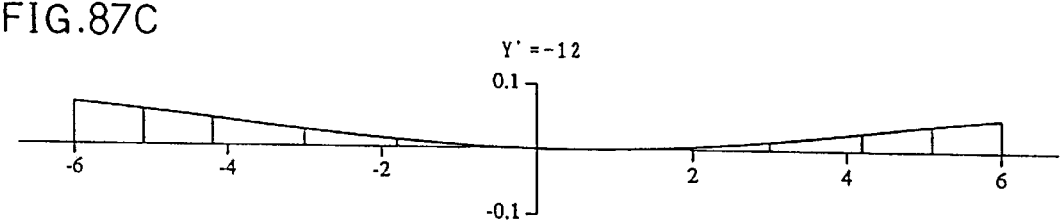
Figure 87D:
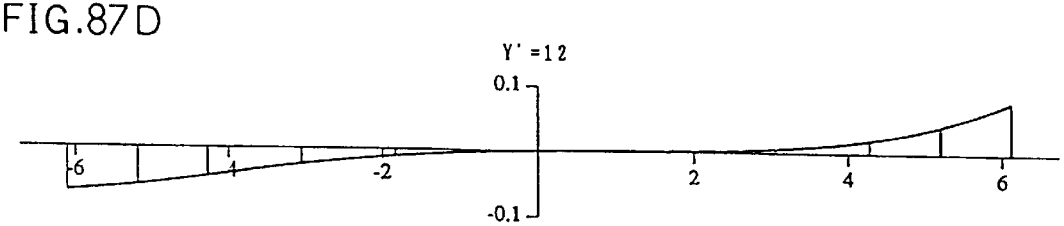
Figure 87E:
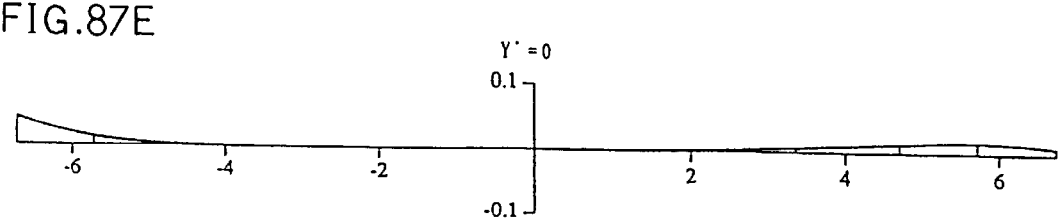
Figure 88:
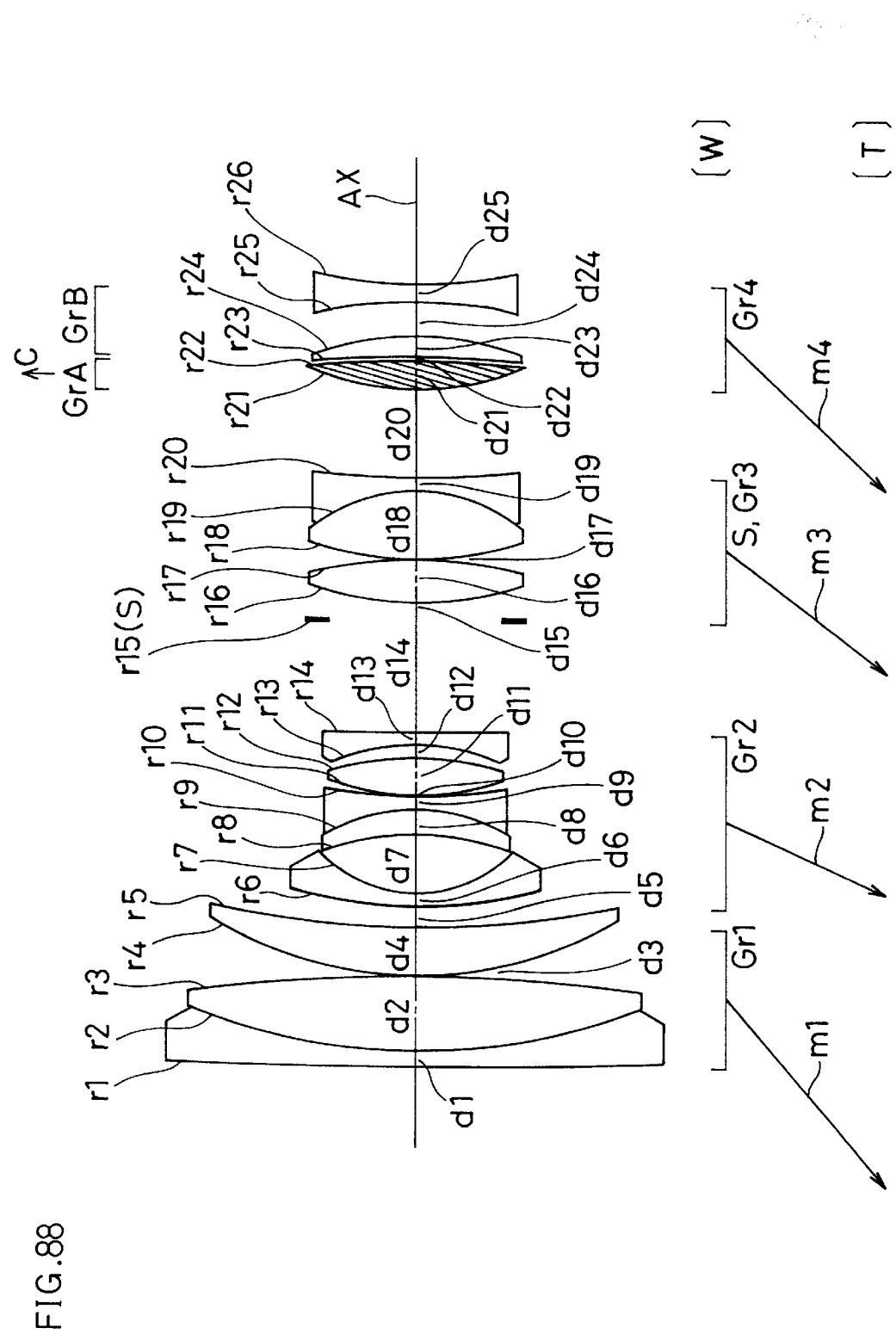
FIG. 88 shows the lens arrangement of a twenty-first embodiment.
Figure 89A:
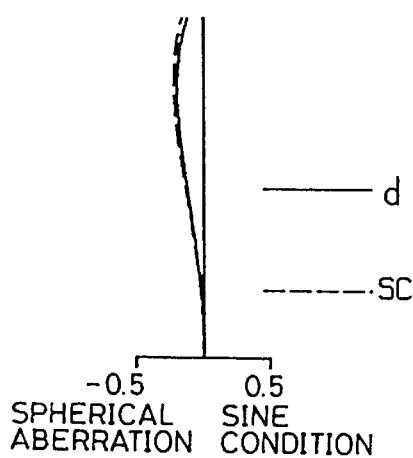
FIGS. 89A to 89I show longitudinal aberration curves of the twenty-first embodiment before decentering.
Figure 89B:
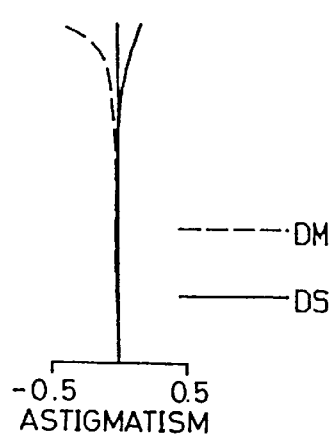
Figure 89C:
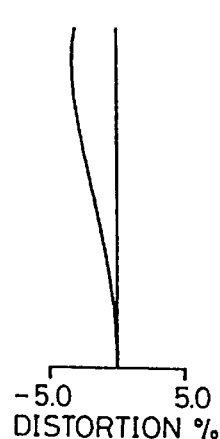
Figure 89D:
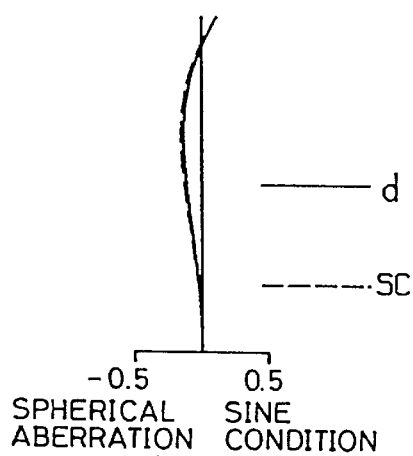
Figure 89E:
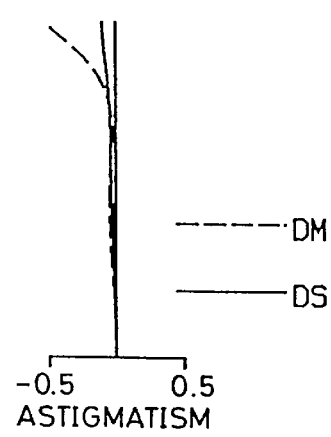
Figure 89F:
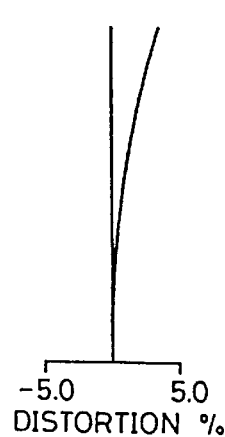
Figure 89G:
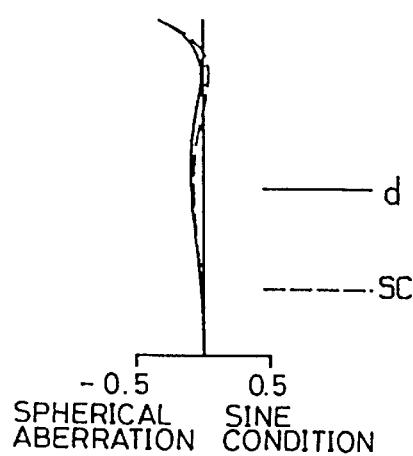
Figure 89H:
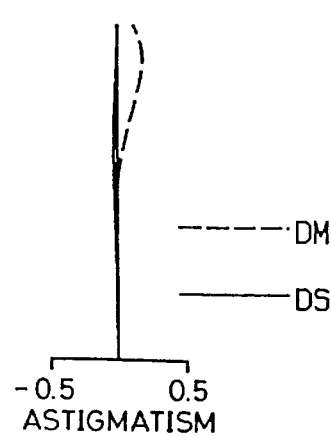
Figure 89I:
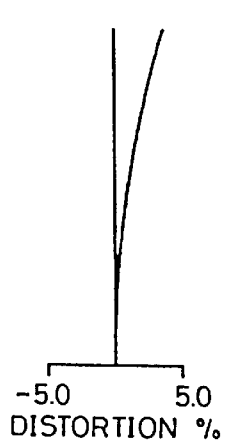
Figure 90A:
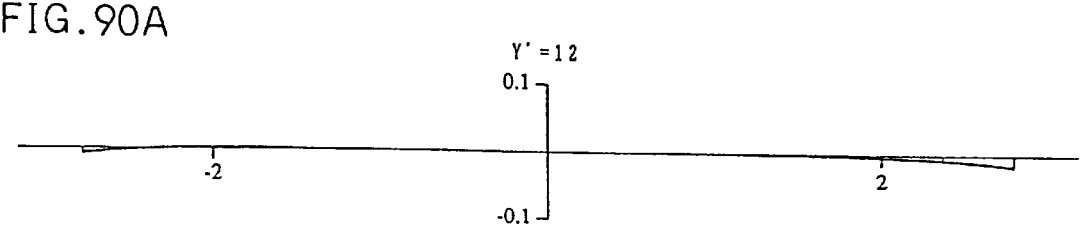
FIGS. 90A to 90E show meridional lateral aberration curves of the twenty-first embodiment at the wide angle limit before and after decentering.
Figure 90B:
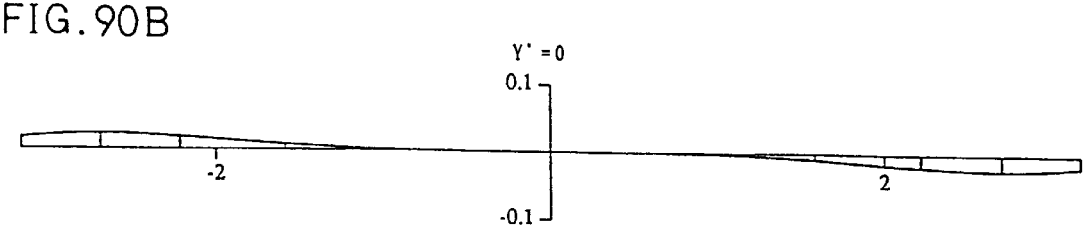
Figure 90C:
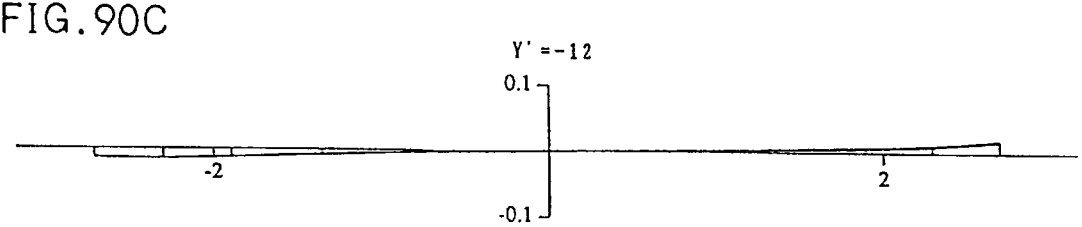
Figure 90D:
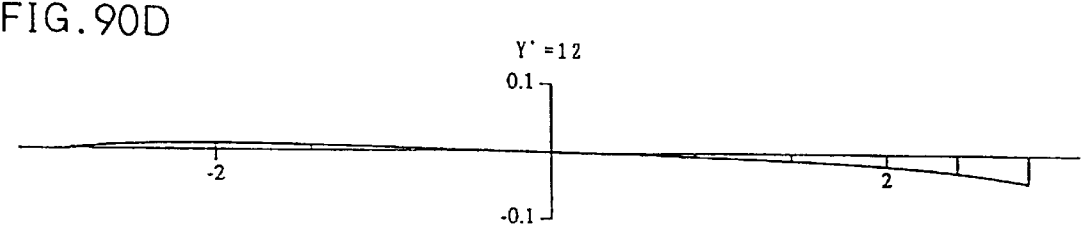
Figure 90E:
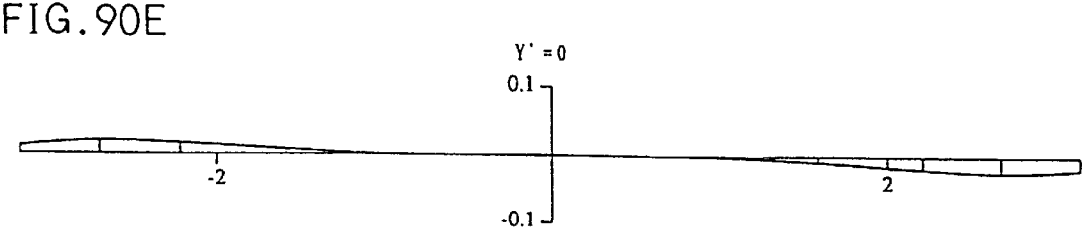
Figure 91A:
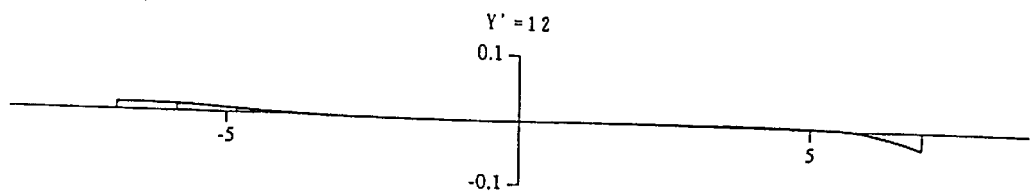
FIGS. 91A to 91E show meridional lateral aberration curves of the twenty-first embodiment at the telephoto limit before and after decentering.
Figure 91B:
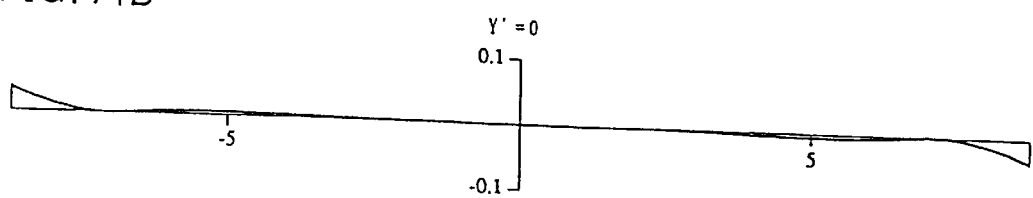
Figure 91C:
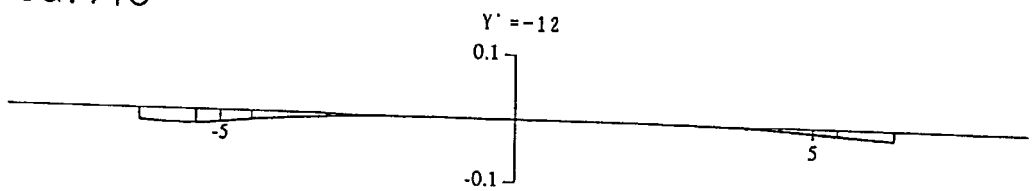
Figure 91D:
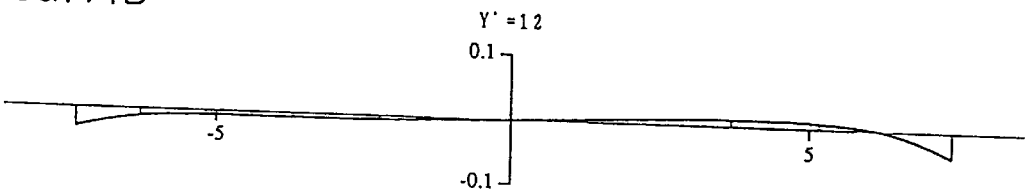
Figure 91E:
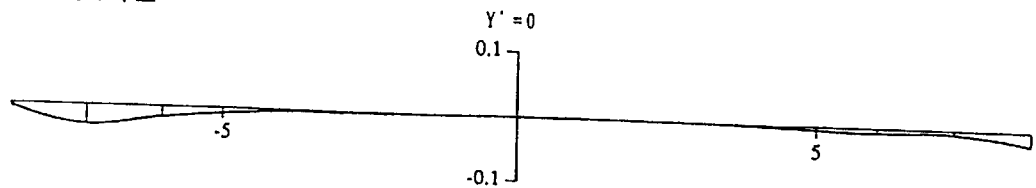
Figure 92:
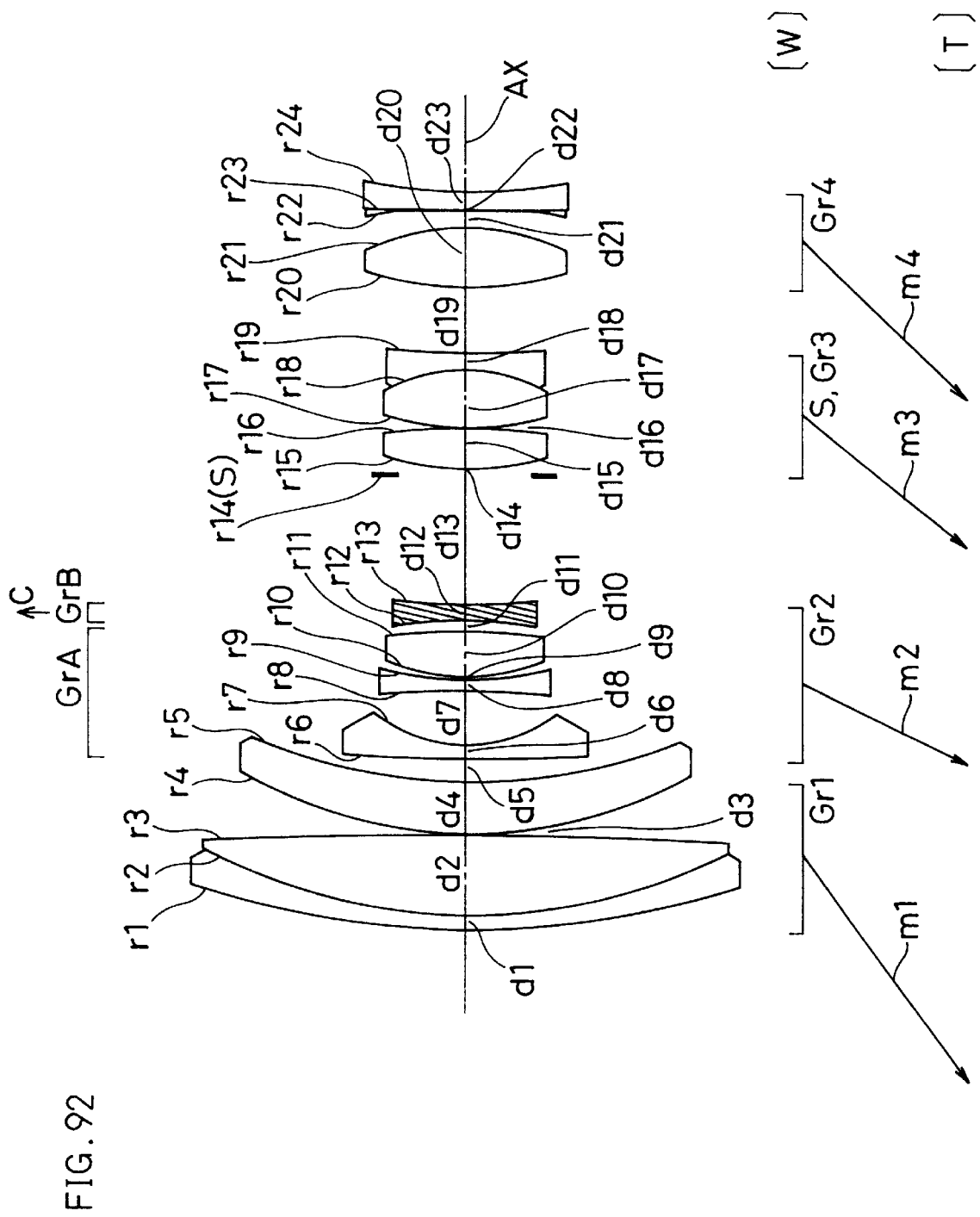
FIG. 92 shows the lens arrangement of a twenty-second embodiment.
Figure 93A:
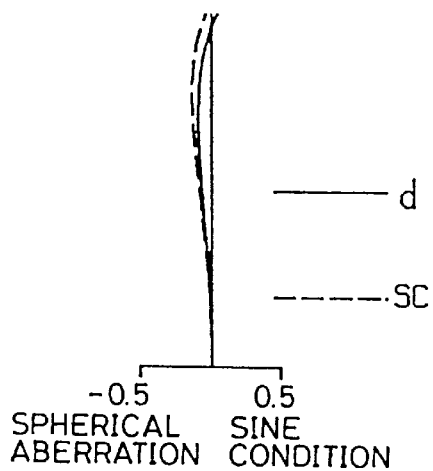
FIGS. 93A to 93I show longitudinal aberration curves of the twenty-second embodiment before decentering.
Figure 93B:
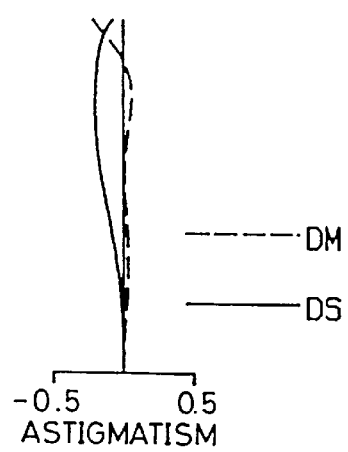
Figure 93C:
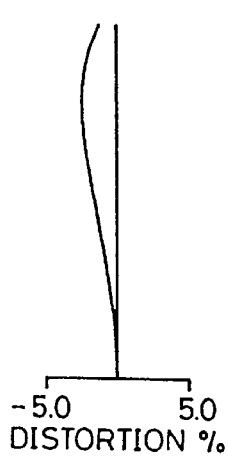
Figure 93D:
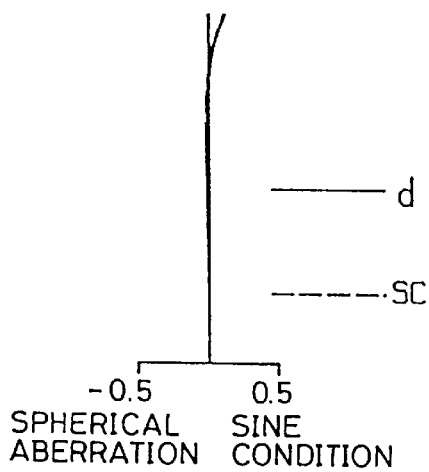
Figure 93E:
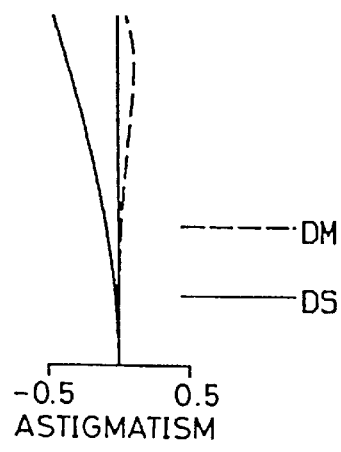
Figure 93F:
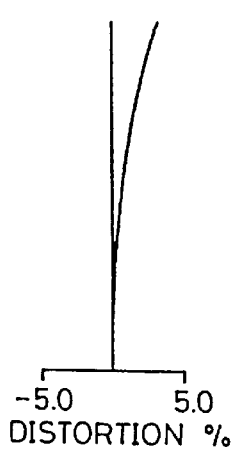
Figure 93G:
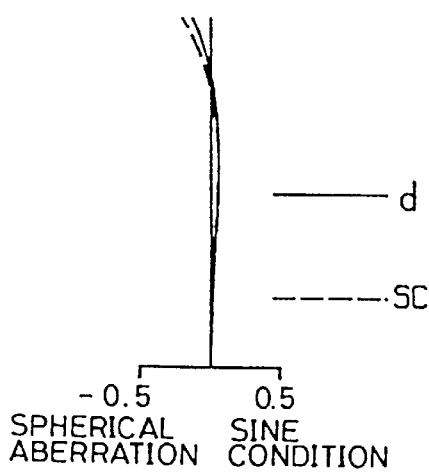
Figure 93H:
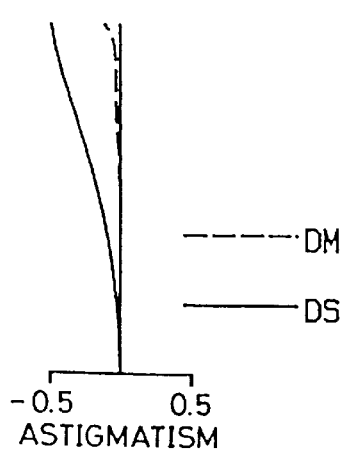
Figure 93I:
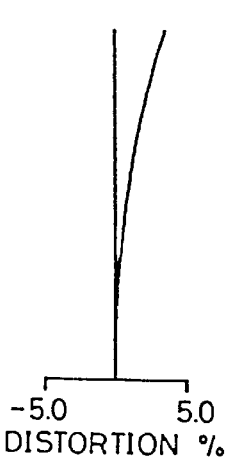
Figure 94A:
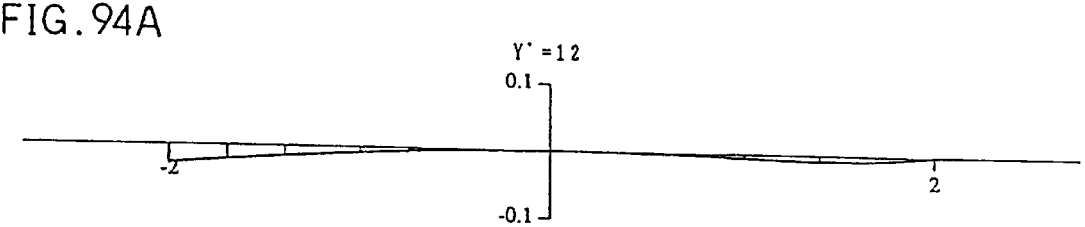
FIGS. 94A to 94E show meridional lateral aberration curves of the twenty-second embodiment at the wide angle limit before and after decentering.
Figure 94B:
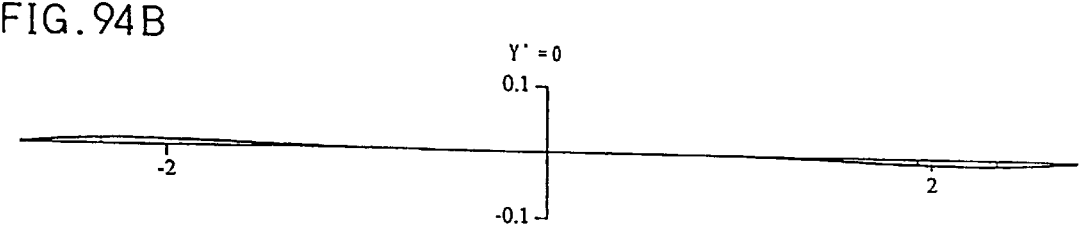
Figure 94C:
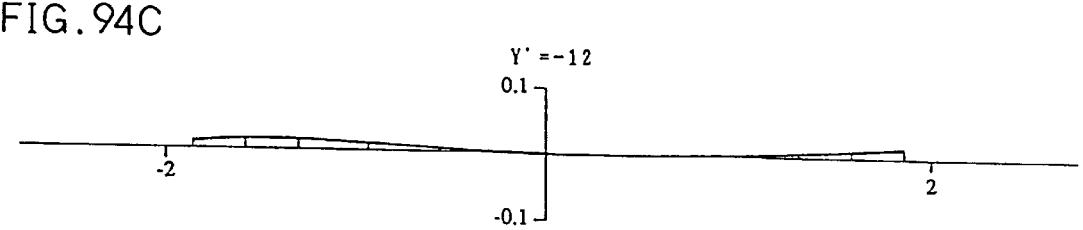
Figure 94D:
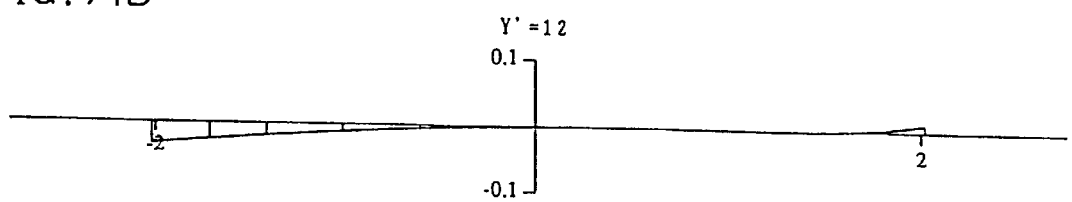
Figure 94E:
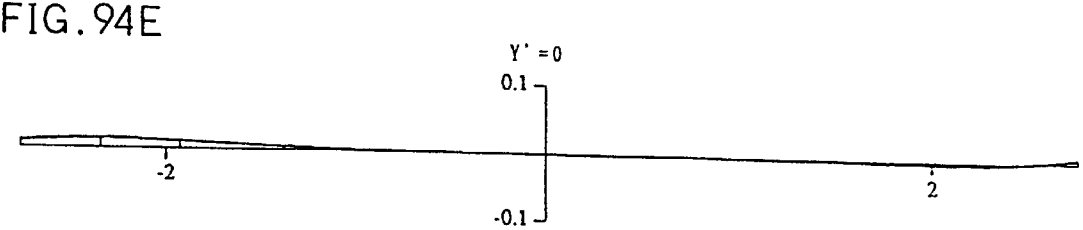
Figure 95A:
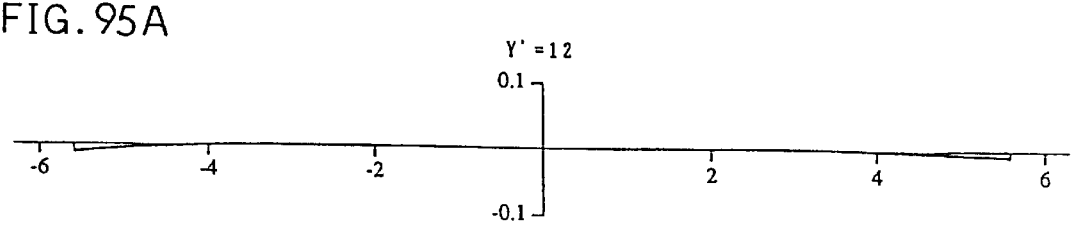
FIGS. 95A to 95E show meridional lateral aberration curves of the twenty-second embodiment at the telephoto limit before and after decentering.
Figure 95B:
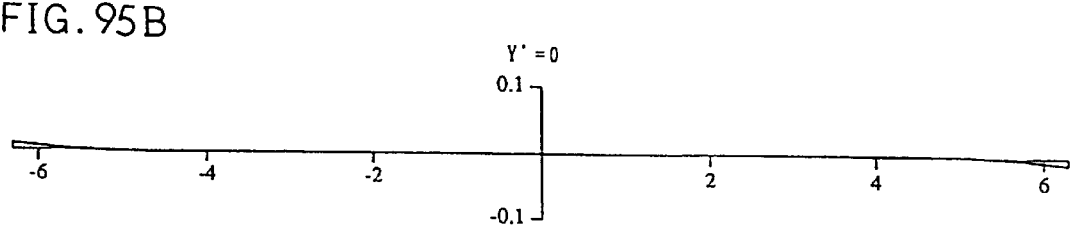
Figure 95C:
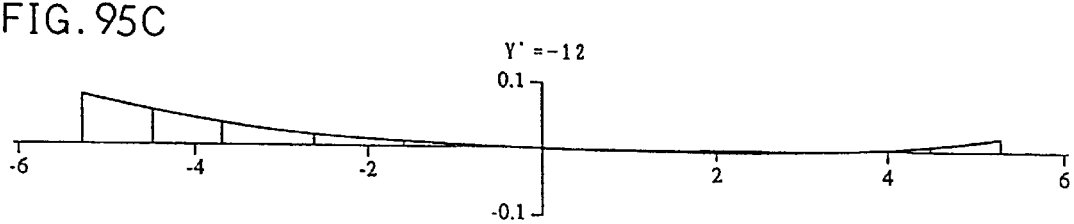
Figure 95D:
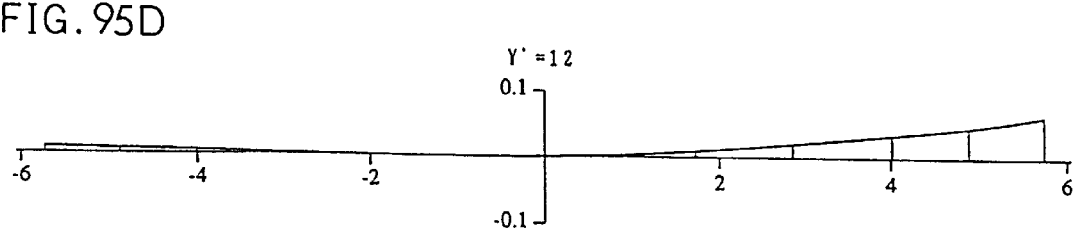
Figure 95E:
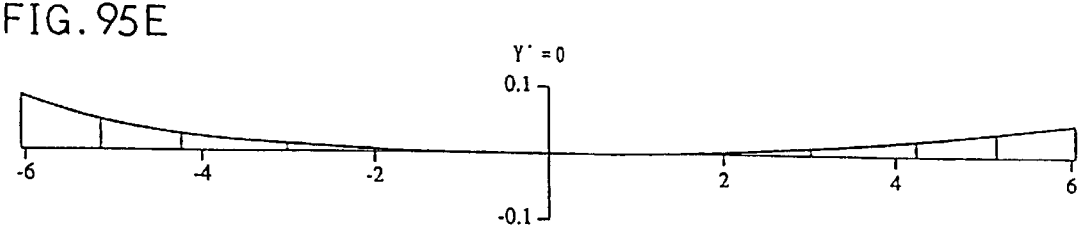

Zoom lens systems having an image blur compensating function according to the twentieth to twenty-second embodiments will be described with reference to the drawings. FIGS. 84, 88 and 92 show the lens arrangements of the twentieth to twenty-second embodiments in the normal condition (pre-decentering condition) at the wide-angle limit

[W]. In the figures, the surface marked with ri (i=1, 2, 3, ...) is an ith surface counted from the object side, and the axial distance marked with di (i=1, 2, 3, ...) is an ith axial distance counted from the object side. Arrows m1, m2, m3 and m4 of FIGS. 84, 88 and 92 schematically show zoom movements of a first lens unit Gr1, a second lens unit Gr2, a third lens unit Gr3 and a fourth lens unit Gr4 from the wide-angle limit [W] to the telephoto limit [T].

Zoom lens systems of the twentieth to twenty-second embodiments are zoom lens systems consisting of, from the object side, a first lens unit Gr1 having a positive refractive power, a second lens unit Gr2 having a negative refractive power, a third lens unit Gr3 having a positive refractive power and a fourth lens unit Gr4 having a positive refractive power wherein zooming is performed by varying the distances between the lens units.

In the twentieth embodiment, the third lens unit Gr3 is divided into a front lens unit GrA and a rear lens unit GrB from the object side, and image blur compensation is made by parallel decentering the front lens unit GrA (i.e. by moving it vertically to the optical axis AX). In FIG. 84, arrow C represents the movement of the front lens unit GrA during image blur correction. In the twenty-first embodiment, the fourth lens unit Gr4 is divided into a front lens unit GrA and a rear lens unit GrB from the object side, and image blur compensation is made by parallel decentering the front lens unit GrA. In FIG. 88, arrow C represents the movement of the front lens unit GrA during image blur correction. In the twenty-second embodiment, the second lens unit Gr2 is divided into a front lens unit GrA and a rear lens unit GrB from the object side, and image blur compensation is made by parallel decentering the rear lens unit GrB. In FIG. 92, arrow C represents the movement of the rear lens unit GrB during image blur correction.

In the twentieth and twenty-first embodiments, the image side surface of the front lens unit GrA serving as the image blur compensating lens unit is an aspherical surface (i.e. r16 in the twentieth embodiment, and r22 in the twenty-first embodiment), and the lens disposed directly on the image side of the front lens unit GrA has an aspherical surface (i.e. r17 in the twentieth embodiment, and r23 in the twenty-first embodiment) which cancels the aspherical surface of the front lens unit GrA. That is, the facing surfaces of the front and rear lens units GrA and GrB are aspherical surfaces which cancel each other. By this arrangement, aberrations caused at the time of image blur are excellently corrected without any change in the image quality to be obtained in normal photographing.

The zoom lens systems of the twentieth to twenty-second embodiments are suitable for use as the zoom lens system for single lens reflex cameras. In this type of zoom lens systems consisting of four zoom lens units of a positive, negative, positive configuration, the degree of freedom of the movements of the zoom lens units is effectively used for aberration correction, so that excellent image quality is obtained in the entire zoom range.

Since the first lens unit Gr1 and the fourth lens unit Gr4 are moved toward the object side during zooming from the wide-angle limit [W] to the telephoto limit [T], the zoom lens systems is in a retro-type arrangement at the wide-angle limit [W] and in a telephoto-type arrangement at the telephoto limit [T]. For this reason, a sufficient back focal length is secured and an optical system being short in total length is achieved. Further, by arranging so that the second lens unit Gr2 and the third lens unit Gr3 are moved toward the object side during zooming from the wide-angle limit [W] to the telephoto limit [T], the degree of freedom of the movements of the zoom lens units increases, so that an optical system is obtained which is advantageous in correcting aberration and has a further reduced total length.

Although the degree of freedom of aberration correction increases as the number of zoom lens units increases, the overall size of the optical system (particularly, the size at the wide-angle limit [W]) increases accordingly. However, since the zoom lens systems of this type have four lens units, the degree of freedom for restraining the aberrations caused during zooming and the compactness of the optical system are simultaneously satisfied. That is, if the number of zoom lens units is smaller than this, it is difficult to satisfy excellent image quality in the entire zoom range, and conversely, if the number of zoom lens units is greater than this, it is difficult to maintain the compactness of the entire optical system and the structure of the lens barrel is complicated.

In this type of zoom lens systems, since the zoom lens units positively perform zooming, the aberration burden on the zoom lens units is considerably heavy. For this reason, it is extremely difficult to correct aberrations caused in the zoom lens units by use of only one single lens or one doublet lens. Therefore, it is desirable that the zoom lens units include a plurality of lens elements.

The twentieth to twenty-second embodiments fulfill the conditions (6) to (11) noted above. When the condition (6) is fulfilled with an upper limit of 1.3, a more compact optical system is obtained; when the condition (6) is fulfilled with a lower limit of 0.8, still better image quality is obtained. When the condition (7) is fulfilled with an upper limit of 3.8, a more compact optical system is obtained; when the condition (7) is fulfilled with a lower limit of 2.5, still better image quality is obtained. Moreover, when the condition (9) is fulfilled with an upper limit of 1.6, an optical system having its aberration further corrected is obtained.

Tables 25 to 27 show construction data of the twentieth to twenty-second embodiments (FIGS. 84, 88, and 92). Table 28 shows values of the conditions (6) to (9) in the twentieth to twenty-second embodiments.

FIGS. 85A to 85I, 89A to 89I and 93A to 93I show longitudinal aberration curves of the twentieth to twenty-second embodiments. FIGS. 85A to 85C, 89A to 89C and 93A to 93C show aberration curves at the wide-angle limit [W] in the normal condition (pre-decentering condition). FIGS. 85D to 85F, 89D to 89F and 93D to 93F show aberration curves at the middle focal length condition [M] in the normal condition. FIGS. 85G to 85I, 89G to 89I and 93G to 93I show aberration curves at the telephoto limit [T] in the normal condition.

FIGS. 85A, 85D, 85G, 89A, 89D, 89G, 93A, 93D and 93G show spherical aberration and sine condition. The solid line d represents aberration to the d-line. The broken line SC represents sine condition. FIGS. 85B, 85E, 85H, 89B, 89E, 89H, 93B, 93E and 93H show astigmatism. The broken line DM and the solid line DS represent astigmatisms on the meridional image plane and on the sagittal image plane, respectively. FIGS. 85C, 85F, 85I, 89C, 89F, 89I, 93C, 93F and 93I show distortion.

FIGS. 86A to 86E, 90A to 90E and 94A to 94E show lateral aberration curves of the twentieth to twenty-second embodiments at the wide-angle limit [W]. FIGS. 87A to 87E, 91A to 91E and 95A to 95E show lateral aberration curves of the twentieth to twenty-second embodiments at the telephoto limit [T].

FIGS. 86A, 86B, 87A, 87B, 90A, 90B, 91A, 91B, 94A, 94B, 95A and 95B show lateral aberration (image height Y'=12, 0) with respect to the luminous flux on the meridional image plane before the decentering of the image blur compensating lens unit in the twentieth to twenty-second embodiments. FIGS. 86C to 86E, 87C to 87E, 90C to 90E, 91C to 91E, 94C to 94E and 95C to 95E show lateral aberration (image height Y'=−12, 12, 0) with respect to the luminous flux on the meridional image plane after the decentering of the image blur compensating lens unit in the twentieth to twenty-second embodiments. The aberration curves after the decentering show aberrations in the compensated condition when an image blur compensation angle θ of the image blur compensating lens unit is 0.7° (=0.0122173 rad.).

As described above, in the twentieth to twenty-second embodiments, since the image blur compensating lens unit parallel decentered for image blur compensation is a light-weight front or rear lens unit GrA or GrB included in the second, third or fourth lens unit Gr2, Gr3 or Gr4, the burden on the image blur compensation driving system is lightened. In addition, since the power arrangement and the zoom movement arrangement are effective in reducing the total length to achieve compactness and the above-described conditions are fulfilled, high description quality is obtained without any degradation of compactness.

Obviously, many modifications and variations of the present invention are possible in light of the above teachings. It is therefore to be understood that within the scope of the appended claims, the invention may be practiced other than as specifically described.

TABLE 1

<< Embodiment 1 >>
f = 83.0~160.0~234.0
FNO = 4.60~5.81~5.78

| | Radius of Curvature | Axial Distance | | Refractive Index | | Abbe Number |
|---|---|---|---|---|---|---|

<First Lens Unit Gr1-positive>

| r1 | 97.345 | | | | | |
| | | d1 | 1.700 | N1 | 1.61293 v1 | 36.96 |
| r2 | 48.265 | | | | | |
| | | d2 | 6.460 | N2 | 1.49310 v2 | 83.58 |
| r3 | −1091.036 | | | | | |
| | | d3 | 0.100 | | | |
| r4 | 57.984 | | | | | |
| | | d4 | 3.820 | N3 | 1.49310 v3 | 83.58 |
| r5 | 810.051 | | | | | |
| | | d5 | 3.300~26.272~39.846 | | | |

<Second Lens Unit Gr2-negative>

| r6 | −73.346 | | | | | |
| | | d6 | 1.830 | N4 | 1.71300 v4 | 53.93 |
| r7 | 34.239 | | | | | |
| | | d7 | 3.000 | | | |
| r8 | 39.600 | | | | | |
| | | d8 | 2.750 | N5 | 1.67339 v5 | 29.25 |
| r9 | −3349.859 | | | | | |
| | | d9 | 2.000 | | | |
| r10 | −35.714 | | | | | |
| | | d10 | 1.215 | N6 | 1.51728 v6 | 69.43 |
| r11 | −29.097 | | | | | |
| | | d11 | 2.000~4.000~6.000 | | | |

<Third Lens Unit Gr3-negative>

| r12 | −24.999 | | | | | |
| | | d12 | 1.215 | N7 | 1.51728 v7 | 69.43 |
| r13 | −30.588 | | | | | |
| | | d13 | 20.453~4.949~1.000 | | | |

<Aperture Diaphragm S, Fourth Lens Unit Gr4-positive>

| r14 | ∞ (Aperture Diaphragm S) | | | | | |
| | | d14 | 1.380 | | | |

TABLE 1-continued

| r15 | 60.430 | | | | | |
|---|---|---|---|---|---|---|
| | | d15 | 1.300 | N8 | 1.84666 v8 | 23.82 |
| r16 | 26.308 | | | | | |
| | | d16 | 2.460 | | | |
| r17 | 41.552 | | | | | |
| | | d17 | 2.840 | N9 | 1.51680 v9 | 64.20 |
| r18 | −115.365 | | | | | |
| | | d18 | 0.400 | | | |
| r19 | 36.133 | | | | | |
| | | d19 | 4.550 | N10 | 1.51680 v10 | 64.20 |
| r20 | −42.506 | | | | | |
| | | d20 | 19.811~9.140~0.900 | | | |

<Fifth Lens Unit Gr5-negative>

| r21 | 214.395 | | | | | |
| | | d21 | 1.080 | N11 | 1.71300 v11 | 53.93 |
| r22 | 23.976 | | | | | |
| | | d22 | 1.540 | | | |
| r23 | −181.698 | | | | | |
| | | d23 | 3.480 | N12 | 1.67339 v12 | 29.25 |
| r24 | −18.797 | | | | | |
| | | d24 | 1.130 | N13 | 1.75450 v13 | 51.57 |
| r25 | ∞ | | | | | |

Σd = 89.815~88.611~91.997

TABLE 2

<< Embodiment 2 >>
f = 82.6~160.0~234.0
FNO = 4.60~5.81~6.83

| | Radius of Curvature | Axial Distance | | Refractive Index | | Abbe Number |
|---|---|---|---|---|---|---|

<First Lens Unit Gr1-positive>

| r1 | 97.792 | | | | | |
| | | d1 | 1.700 | N1 | 1.61293 v1 | 36.96 |
| r2 | 46.299 | | | | | |
| | | d2 | 6.460 | N2 | 1.49310 v2 | 83.58 |
| r3 | −184.667 | | | | | |
| | | d3 | 0.100 | | | |
| r4 | 50.563 | | | | | |
| | | d4 | 3.820 | N3 | 1.49310 v3 | 83.58 |
| r5 | 241.312 | | | | | |
| | | d5 | 3.300~23.941~31.837 | | | |

<Second Lens Unit Gr2-negative>

| r6 | −71.122 | | | | | |
| | | d6 | 1.830 | N4 | 1.71300 v4 | 53.93 |
| r7 | 33.113 | | | | | |
| | | d7 | 1.000 | | | |
| r8 | 20.179 | | | | | |
| | | d8 | 2.000 | N5 | 1.51728 v5 | 69.43 |
| r9 | 24.487 | | | | | |
| | | d9 | 2.000~4.000~6.000 | | | |

<Third Lens Unit Gr3-positive>

| r10 | 30.032 | | | | | |
| | | d10 | 1.215 | N6 | 1.51728 v6 | 69.43 |
| r11 | 19.448 | | | | | |
| | | d11 | 1.000 | | | |
| r12 | 26.836 | | | | | |
| | | d12 | 2.750 | N7 | 1.67339 v7 | 29.25 |
| r13 | 117.377 | | | | | |
| | | d13 | 23.629~8.887~1.306 | | | |

<Aperture Diaphragm S, Fourth Lens Unit Gr4-positive>

| r14 | ∞ (Aperture Diaphragm S) | | | | | |
| | | d14 | 1.380 | | | |
| r15 | 73.885 | | | | | |
| | | d15 | 1.300 | N8 | 1.84666 v8 | 23.82 |
| r16 | 28.089 | | | | | |
| | | d16 | 2.460 | | | |
| r17 | 46.118 | | | | | |
| | | d17 | 2.840 | N9 | 1.51680 v9 | 64.20 |

TABLE 2-continued

| | | | | | | |
|---|---|---|---|---|---|---|
| r18 | −60.125 | | | | | |
| | | d18 | 0.400 | | | |
| r19 | 34.079 | | | | | |
| | | d19 | 4.550 | N10 | 1.51680 v10 | 64.20 |
| r20 | −44.058 | | | | | |
| | | d20 | 17.850~6.911~0.874 | | | |
| <Fifth Lens Unit Gr5-negative> | | | | | | |
| r21 | 512.839 | | | | | |
| | | d21 | 1.080 | N11 | 1.71300 v11 | 53.93 |
| r22 | 24.541 | | | | | |
| | | d22 | 1.540 | | | |
| r23 | −133.326 | | | | | |
| | | d23 | 3.480 | N12 | 1.67339 v12 | 29.25 |
| r24 | −17.645 | | | | | |
| | | d24 | 1.130 | N13 | 1.75450 v13 | 51.57 |
| r25 | ∞ | | | | | |
| | | Σd = 88.815~85.775~82.052 | | | | |

TABLE 3

<< Embodiment 3 >>
f = 82.6~160.0~234.0
FNO = 4.60~5.81~5.95

| | Radius of Curvature | Axial Distance | | Refractive Index | | Abbe Number |
|---|---|---|---|---|---|---|
| <First Lens Unit Gr1-positive> | | | | | | |
| r1 | 58.900 | | | | | |
| | | d1 | 1.700 | N1 | 1.61293 v1 | 36.96 |
| r2 | 34.284 | | | | | |
| | | d2 | 6.460 | N2 | 1.49310 v2 | 83.58 |
| r3 | −300.890 | | | | | |
| | | d3 | 0.100 | | | |
| r4 | 63.185 | | | | | |
| | | d4 | 3.820 | N3 | 1.49310 v3 | 83.58 |
| r5 | 98.931 | | | | | |
| | | d5 | 3.300~28.301~41.700 | | | |
| <Second Lens Unit Gr2-negative> | | | | | | |
| r6 | −74.716 | | | | | |
| | | d6 | 1.830 | N4 | 1.71300 v4 | 53.93 |
| r7 | 29.553 | | | | | |
| | | d7 | 1.000 | | | |
| r8 | 23.424 | | | | | |
| | | d8 | 1.215 | N5 | 1.51728 v5 | 69.43 |
| r9 | 39.791 | | | | | |
| | | d9 | 2.500~4.000~7.500 | | | |
| <Third Lens Unit Gr3-positive> | | | | | | |
| r10 | 36.855 | | | | | |
| | | d10 | 1.215 | N6 | 1.51728 v6 | 69.43 |
| r11 | 21.931 | | | | | |
| | | d11 | 1.000 | | | |
| r12 | 29.252 | | | | | |
| | | d12 | 2.750 | N7 | 1.67339 v7 | 29.25 |
| r13 | 212.765 | | | | | |
| | | d13 | 29.756~11.469~1.306 | | | |
| <Aperture Diaphragm S, Fourth Lens Unit Gr4-positive> | | | | | | |
| r14 | ∞ (Aperture Diaphragm S) | | | | | |
| | | d14 | 1.380 | | | |
| r15 | 62.924 | | | | | |
| | | d15 | 1.300 | N8 | 1.84666 v8 | 23.82 |
| r16 | 28.043 | | | | | |
| | | d16 | 2.460 | | | |
| r17 | 45.986 | | | | | |
| | | d17 | 2.840 | N9 | 1.51680 v9 | 64.20 |
| r18 | −86.763 | | | | | |
| | | d18 | 0.400 | | | |
| r19 | 32.661 | | | | | |
| | | d19 | 4.550 | N10 | 1.51680 v10 | 64.20 |
| r20 | −50.825 | | | | | |
| | | d20 | 18.926~8.308~0.874 | | | |

TABLE 3-continued

| | | | | | | |
|---|---|---|---|---|---|---|
| <Fifth Lens Unit Gr5-negative> | | | | | | |
| r21 | 149.097 | | | | | |
| | | d21 | 1.080 | N11 | 1.71300 v11 | 53.93 |
| r22 | 24.519 | | | | | |
| | | d22 | 1.540 | | | |
| r23 | −121.815 | | | | | |
| | | d23 | 3.480 | N12 | 1.67339 v12 | 29.25 |
| r24 | −18.056 | | | | | |
| | | d24 | 1.130 | N13 | 1.75450 v13 | 51.57 |
| r25 | ∞ | | | | | |
| | | Σd = 95.733~93.328~92.631 | | | | |

TABLE 4

<< Embodiment 4 >>
f = 82.6~160.0~234.0
FNO = 4.60~5.90~6.00

| | Radius of Curvature | Axial Distance | | Refractive Index | | Abbe Number |
|---|---|---|---|---|---|---|
| <First Lens Unit Gr1-positive> | | | | | | |
| r1 | 61.148 | | | | | |
| | | d1 | 1.700 | N1 | 1.61293 v1 | 36.96 |
| r2 | 34.001 | | | | | |
| | | d2 | 7.500 | N2 | 1.49310 v2 | 83.58 |
| r3 | −253.109 | | | | | |
| | | d3 | 0.100 | | | |
| r4 | 60.899 | | | | | |
| | | d4 | 4.200 | N3 | 1.49310 v3 | 83.58 |
| r5 | 95.792 | | | | | |
| | | d5 | 3.300~25.514~41.021 | | | |
| <Second Lens Unit Gr2-negative> | | | | | | |
| r6 | −85.359 | | | | | |
| | | d6 | 1.830 | N4 | 1.71300 v4 | 53.93 |
| r7 | 26.983 | | | | | |
| | | d7 | 1.000 | | | |
| r8 | 22.823 | | | | | |
| | | d8 | 1.215 | N5 | 1.51728 v5 | 69.43 |
| r9 | 40.300 | | | | | |
| | | d9 | 2.500~4.000~7.500 | | | |
| <Third Lens Unit Gr3-positive> | | | | | | |
| r10 | 35.792 | | | | | |
| | | d10 | 1.215 | N6 | 1.51728 v6 | 69.43 |
| r11 | 21.684 | | | | | |
| | | d11 | 1.000 | | | |
| r12 | 29.241 | | | | | |
| | | d12 | 2.750 | N7 | 1.67339 v7 | 29.25 |
| r13 | 217.960 | | | | | |
| | | d13 | 29.529~12.908~1.306 | | | |
| <Aperture Diaphragm S, Fourth Lens Unit Gr4-positive> | | | | | | |
| r14 | ∞ (Aperture Diaphragm S) | | | | | |
| | | d14 | 1.380 | | | |
| r15 | 55.422 | | | | | |
| | | d15 | 1.300 | N8 | 1.84666 v8 | 23.82 |
| r16 | 27.905 | | | | | |
| | | d16 | 2.460 | | | |
| r17 | 47.314 | | | | | |
| | | d17 | 2.840 | N9 | 1.51680 v9 | 64.20 |
| r18 | −83.181 | | | | | |
| | | d18 | 0.400 | | | |
| r19 | 34.948 | | | | | |
| | | d19 | 4.550 | N10 | 1.51680 v10 | 64.20 |
| r20 | −47.390 | | | | | |
| | | d20 | 17.734~8.310~0.874 | | | |
| <Fifth Lens Unit Gr5-negative> | | | | | | |
| r21 | 198.738 | | | | | |
| | | d21 | 1.080 | N11 | 1.71300 v11 | 53.93 |
| r22 | 24.489 | | | | | |
| | | d22 | 1.540 | | | |

TABLE 4-continued

| | | | | | | |
|---|---|---|---|---|---|---|
| r23 | −114.315 | | | | | |
| | | d23 | 3.480 | N12 | 1.67339 | ν12 | 29.25 |
| r24 | −17.995 | | | | | |
| | | d24 | 1.130 | N13 | 1.75450 | ν13 | 51.57 |
| r25 | ∞ | | | | | |
| | Σd = 95.734~93.403~93.372 | | | | | |

TABLE 5

| | |fL/fW| | |f2/fW| | f1/fW | MT/MW |
|---|---|---|---|---|
| Embodiment 1 | 0.345 | 1.58 | 1.00 | 1.72 |
| Embodiment 2 | 0.319 | 0.445 | 0.87 | 1.86 |
| Embodiment 3 | 0.347 | 0.493 | 1.06 | 2.02 |
| Embodiment 4 | 0.332 | 0.487 | 1.06 | 2.00 |

TABLE 6

<< Embodiment 5 >>
f = 22.6~50.5~78.0
FNO = 4.10~5.31~5.73

| | Radius of Curvature | Axial Distance | | Refractive Index | | Abbe Number |
|---|---|---|---|---|---|---|

<First Lens Unit Gr1-positive>

| | | | | | | |
|---|---|---|---|---|---|---|
| r1 | 108.1551 | | | | | |
| | | d1 | 1.300 | N1 | 1.83350 | ν1 | 21.00 |
| r2 | 51.344 | | | | | |
| | | d2 | 6.550 | N2 | 1.58913 | ν2 | 61.11 |
| r3 | −227.303 | | | | | |
| | | d3 | 0.100 | | | |
| r4 | 26.595 | | | | | |
| | | d4 | 4.250 | N3 | 1.71300 | ν3 | 53.93 |
| r5 | 50.796 | | | | | |
| | | d5 | 1.845~14.212~19.892 | | | | |

<Second Lens Unit Gr2-negative>

| | | | | | | |
|---|---|---|---|---|---|---|
| r6 | 42.937 | | | | | |
| | | d6 | 1.100 | N4 | 1.80420 | ν4 | 46.50 |
| r7 | 10.592 | | | | | |
| | | d7 | 4.400 | | | |
| r8 | −30.198 | | | | | |
| | | d8 | 0.950 | N5 | 1.75450 | ν5 | 51.57 -- DL |
| r9 | 23.104 | | | | | |
| | | d9 | 0.300 | | | |
| r10 | 18.296 | | | | | |
| | | d10 | 3.700 | N6 | 1.75000 | ν6 | 25.14 |
| r11 | −41.997 | | | | | |
| | | d11 | 0.940 | | | |
| r12 | −15.369 | | | | | |
| | | d12 | 1.300 | N7 | 1.69680 | ν7 | 56.47 |
| r13 | −55.424 | | | | | |
| | | d13 | 10.978~5.009~2.000 | | | | |

<Aperture Diaphragm S, Third Lens Unit Gr3-positive>

| | | | | | | |
|---|---|---|---|---|---|---|
| r14 | ∞ (Aperture Diaphragm S) | | | | | |
| | | d14 | 0.500 | | | |
| r15 | 24.823 | | | | | |
| | | d15 | 3.310 | N8 | 1.62041 | ν8 | 60.29 |
| r16 | −28.498 | | | | | |
| | | d16 | 0.110 | | | |
| r17 | 25.329 | | | | | |
| | | d17 | 4.710 | N9 | 1.51742 | ν9 | 52.15 |
| r18 | −12.652 | | | | | |
| | | d18 | 1.360 | N10 | 1.80741 | ν10 | 31.59 |
| r19 | 134.710 | | | | | |
| | | d19 | 5.300~1.349~1.000 | | | | |

<Fourth Lens Unit Gr5-positive>

| | | | | | | |
|---|---|---|---|---|---|---|
| r20 | 40.082 | | | | | |
| | | d20 | 4.820 | N11 | 1.51823 | ν11 | 58.96 |

TABLE 6-continued

<< Embodiment 5 >>
f = 22.6~50.5~78.0
FNO = 4.10~5.31~5.73

| | | | | | | |
|---|---|---|---|---|---|---|
| r21 | −17.987 | | | | | |
| | | d21 | 1.470 | | | |
| r22* | −140.644 | | | | | |
| | | d22 | 0.100 | N12 | 1.51790 | ν12 | 52.31 |
| r23 | −57.516 | | | | | |
| | | d23 | 1.400 | N13 | 1.80500 | ν13 | 40.97 |
| r24 | 40.734 | | | | | |
| | Σd = 60.793~63.239~65.562 | | | | | |

[Aspherical Coefficient]

r22: ε = 1.0000
A4 = −0.10470 × $10^3$
A6 = −0.34309 × $10^6$
A8 = −0.53396 × $10^9$
A10 = −0.14576 × $10^{10}$
A12 = −0.69539 × $10^{15}$

TABLE 7

<< Embodiment 6 >>
f = 30.6~64.7~165.1
FNO = 4.60~5.23~5.81

| | Radius of Curvature | Axial Distance | | Refractive Index | | Abbe Number |
|---|---|---|---|---|---|---|

<First Lens Unit Gr1-positive>

| | | | | | | |
|---|---|---|---|---|---|---|
| r1 | 89.595 | | | | | |
| | | d1 | 1.530 | N1 | 1.84666 | ν1 | 23.82 |
| r2 | 50.523 | | | | | |
| | | d2 | 6.970 | N2 | 1.58913 | ν2 | 61.11 |
| r3 | 885.692 | | | | | |
| | | d3 | 0.127 | | | |
| r4 | 47.852 | | | | | |
| | | d4 | 5.695 | N3 | 1.51680 | ν3 | 64.20 |
| r5 | 218.621 | | | | | |
| | | d5 | 0.467~17.796~41.243 | | | | |

<Second Lens Unit Gr2-negative>

| | | | | | | |
|---|---|---|---|---|---|---|
| r6 | 73.128 | | | | | |
| | | d6 | 1.020 | N4 | 1.85000 | ν4 | 40.04 |
| r7 | 14.317 | | | | | |
| | | d7 | 4.420 | | | |
| r8 | −404.817 | | | | | |
| | | d8 | 2.550 | N5 | 1.75000 | ν5 | 25.14 |
| r9 | −31.873 | | | | | |
| | | d9 | 1.020 | N6 | 1.77250 | ν6 | 49.77 |
| r10 | 36.869 | | | | | |
| | | d10 | 1.105 | | | |
| r11 | 22.548 | | | | | |
| | | d11 | 2.635 | N7 | 1.76182 | ν7 | 26.55 |
| r12 | 212.813 | | | | | |
| | | d12 | 1.530 | | | |
| r13 | −45.353 | | | | | |
| | | d13 | 1.000 | N8 | 1.75450 | ν8 | 51.57 -- DL |
| r14 | 38.340 | | | | | |
| | | d14 | 1.000 | N9 | 1.80518 | ν9 | 25.43 -- DL |
| r15 | 171.510 | | | | | |
| | | d15 | 17.275~8.731~1.714 | | | | |

<Aperture Diaphragm S, Third Lens Unit Gr3-positive>

| | | | | | | |
|---|---|---|---|---|---|---|
| r14 | ∞ (Aperture Diaphragm S) | | | | | |
| | | d16 | 1.062 | | | |
| r17 | 33.590 | | | | | |
| | | d17 | 2.125 | N10 | 1.51680 | ν10 | 64.20 |
| r18 | 145.888 | | | | | |
| | | d18 | 0.085 | | | |
| r19 | 28.299 | | | | | |
| | | d19 | 2.720 | N11 | 1.51823 | ν11 | 58.96 |

TABLE 7-continued

| | | | | | | |
|---|---|---|---|---|---|---|
| r20 | −4683.183 | | | | | |
| | | d20 | 0.127 | | | |
| r21 | 40.246 | | | | | |
| | | d21 | 2.380 | N12 | 1.51680 v12 | 64.20 |
| r22 | −101.132 | | | | | |
| | | d22 | 2.125 | | | |
| r23 | −26.751 | | | | | |
| | | d23 | 1.020 | N13 | 1.84666 v13 | 23.82 |
| r24 | 397.583 | | | | | |
| | | d24 | 4.505~1.969~1.360 | | | |
| <Fourth Lens Unit Gr5-positive> | | | | | | |
| r25 | 43.689 | | | | | |
| | | d25 | 2.550 | N14 | 1.51823 v14 | 58.96 |
| r26 | −52.186 | | | | | |
| | | d26 | 0.127 | | | |
| r27 | 35.901 | | | | | |
| | | d27 | 2.890 | N15 | 1.51823 v15 | 58.96 |
| r28 | −32.031 | | | | | |
| | | d28 | 3.187 | | | |
| r29* | −70.884 | | | | | |
| | | d29 | 0.030 | N16 | 1.51790 v16 | 52.31 |
| r30 | −58.398 | | | | | |
| | | d30 | 1.190 | N17 | 1.85000 v17 | 40.04 |
| r31 | 23.219 | | | | | |
| | | d31 | 1.020 | | | |
| r32 | 68.181 | | | | | |
| | | d32 | 2.550 | N18 | 1.67339 v18 | 29.25 |
| r33 | −66.682 | | | | | |
| | | d33 | 1.700~9.782~0.628 | | | |
| <Fifth Lens Unit Gr5-negative> | | | | | | |
| r34 | −41.406 | | | | | |
| | | d34 | 1.598 | N19 | 1.67000 v19 | 57.07 |
| r35 | −98.910 | | | | | |
| | | Σd = 81.338−95.669−102.335 | | | | |

[Aspherical Coefficient]

r29: ε = 1.0000
A4 = −0.68521 × 10$^4$
A6 = −0.10299 × 10$^6$
A8 = −0.23092 × 10$^8$
A10 = −0.11744 × 10$^9$
A12 = −0.13601 × 10$^{11}$

TABLE 8

<< Embodiment 7 >>
f = 22.6~50.5~78.0
FNO = 4.10~5.31~5.73

| | Radius of Curvature | Axial Distance | | Refractive Index | | Abbe Number |
|---|---|---|---|---|---|---|
| <First Lens Unit Gr1-positive> | | | | | | |
| r1 | 122.692 | | | | | |
| | | d1 | 1.300 | N1 | 1.83350 v1 | 21.00 |
| r2 | 51.521 | | | | | |
| | | d2 | 6.550 | N2 | 1.58913 v2 | 61.11 |
| r3 | −185.231 | | | | | |
| | | d3 | 0.100 | | | |
| r4 | 27.634 | | | | | |
| | | d4 | 4.250 | N3 | 1.71300 v3 | 53.93 |
| r5 | 57.348 | | | | | |
| | | d5 | 1.845~12.466~19.246 | | | |
| <Second Lens Unit Gr2-negative> | | | | | | |
| r6 | 51.452 | | | | | |
| | | d6 | 1.100 | N4 | 1.80420 v4 | 46.50 |
| r7 | 10.185 | | | | | |
| | | d7 | 4.400 | | | |
| r8 | −30.276 | | | | | |
| | | d8 | 0.950 | N5 | 1.75450 v5 | 51.57 |

TABLE 8-continued

| | | | | | | |
|---|---|---|---|---|---|---|
| r9 | 20.585 | | | | | |
| | | d9 | 0.300 | | | |
| r10 | 16.780 | | | | | |
| | | d10 | 3.700 | N6 | 1.75000 v6 | 25.14 |
| r11 | −38.497 | | | | | |
| | | d11 | 0.940 | | | |
| r12 | −14.318 | | | | | |
| | | d12 | 1.300 | N7 | 1.69680 v7 | 56.47 |
| r13 | −47.972 | | | | | |
| | | d13 | 9.859~4.319~2.000 | | | |
| <Aperture Diaphragm S, Third Lens Unit Gr3-positive> | | | | | | |
| r14 | ∞ (Aperture Diaphragm S) | | | | | |
| | | d14 | 0.500 | | | |
| r15 | 32.322 | | | | | |
| | | d15 | 1.500 | N8 | 1.62041 v8 | 60.29 |
| | | | | | | -- DL |
| r16* | −24.847 | | | | | |
| | | d16 | 0.500 | | | |
| r17* | −24.847 | | | | | |
| | | d17 | 1.310 | N9 | 1.62041 v9 | 60.29 |
| r18 | −24.706 | | | | | |
| | | d18 | 0.110 | | | |
| r19 | 24.077 | | | | | |
| | | d19 | 4.710 | N10 | 1.51742 v10 | 52.15 |
| r20 | −12.877 | | | | | |
| | | d20 | 1.360 | N11 | 1.80741 v11 | 31.59 |
| r21 | 133.539 | | | | | |
| | | d21 | 5.300~1.467~1.000 | | | |
| <Fourth Lens Unit Gr5-positive> | | | | | | |
| r22 | 35.194 | | | | | |
| | | d22 | 4.820 | N12 | 1.51823 v12 | 58.96 |
| r23 | −17.079 | | | | | |
| | | d23 | 1.470 | | | |
| r24* | −125.833 | | | | | |
| | | d24 | 0.100 | N13 | 1.51790 v13 | 52.31 |
| r25 | −56.309 | | | | | |
| | | d25 | 1.400 | N14 | 1.80500 v14 | 40.97 |
| r26 | 39.727 | | | | | |
| | Σd = 59.674~60.923~64.916 | | | | | |

[Aspherical Coefficient]

r16: ε = 1.0000
A4 = 0.33000 × 10$^{-4}$
r17: ε = 1.0000
A4 = 0.33000 × 10$^{-4}$
r24: ε = 1.0000
A4 = −0.10469 × 10$^{-3}$
A6 = −0.34301 × 10$^{-6}$
A8 = −0.53437 × 10$^{-9}$
A10 = −0.14584 × 10$^{-10}$
A12 = −0.75981 × 10$^{-15}$

TABLE 9

<< Embodiment 8 >>
f = 22.6~47.2~80.7
FNO = 3.57~4.38~4.63

| | Radius of Curvature | Axial Distance | | Refractive Index | | Abbe Number |
|---|---|---|---|---|---|---|
| <First Lens Unit Gr1-positive> | | | | | | |
| r1 | 701.858 | | | | | |
| | | d1 | 1.339 | N1 | 1.84666 v1 | 23.78 |
| r2 | 50.822 | | | | | |
| | | d2 | 6.300 | N2 | 1.61272 v2 | 58.75 |
| r3 | −142.661 | | | | | |
| | | d3 | 0.118 | | | |
| r4 | 33.789 | | | | | |
| | | d4 | 3.937 | N3 | 1.83400 v3 | 37.17 |
| r5 | 86.386 | | | | | |
| | | d5 | 1.696~13.804~21.178 | | | |

TABLE 9-continued

<Second Lens Unit Gr2-negative>

| | | | | | | |
|---|---|---|---|---|---|---|
| r6 | 39.339 | | | | | |
| | | d6 | 1.102 | N4 | 1.83400 v4 | 37.17 |
| r7 | 11.226 | | | | | |
| | | d7 | 4.804 | | | |
| r8 | −26.223 | | | | | |
| | | d8 | 2.126 | N5 | 1.78472 v5 | 25.68 |
| r9 | −15.872 | | | | | |
| | | d9 | 1.024 | N6 | 1.77250 v6 | 49.60 |
| r10 | 41.165 | | | | | |
| | | d10 | 0.118 | | | |
| r11 | 22.587 | | | | | |
| | | d11 | 3.071 | N7 | 1.78472 v7 | 25.68 |
| r12 | −27.632 | | | | | |
| | | d12 | 1.102 | | | |
| r13 | −18.584 | | | | | |
| | | d13 | 1.024 | N8 | 1.81554 v8 | 44.36 |
| r14 | 321.763 | | | | | |
| | | d14 | 9.368~4.115~1.069 | | | |

<Aperture Diaphragm S, Third Lens Unit Gr3-positive>

| | | | | | | |
|---|---|---|---|---|---|---|
| r15 | ∞ (Aperture Diaphragm S) | | | | | |
| | | d15 | 1.496 | | | |
| r16 | 29.194 | | | | | |
| | | d16 | 3.465 | N9 | 1.61800 v9 | 63.39 |
| r17 | −40.669 | | | | | |
| | | d17 | 0.079 | | | |
| r18 | 27.739 | | | | | |
| | | d18 | 5.591 | N10 | 1.56873 v10 | 63.16 |
| r19 | −14.928 | | | | | |
| | | d19 | 1.181 | N11 | 1.83400 v11 | 37.17 |
| r20 | 102.907 | | | | | |
| | | d20 | 7.384~3.742~2.663 | | | |

<Fourth Lens Unit Gr4-positive>

| | | | | | | |
|---|---|---|---|---|---|---|
| r21 | 24.467 | | | | | |
| | | d21 | 2.362 | N12 | 1.58170 v12 | 69.75 -- DL |
| r22* | −59.882 | | | | | |
| | | d22 | 0.354 | | | |
| r23* | −59.882 | | | | | |
| | | d23 | 1.575 | N13 | 1.75450 v13 | 51.57 |
| r24 | −27.635 | | | | | |
| | | d24 | 2.756 | | | |
| r25* | −86.973 | | | | | |
| | | d25 | 1.488 | N14 | 1.74500 v14 | 34.96 |
| r26 | 34.087 | | | | | |
| | | Σd = 64.862~68.073~71.323 | | | | |

[Aspherical Coefficient]

r22: ε = 1.0000
A4 = 0.27748 × 10$^{-4}$
r23: ε = 1.0000
A4 = 0.25095 × 10$^{-4}$
r25: ε = 1.0000
A4 = −0.76769 × 10$^{-4}$
A6 = −0.21795 × 10$^{-6}$
A8 = 0.57736 × 10$^{-9}$
A10 = −0.52121 × 10$^{-11}$
A12 = 0.27373 × 10$^{-13}$

TABLE 10

<< Embodiment 9 >>
f = 22.6~50.5~78.0
FNO = 4.10~5.45~6.20

| | Radius of Curvature | Axial Distance | Refractive Index | Abbe Number |
|---|---|---|---|---|

<First Lens Unit Gr1-positive>

| | | | | | | |
|---|---|---|---|---|---|---|
| r1 | 69.769 | | | | | |
| | | d1 | 1.300 | N1 | 1.83350 v1 | 21.00 |

TABLE 10-continued

| | | | | | | |
|---|---|---|---|---|---|---|
| r2 | 45.196 | | | | | |
| | | d2 | 6.550 | N2 | 1.58913 v2 | 61.11 |
| r3 | −397.682 | | | | | |
| | | d3 | 0.100 | | | |
| r4 | 36.176 | | | | | |
| | | d4 | 4.250 | N3 | 1.71300 v3 | 53.93 |
| r5 | 44.734 | | | | | |
| | | d5 | 1.845~14.591~25.237 | | | |

<Second Lens Unit Gr2-negative>

| | | | | | | |
|---|---|---|---|---|---|---|
| r6 | 123.224 | | | | | |
| | | d6 | 1.100 | N4 | 1.80420 v4 | 46.50 |
| r7 | 11.538 | | | | | |
| | | d7 | 4.400 | | | |
| r8 | −72.748 | | | | | |
| | | d8 | 0.950 | N5 | 1.75450 v5 | 51.57 |
| r9 | 26.505 | | | | | |
| | | d9 | 0.300 | | | |
| r10 | 17.282 | | | | | |
| | | d10 | 3.700 | N6 | 1.75000 v6 | 25.14 |
| r11 | −51.639 | | | | | |
| | | d11 | 0.940 | | | |
| r12 | −28.103 | | | | | |
| | | d12 | 1.300 | N7 | 1.69680 v7 | 56.47 -- DL |
| r13 | 64.162 | | | | | |
| | | d13 | 10.332~3.957~2.000 | | | |

<Aperture Diaphragm S, Third Lens Unit Gr3-positive>

| | | | | | | |
|---|---|---|---|---|---|---|
| r14 | ∞ (Aperture Diaphragm S) | | | | | |
| | | d14 | 0.500 | | | |
| r15 | 21.611 | | | | | |
| | | d15 | 3.310 | N8 | 1.62041 v8 | 60.29 |
| r16 | −68.274 | | | | | |
| | | d16 | 0.110 | | | |
| r17 | 24.544 | | | | | |
| | | d17 | 4.710 | N9 | 1.51742 v9 | 52.15 |
| r18 | −13.473 | | | | | |
| | | d18 | 1.360 | N10 | 1.80741 v10 | 31.59 |
| r19 | 80.836 | | | | | |
| | | d19 | 5.300~2.063~1.000 | | | |

<Fourth Lens Unit Gr4-positive>

| | | | | | | |
|---|---|---|---|---|---|---|
| r20 | 27.647 | | | | | |
| | | d20 | 4.820 | N11 | 1.51823 v11 | 58.96 |
| r21 | −19.138 | | | | | |
| | | d21 | 1.470 | | | |
| r22* | 1610.591 | | | | | |
| | | d22 | 0.100 | N12 | 1.51790 v12 | 52.31 |
| r23 | −292.156 | | | | | |
| | | d23 | 1.400 | N13 | 1.80500 v13 | 40.97 |
| r24 | 42.444 | | | | | |
| | | Σd = 60.147~63.282~70.907 | | | | |

[Aspherical Coefficient]

r22: ε = 1.0000
A4 = −0.10446 × 10$^{-3}$
A6 = −0.34881 × 10$^{-6}$
A8 = −0.56963 × 10$^{-9}$
A10 = −0.14711 × 10$^{-10}$
A12 = −0.89025 × 10$^{-15}$

TABLE 11

| | | | D/f | | |
|---|---|---|---|---|---|
| | f1/fW | fR/fW | [W] | [T] | \|Pd\|/fW |
| Embodiment 5 | 2.31 | 0.831 | 0.76 | 0.11 | 0.73 |
| Embodiment 6 | 2.71 | 0.853 | 0.56 | 0.01 | 0.60 |
| Embodiment 7 | 2.29 | 0.825 | 0.02 | 0.01 | 0.99 |
| Embodiment 8 | 2.65 | 0.876 | 0.85 | 0.18 | 0.74 |
| Embodiment 9 | 3.48 | 0.897 | 0.46 | 0.03 | 0.81 |

TABLE 12

<< Embodiment 10 >>
f = 82.2~160.0~233.6
FNO = 4.60~5.81~6.19

| | Radius of Curvature | Axial Distance | Refractive Index | | Abbe Number |
|---|---|---|---|---|---|

<First Lens Unit Gr1-positive>

| | | | | | |
|---|---|---|---|---|---|
| r1 | 100.722 | | | | |
| | | d1 | 1.700 | N1 1.61293 | v1 36.96 |
| r2 | 49.221 | | | | |
| | | d2 | 6.460 | N2 1.49310 | v2 83.58 |
| r3 | −1678.106 | | | | |
| | | d3 | 0.100 | | |
| r4 | 56.111 | | | | |
| | | d4 | 3.820 | N3 1.49310 | v3 83.58 |
| r5 | 859.262 | | | | |
| | | d5 | 3.300~27.890~41.425 | | |

<Second Lens Unit Gr2-negative>
{Front Lens Unit GrA-Image Blur Compensating Lens Unit}

| | | | | | |
|---|---|---|---|---|---|
| r6 | −69.399 | | | | |
| | | d6 | 1.830 | N4 1.71300 | v4 53.93 |
| r7 | 34.412 | | | | |
| | | d7 | 3.000 | | |
| r8 | 38.193 | | | | |
| | | d8 | 2.750 | N5 1.67339 | v5 29.25 |
| r9 | 1893.115 | | | | |
| | | d9 | 2.000 | | |
| r10 | −35.714 | | | | |
| | | d10 | 1.215 | N6 1.51728 | v6 69.43 |
| r11 | −29.097 | | | | |
| | | d11 | 2.000 | | |

{Rear Lens Unit GrB}

| | | | | | |
|---|---|---|---|---|---|
| r12 | −24.999 | | | | |
| | | d12 | 1.215 | N7 1.51728 | v7 69.43 |
| r13 | −30.588 | | | | |
| | | d13 | 20.004~4.713~1.036 | | |

<Aperture Diaphragm S, Third Lens Unit Gr3-positive>

| | | | | | |
|---|---|---|---|---|---|
| r14 | ∞ (Aperture Diaphragm S) | | | | |
| | | d14 | 1.380 | | |
| r15 | 60.855 | | | | |
| | | d15 | 1.300 | N8 1.84666 | v8 23.82 |
| r16 | 26.095 | | | | |
| | | d16 | 2.460 | | |
| r17 | 41.450 | | | | |
| | | d17 | 2.840 | N9 1.51680 | v9 64.20 |
| r18 | −111.975 | | | | |
| | | d18 | 0.400 | | |
| r19 | 35.623 | | | | |
| | | d19 | 4.550 | N10 1.51680 | v10 64.20 |
| r20 | −42.960 | | | | |
| | | d20 | 20.260~9.024~0.874 | | |

<Fourth Lens Unit Gr4-negative>

| | | | | | |
|---|---|---|---|---|---|
| r21 | 206.481 | | | | |
| | | d21 | 1.080 | N11 1.71300 | v11 53.93 |
| r22 | 24.106 | | | | |
| | | d22 | 1.540 | | |
| r23 | −195.003 | | | | |
| | | d23 | 3.480 | N12 1.67339 | v12 29.25 |
| r24 | −18.789 | | | | |
| | | d24 | 1.130 | N13 1.75450 | v13 51.57 |
| r25 | ∞ | | | | |
| | | Σd = 89.815~87.878~89.586 | | | |

TABLE 13

<< Embodiment 11 >>
f = 82.2~160.0~233.6
FNO = 4.60~5.81~6.60

| | Radius of Curvature | Axial Distance | Refractive Index | | Abbe Number |
|---|---|---|---|---|---|

<First Lens Unit Gr1-positive>

| | | | | | |
|---|---|---|---|---|---|
| r1 | 103.105 | | | | |
| | | d1 | 1.700 | N1 1.61293 | v1 36.96 |
| r2 | 47.562 | | | | |
| | | d2 | 6.460 | N2 1.49310 | v2 83.58 |
| r3 | −214.862 | | | | |
| | | d3 | 0.100 | | |
| r4 | 50.735 | | | | |
| | | d4 | 3.820 | N3 1.49310 | v3 83.58 |
| r5 | 247.066 | | | | |
| | | d5 | 3.300~25.679~34.769 | | |

<Second Lens Unit Gr2-negative>
{Front Lens Unit GrA-Image Blur Compensating Lens Unit}

| | | | | | |
|---|---|---|---|---|---|
| r6 | −70.232 | | | | |
| | | d6 | 1.830 | N4 1.71300 | v4 53.93 |
| r7 | 33.675 | | | | |
| | | d7 | 1.000 | | |
| r8 | 20.095 | | | | |
| | | d8 | 2.000 | N5 1.51728 | v5 69.43 |
| r9 | 24.008 | | | | |
| | | d9 | 2.000 | | |

{Rear Lens Unit GrB}

| | | | | | |
|---|---|---|---|---|---|
| r10 | 30.117 | | | | |
| | | d10 | 1.215 | N6 1.51728 | v6 69.43 |
| r11 | 19.468 | | | | |
| | | d11 | 1.000 | | |
| r12 | 27.326 | | | | |
| | | d12 | 2.750 | N7 1.67339 | v7 29.25 |
| r13 | 157.462 | | | | |
| | | d13 | 22.913~7.665~1.036 | | |

<Aperture Diaphragm S, Third Lens Unit Gr3-positive>

| | | | | | |
|---|---|---|---|---|---|
| r14 | ∞ (Aperture Diaphragm S) | | | | |
| | | d14 | 1.380 | | |
| r15 | 86.768 | | | | |
| | | d15 | 1.300 | N8 1.84666 | v8 23.82 |
| r16 | 28.577 | | | | |
| | | d16 | 2.460 | | |
| r17 | 46.617 | | | | |
| | | d17 | 2.840 | N9 1.51680 | v9 64.20 |
| r18 | −58.745 | | | | |
| | | d18 | 0.400 | | |
| r19 | 34.744 | | | | |
| | | d19 | 4.550 | N10 1.51680 | v10 64.20 |
| r20 | −42.470 | | | | |
| | | d20 | 18.566~7.464~0.874 | | |

<Fourth Lens Unit Gr4-negative>

| | | | | | |
|---|---|---|---|---|---|
| r21 | 488.716 | | | | |
| | | d21 | 1.080 | N11 1.71300 | v11 53.93 |
| r22 | 24.791 | | | | |
| | | d22 | 1.540 | | |
| r23 | −153.247 | | | | |
| | | d23 | 3.480 | N12 1.67339 | v12 29.25 |
| r24 | −17.314 | | | | |
| | | d24 | 1.130 | N13 1.75450 | v13 51.57 |
| r25 | ∞ | | | | |
| | | Σd = 88.815~84.843~80.715 | | | |

TABLE 14

<< Embodiment 12 >>
f = 82.2~160.0~233.6
FNO = 4.60~5.81~6.12

| | Radius of Curvature | Axial Distance | | Refractive Index | | Abbe Number |
|---|---|---|---|---|---|---|
| <First Lens Unit Gr1-positive> | | | | | | |
| r1 | 113.986 | | | | | |
| | | d1 | 1.700 | N1 | 1.61293 v1 | 36.96 |
| r2 | 53.568 | | | | | |
| | | d2 | 6.460 | N2 | 1.49310 v2 | 83.58 |
| r3 | −277.902 | | | | | |
| | | d3 | 0.100 | | | |
| r4 | 51.402 | | | | | |
| | | d4 | 3.820 | N3 | 1.49310 v3 | 83.58 |
| r5 | 313.208 | | | | | |
| | | d5 | 3.300~26.254~39.244 | | | |
| <Second Lens Unit Gr2-negative> {Front Lens Unit GrA} | | | | | | |
| r6 | −58.146 | | | | | |
| | | d6 | 1.830 | N4 | 1.71300 v4 | 53.93 |
| r7 | 36.289 | | | | | |
| | | d7 | 1.000 | | | |
| r8 | 29.826 | | | | | |
| | | d8 | 1.215 | N5 | 1.51728 v5 | 69.43 |
| r9 | 48.766 | | | | | |
| | | d9 | 2.500 | | | |
| {Rear Lens Unit GrB-Image Blur Compensating Lens Unit} | | | | | | |
| r10 | 61.169 | | | | | |
| | | d10 | 1.215 | N6 | 1.51728 v6 | 69.43 |
| r11 | 29.572 | | | | | |
| | | d11 | 1.000 | | | |
| r12 | 36.154 | | | | | |
| | | d12 | 2.750 | N7 | 1.67339 v7 | 29.25 |
| r13 | −598.254 | | | | | |
| | | d13 | 22.097~5.758~1.036 | | | |
| <Aperture Diaphragm S, Third Lens Unit Gr3-positive> | | | | | | |
| r14 | ∞ (Aperture Diaphragm S) | | | | | |
| | | d14 | 1.380 | | | |
| r15 | 72.175 | | | | | |
| | | d15 | 1.300 | N8 | 1.84666 v8 | 23.82 |
| r16 | 25.379 | | | | | |
| | | d16 | 2.460 | | | |
| r17 | 49.093 | | | | | |
| | | d17 | 2.840 | N9 | 1.51680 v9 | 64.20 |
| r18 | −82.965 | | | | | |
| | | d18 | 0.400 | | | |
| r19 | 29.756 | | | | | |
| | | d19 | 4.550 | N10 | 1.51680 v10 | 64.20 |
| r20 | −40.741 | | | | | |
| | | d20 | 19.667~8.830~0.874 | | | |
| <Fourth Lens Unit Gr4-negative> | | | | | | |
| r21 | 170.677 | | | | | |
| | | d21 | 1.080 | N11 | 1.71300 v11 | 53.93 |
| r22 | 22.780 | | | | | |
| | | d22 | 1.540 | | | |
| r23 | −161.563 | | | | | |
| | | d23 | 3.480 | N12 | 1.67339 v12 | 29.25 |
| r24 | −17.326 | | | | | |
| | | d24 | 1.130 | N13 | 1.75450 v13 | 51.57 |
| r25 | ∞ | | | | | |
| | | Σd = 88.815~84.593~84.906 | | | | |

TABLE 15

<< Embodiment 13 >>
f = 82.2~160.0~233.6
FNO = 4.69~5.81~6.03

| | Radius of Curvature | Axial Distance | | Refractive Index | | Abbe Number |
|---|---|---|---|---|---|---|
| <First Lens Unit Gr1-positive> | | | | | | |
| r1 | 106.492 | | | | | |
| | | d1 | 1.700 | N1 | 1.61293 v1 | 36.96 |
| r2 | 50.420 | | | | | |
| | | d2 | 6.460 | N2 | 1.49310 v2 | 83.58 |
| r3 | −246.009 | | | | | |
| | | d3 | 0.100 | | | |
| r4 | 49.684 | | | | | |
| | | d4 | 3.820 | N3 | 1.49310 v3 | 83.58 |
| r5 | 239.154 | | | | | |
| | | d5 | 3.300~26.710~38.554 | | | |
| <Second Lens Unit Gr2-negative> {Front Lens Unit GrA} | | | | | | |
| r6 | −61.101 | | | | | |
| | | d6 | 1.830 | N4 | 1.71300 v4 | 53.93 |
| r7 | 48.903 | | | | | |
| | | d7 | 4.000 | | | |
| {Rear Lens Unit GrB-Image Blur Compensating Lens Unit} | | | | | | |
| r8 | 59.747 | | | | | |
| | | d8 | 1.215 | N5 | 1.51728 v5 | 69.43 |
| r9 | 30.253 | | | | | |
| | | d9 | 1.000 | | | |
| r10 | 37.070 | | | | | |
| | | d10 | 2.750 | N6 | 1.67339 v6 | 29.25 |
| r11 | −570.337 | | | | | |
| | | d11 | 22.350~6.417~1.036 | | | |
| <Aperture Diaphragm S, Third Lens Unit Gr3-positive> | | | | | | |
| r12 | ∞ (Aperture Diaphragm S) | | | | | |
| | | d12 | 1.380 | | | |
| r13 | 75.177 | | | | | |
| | | d13 | 1.300 | N7 | 1.84666 v7 | 23.82 |
| r14 | 25.910 | | | | | |
| | | d14 | 2.460 | | | |
| r15 | 49.949 | | | | | |
| | | d15 | 2.840 | N8 | 1.51680 v8 | 64.20 |
| r16 | −80.657 | | | | | |
| | | d16 | 0.400 | | | |
| r17 | 31.812 | | | | | |
| | | d17 | 4.550 | N9 | 1.51680 v9 | 64.20 |
| r18 | −37.178 | | | | | |
| | | d18 | 20.130~8.855~0.874 | | | |
| <Fourth Lens Unit Gr4-negative> | | | | | | |
| r19 | 183.147 | | | | | |
| | | d19 | 1.080 | N10 | 1.71300 v10 | 53.93 |
| r20 | 23.293 | | | | | |
| | | d20 | 1.540 | | | |
| r21 | −137.477 | | | | | |
| | | d21 | 3.480 | N11 | 1.67339 v11 | 29.25 |
| r22 | −17.437 | | | | | |
| | | d22 | 1.130 | N12 | 1.75450 v12 | 51.57 |
| r23 | ∞ | | | | | |
| | | Σd = 88.815~85.017~83.500 | | | | |

TABLE 16

<< Embodiment 14 >>
f = 80.2~235.1~305.9
FNO = 4.60~6.50~6.90

| | Radius of Curvature | Axial Distance | | Refractive Index | | Abbe Number |
|---|---|---|---|---|---|---|
| <First Lens Unit Gr1-positive> | | | | | | |
| r1 | 158.114 | | | | | |
| | | d1 | 1.955 | N1 | 1.85000 ν1 | 40.04 |
| r2 | 68.648 | | | | | |
| | | d2 | 6.255 | N2 | 1.49310 ν2 | 83.58 |
| r3 | −154.056 | | | | | |
| | | d3 | 0.156 | | | |
| r4 | 57.897 | | | | | |
| | | d4 | 3.597 | N3 | 1.48749 ν3 | 70.44 |
| r5 | 184.014 | | | | | |
| | | d5 | 3.127~51.345~64.591 | | | |
| <Second Lens Unit Gr2-negative> | | | | | | |
| {Front Lens Unit GrA-Image Blur Compensating Lens Unit} | | | | | | |
| r6 | −58.146 | | | | | |
| | | d6 | 0.391 | N4 | 1.69680 ν4 | 56.47 |
| r7 | 21.988 | | | | | |
| | | d7 | 2.033 | N5 | 1.75520 ν5 | 27.51 |
| r8* | 36.559 | | | | | |
| | | d8 | 2.619 | | | |
| {Rear Lens Unit GrB} | | | | | | |
| r9* | 41.898 | | | | | |
| | | d9 | 1.877 | N6 | 1.61800 ν6 | 63.39 |
| r10 | −157.007 | | | | | |
| | | d10 | 39.082~8.439~1.564 | | | |
| <Aperture Diaphragm S, Third Lens Unit Gr3-positive> | | | | | | |
| r11 | ∞ (Aperture Diaphragm S) | | | | | |
| | | d11 | 1.407 | | | |
| r12 | −923.532 | | | | | |
| | | d12 | 1.173 | N7 | 1.84666 ν7 | 23.83 |
| r13 | 38.530 | | | | | |
| | | d13 | 2.111 | | | |
| r14 | 189.888 | | | | | |
| | | d14 | 2.346 | N8 | 1.59270 ν8 | 35.45 |
| r15 | −66.538 | | | | | |
| | | d15 | 1.095 | | | |
| r16 | 63.084 | | | | | |
| | | d16 | 1.877 | N9 | 1.51680 ν9 | 64.20 |
| r17 | −240.098 | | | | | |
| | | d17 | 0.078 | | | |
| r18 | 39.252 | | | | | |
| | | d18 | 3.518 | N10 | 1.48749 ν10 | 70.44 |
| r19 | −48.315 | | | | | |
| | | d19 | 24.727~7.153~0.782 | | | |
| <Fourth Lens Unit Gr4-negative> | | | | | | |
| r20 | 212.197 | | | | | |
| | | d20 | 0.938 | N11 | 1.75450 ν11 | 51.57 |
| r21 | 27.379 | | | | | |
| | | d21 | 2.580 | | | |
| r22 | −171.245 | | | | | |
| | | d22 | 2.502 | N12 | 1.67339 ν12 | 29.25 |
| r23 | −20.480 | | | | | |
| | | d23 | 0.938 | N13 | 1.69680 ν13 | 56.47 |
| r24 | 370.701 | | | | | |
| | | Σd = 106.383~106.383~106.383 | | | | |

[Aspherical Coefficient]

r8: ε = 1.0000
 A4 = −0.61121 × 10$^{-5}$
r9: ε = 1.0000
 A4 = −0.69911 × 10$^{-5}$
 A6 = 0.95248 × 10$^{-6}$
 A8 = −0.51197 × 10$^{-10}$
 A10 = −0.48524 × 10$^{-12}$
 A12 = 0.38472 × 10$^{-14}$

TABLE 17

<< Embodiment 15 >>
f = 30.6~64.7~165.1
FNO = 4.60~5.23~5.81

| | Radius of Curvature | Axial Distance | | Refractive Index | | Abbe Number |
|---|---|---|---|---|---|---|
| <First Lens Unit Gr1-positive> | | | | | | |
| r1 | 89.595 | | | | | |
| | | d1 | 1.530 | N1 | 1.84666 ν1 | 23.82 |
| r2 | 50.523 | | | | | |
| | | d2 | 6.970 | N2 | 1.58913 ν2 | 61.11 |
| r3 | 885.692 | | | | | |
| | | d3 | 0.127 | | | |
| r4 | 47.852 | | | | | |
| | | d4 | 5.695 | N3 | 1.51680 ν3 | 64.20 |
| r5 | 218.621 | | | | | |
| | | d5 | 0.467~17.796~41.243 | | | |
| <Second Lens Unit Gr2-negative> | | | | | | |
| {Front Lens Unit GrA} | | | | | | |
| r6 | 73.128 | | | | | |
| | | d6 | 1.020 | N4 | 1.85000 ν4 | 40.04 |
| r7 | 14.317 | | | | | |
| | | d7 | 4.420 | | | |
| r8 | −404.817 | | | | | |
| | | d8 | 2.550 | N5 | 1.75000 ν5 | 25.14 |
| r9 | −31.873 | | | | | |
| | | d9 | 1.020 | N6 | 1.77250 ν6 | 49.77 |
| r10 | 36.869 | | | | | |
| | | d10 | 1.105 | | | |
| r11 | 22.548 | | | | | |
| | | d11 | 2.635 | N7 | 1.76182 ν7 | 26.55 |
| r12 | 212.813 | | | | | |
| | | d12 | 1.530 | | | |
| {Rear Lens Unit GrB-Image Blur Compensating Lens Unit} | | | | | | |
| r13 | −45.353 | | | | | |
| | | d13 | 1.000 | N8 | 1.75450 ν8 | 51.57 |
| r14 | 38.340 | | | | | |
| | | d14 | 1.000 | N9 | 1.80518 ν9 | 25.43 |
| r15 | 171.510 | | | | | |
| | | d15 | 17.275~8.731~1.714 | | | |
| <Aperture Diaphragm S, Third Lens Unit Gr3-positive> | | | | | | |
| r16 | ∞ (Aperture Diaphragm S) | | | | | |
| | | d16 | 1.062 | | | |
| r17 | 33.590 | | | | | |
| | | d17 | 2.125 | N10 | 1.51680 ν10 | 64.20 |
| r18 | 145.888 | | | | | |
| | | d18 | 0.085 | | | |
| r19 | 28.299 | | | | | |
| | | d19 | 2.720 | N11 | 1.51823 ν11 | 58.96 |
| r20 | −4683.183 | | | | | |
| | | d20 | 0.127 | | | |
| r21 | 40.246 | | | | | |
| | | d21 | 2.380 | N12 | 1.51680 ν12 | 64.20 |
| r22 | −101.132 | | | | | |
| | | d22 | 2.125 | | | |
| r23 | −26.751 | | | | | |
| | | d23 | 1.020 | N13 | 1.84666 ν13 | 23.82 |
| r24 | 397.583 | | | | | |
| | | d24 | 4.505~1.969~1.360 | | | |
| <Fourth Lens Unit Gr4-positive> | | | | | | |
| r25 | 43.689 | | | | | |
| | | d25 | 2.550 | N14 | 1.51823 ν14 | 58.96 |
| r26 | −52.186 | | | | | |
| | | d26 | 0.127 | | | |
| r27 | 35.901 | | | | | |
| | | d27 | 2.890 | N15 | 1.51823 ν15 | 58.96 |
| r28 | −32.031 | | | | | |
| | | d28 | 3.187 | | | |
| r29* | −70.884 | | | | | |
| | | d29 | 0.030 | N16 | 1.51790 ν16 | 52.31 |
| r30 | −58.398 | | | | | |
| | | d30 | 1.190 | N17 | 1.85000 ν17 | 40.04 |

TABLE 17-continued

| | | | | | | |
|---|---|---|---|---|---|---|
| r31 | 23.219 | | | | | |
| | | d31 | 1.020 | | | |
| r32 | 68.181 | | | | | |
| | | d32 | 2.550 | N18 | 1.67339 v18 | 29.25 |
| r33 | −66.682 | | | | | |
| | | d33 | 1.700~9.782~0.628 | | | |

<Fifth Lens Unit Gr5-negative>

| | | | | | | |
|---|---|---|---|---|---|---|
| r34 | −41.406 | | | | | |
| | | d34 | 1.598 | N19 | 1.67000 v19 | 57.07 |
| r35 | −98.910 | | | | | |
| | | $\Sigma d$ = 81.338~95.669~102.335 | | | | |

[Aspherical Coefficient]

r29: $\epsilon$ = 1.0000
$A4 = -0.68521 \times 10^{-4}$
$A6 = -0.10099 \times 10^{-6}$
$A8 = -0.23092 \times 10^{-8}$
$A10 = 0.11744 \times 10^{-9}$
$A12 = -0.13601 \times 10^{-11}$

TABLE 18

| | (fT/fW) · (βLW/βLT) | MT/MW |
|---|---|---|
| Embodiment 10 | 1.71 | 1.78 |
| Embodiment 11 | 1.60 | 1.92 |
| Embodiment 12 | 1.68 | 2.29 |
| Embodiment 13 | 1.70 | 2.33 |
| Embodiment 14 | 2.00 | 2.52 |
| Embodiment 15 | 4.70 | 2.53 |

TABLE 19

| | φ1 | φ2 | φL | φ2/φ1 | φL/φ1 |
|---|---|---|---|---|---|
| Embodiment 10 | 0.012 | −0.012 | −0.034 | −1.0 | −2.8 |
| Embodiment 11 | 0.013 | −0.014 | −0.037 | −1.1 | −2.8 |
| Embodiment 12 | 0.013 | −0.012 | −0.036 | −0.9 | −2.8 |
| Embodiment 13 | 0.013 | −0.013 | −0.037 | −1.0 | −2.8 |
| Embodiment 14 | 0.009 | −0.010 | −0.031 | −1.1 | −3.4 |
| Embodiment 15 | 0.012 | −0.066 | −0.009 | −5.5 | −0.75 |

TABLE 20

<< Embodiment 16 >>
f = 30.6~64.7~165.1
FNO = 4.60~5.23~5.81

| Radius of Curvature | Axial Distance | Refractive Index | Abbe Number |
|---|---|---|---|

<First Lens Unit Gr1-positive>

| | | | | | | |
|---|---|---|---|---|---|---|
| r1 | 89.595 | | | | | |
| | | d1 | 1.530 | N1 | 1.84666 v1 | 23.82 |
| r2 | 50.523 | | | | | |
| | | d2 | 6.970 | N2 | 1.58913 v2 | 61.11 |
| r3 | 885.692 | | | | | |
| | | d3 | 0.127 | | | |
| r4 | 47.852 | | | | | |
| | | d4 | 5.695 | N3 | 1.51680 v3 | 64.20 |
| r5 | 218.621 | | | | | |
| | | d5 | 0.467~17.796~41.243 | | | |

<Second Lens Unit Gr2-negative>
{Front Lens Unit GrA}

| | | | | | | |
|---|---|---|---|---|---|---|
| r6 | 73.128 | | | | | |
| | | d6 | 1.020 | N4 | 1.85000 v4 | 40.04 |
| r7 | 14.317 | | | | | |
| | | d7 | 4.420 | | | |

TABLE 20-continued

| | | | | | | |
|---|---|---|---|---|---|---|
| r8 | −404.817 | | | | | |
| | | d8 | 2.550 | N5 | 1.75000 v5 | 25.14 |
| r9 | −31.873 | | | | | |
| | | d9 | 1.020 | N6 | 1.77250 v6 | 49.77 |
| r10 | 36.869 | | | | | |
| | | d10 | 1.105 | | | |
| r11 | 22.548 | | | | | |
| | | d11 | 2.635 | N7 | 1.76182 v7 | 26.55 |
| r12 | 212.813 | | | | | |
| | | d12 | 1.530 | | | |

{Rear Lens Unit GrB-Image Blur Compensating Lens Unit}

| | | | | | | |
|---|---|---|---|---|---|---|
| r13 | −45.353 | | | | | |
| | | d13 | 1.000 | N8 | 1.75450 v8 | 51.57 |
| r14 | 38.340 | | | | | |
| | | d14 | 1.000 | N9 | 1.80518 v9 | 25.43 |
| r15 | 171.510 | | | | | |
| | | d15 | 17.275~8.731~1.714 | | | |

<Aperture Diaphragm S, Third Lens Unit Gr3-positive>

| | | | | | | |
|---|---|---|---|---|---|---|
| r16 | ∞ (Aperture Diaphragm S) | | | | | |
| | | d16 | 1.062 | | | |
| r17 | 33.590 | | | | | |
| | | d17 | 2.125 | N10 | 1.51680 v10 | 64.20 |
| r18 | 145.888 | | | | | |
| | | d18 | 0.085 | | | |
| r19 | 28.299 | | | | | |
| | | d19 | 2.720 | N11 | 1.51823 v11 | 58.96 |
| r20 | −4683.183 | | | | | |
| | | d20 | 0.127 | | | |
| r21 | 40.246 | | | | | |
| | | d21 | 2.380 | N12 | 1.51680 v12 | 64.20 |
| r22 | −101.132 | | | | | |
| | | d22 | 2.125 | | | |
| r23 | −26.751 | | | | | |
| | | d23 | 1.020 | N13 | 1.84666 v13 | 23.82 |
| r24 | 397.583 | | | | | |
| | | d24 | 4.505~1.969~1.360 | | | |

<Fourth Lens Unit Gr4-positive>

| | | | | | | |
|---|---|---|---|---|---|---|
| r25 | 43.689 | | | | | |
| | | d25 | 2.550 | N14 | 1.51823 v14 | 58.96 |
| r26 | −52.186 | | | | | |
| | | d26 | 0.127 | | | |
| r27 | 35.901 | | | | | |
| | | d27 | 2.890 | N15 | 1.51823 v15 | 58.96 |
| r28 | −32.031 | | | | | |
| | | d28 | 3.187 | | | |
| r29* | −70.884 | | | | | |
| | | d29 | 0.030 | N16 | 1.51790 v16 | 52.31 |
| r30 | −58.398 | | | | | |
| | | d30 | 1.190 | N17 | 1.85000 v17 | 40.04 |
| r31 | 23.219 | | | | | |
| | | d31 | 1.020 | | | |
| r32 | 68.181 | | | | | |
| | | d32 | 2.550 | N18 | 1.67339 v18 | 29.25 |
| r33 | −66.682 | | | | | |
| | | d33 | 1.700~9.782~0.628 | | | |

<Fifth Lens Unit Gr5-negative>

| | | | | | | |
|---|---|---|---|---|---|---|
| r34 | −41.406 | | | | | |
| | | d34 | 1.598 | N19 | 1.67000 v19 | 57.07 |
| r35 | −98.910 | | | | | |
| | | $\Sigma d$ = 81.338~95.669~102.335 | | | | |

[Aspherical Coefficient]

r29: $\epsilon$ = 1.0000
$A4 = -0.68521 \times 10^{-4}$
$A6 = -0.10299 \times 10^{-6}$
$A8 = -0.23092 \times 10^{-8}$
$A10 = 0.11744 \times 10^{-9}$
$A12 = -0.13601 \times 10^{-11}$

TABLE 21

<< Embodiment 17 >>
f = 22.6~50.5~78.0
FNO = 4.10~5.31~5.73

| Radius of Curvature | Axial Distance | Refractive Index | Abbe Number |
|---|---|---|---|
| <First Lens Unit Gr1-positive> | | | |
| r1  122.692 | | | |
| | d1  1.300 | N1  1.83350  ν1 | 21.00 |
| r2  51.521 | | | |
| | d2  6.550 | N2  1.58913  ν2 | 61.11 |
| r3  −185.231 | | | |
| | d3  0.100 | | |
| r4  27.634 | | | |
| | d4  4.250 | N3  1.71300  ν3 | 53.93 |
| r5  57.348 | | | |
| | d5  1.845~12.466~19.246 | | |
| <Second Lens Unit Gr2-negative> | | | |
| r6  51.452 | | | |
| | d6  1.100 | N4  1.80420  ν4 | 46.50 |
| r7  10.185 | | | |
| | d7  4.400 | | |
| r8  −30.276 | | | |
| | d8  0.950 | N5  1.75450  ν5 | 51.57 |
| r9  20.585 | | | |
| | d9  0.300 | | |
| r10  16.780 | | | |
| | d10  3.700 | N6  1.75000  ν6 | 25.14 |
| r11  −38.497 | | | |
| | d11  0.940 | | |
| r12  −14.318 | | | |
| | d12  1.300 | N7  1.69680  ν7 | 56.47 |
| r13  −47.972 | | | |
| | d13  9.859~4.319~2.000 | | |
| <Aperture Diaphragm S, Third Lens Unit Gr3-positive> | | | |
| r14  ∞ (Aperture Diaphragm S) | | | |
| | d14  0.500 | | |
| {Front Lens Unit GrA-Image Blur Compensating Lens Unit} | | | |
| r15  32.322 | | | |
| | d15  1.500 | N8  1.62041  ν8 | 60.29 |
| r16*  −24.847 | | | |
| | d16  0.500 | | |
| {Rear Lens Unit GrB} | | | |
| r17*  −24.847 | | | |
| | d17  1.310 | N9  1.62041  ν9 | 60.29 |
| r18  −24.706 | | | |
| | d18  0.110 | | |
| r19  24.077 | | | |
| | d19  4.710 | N10  1.51742  ν10 | 52.15 |
| r20  −12.877 | | | |
| | d20  1.360 | N11  1.80741  ν11 | 31.59 |
| r21  133.539 | | | |
| | d21  5.300~1.467~1.000 | | |
| <Fourth Lens Unit Gr4-positive> | | | |
| r22  35.194 | | | |
| | d22  4.820 | N12  1.51823  ν12 | 58.96 |
| r23  −17.079 | | | |
| | d23  1.470 | | |
| r24*  −125.833 | | | |
| | d24  0.100 | N13  1.51790  ν13 | 52.31 |
| r25  −56.309 | | | |
| | d25  1.400 | N14  1.80500  ν14 | 40.97 |
| r26  39.727 | | | |
| | Σd = 59.674~60.923~64.916 | | |

[Aspherical Coefficient]

r16: ε = 1.0000
A4 = 0.33000 × 10⁻⁴
r17: ε = 1.0000
A4 = 0.33000 × 10⁻⁴
r24: ε = 1.0000
A4 = −0.10469 × 10⁻³
A6 = −0.34301 × 10⁻⁶
A8 = −0.53437 × 10⁻⁹
A10 = −0.14584 × 10⁻¹⁰
A12 = −0.75981 × 10⁻¹⁵

TABLE 22

<< Embodiment 18 >>
f = 22.6~47.2~80.7
FNO = 3.57~4.38~4.63

| Radius of Curvature | Axial Distance | Refractive Index | Abbe Number |
|---|---|---|---|
| <First Lens Unit Gr1-positive> | | | |
| r1  7010.858 | | | |
| | d1  1.339 | N1  1.84666  ν1 | 23.78 |
| r2  50.822 | | | |
| | d2  6.300 | N2  1.61272  ν2 | 58.75 |
| r3  −142.661 | | | |
| | d3  0.118 | | |
| r4  33.789 | | | |
| | d4  3.937 | N3  1.83400  ν3 | 37.17 |
| r5  86.386 | | | |
| | d5  1.696~13.804~21.178 | | |
| <Second Lens Unit Gr2-negative> | | | |
| r6  39.339 | | | |
| | d6  1.102 | N4  1.83400  ν4 | 37.17 |
| r7  11.226 | | | |
| | d7  4.804 | | |
| r8  −26.223 | | | |
| | d8  2.126 | N5  1.78472  ν5 | 25.68 |
| r9  −15.872 | | | |
| | d9  1.024 | N6  1.77250  ν6 | 49.60 |
| r10  41.165 | | | |
| | d10  0.118 | | |
| r11  22.587 | | | |
| | d11  3.071 | N7  1.78472  ν7 | 25.68 |
| r12  −27.632 | | | |
| | d12  1.102 | | |
| R13  −18.584 | | | |
| | d13  1.024 | N8  1.81554  ν8 | 44.36 |
| r14  321.763 | | | |
| | d14  9.368~4.115~1.069 | | |
| <Aperture Diaphragm S, Third Lens Unit Gr3-positive> | | | |
| r15  ∞ (Aperture Diaphragm S) | | | |
| | d15  1.496 | | |
| r16  29.194 | | | |
| | d16  3.465 | N9  1.61800  ν9 | 63.39 |
| r17  −40.669 | | | |
| | d17  0.079 | | |
| r18  27.739 | | | |
| | d18  5.591 | N10  1.56873  ν10 | 63.16 |
| r19  −14.928 | | | |
| | d19  1.181 | N11  1.83400  ν11 | 37.17 |
| r20  102.907 | | | |
| | d20  7.384~3.742~2.663 | | |
| <Fourth Lens Unit Gr4-positive> | | | |
| {Front Lens Unit GrA-Image Blur Compensating Lens Unit} | | | |
| r21  24.467 | | | |
| | d21  2.362 | N12  1.58170  ν12 | 69.75 |
| r22*  −59.882 | | | |
| | d22  0.354 | | |
| {Rear Lens Unit GrB} | | | |
| r23*  59.882 | | | |
| | d23  1.575 | N13  1.75450  ν13 | 51.57 |
| r24  −27.635 | | | |
| | d24  2.756 | | |
| r25*  −86.973 | | | |
| | d25  1.488 | N14  1.74500  ν14 | 34.96 |

TABLE 22-continued

| | | | | | |
|---|---|---|---|---|---|
| r26 | 34.087 | | | | |
| | $\Sigma d = 64.862\sim68.073\sim71.323$ | | | | |

[Aspherical Coefficient]

r22: $\epsilon = 1.0000$
$A4 = 0.27748 \times 10^{-4}$
r23: $\epsilon = 1.0000$
$A4 = 0.25095 \times 10^{-4}$
r25: $\epsilon = 1.0000$
$A4 = -0.76769 \times 10^{-4}$
$A6 = -0.21795 \times 10^{-6}$
$A8 = 0.57736 \times 10^{-9}$
$A10 = -0.52121 \times 10^{-11}$
$A12 = 0.27373 \times 10^{-13}$

TABLE 23

<< Embodiment 19 >>
$f = 22.6\sim50.5\sim78.0$
$FNO = 4.10\sim5.45\sim6.20$

| | Radius of Curvature | Axial Distance | Refractive Index | | Abbe Number |
|---|---|---|---|---|---|
| <First Lens Unit Gr1-positive> | | | | | |
| r1 | 69.769 | | | | |
| | | d1 | 1.300 | N1 1.83350 | v1 21.00 |
| r2 | 45.196 | | | | |
| | | d2 | 6.550 | N2 1.58913 | v2 61.11 |
| r3 | −397.682 | | | | |
| | | d3 | 0.100 | | |
| r4 | 36.176 | | | | |
| | | d4 | 4.250 | N3 1.71300 | v3 53.93 |
| r5 | 44.734 | | | | |
| | | d5 | 1.845~14.591~25.237 | | |
| <Second Lens Unit Gr2-negative> | | | | | |
| {Front Lens Unit GrA} | | | | | |
| r6 | 123.224 | | | | |
| | | d6 | 1.1000 | N4 1.80420 | v4 46.50 |
| r7 | 11.538 | | | | |
| | | d7 | 4.400 | | |
| r8 | −72.748 | | | | |
| | | d8 | 0.950 | N5 1.75450 | v5 51.57 |
| r9 | 26.505 | | | | |
| | | d9 | 0.300 | | |
| r10 | 17.282 | | | | |
| | | d10 | 3.700 | N6 1.75000 | v6 25.14 |
| r11 | −51.639 | | | | |
| | | d11 | 0.940 | | |
| {Rear Lens Unit GrB-Image Blur Compensating Lens Unit} | | | | | |
| r12 | −28.103 | | | | |
| | | d12 | 1.300 | N7 1.69680 | v7 56.47 |
| r13 | 64.162 | | | | |
| | | d13 | 10.332~3.957~2.000 | | |
| <Aperture Diaphragm S, Third Lens Unit Gr3-positive> | | | | | |
| r14 | ∞ (Aperture Diaphragm S) | | | | |
| | | d14 | 0.500 | | |
| r15 | 21.611 | | | | |
| | | d15 | 3.310 | N8 1.62041 | v8 60.29 |
| r16 | −68.274 | | | | |
| | | d16 | 0.110 | | |
| r17 | 24.544 | | | | |
| | | d17 | 4.710 | N9 1.51742 | v9 52.15 |
| r18 | −13.473 | | | | |
| | | d18 | 1.360 | N10 1.80741 | v10 31.59 |
| r19 | 80.836 | | | | |
| | | d19 | 5.300~2.063~1.000 | | |
| <Fourth Lens Unit Gr4-positive> | | | | | |
| r20 | 27.647 | | | | |
| | | d20 | 4.820 | N11 1.51823 | v11 58.96 |

TABLE 23-continued

| | | | | | |
|---|---|---|---|---|---|
| r21 | −19.138 | | | | |
| | | d21 | 1.470 | | |
| r22* | 1610.591 | | | | |
| | | d22 | 0.100 | N12 1.51790 | v12 52.31 |
| r23 | −292.156 | | | | |
| | | d23 | 1.400 | N13 1.80500 | v13 40.97 |
| r24 | 42.444 | | | | |
| | $\Sigma d = 60.147\sim63.282\sim70.907$ | | | | |

[Aspherical Coefficient]

r22: $\epsilon = 1.0000$
$A4 = 0.10446 \times 10^{-3}$
$A6 = -0.34881 \times 10^{-6}$
$A8 = -0.56963 \times 10^{-9}$
$A10 = -0.14711 \times 10^{-10}$
$A12 = -0.89025 \times 10^{-15}$

TABLE 24

| | | | D/f | | |
|---|---|---|---|---|---|
| | f1/fW | fR/fW | [W] | [T] | |Pd|/fW |
| Embodiment 16 | 2.71 | 0.853 | 0.56 | 0.01 | 0.60 |
| Embodiment 17 | 2.29 | 0.825 | 0.02 | 0.01 | 0.99 |
| Embodiment 18 | 2.65 | 0.876 | 0.85 | 0.18 | 0.74 |
| Embodiment 19 | 3.48 | 0.897 | 0.46 | 0.03 | 0.81 |

TABLE 25

<< Embodiment 20 >>
$f = 22.6\sim50.5\sim78.0$
$FNO = 4.10\sim5.31\sim5.73$

| | Radius of Curvature | Axial Distance | Refractive Index | | Abbe Number |
|---|---|---|---|---|---|
| <First Lens Unit Gr1-positive> | | | | | |
| r1 | 122.692 | | | | |
| | | d1 | 1.300 | N1 1.83350 | v1 21.00 |
| r2 | 51.521 | | | | |
| | | d2 | 6.550 | N2 1.58913 | v2 61.11 |
| r3 | −185.231 | | | | |
| | | d3 | 0.100 | | |
| r4 | 27.634 | | | | |
| | | d4 | 4.250 | N3 1.71300 | v3 53.93 |
| r5 | 57.348 | | | | |
| | | d5 | 1.845~12.466~19.246 | | |
| <Second Lens Unit Gr2-negative> | | | | | |
| r6 | 51.452 | | | | |
| | | d6 | 1.100 | N4 1.80420 | v4 46.50 |
| r7 | 10.185 | | | | |
| | | d7 | 4.400 | | |
| r8 | −30.276 | | | | |
| | | d8 | 0.950 | N5 1.75450 | v5 51.57 |
| r9 | 20.585 | | | | |
| | | d9 | 0.300 | | |
| r10 | 16.780 | | | | |
| | | d10 | 3.700 | N6 1.75000 | v6 25.14 |
| r11 | −38.497 | | | | |
| | | d11 | 0.940 | | |
| r12 | −14.318 | | | | |
| | | d12 | 1.300 | N7 1.69680 | v7 56.47 |
| r13 | −47.972 | | | | |
| | | d13 | 9.859~4.319~2.000 | | |
| <Aperture Diaphragm S, Third Lens Unit Gr3 - positive> | | | | | |
| r14 | ∞ (Aperture Diaphragm S) | | | | |
| | | d14 | 0.500 | | |

TABLE 25-continued

{Front Lens Unit GrA-Image Blur Compensating Lens Unit}

| | Radius of Curvature | | Axial Distance | | Refractive Index | | Abbe Number |
|---|---|---|---|---|---|---|---|
| r15 | 32.322 | | | | | | |
| | | d15 | 1.500 | N8 | 1.62041 | v8 | 60.29 |
| r16* | −24.847 | | | | | | |
| | | d16 | 0.500 | | | | |

{Rear Lens Unit GrB}

| | | | | | | | |
|---|---|---|---|---|---|---|---|
| r17* | −24.847 | | | | | | |
| | | d17 | 1.310 | N9 | 1.62041 | v9 | 60.29 |
| r18 | −24.706 | | | | | | |
| | | d18 | 0.110 | | | | |
| r19 | 24.077 | | | | | | |
| | | d19 | 4.710 | N10 | 1.51742 | v10 | 52.15 |
| r20 | −12.877 | | | | | | |
| | | d20 | 1.360 | N11 | 1.80741 | v11 | 31.59 |
| r21 | 133.539 | | | | | | |
| | | d21 | 5.300~1.467~1.000 | | | | |

<Fourth Lens Unit Gr4-positive>

| | | | | | | | |
|---|---|---|---|---|---|---|---|
| r22 | 35.194 | | | | | | |
| | | d22 | 4.820 | N12 | 1.51823 | v12 | 58.96 |
| r23 | −17.079 | | | | | | |
| | | d23 | 1.470 | | | | |
| r24* | −125.833 | | | | | | |
| | | d24 | 0.100 | N13 | 1.51790 | v13 | 52.31 |
| r25 | −56.309 | | | | | | |
| | | d25 | 1.400 | N14 | 1.80500 | v14 | 40.97 |
| r26 | 39.727 | | | | | | |
| | Σd = 59.674~60.923~64.916 | | | | | | |

[Aspherical Coefficient]

r16: ϵ = 1.0000
A4 = 0.33000 × 10$^{-4}$
r17: ϵ = 1.0000
A4 = 0.33000 × 10$^{-4}$
r24: ϵ = 1.0000
A4 = −0.10469 × 10$^{-3}$
A6 = −0.34301 × 10$^{-6}$
A8 = −0.53437 × 10$^{-9}$
A10 = 0.14584 × 10$^{-10}$
A12 = −0.75981 × 10$^{-15}$

TABLE 26

<< Embodiment 21 >>
f = 22.6~47.2~80.7
FNO = 3.57~4.38~4.63

| | Radius of Curvature | | Axial Distance | | Refractive Index | | Abbe Number |
|---|---|---|---|---|---|---|---|

<First Lens Unit Gr1-positive>

| | | | | | | | |
|---|---|---|---|---|---|---|---|
| r1 | 701.858 | | | | | | |
| | | d1 | 1.339 | N1 | 1.84666 | v1 | 23.78 |
| r2 | 50.822 | | | | | | |
| | | d2 | 6.300 | N2 | 1.61272 | v2 | 58.75 |
| r3 | −142.661 | | | | | | |
| | | d3 | 0.118 | | | | |
| r4 | 33.789 | | | | | | |
| | | d4 | 3.937 | N3 | 1.83400 | v3 | 37.17 |
| r5 | 86.386 | | | | | | |
| | | d5 | 1.696~13.804~21.178 | | | | |

<Second Lens Unit Gr2-negative>

| | | | | | | | |
|---|---|---|---|---|---|---|---|
| r6 | 39.339 | | | | | | |
| | | d6 | 1.102 | N4 | 1.83400 | v4 | 37.17 |
| r7 | 11.226 | | | | | | |
| | | d7 | 4.804 | | | | |
| r8 | −26.223 | | | | | | |
| | | d8 | 2.126 | N5 | 1.78472 | v5 | 25.68 |
| r9 | −15.872 | | | | | | |
| | | d9 | 1.024 | N6 | 1.77250 | v6 | 49.60 |
| r10 | 41.165 | | | | | | |
| | | d10 | 0.118 | | | | |

TABLE 26-continued

| | | | | | | | |
|---|---|---|---|---|---|---|---|
| r11 | 22.587 | | | | | | |
| | | d11 | 3.071 | N7 | 1.78472 | v7 | 25.68 |
| r12 | −27.632 | | | | | | |
| | | d12 | 1.102 | | | | |
| r13 | −18.584 | | | | | | |
| | | d13 | 1.024 | N8 | 1.81554 | v8 | 44.36 |
| r14 | 321.763 | | | | | | |
| | | d14 | 9.368~4.115~1.069 | | | | |

<Aperture Diaphragm S, Third Lens Unit Gr3-positive>

| | | | | | | | |
|---|---|---|---|---|---|---|---|
| r15 | ∞ (Aperture Diaphragm S) | | | | | | |
| | | d15 | 1.496 | | | | |
| r16 | 29.194 | | | | | | |
| | | d16 | 3.465 | N9 | 1.61800 | v9 | 63.39 |
| r17 | −40.669 | | | | | | |
| | | d17 | 0.079 | | | | |
| r18 | 27.739 | | | | | | |
| | | d18 | 5.591 | N10 | 1.56873 | v10 | 63.16 |
| r19 | −14.928 | | | | | | |
| | | d19 | 1.181 | N11 | 1.83400 | v11 | 37.17 |
| r20 | 102.907 | | | | | | |
| | | d20 | 7.384~3.742~2.663 | | | | |

<Fourth Lens Unit Gr4-positive>
{Front Lens Unit GrA-Image Blur Compensating Lens Unit}

| | | | | | | | |
|---|---|---|---|---|---|---|---|
| r21 | 24.467 | | | | | | |
| | | d21 | 2.362 | N12 | 1.58170 | v12 | 69.75 |
| r22* | −59.882 | | | | | | |
| | | d22 | 0.354 | | | | |

{Rear Lens Unit GrB}

| | | | | | | | |
|---|---|---|---|---|---|---|---|
| r23* | −59.882 | | | | | | |
| | | d23 | 1.575 | N13 | 1.75450 | v13 | 51.57 |
| r24 | −27.635 | | | | | | |
| | | d24 | 2.756 | | | | |
| r25* | −86.973 | | | | | | |
| | | d25 | 1.488 | N14 | 1.74500 | v14 | 34.96 |
| r26 | 34.087 | | | | | | |
| | Σd = 64.862~68.073~71.323 | | | | | | |

[Aspherical Coefficient]

r22: ϵ = 1.0000
A4 = 0.27748 × 10$^{-4}$
r23: ϵ = 1.0000
A4 = 0.25095 × 10$^{-4}$
r25: ϵ = 1.0000
A4 = −0.76769 × 10$^{-4}$
A6 = −0.21795 × 10$^{-6}$
A8 = 0.57736 × 10$^{-9}$
A10 = −0.52121 × 10$^{-11}$
A12 = 0.27373 × 10$^{-13}$

TABLE 27

<< Embodiment 22 >>
f = 22.6~50.5~78.0
FNO = 4.10~5.45~6.20

| | Radius of Curvature | | Axial Distance | | Refractive Index | | Abbe Number |
|---|---|---|---|---|---|---|---|

<First Lens Unit Gr1-positive>

| | | | | | | | |
|---|---|---|---|---|---|---|---|
| r1 | 69.769 | | | | | | |
| | | d1 | 1.300 | N1 | 1.83350 | v1 | 21.00 |
| r2 | 45.196 | | | | | | |
| | | d2 | 6.550 | N2 | 1.58913 | v2 | 61.11 |
| r3 | −397.682 | | | | | | |
| | | d3 | 0.100 | | | | |
| r4 | 36.176 | | | | | | |
| | | d4 | 4.250 | N3 | 1.71300 | v3 | 53.93 |
| r5 | 44.734 | | | | | | |
| | | d5 | 1.845~14.591~25.237 | | | | |

TABLE 27-continued

<Second Lens Unit Gr2-negative>
{Front Lens Unit GrA}

| r6  | 123.224  |     |                  |     |         |     |       |
|-----|----------|-----|------------------|-----|---------|-----|-------|
|     |          | d6  | 1.100            | N4  | 1.80420 | v4  | 46.50 |
| r7  | 11.538   |     |                  |     |         |     |       |
|     |          | d7  | 4.400            |     |         |     |       |
| r8  | −72.748  |     |                  |     |         |     |       |
|     |          | d8  | 0.950            | N5  | 1.75450 | v5  | 51.57 |
| r9  | 26.505   |     |                  |     |         |     |       |
|     |          | d9  | 0.300            |     |         |     |       |
| r10 | 17.282   |     |                  |     |         |     |       |
|     |          | d10 | 3.700            | N6  | 1.75000 | v6  | 25.14 |
| r11 | −51.639  |     |                  |     |         |     |       |
|     |          | d11 | 0.940            |     |         |     |       |

{Rear Lens Unit GrB-Image Blur Compensating Lens Unit}

| r12 | −28.103 |     |                     |     |         |     |       |
|-----|---------|-----|---------------------|-----|---------|-----|-------|
|     |         | d12 | 1.300               | N7  | 1.69680 | v7  | 56.47 |
| r13 | 64.162  |     |                     |     |         |     |       |
|     |         | d13 | 10.332~3.957~2.000  |     |         |     |       |

<Aperture Diaphragm S, Third Lens Unit Gr3-positive>

| r14 | ∞ (Aperture Diaphragm S) |     |       |     |         |     |       |
|-----|--------------------------|-----|-------|-----|---------|-----|-------|
|     |                          | d14 | 0.500 |     |         |     |       |
| r15 | 21.611                   |     |       |     |         |     |       |
|     |                          | d15 | 3.310 | N8  | 1.62041 | v8  | 60.29 |
| r16 | −68.274                  |     |       |     |         |     |       |
|     |                          | d16 | 0.110 |     |         |     |       |
| r17 | 24.544                   |     |       |     |         |     |       |
|     |                          | d17 | 4.710 | N9  | 1.51742 | v9  | 52.15 |
| r18 | −13.473                  |     |       |     |         |     |       |
|     |                          | d18 | 1.360 | N10 | 1.80741 | v10 | 31.59 |
| r19 | 80.836                   |     |       |     |         |     |       |
|     |                          | d19 | 5.300~2.063~1.000 |   |       |     |       |

<Fourth Lens Unit Gr4-positive>

| r20  | 27.647   |     |                    |     |         |     |       |
|------|----------|-----|--------------------|-----|---------|-----|-------|
|      |          | d20 | 4.820              | N11 | 1.51823 | v11 | 58.96 |
| r21  | −19.138  |     |                    |     |         |     |       |
|      |          | d21 | 1.470              |     |         |     |       |
| r22* | 1610.591 |     |                    |     |         |     |       |
|      |          | d22 | 0.100              | N12 | 1.51790 | v12 | 52.31 |
| r23  | −292.156 |     |                    |     |         |     |       |
|      |          | d23 | 1.400              | N13 | 1.80500 | v13 | 40.97 |
| r24  | 42.444   |     |                    |     |         |     |       |
|      |          | Σd = 60.147~63.282~70.907 |   |   |     |     |       |

[Aspherical Coefficient]

r22: ε = 1.0000
A4 = −0.10446 × $10^{-3}$
A6 = −0.34881 × $10^{-6}$
A8 = −0.56963 × $10^{-9}$
A10 = −0.14711 × $10^{-10}$
A12 = −0.89025 × $10^{-15}$

TABLE 28

|              |       |       | D/f  |      |        |
|--------------|-------|-------|------|------|--------|
|              | f1/fW | fR/fW | [W]  | [T]  | |Pd|/fW |
| Embodiment 20 | 2.29 | 0.825 | 0.02 | 0.01 | 0.99 |
| Embodiment 21 | 2.65 | 0.876 | 0.85 | 0.18 | 0.74 |
| Embodiment 22 | 3.48 | 0.897 | 0.46 | 0.03 | 0.81 |

What is claimed is:

1. A zoom lens system comprising from an object side:
   a first lens unit having a positive refractive power, said first lens unit being moved toward the object side during zooming from a wide-angle limit to a telephoto limit;
   a second lens unit having a negative refractive power;
   a third lens unit having a positive refractive power; and
   a fourth lens unit having a positive refractive power, said fourth lens unit being moved toward the object side during zooming from the wide-angle limit to the telephoto limit,
   wherein one image blur compensating single lens element in any of the second to fourth lens units is moved vertically to an optical axis to compensate for an image blur, and wherein the following condition is fulfilled:

$0.75 < |fR/fW| < 1.8$ where fR is a composite focal length of the third lens unit and the entire lens units provided at an image side of the third lens unit at the wide-angle limit, and fW is a focal length of the entire zoom lens system at the wide-angle limit.

2. A zoom lens system as claimed in claim 1, wherein the second lens unit includes the image blur compensating lens element.

3. A zoom lens system as claimed in claim 1, wherein the third lens unit includes the image blur compensating lens element.

4. A zoom lens system as claimed in claim 1, wherein the fourth lens unit includes the image blur compensating lens element.

5. A zoom lens system as claimed in claim 1, wherein said image blur compensating lens is a doublet lens formed of a positive lens and a negative lens.

6. A zoom lens system as claimed in claim 1, wherein said zoom lens system has an aperture diagram, and fulfills the following condition:

$D/f < 1.2$ where D is a distance from an aperture diaphragm side surface of the image blur compensating lens element to the aperture diaphragm, and f is a focal length of the entire zoom lens system.

7. A zoom lens system as claimed in claim 1, further fulfilling the following condition:

$|Pd|/fW < 2.30$ where Pd is a refractive power of the image blur compensating lens element.

8. A zoom lens system as claimed in claim 1, wherein overall refractive power of the image blur compensating lens element is positive, said image blur compensating lens element being a doublet lens formed of a positive lens element and a negative lens element, and fulfilling the following condition:

$vp > vn$ where vp is an Abbe number of the positive lens element, and vn is an Abbe number of the negative lens element.

9. A zoom lens system as claimed in claim 1, wherein overall refractive power of the image blur compensating lens element is negative, said image blur compensating lens element being a doublet lens formed of a positive lens element and a negative lens element, and fulfilling the following condition:

$vp < vn$ where vp is an Abbe number of the positive lens element, and vn is an Abbe number of the negative lens element.

10. A zoom lens system comprising from an object side:
    a first lens unit having a positive refractive power, said first lens unit being moved toward the object side during zooming from a wide-angle limit to a telephoto limit;

a second lens unit having a negative refractive power;

a third lens unit having a positive refractive power; and a fourth lens unit having a positive refractive power, wherein any of the second lens unit and lens units disposed on an image side of the second lens unit comprises from the object side a front lens and a rear lens unit, either said front lens unit or said rear lens unit being moved vertically to an optical axis to compensate for an image blur, wherein a distance between said front and rear lens units is fixed during zooming, wherein the following condition is fulfilled:

$$2.1 < f1/fW < 4.3$$

where f1 is a focal length of the first lens unit, and fW is a focal length of the entire zoom lens system at the wide-angle limit.

11. A zoom lens system as claimed in claim 10, wherein the front lens unit and the rear lens unit are included in the second lens unit.

12. A zoom lens system as claimed in claim 10, wherein the front lens unit and the rear lens unit are included in the third lens unit.

13. A zoom lens system as claimed in claim 10, wherein the front lens unit and the rear lens unit are included in the fourth lens unit.

14. A zoom lens system as claimed in claim 10, wherein each of the first through fourth lens units are moved during a zooming mode of operation and one of the first lens units and rear lens units are maintained stationary during compensation for image blur.

15. A zoom lens system comprising from an object side:

a first lens unit having a positive refractive power, said first lens unit being moved toward the object side during zooming from a wide-angle limit to a telephoto limit;

a second lens unit having a negative refractive power;

a third lens unit having a positive refractive power; and a fourth lens unit, wherein any of the second lens unit and lens units disposed on an image side of the second lens unit comprises, from the object side, a front lens unit and a rear lens unit, either said front or said rear lens unit being moved vertically from an optical axis to compensate for an image blur, wherein the following condition is fulfilled:

$$2.1 < f1/fW < 4.3$$

where F1 is a focal length of the first lens unit, and fW is a focal length of the entire zoom lens system at the wide-angle limit.

16. A zoom lens system as claimed in claim 15, wherein said zoom lens system has an aperture diaphragm and fulfills the following condition:

$$D/f < 1.2$$

where D is a distance from an aperture diaphragm side surface either of the front or the rear lens unit moving vertically to an optical axis to compensate for an image blur to the aperture diaphragm, and f is a focal length of the entire zoom lens system.

17. A zoom lens system as claimed in claim 15, further fulfilling the following condition:

$$|Pd|/fW < 2.30$$

where Pd is a refractive power either of the front or the rear lens unit moving vertically to an optical axis to compensate for an image blur.

18. A zoom lens system as claimed in claim 15, wherein either of the front or the rear lens unit moving vertically to an optical axis to compensate for an image blur is a doublet lens formed of a positive lens element and a negative lens element, said doublet lens having a positive refractive power, said doublet lens fulfilling the following conditions:

$$vp > vn$$

where vp is an Abbe number of a positive lens element, vn is an Abbe number of a negative lens element.

19. A zoom lens system as claimed in claim 15, wherein either of the front or the rear lens unit moving vertically to an optical axis to compensate for an image blur is a doublet lens formed of a positive lens element and a negative lens element, said doublet lens having a negative refractive power, said doublet lens fulflling the following conditions:

$$vp < vn$$

where vp is an Abbe number of a positive lens element, vn is an Abbe number of a negative lens element.

20. A zoom lens system comprising from an object side:

a first lens unit having a positive refractive power, said first lens unit being moved toward the object side during zooming from a wide-angle limit to a telephoto limit;

a second lens unit having a negative refractive power, said second lens unit comprising from the object side a front lens unit and a rear lens unit, either said front lens unit or said rear lens unit being moved vertically to an optical axis to compensate for an image blur, a distance between said front and rear lens units being fixed during zooming and the front or the rear lens unit which is moved vertically to the optical axis to compensate for image blur has at least one positive lens element and at least one negative lens element;

a third lens unit having a positive refractive power; and a fourth lens unit having a negative refractive power, wherein the following condition is fulfilled:

$$0.4 < MT/MW < 2.5$$

wherein MT is a blur compensation movement amount of the second lens unit at the telephoto limit, and MW is a blur compensation movement amount of the second lens unit at the wide-angle limit.

21. A zoom lens system as claimed in claim 20, further comprising the following condition:

$$vp > vn$$

where vp is an Abbe number of a positive lens included in the second lens unit, and vn is an Abbe number of a negative lens included in the second lens unit.

22. A zoom lens system as claimed in claim 21, further comprising the following condition:

$$1.3 < (fT/fW) \cdot (\beta LW/\beta LT) < 7.0$$

where fT is the focal length of the entire lens system at the telephoto limit, fW is the focal length of the entire lens system at the wide-angle limit, βLW is the magnification of the fourth lens unit at the wide-angle limit, and βLT is the magnification of the fourth lens unit at the telephoto limit.

23. A zoom lens system as claimed in claim 22, wherein the third lens unit includes an aperture stop and the third lens unit and the aperture stop is moved during zooming.

\* \* \* \* \*